United States Patent
Hattori et al.

(10) Patent No.: US 10,306,273 B2
(45) Date of Patent: May 28, 2019

(54) INFORMATION PROCESSING DEVICE AND METHOD FOR GENERATING PARTIAL IMAGE INFORMATION INCLUDING GROUP IDENTIFICATION INFORMATION

(71) Applicant: SONY CORPORATION, Tokyo (JP)

(72) Inventors: Shinobu Hattori, Tokyo (JP); Mitsuhiro Hirabayashi, Tokyo (JP); Tatsuya Igarashi, Tokyo (JP); Mikita Yasuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/904,220

(22) PCT Filed: Jul. 16, 2014

(86) PCT No.: PCT/JP2014/068860
§ 371 (c)(1),
(2) Date: Jan. 11, 2016

(87) PCT Pub. No.: WO2015/008774
PCT Pub. Date: Jan. 22, 2015

(65) Prior Publication Data
US 2016/0156943 A1 Jun. 2, 2016

(30) Foreign Application Priority Data

Jul. 19, 2013 (JP) .................................. 2013-150977
Jan. 8, 2014 (JP) .................................. 2014-002046
Mar. 20, 2014 (JP) .................................. 2014-058762

(51) Int. Cl.
*H04N 21/234* (2011.01)
*H04N 21/231* (2011.01)
(Continued)

(52) U.S. Cl.
CPC ..... *H04N 21/23418* (2013.01); *H04N 21/231* (2013.01); *H04N 21/2353* (2013.01);
(Continued)

(58) Field of Classification Search
None
See application file for complete search history.

(56) References Cited

U.S. PATENT DOCUMENTS 5,999,694 A * 12/1999 Yasuda ................ G11B 27/105
386/248
2003/0093810 A1 * 5/2003 Taniguchi ........ G08B 13/19656
725/112
(Continued)

FOREIGN PATENT DOCUMENTS

WO WO2012/125006 A2 9/2012
WO WO 2012/168365 A1 12/2012
(Continued)

OTHER PUBLICATIONS

ISO/IEC JTC 1/SC 29, "Information technology—Coding of audio-visual objects—Part 12: ISO base media file format, Technical Corrigendum 5", Dec. 12, 2011, p. i-37.
(Continued)

*Primary Examiner* — Hoang Vu A Nguyen Ba
(74) *Attorney, Agent, or Firm* — Paratus Law Group, PLLC

(57) ABSTRACT

The present disclosure relates to an information processing device and method for adaptively supplying data of partial images. The information processing device includes: a partial image information generation unit configured to generate partial image information which is information regarding each partial image which is a part of an entire image; and a metadata generation unit configured to generate metadata to be used for supply of a bit stream of the entire image and (Continued)

supply of a bit stream of the partial image using the partial image information generated by the partial image information generation unit. For example, the present disclosure can be applied to an information processing device that performs a process for adaptively supplying image data.

14 Claims, 71 Drawing Sheets

(51) Int. Cl.
| | | |
|---|---|---|
| *H04N 21/235* | (2011.01) | |
| *H04N 21/262* | (2011.01) | |
| *H04N 21/845* | (2011.01) | |
| *H04N 21/854* | (2011.01) | |
| *H04N 21/2343* | (2011.01) | |
| *H04N 21/2385* | (2011.01) | |

(52) U.S. Cl.
CPC ... *H04N 21/2385* (2013.01); *H04N 21/23439* (2013.01); *H04N 21/234345* (2013.01); *H04N 21/26258* (2013.01); *H04N 21/8455* (2013.01); *H04N 21/8456* (2013.01); *H04N 21/85406* (2013.01)

(56) References Cited

U.S. PATENT DOCUMENTS

| | | | |
|---|---|---|---|
| 2012/0189221 A1* | 7/2012 | Inada | G06F 3/14 382/240 |
| 2013/0091251 A1 | 4/2013 | Walker et al. | |
| 2013/0185398 A1 | 7/2013 | Thang et al. | |
| 2014/0006564 A1 | 1/2014 | Thang et al. | |
| 2014/0204428 A1* | 7/2014 | Ito | G06T 1/60 358/447 |
| 2014/0219346 A1* | 8/2014 | Ugur | H04N 19/00575 375/240.12 |
| 2016/0080833 A1* | 3/2016 | Denoual | H04N 21/234327 725/116 |
| 2016/0191931 A1* | 6/2016 | Hannuksela | H04N 19/105 375/240.12 |

FOREIGN PATENT DOCUMENTS

| | | | | |
|---|---|---|---|---|
| WO | WO2012/168365 A1 | 12/2012 | | |
| WO | WO-2013-063094 | * | 5/2013 | ............... H04N 7/26 |
| WO | WO 2013/063094 A1 | 5/2013 | | |
| WO | WO2013/063094 A1 | 5/2013 | | |
| WO | WO2013/089437 A1 | 6/2013 | | |
| WO | WO-2014-170176 | * | 10/2014 | ......... H04N 21/4728 |
| WO | WO2014/170176 A1 | 10/2014 | | |
| WO | WO2014/188886 A1 | 11/2014 | | |
| WO | WO2015/004276 A2 | 1/2015 | | |

OTHER PUBLICATIONS

Le Feuvre, et al., "Support for efficient tile access in the HEVC File Format", International Organisation for Standardisation ISO/IEC JTC1/SC29/WG11, Apr. 2013, p. 1-11, Incheon, Korea.

Denoual, et al., "Interactive ROI streaming with DASH", International Organisation for Standardisation ISO/IEC JTC1/SC29/WG11, Apr. 2013, p. 1-8, Incheon, Korea.

Mar. 22, 2018, Chinese Office Action issued for related CN Application No. 201480039820.X.

Apr. 19, 2018, Chinese Office Action issued for related CN Application No. 201480039821.4.

Oct. 14, 2016, EP communication issued for related EP application No. 14826667.9.

Oct. 19, 2016, EP communication issued for related EP application No. 14825915.3.

Dec. 5, 2016, SG communication issued for related SG application No. 11201600223U.

Aug. 7, 2018, Japanese Office Action issued for related JP Application No. 2015-527309.

Aug. 7, 2018, Japanese Office Action issued for related JP Application No. 2015-527310.

Dec. 20, 2018, Japanese Office Action issued for related JP Application No. 2015-527309.

Dec. 20, 2018, Japanese Office Action issued for related JP Application No. 2015-527310.

Feb. 21, 2019, European Search Report issued for related EP Application No. 18201028.0.

* cited by examiner

INFORMATION PROCESSING DEVICE AND METHOD FOR GENERATING PARTIAL IMAGE INFORMATION INCLUDING GROUP IDENTIFICATION INFORMATION

CROSS REFERENCE TO PRIOR APPLICATION

This application is a National Stage Patent Application of PCT International Patent Application No. PCT/JP2014/068860 (filed on Jul. 16, 2014) under 35 U.S.C. § 371, which claims priority to Japanese Patent Application Nos. 2014-058762 (filed on Mar. 20, 2014), 2014-002046 (filed on Jan. 8, 2014), and 2013-150977 (filed on Jul. 19, 2013), which are all hereby incorporated by reference in their entirety.

TECHNICAL FIELD

The present disclosure relates to an information processing device and method, and more particularly, to an information processing device and method of adaptively supplying data of a partial image.

BACKGROUND ART

In recent years, as a content delivery technology using HyperText Transfer Protocol (HTTP), Moving Picture Experts Group-Dynamic Adaptive Streaming over HTTP (MPEG-DASH) was standardized (for example, see Non-Patent Literature 1). MPEG-DASH adopts an adaptive bitrate streaming (ABS) technology in which a plurality of pieces of encoded data in which the same content is expressed at different bit rates are stored in a content server and a client selects and reproduces one piece of encoded data among the plurality of pieces of encoded data according to a network bandwidth.

Incidentally, selecting a partial image which is a part of an image instead of the entire image and delivering it adaptively has been considered. For example, delivering a partial image which is a part selected in the entire image on a terminal side receiving image data, or controlling the size of the partial image to be delivered according to the performance of the terminal (for example, a processing ability of a CPU or the like or the size of a display), a transmission path, a load situation of a server, or the like has been considered.

CITATION LIST

Non-Patent Literature

Non-Patent Literature 1: MPEG-DASH (Dynamic Adaptive Streaming over HTTP) (URL:http://mpeg.chiariglione.org/standards/mpeg-dash/media-presentation-description-and-segment-formats/text-isoiec-23009-12012-dam-1)

SUMMARY OF INVENTION

Technical Problem

However, the MPEG-DASH standard of the related art relates only to the concept of switching bit rates (Bitrates), and no selection of any partial image or supply of the data performed using tile structures described above, that is, adaptive supply of data of partial images, may be performed.

It is desirable to provide a technology for adaptively supplying data of partial images.

Solution to Problem

According to an aspect of the present technology, there is provided an information processing device including: a partial image information generation unit configured to generate partial image information which is information regarding each partial image which is a part of an entire image; and a metadata generation unit configured to generate metadata to be used for supply of a bit stream of the entire image and supply of a bit stream of the partial image using the partial image information generated by the partial image information generation unit.

The partial image information may include positional information indicating a position of the partial image in the entire image.

The positional information may indicate a position of an upper left of the partial image.

The metadata generation unit may store the partial image information regarding the plurality of partial images in mutually different adaptation sets (AdaptationSet) of the metadata and assign the bit streams of the plurality of partial images to the mutually different adaptation sets.

The metadata generation unit may store the partial image information regarding the plurality of partial images in mutually different adaptation sets (AdaptationSet) of the metadata and assign a plurality of files for which one bit stream including the plurality of partial images is divided for each partial image to the mutually different adaptation sets.

The metadata generation unit may store the partial image information regarding the plurality of partial images in mutually different sub-representations (Sub-Representation) belonging to one representation (Representation) belonging to one adaptation set (AdaptationSet) of the metadata and assign the bit streams of the plurality of partial images to the mutually different sub-representations.

The partial image information generation unit may further generate information indicating that information regarding the bit stream is present under the sub-representation (Sub-Representation).

Each of the bit streams of the plurality of partial images may be stored in a TRACK of one MP4 file.

The metadata generation unit may further generate information indicating a location of data of the one MP4 file.

The partial image information may further include information regarding a size of the entire image.

The partial image information may further include group identification information identifying a group which is a group to which the partial images belong and which is a group of the partial images displayable as one image.

The information processing device may further includes an encoding unit configured to encode image data of the entire image and the partial images and generate a bit stream.

The information processing device may further includes a screen division processing unit configured to generate image data of each partial image from image data of the entire image.

The partial image information may include information indicating the number of partial images forming the entire image, identification information indicating that sizes of the partial images are equal, and information indicating a position and a size of each partial image when the sizes of the partial images are not equal.

According to an aspect of the present technology, there is provided an information processing method including: generating partial image information which is information regarding each partial image which is a part of an entire image; and generating metadata to be used for supply of a bit stream of the entire image and supply of a bit stream of the partial image using the generated partial image information.

According to another aspect of the present technology, there is provided an information processing device including: an analysis unit configured to analyze metadata including partial image information which is information regarding each partial image which is a part of an entire image and used for supply of a bit stream of the entire image and supply of a bit stream of the partial image and to obtain the partial image information; a selection unit configured to select a bit stream of a desired partial image using the partial image information obtained by the analysis unit; and a bit stream acquisition unit configured to acquire the bit stream selected by the selection unit.

The partial image information may include positional information indicating a position of the partial image in the entire image.

The positional information may indicate a position of an upper left of the partial image.

The analysis unit may analyze the metadata in which the partial image information regarding the plurality of partial images is stored in mutually different adaptation sets (AdaptationSet) and the bit streams of the plurality of partial images are assigned to the mutually different adaptation sets.

The analysis unit may analyze the metadata in which the partial image information regarding the plurality of partial images is stored in mutually different adaptation sets (AdaptationSet) and a plurality of files for which one bit stream including the plurality of partial images is divided for each partial image are assigned to the mutually adaptation sets.

The analysis unit may analyze the metadata in which the partial image information regarding the plurality of partial images is stored in mutually different sub-representations (Sub-Representation) belonging to one representation (Representation) belonging to one adaptation set (AdaptationSet) and the bit streams of the plurality of partial images are assigned to the mutually different sub-representations.

The partial image information may include information indicating that information regarding the bit stream is present under the sub-representation (Sub-Representation).

Each of the bit streams of the plurality of partial images may be stored in a TRACK of one MP4 file.

The metadata may include information indicating a location of data of the one MP4 file.

The partial image information may further include information regarding a size of the entire image.

The partial image information may further include group identification information identifying a group which is a group to which the partial images belong and which is a group of the partial images displayable as one image.

The information processing device may further include a decoding unit configured to decode the bit stream acquired by the bit stream acquisition unit.

The information processing device may further includes a screen combination processing unit configured to generate image data of the entire image from image data of the partial image obtained by the decoding unit decoding the bit stream.

The partial image information may include information indicating the number of partial images forming the entire image, identification information indicating that sizes of the partial images are equal, and information indicating a position and a size of each partial image when the sizes of the partial images are not equal.

According to another aspect of the present technology, there is provided an information processing method including: analyzing metadata including partial image information which is information regarding each partial image which is a part of an entire image and used for supply of a bit stream of the entire image and supply of a bit stream of the partial image and obtaining the partial image information; selecting a bit stream of a desired partial image using the obtained partial image information; and acquiring the selected bit stream.

According to an aspect of the present technology, partial image information which is information regarding each partial image which is a part of an entire image is generated; and metadata to be used for supply of a bit stream of the entire image and supply of a bit stream of the partial image is generated using the generated partial image information.

According to another aspect of the present technology, metadata is analyzed, the metadata including partial image information which is information regarding each partial image which is a part of an entire image and used for supply of a bit stream of the entire image and supply of a bit stream of the partial image and obtaining the partial image information; a bit stream of a desired partial image is selected using the obtained partial image information; and the selected bit stream is acquired.

Advantageous Effects of Invention

According to an embodiment of the present disclosure, information can be processed. In particular, it is possible to adaptively supply data of partial images.

BRIEF DESCRIPTION OF DRAWINGS

FIG. 18 is a diagram illustrating an example of an extended MPD.

FIG. 21 is a diagram illustrating an example of an extended MPD.

FIG. 24 is a diagram illustrating an example of an extended MPD.

FIG. 26 is a diagram illustrating an example of an extended MPD.

FIG. 28 is a diagram illustrating an example of an extended MPD.

FIG. 30 is a diagram illustrating an example of an extended MPD.

FIG. 33 is a diagram illustrating an example of an extended MPD.

DESCRIPTION OF EMBODIMENTS

Hereinafter, modes (hereinafter referred to as embodiments) for carrying out the present disclosure will be described. The description will be made in the following order, 1. First embodiment (MPD extension)
2. Second embodiment (delivery system)
3. Third embodiment (specific example of MPD extension)
4. Fourth embodiment (other example of MPD extension)
5. Fifth embodiment (MP4 file and other example of MPD extension)
6. Sixth embodiment (computer)
7. Seventh embodiment (multi-view image encoding device and multi-view image decoding device)
8. Eighth embodiment (layered image encoding device and layered image decoding device)
9. Ninth embodiment (application examples)
10. Tenth embodiment (set, unit, module, and processor)

1. First Embodiment

<DASH>

Conventionally, as a content delivery technology using HyperText Transfer Protocol (HTTP), there is Moving Picture Experts Group-Dynamic Adaptive Streaming over HTTP (MPEG-DASH) as described in Non-Patent Literature 1. MPEG-DASH adopts an adaptive bitrate streaming (ABS) technology in which a plurality of pieces of encoded data in which the same content is expressed at different bit rates are stored in a content server and a client selects and reproduces one piece of encoded data among the plurality of pieces of encoded data according to a network bandwidth.

Figure 1:
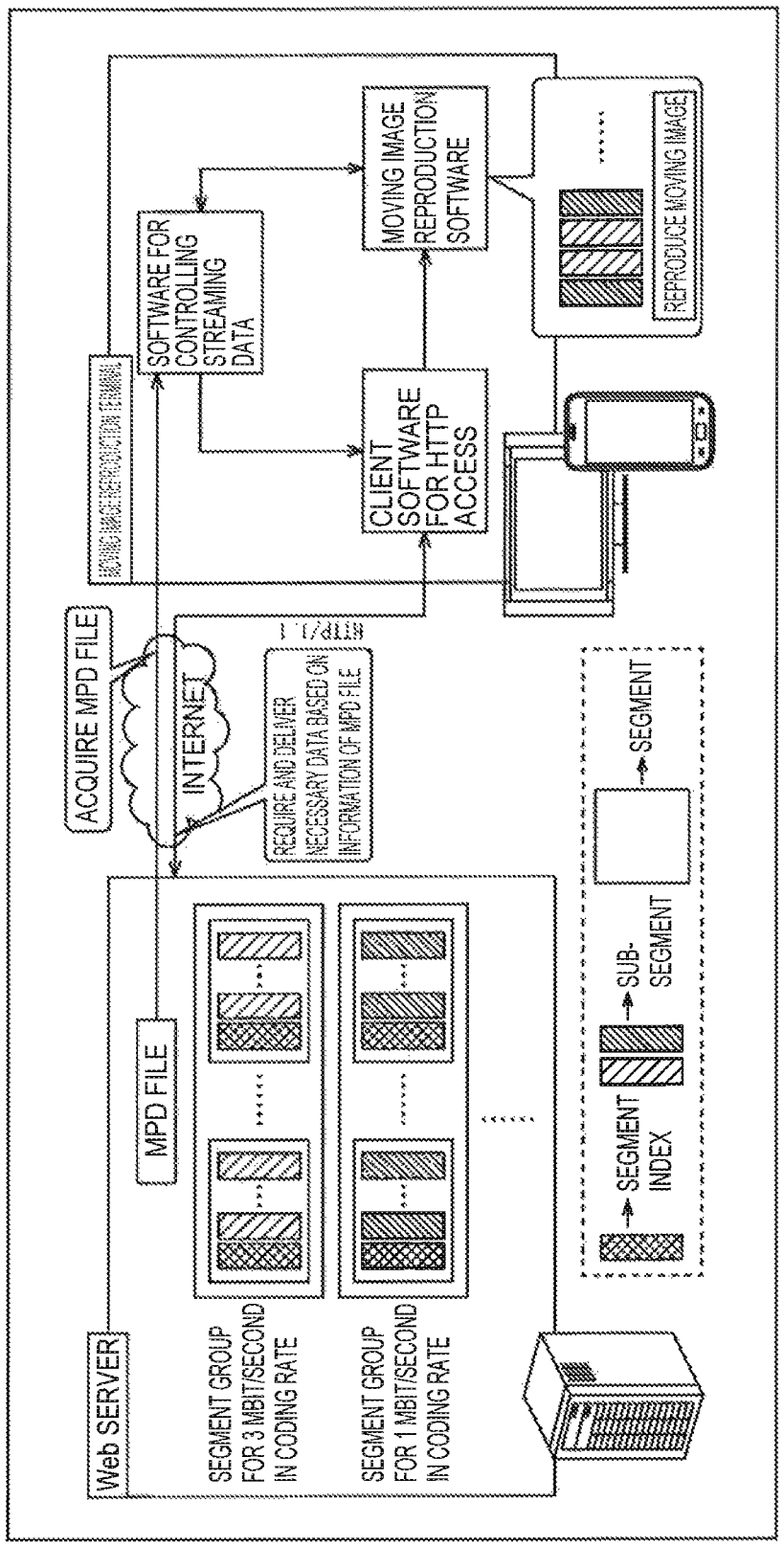
FIG. 1 is a diagram for describing the overview of MPEG-DASH.

A procedure of transmission of content by DASH will be described with reference to FIG. 1. First, in a moving image reproduction terminal of a side acquiring the content, software for controlling streaming data selects a media presentation description (MPD) file of desired content and acquires the MPD file from a web server. The MPD is metadata for managing content such as a moving image or audio to be delivered.

When the MPD is acquired, the software for controlling streaming data of the moving image reproduction terminal analyzes the MPD and performs control such that data (a DASH segment) of the desired content appropriate for the quality of a communication line, the performance of the moving image reproduction terminal, or the like is acquired from the web server. Client software for HTTP access acquires the DASH segment using HTTP from the web server under the control. The content acquired in this way is reproduced by moving image reproduction software.

Figure 2:
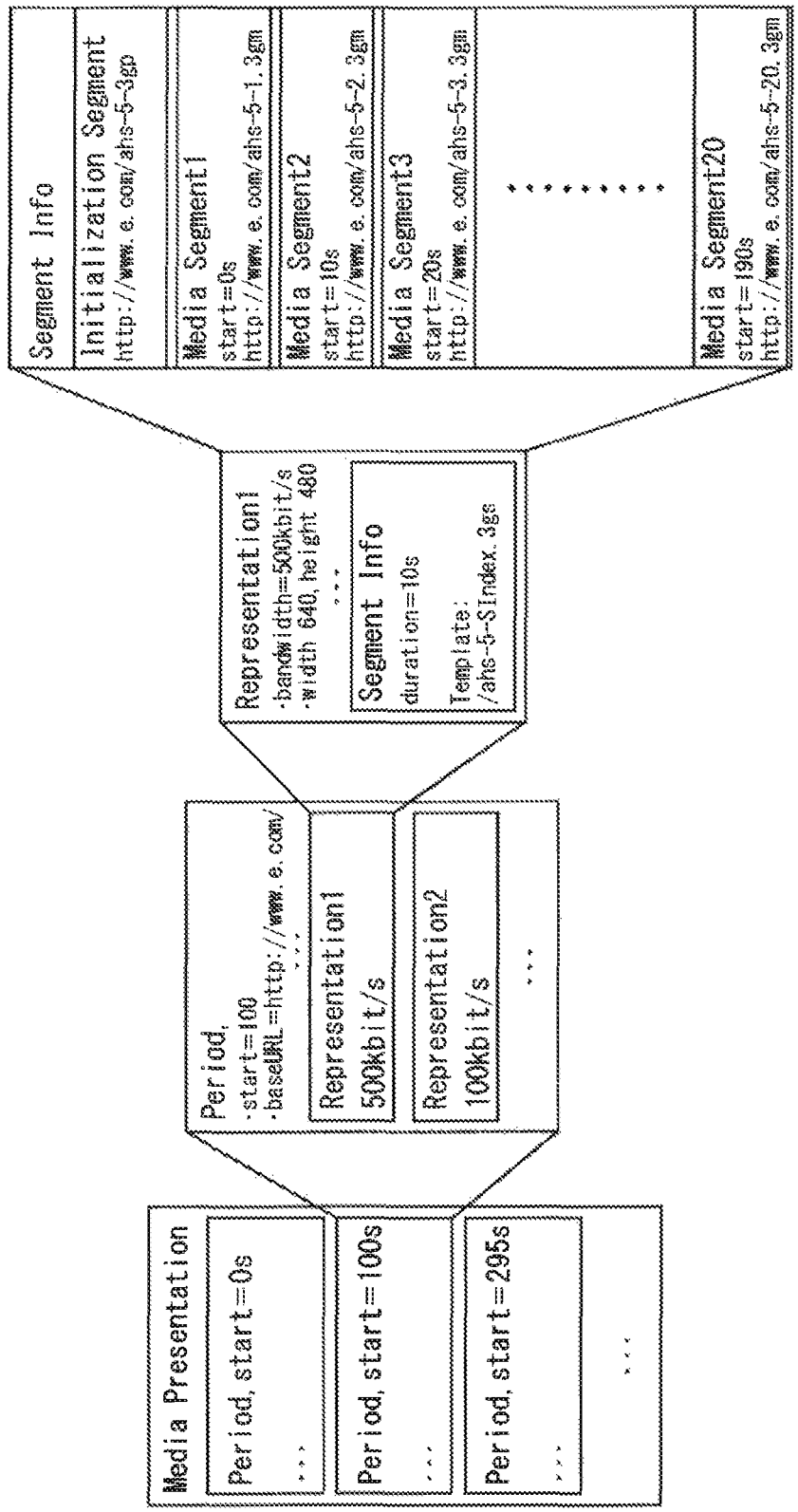
FIG. 2 is a diagram illustrating an example of the configuration of an MPD.

The MPD has, for example, the configuration illustrated in FIG. 2. In the analysis (parsing) of the MPD, a client selects an optimum representation from attributes of representations (Representation) included in periods (Period) of the MPD (Media Presentation in FIG. 2).

The client reads the beginning segment (Segment) of the selected representation (Representation) to acquire and process an initialization segment (Initialization Segment). Subsequently, the client acquires and reproduces subsequent segments (Segment).

Figure 3:
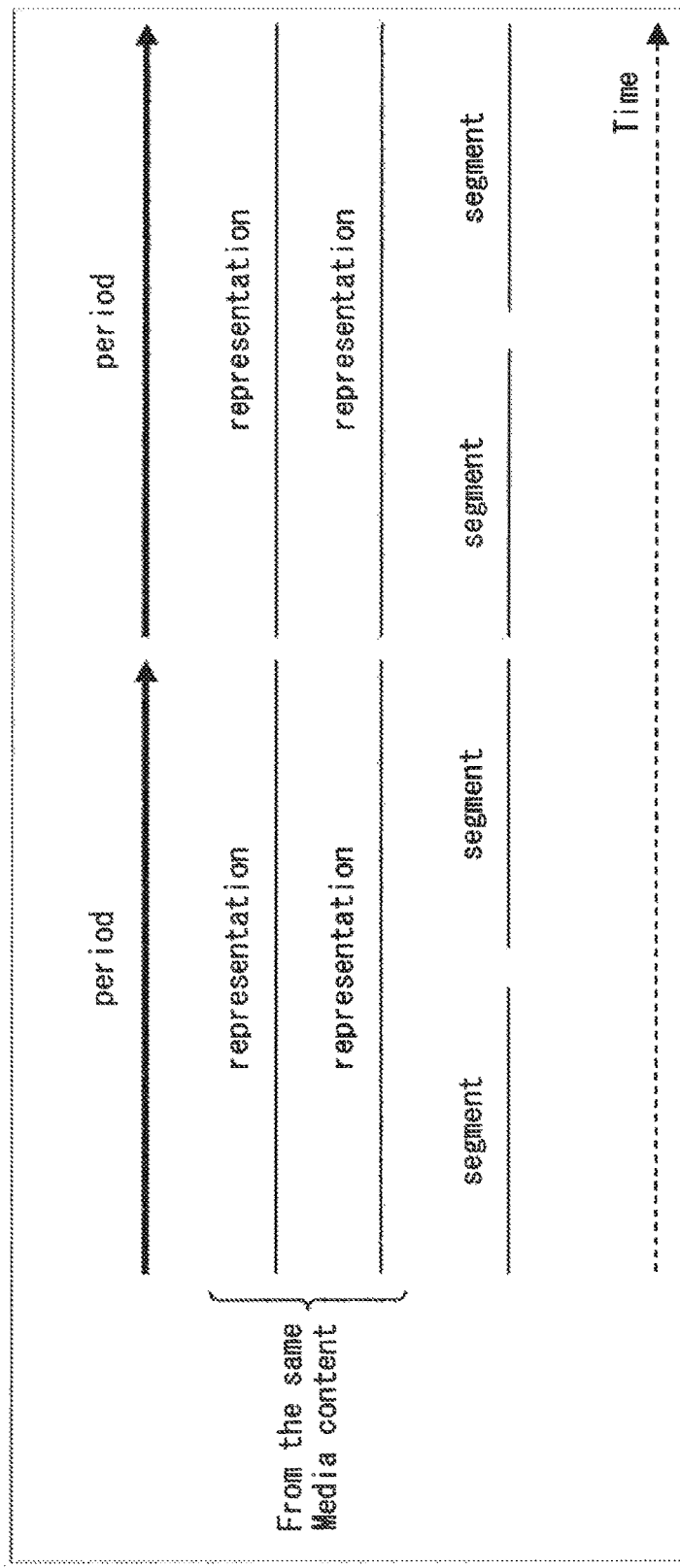
FIG. 3 is a diagram for describing temporal separation of content.

A relation among the period (Period), the representation (Representation), and the segment (Segment) in the MPD is illustrated in FIG. 3. That is, one piece of media content can be managed for each period (Period) which is a unit of data in a time direction and each period (Period) can be managed for each segment (Segment) which is a unit of data in the time direction. For each period (Period), a plurality of representations (Representation) with different attributes such as bit rates can be configured.

Figure 4:
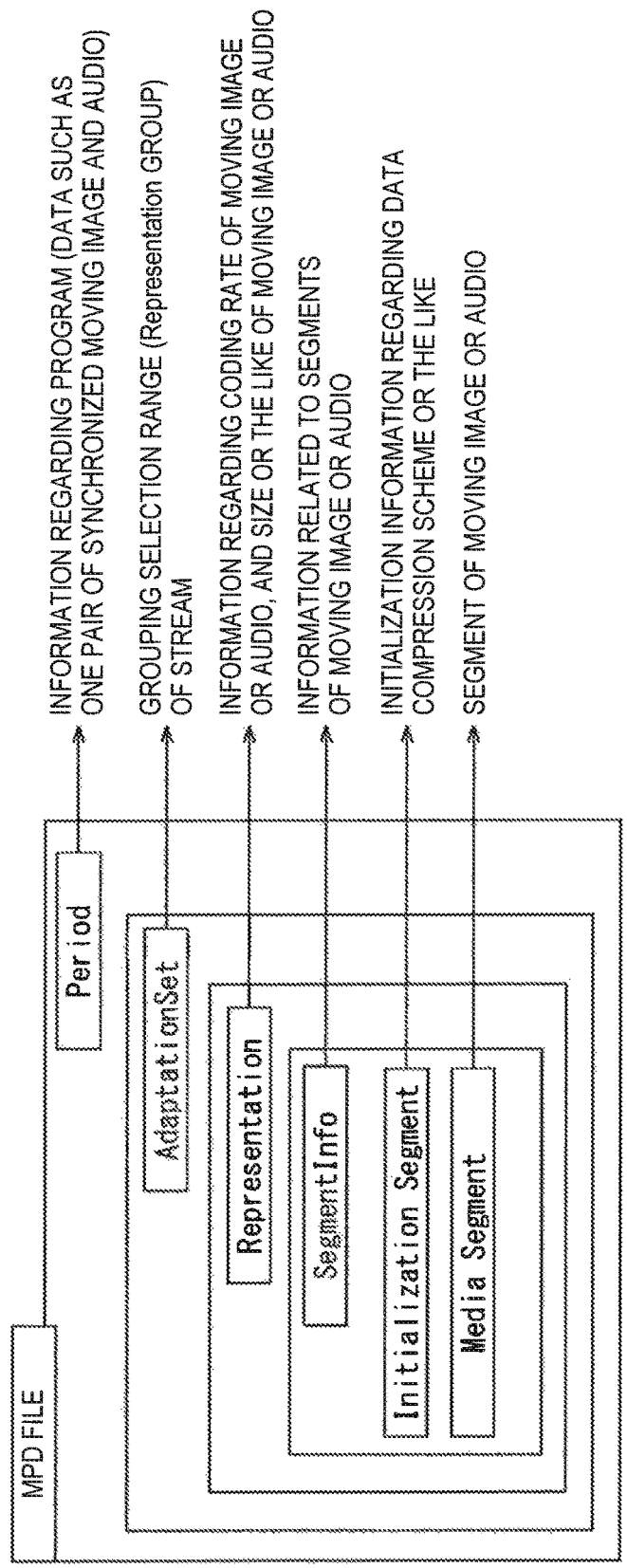
FIG. 4 is a diagram illustrating an example of a layered structure below a period in the MPD.
Figure 5:
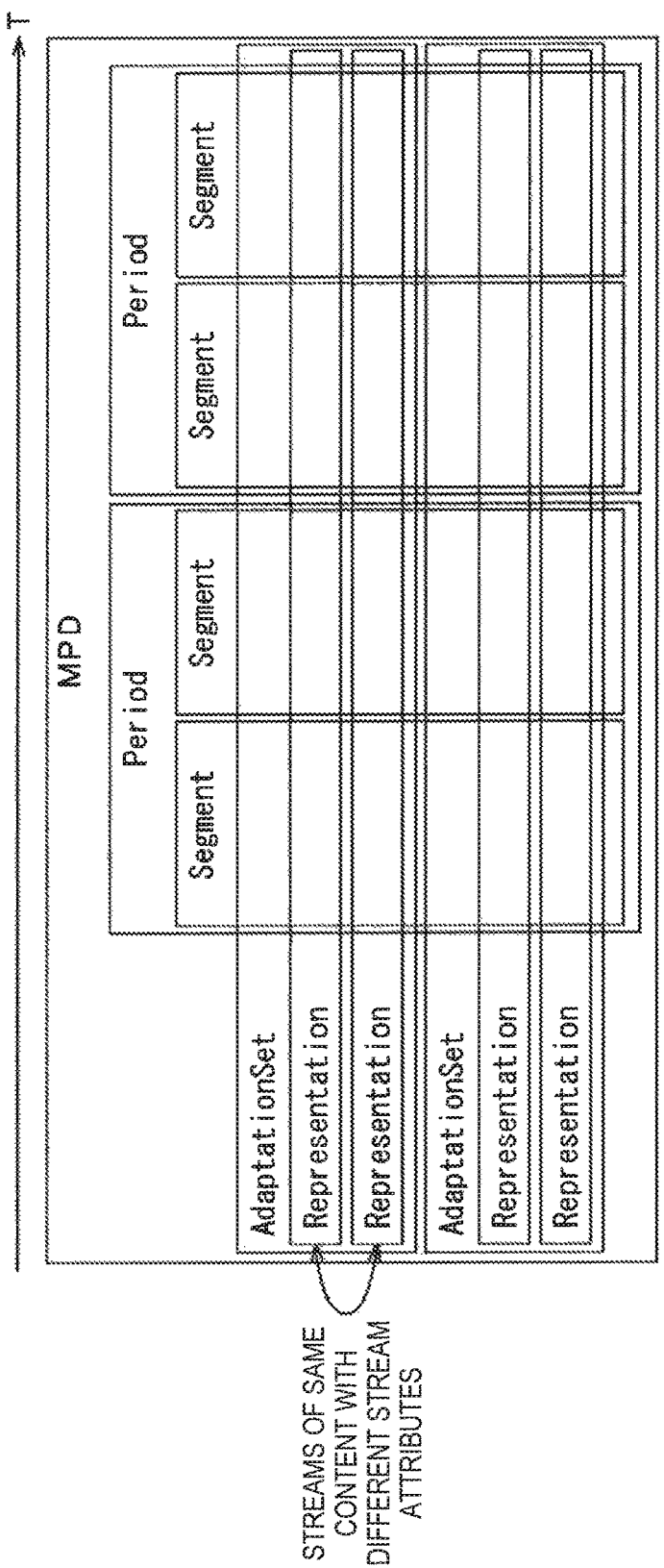
FIG. 5 is a diagram for describing an example of the configuration of an MPD file on a time axis.

Accordingly, a file of the MPD (also referred to as an MPD file) has the layered structure illustrated in FIG. 4 below the period (Period). When the structure of the MPD is arranged on the time axis, the MPD has the structure illustrated in the example of FIG. 5. For the same segment (Segment), a plurality of representations (Representation) are present as is apparent from the example of FIG. 5. The client can acquire proper stream data according to a communication environment, a decoding ability of the client, or the like by adaptively selecting any of the representations to reproduce the stream data.

<Tile Structure>

In DASH of the related art, delivery of data of an entire image is adaptively controlled, but selecting a partial image which is a part of an image instead of the entire image and delivering it adaptively has been considered. For example, delivering a partial image which is a part selected in the entire image on a terminal side receiving image data, or controlling the size of the partial image to be delivered according to the performance of the terminal (for example, a processing ability of a CPU or the like or the size of a display), a transmission path, a load situation of a server, or the like has been considered.

In order to perform the adaptive delivery of a partial image, the concept of a tile (Tile) has been used. A tile (Tile) is a partial region obtained by dividing an entire image in a pre-decided layout (a size, a shape, a number, or the like). Hereinafter, an image of one tile is referred to as a tile image. When an entire image is tiled in advance in this way, adaptive delivery of a partial image can be facilitated merely by selecting a tile image to be delivered. In this case, a partial image is configured by a single tile image or a plurality of tile images.

Figure 6:
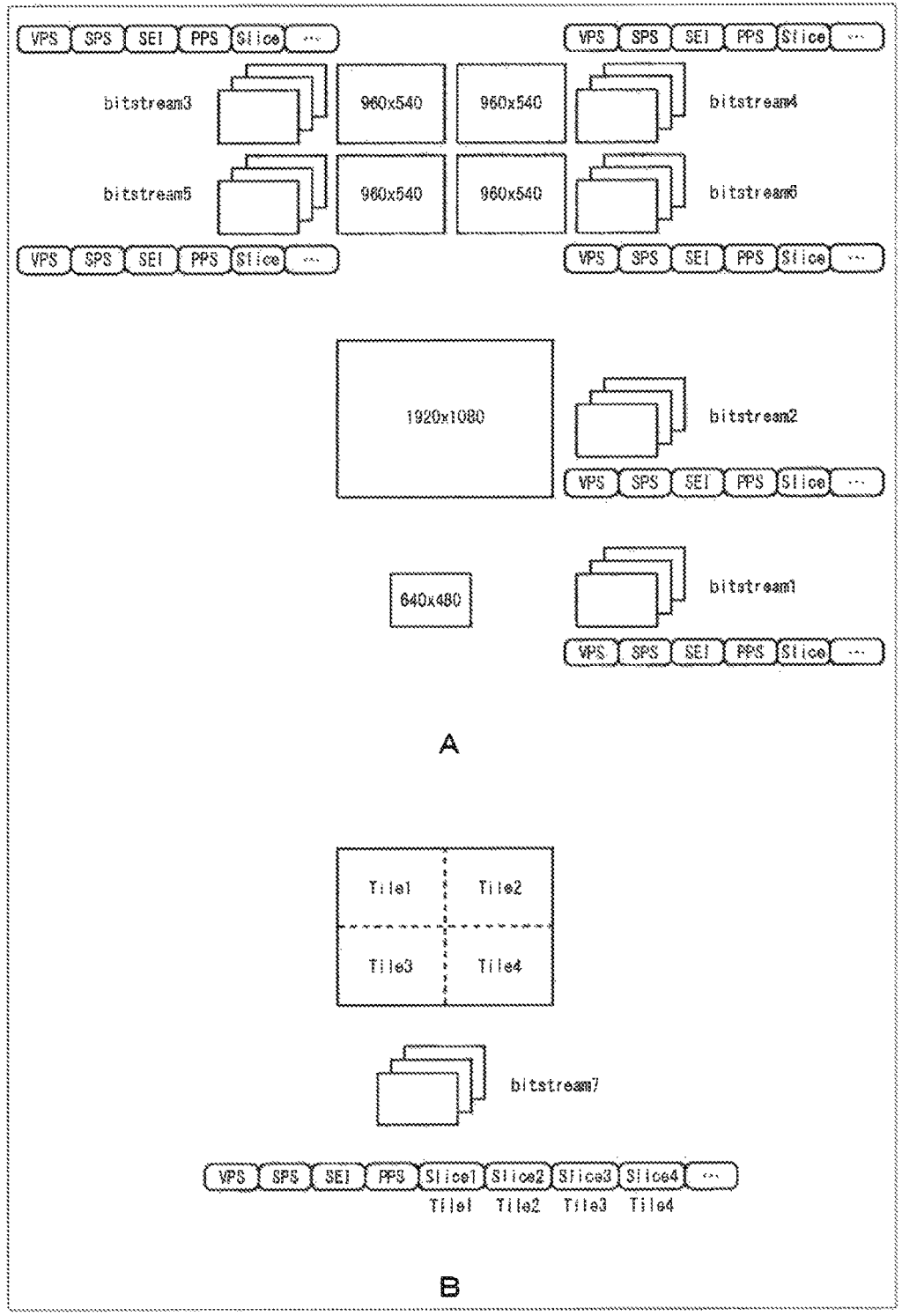
FIG. 6 is a diagram illustrating examples of bit streams of tile images.

When the partial image is delivered using HTTP as in DASH, image data is encoded and a bit stream of the image data is filed to be delivered (published as a file). When an entire image has the above-described tile structure, image data is encoded independently for each tile image. At this time, as in the example illustrated in FIG. 6A, each piece of encoded data of each tile may be configured in one bit stream.

In the example of FIG. 6A, an entire image with a 640×480 size, an entire image with a 1980×1080 size, and each of tile images (four partial images) with a 960×540 size obtained by dividing the entire image into two in the vertical and horizontal directions are prepared as images for delivery. Data of the entire image with the 640×480 size is encoded and considered to be one bit stream (bitstream1) and the data of the entire image with the 1980×1080 size is also encoded and considered to be one bit stream (bitstream2). In addition to the data, data of each tile image with the 960×540 size is independently encoded and considered to be one bit stream (bitstream3 to bitstream6).

In each bit stream, header information such as a video parameter set (VPS), a sequence parameter set (SPS), supplemental enhancement information (SEI), and a picture parameter set (PPS) is added, and the bit stream of the image data is arranged for each slice (Slice).

By setting such a structure, a tile image to be delivered can be selected by selecting the bit stream to be delivered selected from bitstream3 to bitstream6. In the case of the example of FIG. 6A, each tile image can be delivered as the entire image.

Incidentally, for example, in a coding scheme such as high efficiency video coding (HEVC), a structure called tiles (Tile) into which an entire image is divided is supported, and thus encoding can be independently performed for each tile. For example, decoding can be performed so that only the image of some of the tiles is obtained. That is, the decoding can be performed so that only a partial image which is a part of the entire image is obtained.

As in the example illustrated in FIG. 6B, encoded data of a plurality of tile images can also be configured as one bit stream (bitstream7) using the function of such a coding scheme. That is, in this case, the tiles (Tile) for delivery described above are handled as tiles (Tile) supported by the coding scheme to be encoded. In this case, in the bit stream, the data of the tiles is arranged as slices (Slice).

<MP4 File>

As described above, the bit stream for delivery is filed in accordance with, for example, an MP4 file format. In this case, the bit stream of each tile can be set to be a separate file, as in the example illustrated in FIG. 7. The bit stream of each tile is managed in units called tracks (Track). Further, header (Header) information regarding each tile and a base track (Base Track) in which reference to each track is described are provided and filed as a different file from the bit stream of each tile. When all of the tiles are decoded, the base track is reproduced. When each tile is decoded, the base track is referred to in the header information.

Figure 7:
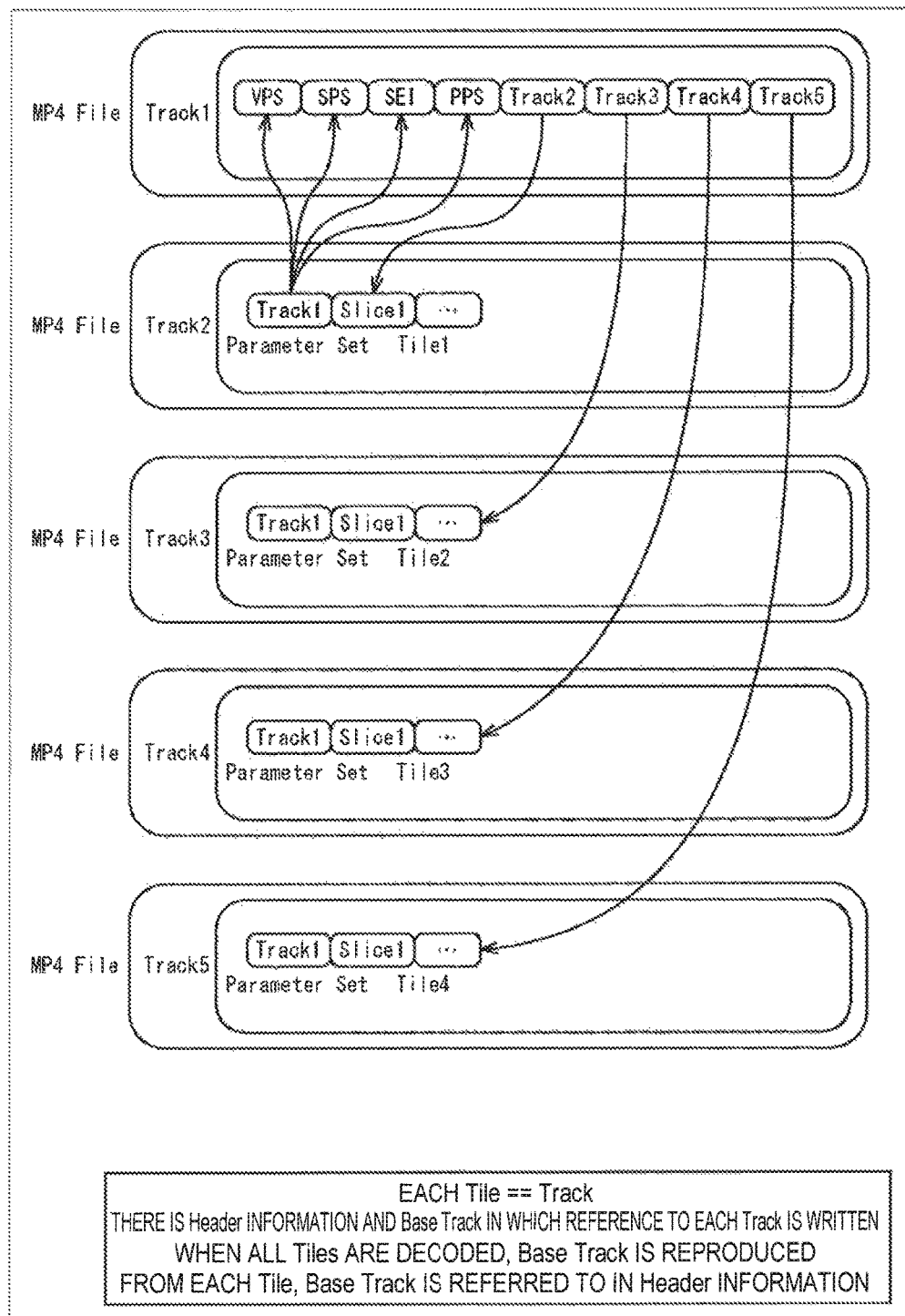
FIG. 7 is a diagram for describing examples of MP4 files of tile images.
Figure 8:
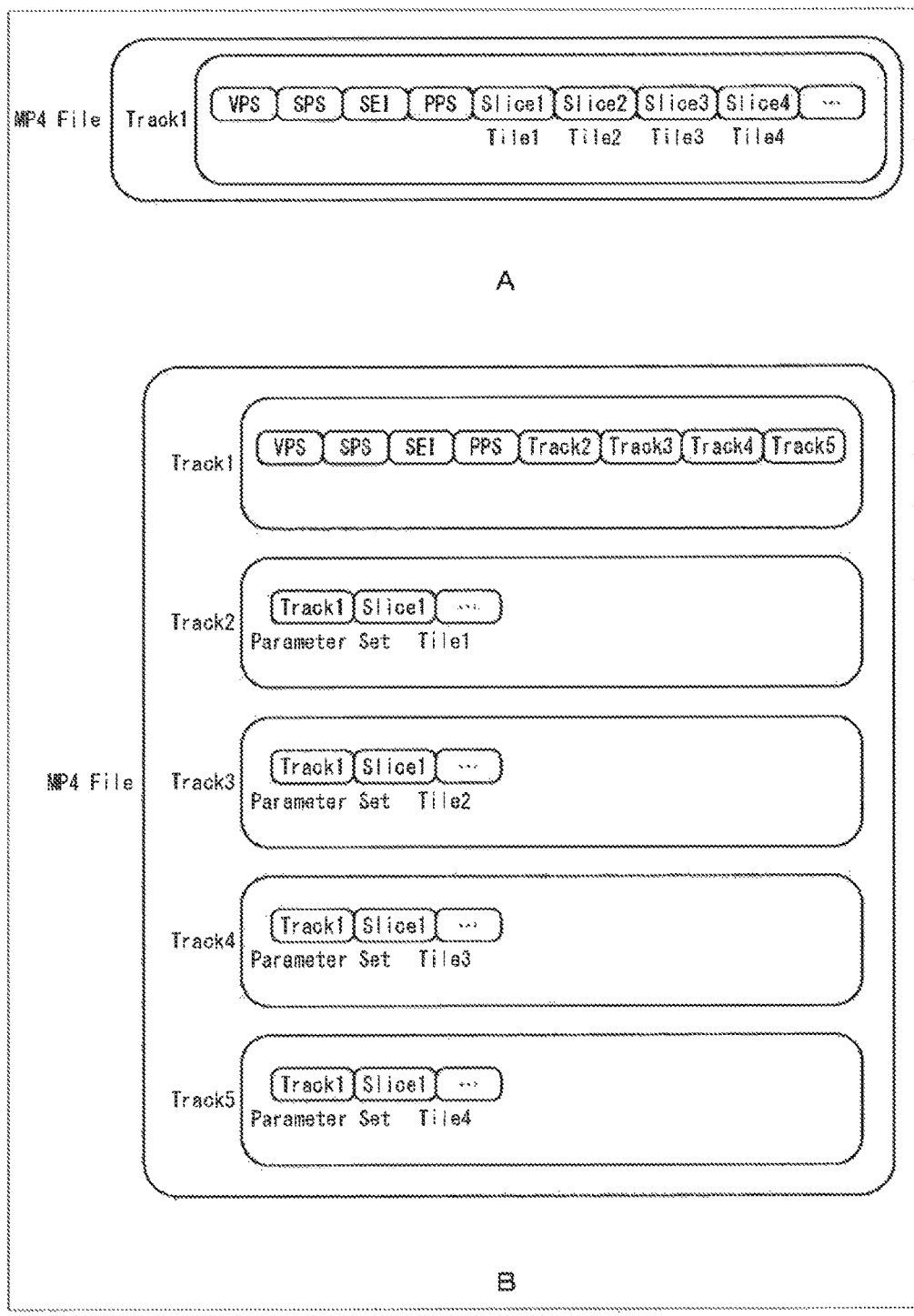
FIG. 8 is a diagram for describing other examples of the MP4 files of the tile images.

As in the example illustrated in FIG. 8, the bit streams of the tiles can also be collected and configured in one file. At this time, data of the tiles can also be collected and managed in one track as in FIG. 8A and the tiles can also be managed as mutually different tracks as in FIG. 8B. In this case, as in the case of FIG. 7, the header (Header) information regarding each tile and the base track (Base Track) in which the reference to each track is described are provided.

<Division Method>

Figure 9:
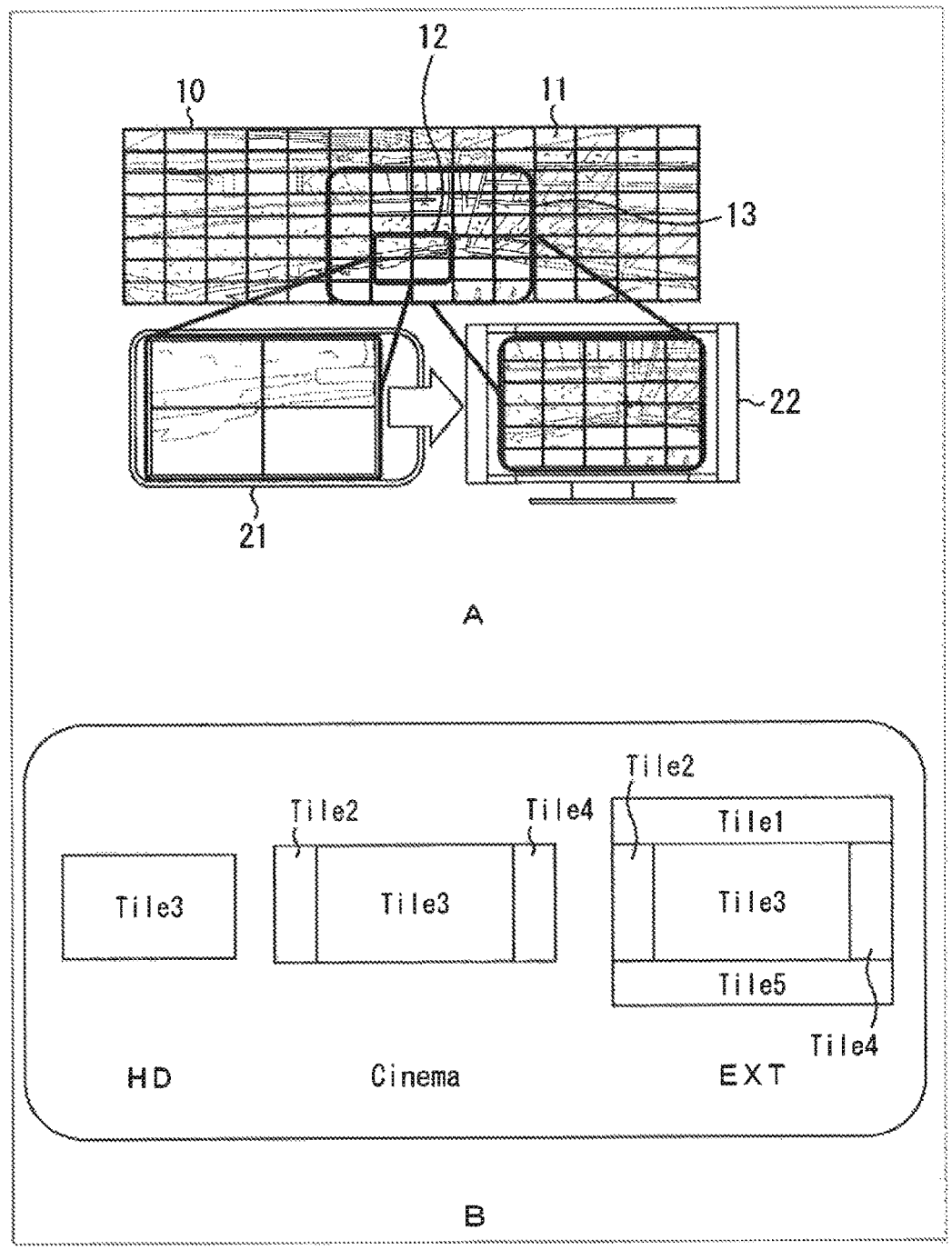
FIG. 9 is a diagram for describing examples of division sizes.

The tiles (Tile) may be tiles obtained by equally dividing an entire image as in the example of FIG. 9A or may be tiles obtained by unequally dividing an entire image as in the example of FIG. 9B. That is, the image sizes of the tile images forming the entire image may be the same as or different from one another.

<Application>

As an example of an application using such a tile (Tile) structure, for example, an application controlling the size of a partial image to be displayed can be considered.

An entire image 10 illustrated in FIG. 9A is assumed to be tiled and divided into a plurality of tile images 11 with the same size. For example, when the image is displayed by a motile device 21 with a display of a small size, an application displays partial images 12 which are 4 tile images of 2×2. For example, when the image is displayed by a television signal receiver (TV) 22 with a display of a large size, an application displays partial images 13 which are 30 tile images of 6×5. In this way, an application controlling the image sizes of partial images displayed according to the performance or the like of a terminal displaying an image is considered.

In the case of the example of FIG. 9B, the image sizes of the tile images are unequal. The application can display an image with an HD resolution by displaying an image of a tile 3 (Tile 3), can display an image with a cinema resolution by displaying images of tile 2 (Tile 2) to tile 4 (Tile 4), and can further display an image with a further extended size (EXT) by displaying images of tile 1 (Tile1) to tile 5 (Tile5). In this way, the application controlling a resolution or an aspect ratio of a display image by controlling the image sizes of partial images to be displayed is considered.

Since it is not necessary to deliver an image of an unnecessary portion that will not be displayed by adaptively controlling the sizes of partial images to be delivered (by controlling the number of tile images to be delivered), as described above, according to the image sizes of the partial images to be displayed in such an application, a load of a server, a terminal, a transmission path, or the like can be adaptively controlled, and thus it is possible to suppress an increase in an unnecessary load.

<Adaptive Supply of Tile Images>

However, the MPEG-DASH standard of the related art relates only to the concept of switching bit rates (Bitrates), and no selection of any partial image or supply of the data performed using tile structures described above, that is, adaptive supply of data of partial images, may be performed.

Accordingly, partial image information which is information regarding a partial image which is a part of an entire image is generated as extended data of the MPD, and an extended MPD which is extended to include metadata used for supply of a bit stream of the entire image and supply of a bit stream of the partial image, that is, the partial image information, is generated using the generated partial image information.

The partial image to be supplied may be any partial image as long as the partial image is a part of the entire image, and the shape, size, etc. are arbitrary. For example, the partial image may be a part which can be encoded independently from other portions. Hereinafter, however, to facilitate the description, the partial image is assumed to be an image in units of tiles described above. That is, the partial image is assumed to be formed by a single tile image or a plurality of tile images.

The MPD has a layered structure, for example, layers of an adaptation set (AdaptationSet), a representation (Representation), a sub-representation (Sub-Representation), and a sub-segment (Sub-Segment). Any of these layers may be extended.

For example, a description for a tile (Tile) is defined utilizing a descriptor type element (DescriptorType element) of the MPD. For example, a description for a tile called a viewpoint (Viewpoint) is defined as in FIG. 10A.

The viewpoint is an element which is present in the adaptation set (AdaptationSet). The viewpoint is a description that defines what the view is. For example, the viewpoint defines whether the view is a right (R) image or a left (L) image of a stereo image.

That is, when the adaptation set is extended, an element of the related art is used (extended). By using the element of the related art, it is possible to suppress a reduction in affinity to an MPD of the related art (it is possible to suppress an increase in a description which may not be analyzed by a decoder of the related art). On the other hand, when the representation (Representation) or the sub-representation (Sub-Representation) is extended, a new element is defined.

In the element of the viewpoint described above, a schema (schemeIdUri) for storing the partial image information is defined. In the case of the example of FIG. 10A, (urn:mpeg:DASH:tile:2013) is defined as a schema for a tile. The extension of the schema is performed when any of the adaptation set, the representation, and the sub-representation is extended.

Further, values of schema (urn:mpeg:DASH:tile:2013) for the new tile are defined. In the values, the above-described partial image information is defined. For example, a view type ((1) viewtype) indicating what an image indicated by the element is, information ((2) the width and the height of an entire image) regarding the size of the entire image, information ((3) the x coordinate and the y coordinate of the image indicated by the element) indicating the position of a partial image in the entire image, and group identification information ((4) TilegroupID) identifying a group to which the partial image belongs and which is a group of the partial images displayable as one image are defined as the values.

Figure 10:
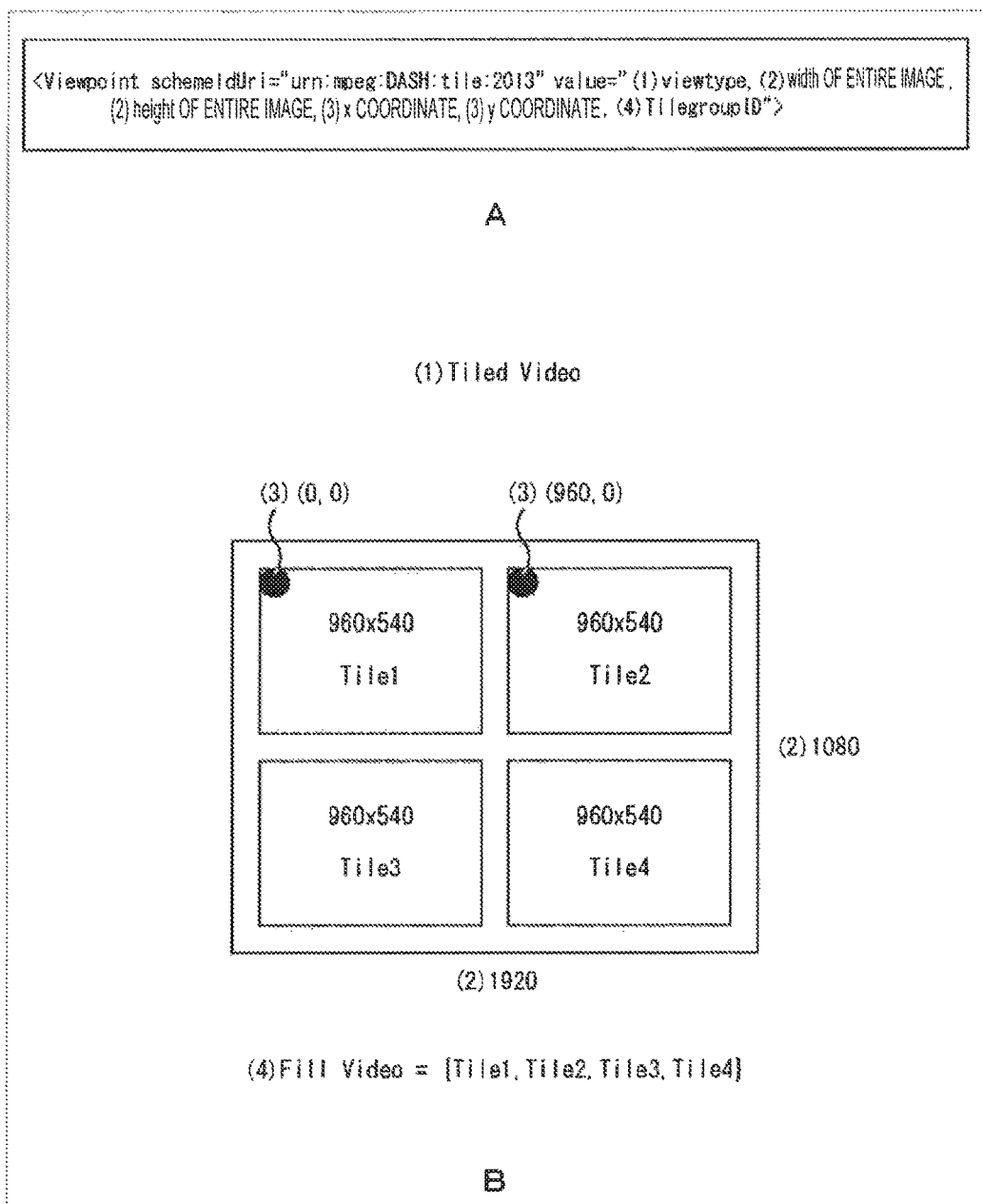
FIG. 10 is a diagram for describing an example of extended data.

The view type (viewtype) is information indicating, for example, whether the image is a tile image, as illustrated in FIG. 10B. For example, a value when the image is an entire image is assumed to be "0," a value when the image is a tile image and a bit stream is divided for each tile as in the example of FIG. 6A is assumed to be "1," and a value when the image is a tile image and data of all the tiles is collected in one bit stream as in the example of FIG. 6B is assumed to be "2." These values and states (definitions of the values) indicated by the values are decided in advance. Of course, the method of defining these values is arbitrary and an example other than this example may be used. By referring to these values, it is possible to easily comprehend whether it is necessary to refer to another element (that is, whether another tile is present). In particular, when the image is an entire image, it is possible to easily comprehend that it is not necessary to refer to another element merely by referring to this value.

The information (the width and the height of the entire image) regarding the size of the entire image is information indicating the size (the horizontal width and the height) of an image in which all of the tile images belonging to the same group as the image (the tile image) are unified, as illustrated in FIG. 10B. In the case of an MPD of the related art, it is assumed that the sizes of images of bit streams are the same as the size of a display image. When the partial images are supplied, as described above, the sizes of the images of the bit streams are different from the size of the display image in some cases. For example, when a plurality of tile images of mutually different bit streams are unified to be displayed, the size of the display image can be larger than the sizes of the images of the bits streams in some cases. In order to cope with such cases, the size of an image in which all of the tile images belonging to the same group as the image (the tile image) are unified is indicated. That is, by referring to this value, it is possible to easily comprehend a maximum processing load when all of the tile images belonging to the same group of the image (the tile image) are decoded. In the case of the example of FIG. 10B, the size (1920×1080) of an image in which 4 (2×2) tile images with a 960×540 size are unified is indicated as information regarding the size of the entire image.

The information (the x coordinate and the y coordinate of the image indicated by the element) indicating the position of the partial image in the entire image is information indicating where the image in which all of the tile images belonging to the same group as the image (tile image) are unified is located, as illustrated in FIG. 10B. Expression of the position (indicating with which value) is arbitrary. For example, the position may be expressed with the coordinates of the upper left of the image. For example, the position may be expressed with another piece of information such as identification information regarding the tile or the coordinates of another location other than the upper left. By referring to this value, it is possible to easily comprehend the position of the image when the images (tile images) are unified (combined). That is, by referring this value of each tile image to be unified (combined), it is possible to easily comprehend how each tile image is arranged and unified (combined).

The group identification information (TilegroupID) is identification information indicating a group of the tile images to which the image belongs, as illustrated in FIG. 10B. The same value can be assigned to the tile images of the same group. In contrast, different values can be assigned to respective groups. In the case of the example of FIG. 10B, since the tile images of tile 1 (Tile 1) to tile 4 (Tile 4) can be unified, the same value can be assigned as group identification information to the tile images. By referring to this value, it is possible to easily comprehend which tile images can be unified (combined). In other words, it is possible to easily identify other tile images to be unified (combined) with the image at the time of display.

The group identification information (TilegroupID) may be defined not as the value of the viewpoint but as an attribute of another element, for example, as follows.

<AdaptationSet mimeType="video/mp4" group="1">

In the adaptation set, an attribute called a group is already present. In the foregoing example, a meaning can be assigned as a set (Tilegroup) of tiles (Tile) to the group.

<Representation mimeType="video/mp4" group="1">

On the other hand, an attribute called group is not present in the representation or the sub-representation. That is, when the representation or the sub-representation is extended, a new attribute called (group) is set.

The above-described extension method can also be applied when a bit stream is filed (in particular, MP4 filing) as in the example of FIG. 7 or 8. In this case, since the header information or the like of the bit stream assigned to other tracks is assigned to the base track (Base Track), positional information regarding the segment is not necessary. For this reason, in the description (viewpoint) corresponding to the base track, a value which is not the actual coordinates may be defined as information regarding the position of the image. For example, NULL, empty, space, or the like may be set. For example, a considerably large value or a negative value may be set as the coordinates. Of course, identification (a flag or the like) indicating the base track may be separately provided.

In the case of an MPD of the related art, segments (Segment) are necessarily present under the representation (Representation). That is, a URL of an MP4 file is described in segments immediately under the representation. The sub-representation (Sub-Representation) is, for example, information that is used to reproduce only trickplay or music and designates data of a part in the MP4 file of the segment immediately under the representation.

When the MPD is extended so that the partial image information can be included, the MPD may be extended so that segments are present under the sub-representation (Sub-Representation). That is, a tile image may be assigned to the sub-representation so that the URL of the MP4 file can be referred to.

More specifically, tags of a base URL (<BaseURL>), a segment base (<SegmentBase>), a segment list (<SegmentList>), a segment template (<SegmentTemplate>), and the like are additionally defined in the sub-representation.

In this case, however, it is necessary to generate segment information indicating that the information regarding the bit stream is present under the sub-representation (Sub-Representation) as the partial image information and store the segment information in the MPD. For example, a flag (@SegmentInSubRepresentation: true or false) indicating whether the information regarding the bit stream is present under the sub-representation is defined as the segment information.

In this way, the representation can be configured by the sub-representations of the plurality of tile images. By realizing such a structure, separation from the representation of the related art is possible.

In the case of an MPD of the related art, a segment (Segment) expresses a concept of time, and thus the segments of the same time are not permitted to be present in one representation (Representation).

When the MPD is extended so that the partial image information is included, the MPD may be extended so that a plurality of segments of the same time can be present in one representation by assigning the tile images to the segments.

In this case, however, it is necessary to generate multi-segment information indicating that the plurality of segments to which the tile images of the same time are assigned are present as partial image information under the representation and store the multi-segment information in the MPD.

For example, a flag (@multiSegmentInRepresentation: true or false) indicating whether the plurality of pieces of information regarding the bit streams of the same time are present under the representation is defined as the multi-segment information.

In this way, separation from the segments of the related art is possible. The segment can be designated only in access units (AU) in the related art, but the sub-segment (Sub-Segment) assigning an ssix box extended so that data in units of tiles can be designated may be defined under the segment to which an MP4 file storing a bit stream of a single tile image or a plurality of tile images is assigned. That is, under segment to which an MP4 file is assigned, one sub-segment or a plurality of sub-segments including an ssix designating the tile corresponding to the segment from the MP4 file may be present.

In this way, a unit smaller than a sample in the sub-segment can be expressed.

To this end, it is necessary to allow segment information to be false (@SegmentInSubRepresentation=false) and define viewpoint (Viewpoint) in the segment for implication. That is, from the two pieces of information, it is possible to comprehend that the tile image is expressed in accordance with the sub-segment (that the MP4 file is extended).

Dedicated flag information may be separately defined to clarify that the tile image is expressed in accordance with the sub-segment (that the MP4 file is extended).

The partial image information is not limited to the above-described examples, but any partial image information can be used. For example, in the values, information other than the information (a view type ((1) viewtype), the information ((2) the width and the height of an entire image) regarding the size of the entire image, the information ((3) the x coordinate and the y coordinate of the image indicated by the element) indicating the position of a partial image in the entire image, and the group identification information ((4) TilegroupID) identifying a group to which the partial image belongs and which is a group of the partial images displayable as one image) indicated in the above-described example may be defined. Further, flag information other than the above-described flag information may be defined as partial information.

By generating the partial image information, as described above, and extending the MPD (metadata) using the partial image information, it is possible to realize the adaptive supply of the data of the partial image using the metadata.

2. Second Embodiment

<Delivery System>

Figure 11:
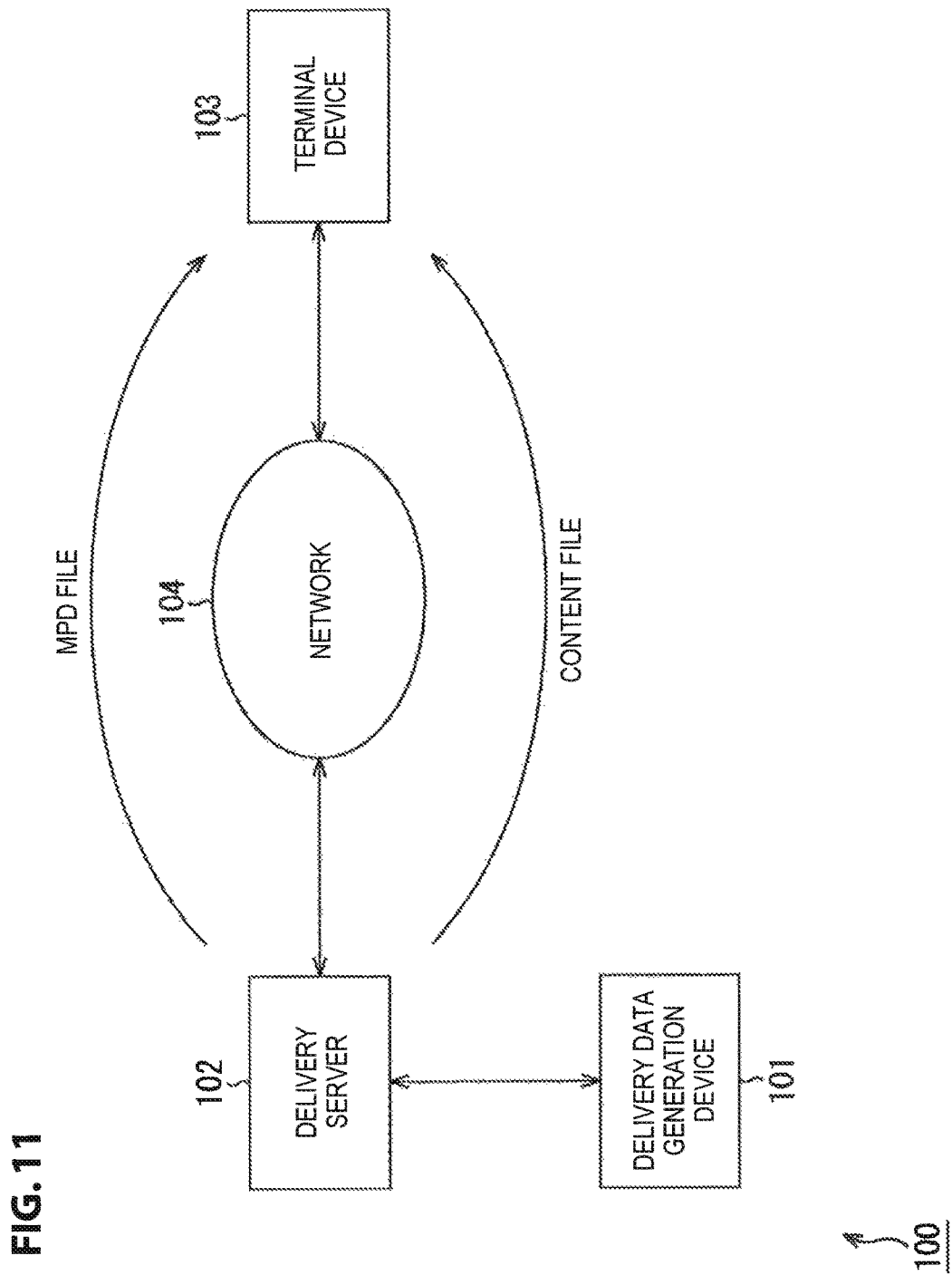
FIG. 11 is a block diagram illustrating an example of a main configuration of a delivery system.

Next, a device realizing the above-described present technology and a method therefor will be described. FIG. 11 is a diagram illustrating a delivery system which is a kind of the system to which the present technology is applied. A delivery system 100 illustrated in FIG. 11 is a system that can adaptively deliver data of a partial image which is a part of an entire image.

As illustrated in FIG. 11, the delivery system 100 includes a delivery data generation device 101, a delivery server 102, and a terminal device 103.

The delivery data generation device 101 generates, for example, files of content such as an image and audio delivered by the delivery server 102 and MPD files of the files and supplies the content files and the MPD files to the delivery server 102. The delivery server 102 publishes the content files and the MPD files supplied from the delivery data generation device 101 on a network 104 and performs adaptive delivery of partial images.

The terminal device 103 accesses the delivery server 102 via the network 104 and acquires the MPD file of desired content published by the delivery server 102.

The terminal device 103 accesses the delivery server 102 via the network 104 according to the MPD file, adaptively selects a proper content file corresponding to the MPD file, and acquires the content file by an HTTP protocol. The terminal device 103 reproduces the acquired content file.

<Delivery Data Generation Device>

Figure 12:
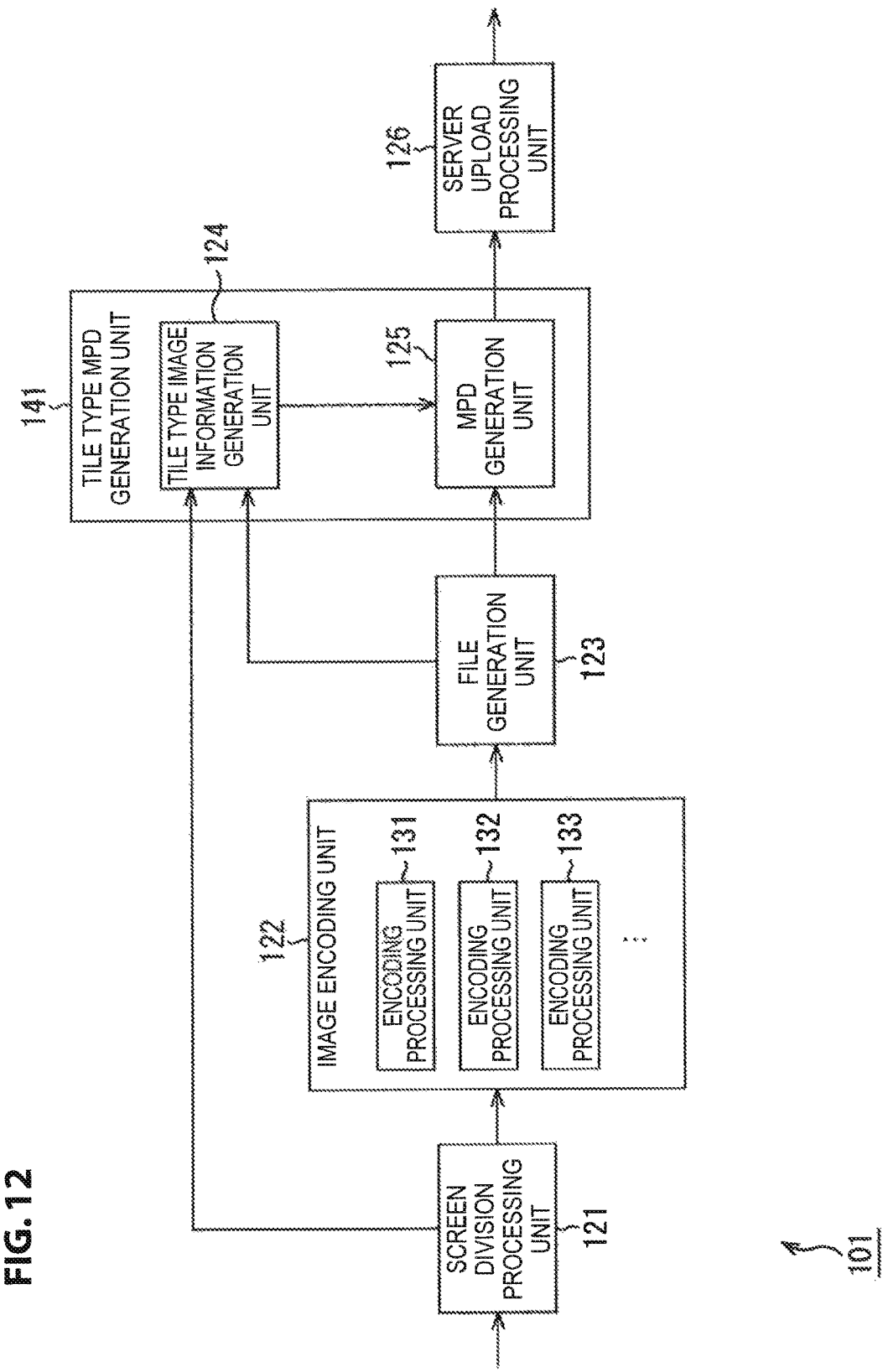
FIG. 12 is a block diagram illustrating an example of a main configuration of a delivery data generation device.

FIG. 12 is a block diagram illustrating an example of a main configuration of the delivery data generation device 101. As illustrated in FIG. 12, the delivery data generation device 101 includes a screen division processing unit 121, an image encoding unit 122, a file generation unit 123, a tile type image information generation unit 124, an MPD generation unit 125, and a server upload processing unit 126.

The screen division processing unit 121 edits (processes) image data supplied from the outside to divide the entire image of the image data for each tile and generates the image data of the tile images. The screen division processing unit 121 supplies the image data of each tile generated in this way to the image encoding unit 122. The screen division processing unit 121 supplies, for example, information regarding the tile structure such as the size, the position, or the like of each tile to the tile type image information generation unit 124.

The image encoding unit 122 encodes the image data of each tile supplied from the screen division processing unit 121 to generate a bit stream. As illustrated in FIG. 12, the image encoding unit 122 includes a plurality of encoding processing units such as an encoding processing unit 131, an encoding processing unit 132, an encoding processing unit 133, etc. and can encode the image data of each tile of the supplied tiles in parallel. As described with reference to FIG. 6 and the like, the image encoding unit 122 can generate any number of bit streams from one piece of image data. The image encoding unit 122 can also collect the plurality of pieces of image data into one bit stream. For example, the image encoding unit 122 can also generate the bit stream for each tile image and can also collect the plurality of tile images into one bit stream. The image encoding unit 122 supplies the generated bit stream to the file generation unit 123.

The encoding method of the image encoding unit 122 is arbitrary. The encoding processing units perform the same encoding method or may perform mutually different encoding methods.

The file generation unit 123 files the supplied bit stream in accordance with a predetermined format such as an MP4 file format to generate the content file. As described with reference to FIGS. 7 and 8 and the like, the file generation unit 123 can file one bit stream into any number of files. The file generation unit 123 can also collect the plurality of bit streams into one file. The file generation unit 123 supplies the generated content file to the MPD generation unit 125. The file generation unit 123 supplies information regarding the filing such as how to file each bit stream to the tile type image information generation unit 124.

The file generation unit 123 can perform the filing in accordance with any format.

The tile type image information generation unit 124 generates tile type image information (that is, partial image information) to match the MPD to the tile structure based on the information regarding the tile structure supplied from the screen division processing unit 121, the information regarding the filing supplied from the file generation unit 123, or the like. The tile type image information (the partial image information) is information including the content described in the first embodiment and is generated as, for example, the values of the viewpoint or the flag information. The tile type image information generation unit 124 supplies the generated tile type image information to the MPD generation unit 125.

The MPD generation unit 125 generates the MPD regarding the content file supplied from the file generation unit 123, extends the MPD using the tile type image information (the partial image information) supplied from the tile type image information generation unit 124, and generates the tile type MPD corresponding to the tile structure. The MPD generation unit 125 supplies the file (MPD file) of the generated tile type MPD and the content file to the server upload processing unit 126.

The server upload processing unit 126 uploads the supplied MPD file or content file to the delivery server 102 (FIG. 11) to publish the MPD file or the content file.

The delivery data generation device 101 generates the tile type MPD corresponding to the tile structure in this way, and thus the delivery server 102 can adaptively deliver (supply) the data of the partial images which are based on the DASH standard. That is, the delivery system 100 can realize the adaptive supply of the data of the partial images.

The above-described processing units may be configured as independent devices. In particular, the tile type image information generation unit 124 or the MPD generation unit 125 may be configured as independent devices. That is, the configuration related to the generation of the content file is not requisite and only the generation of the tile type image information (the partial image information) may be performed. For example, the tile type image information (the partial image information) may also be generated based on information supplied from another device. For example, the generated tile type image information (the partial image information) may be supplied to another device.

Only the generation of the tile type MPD may be performed. For example, the tile type MPD corresponding to the content file generated in another device may be generated using the tile type image information (the partial image information) supplied from the other device. The generated MPD file may also be supplied to another device.

As in a tile type MPD generation unit 141, the tile type image information generation unit 124 and the MPD generation unit 125 may be integrated. For example, the tile type MPD generation unit 141 may be configured as one independent device.

<Terminal Device>

Figure 13:
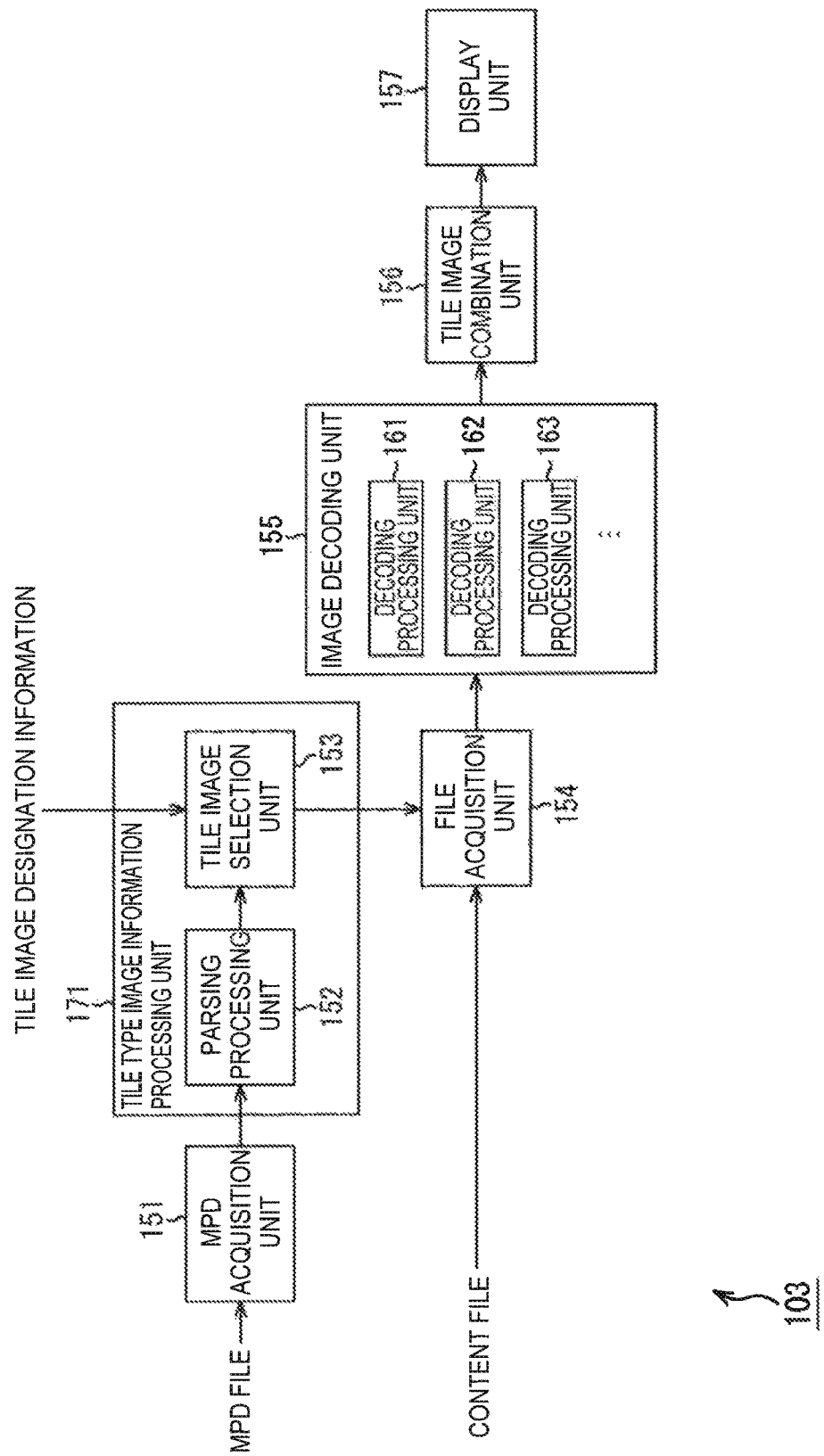
FIG. 13 is a block diagram illustrating an example of a main configuration of a terminal device.

FIG. 13 is a block diagram illustrating an example of a main configuration of the terminal device 103. As illustrated in FIG. 13, the terminal device 103 includes an MPD acquisition unit 151, a parsing processing unit 152, a tile image selection unit 153, a file acquisition unit 154, an image decoding unit 155, a tile image combination unit 156, and a display unit 157.

The MPD acquisition unit 151 acquires the MPD file of desired content from the delivery server 102 via the network 104 based on, for example, an instruction of a control program or a user of the terminal device 103. The MPD acquisition unit 151 supplies the acquired MPD file to the parsing processing unit 152.

The parsing processing unit 152 analyzes (parses) the supplied MPD file. The parsing processing unit 152 also analyzes (parses) the tile type image information (the partial image information) included in the MPD file. The parsing processing unit 152 supplies an analysis result to the tile image selection unit 153.

When the tile image selection unit 153 acquires tile image designation information which is supplied from the outside and used to designate a partial image (an image formed from a single tile image or a plurality of tile images) to be reproduced, the tile image selection unit 153 selects the tile image designated by the tile image designation information among the tile images included in the tile type image information based on the analysis result of the MPD file (the tile type image information) in the parsing processing unit 152. The tile image selection unit 153 supplies the URL (delivery address) of the file of the selected tile image to the file acquisition unit 154.

The file acquisition unit 154 accesses the delivery address of the delivery server 102 supplied from the tile image selection unit 153 via the network 104 to acquire the desired content file. The file acquisition unit 154 acquires the bit stream from the acquired content file and supplies the bit stream to the image decoding unit 155.

The image decoding unit 155 decodes the bit stream supplied from the file acquisition unit 154 to obtain the image data of the tile image. As illustrated in FIG. 13, the image decoding unit 155 includes a plurality of decoding processing units such as a decoding processing unit 161, a decoding processing unit 162, a decoding processing unit 163, etc. and can decode the plurality of supplied bit streams in parallel. The image decoding unit 155 supplies the image data of the tile image obtained by decoding the bit stream to the tile image combination unit 156.

The image decoding unit 155 can perform the decoding in accordance with any decoding method that corresponds to the encoding method of the image encoding unit 122. Accordingly, each decoding processing unit may also perform the decoding in accordance with the same method or may also perform the decoding in accordance with mutually different methods.

When the image data of the plurality of tile images belonging to the same group is supplied from the image decoding unit 155, the tile image combination unit 156 combines (unifies) the tile images and combines the image data so that one image is formed. That is, the tile image combination unit 156 generates the image data of an image for display. When the images are not combined (for example, when a single tile image is displayed or when a plurality of tile images are already formed as one bit stream at the time of delivery), the supplied images are considered to be images for display. The tile image combination unit 156 supplies the image data for display to the display unit 157.

The display unit 157 reproduces the supplied image data for display and displays the image for display on a display.

As described above, the terminal device 103 can correctly analyze the tile type MPD corresponding to the tile structure and can gain the adaptive delivery (supply) of the data of the partial image by the delivery server 102 which is based on the DASH standard. That is, the data of the partial image can be correctly acquired from the delivery server 102 and can be reproduced. That is, the delivery system 100 can realize the adaptive supply of the data of the partial image.

As described above, the terminal device 103 can display the image with a different image size from the image size at the time of the delivery. That is, the terminal device 103 can control the data delivery more adaptively according to a load situation or the like of the delivery server 102 or the network 104. For example, since whether to acquire the entire image or acquire the tile image can be controlled, the number of acquired content files can be appropriately increased or decreased without changing the size of the display image. Therefore, it is possible to appropriately perform control such as distribution or concentration of a delivery source or a path.

The above-described processing units may be configured as independent devices. In particular, the parsing processing unit 152 or the tile image selection unit 153 may be configured as independent devices. That is, the configuration related to the acquisition or reproduction (decoding) of the content file is not requisite and only the analysis of the tile type MPD or the tile type image information (the partial image information) may be performed. For example, the MPD file acquired from the delivery server 102 by another device may be analyzed. For example, the analysis result may be supplied to another device.

As in the tile type image information processing unit 171, the parsing processing unit 152 and the tile image selection unit 153 may be integrated. For example, the tile type image information processing unit 171 may be configured as one independent device.

The image data for display output from the tile image combination unit 156 may be supplied to another device or may be recorded on a recording medium. At this time, the image data may be encoded.

<Flow of Delivery Data Generation Process>

Next, the flow of each process performed by each device of the delivery system 100 described above will be described. First, an example of the flow of a delivery data generation process by the delivery data generation device 101 will be described with reference to the flowchart of FIG. 14.

When the delivery data generation process starts, the screen division processing unit 121 of the delivery data generation device 101 edits (processes) the image data so that a screen (that is, an entire image) is divided into tiles in step S101.

In step S102, the image encoding unit 122 encodes the image data of each tile image generated in step S101.

In step S103, the file generation unit 123 files the encoded data (bit stream) generated in step S102 (that is, generates the content file).

In step S104, the tile type MPD generation unit 141 generates the file of the tile type MPD according to the processing result such as the division of step S101 or the filing of step S103.

In step S105, the server upload processing unit 126 uploads the MPD file and the content file generated in this way to the delivery server 102.

When the process of step S105 ends, the delivery data generation process ends.

<Flow of Tile Type MPD File Generation Process>

Next, an example of the flow of a tile type MPD file generation process performed in step S104 of FIG. 14 will be described with reference to the flowchart of FIG. 15.

When the tile type MPD file generation process starts, the tile type image information generation unit 124 sets the schema (for example, urn:mpeg:DASH:tile:2013) of the tile type image information, for example, in the element of the viewpoint in step S121.

In step S122, the tile type image information generation unit 124 sets a view type (viewtype) in the value of the schema as the tile type image information.

In step S123, the tile type image information generation unit 124 sets the size (width and height) of the entire image in the value of the schema as the tile type image information.

In step S124, the tile type image information generation unit 124 sets the position (x and y) of the tile image in the value of the schema as the tile type image information.

In step S125, the tile type image information generation unit 124 sets the group identification information (TilegroupID) in the value of the schema as the tile type image information.

In step S126, the tile type image information generation unit 124 sets the segment information (@SegmentInSub-Representation), as necessary, as the tile type image information. For example, when the MPD is extended so that the segment is present under the sub-representation (Sub-Representation), the tile type image information generation unit 124 generates the segment information indicating that the information regarding the bit stream is present under the sub-representation (Sub-Representation).

In step S127, the tile type image information generation unit 124 sets the multi-segment information (@multiSegmentInRepresentation), as necessary, as the tile type image information. For example, when the tile images are assigned to the segments and the MPD is extended so that the plurality of segments of the same time are present in one representation, the tile type image information generation unit 124 generates the multi-segment information indicating that the plurality of segments to which the tile images of the same time are assigned are present under the representation.

Figure 14:
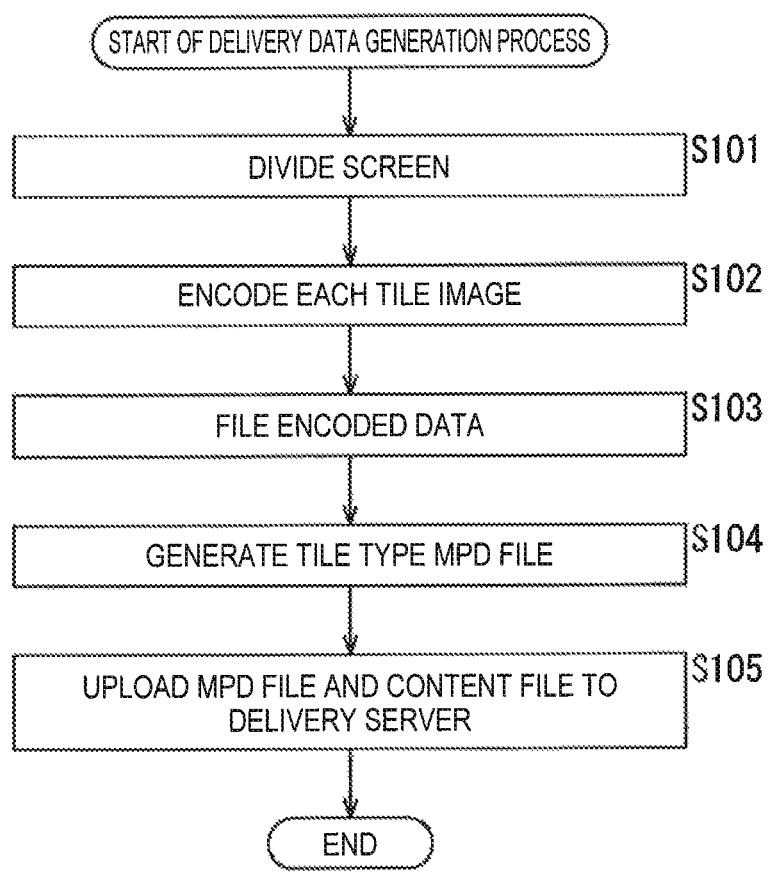
FIG. 14 is a flowchart for describing a flow example of a delivery data generation process.
Figure 15:
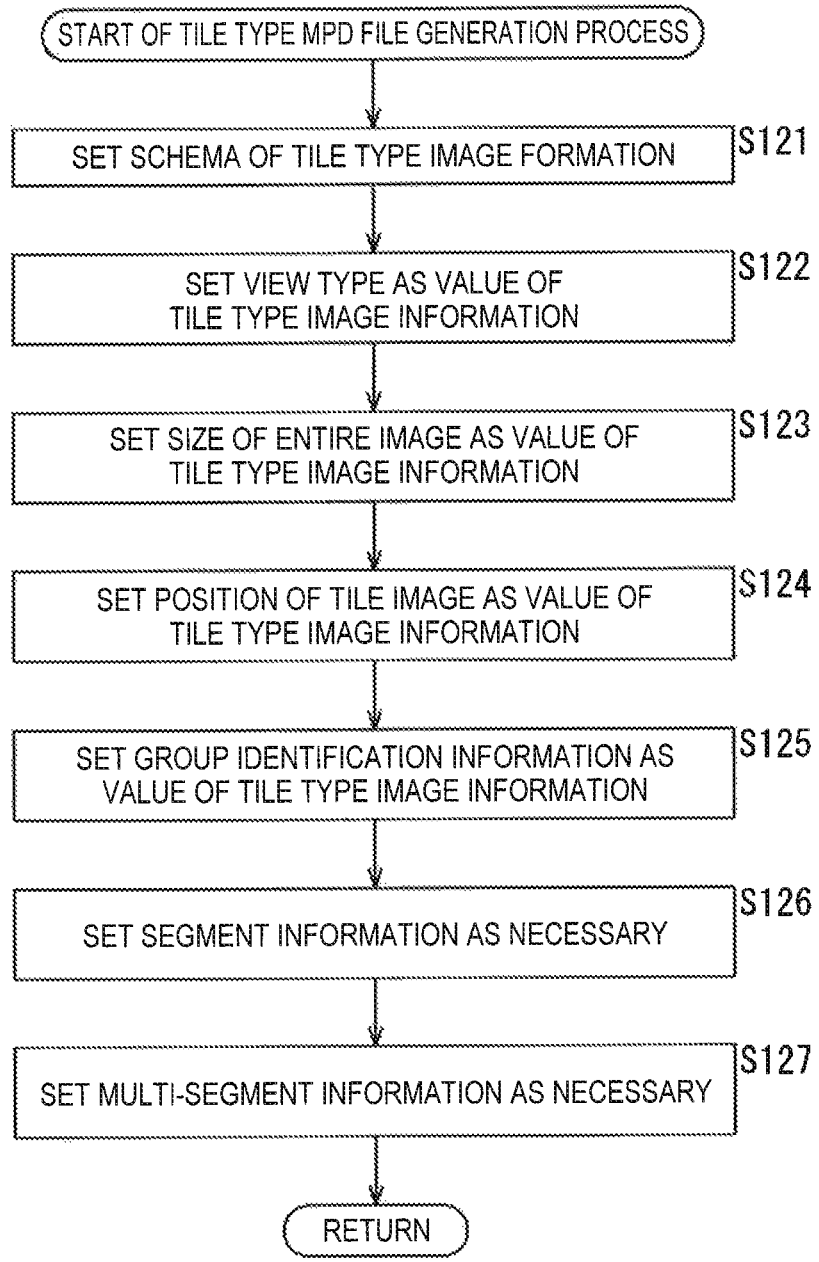
FIG. 15 is a flowchart for describing a flow example of a tile type MPD file generation process.

When the process of step S127 ends, the tile type MPD file generation process ends and the process returns to FIG. 14.

By performing the above-described processes, the delivery data generation device 101 can allow the delivery server 102 to adaptively deliver (supply) the data of the partial images which are based on the DASH standard. That is, it is possible to realize the adaptive supply of the data of the partial images.

<Flow of Delivery Data Reproduction Process>

Figure 16:
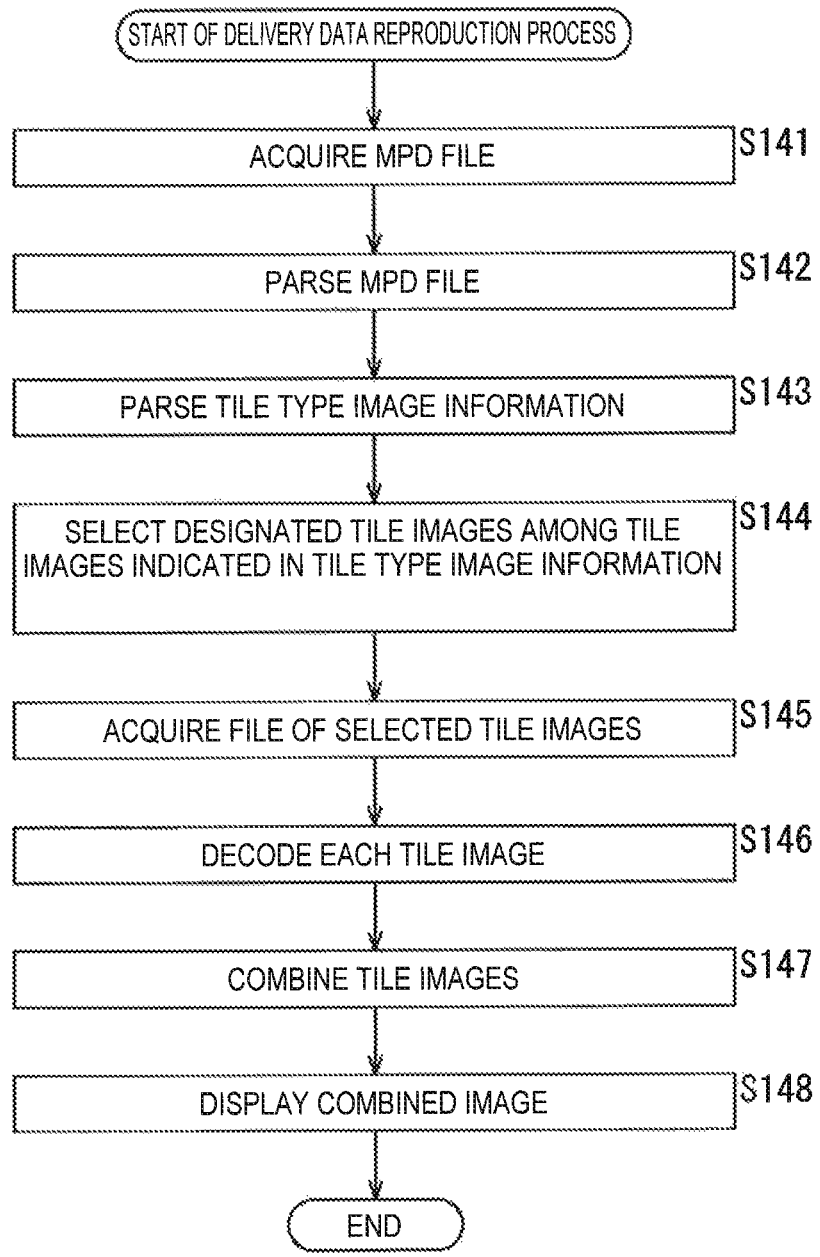
FIG. 16 is a flowchart for describing a flow example of a delivery data reproduction process.

Next, an example of the flow of the delivery data reproduction process performed by the terminal device 103 will be described with reference to the flowchart of FIG. 16.

When the delivery data reproduction process starts, the MPD acquisition unit 151 acquires the MPD file corresponding to the desired content from the delivery server 102 in step S141.

In step S142, the parsing processing unit 152 analyzes (parses) the MPD file acquired in step S141.

In step S143, the parsing processing unit 152 analyzes (parses) the tile type image information (the partial image information) included in the MPD file.

In step S144, the tile image selection unit 153 selects the tile images designated by the tile image designation information supplied from the outside among the tile images indicated in the tile type image information.

In step S145, the file acquisition unit 154 acquires the file of the tile images selected in step S144.

In step S146, the image decoding unit 155 decodes the bit stream of the tile images included in the file acquired in step S145.

In step S147, the tile image combination unit 156 edits (processes) the image data of the tile images obtained by decoding the bit stream in step S146 so that the tile images are combined, as necessary.

In step S148, the display unit 157 displays the image for display such as the combined image of the tile images obtained in step S147 on a display.

When the process of step S148 ends, the delivery data reproduction process ends.

As described above, by executing the delivery data reproduction process, the terminal device 103 can correctly analyze the tile type MPD corresponding to the tile structure and can gain the adaptive delivery (supply) of the data of the partial image by the delivery server 102 which is based on the DASH standard. That is, the data of the partial image can be correctly acquired from the delivery server 102 and can be reproduced. That is, it is possible to realize the adaptive supply of the data of the partial image.

The above-described adaptive delivery (supply) of the partial images can be used together with the delivery (supply) of the entire image. That is, for example, the server may adaptively deliver the entire image or any partial image according to a request or the like from the terminal.

3. Third Embodiment

<Specific Example of MPD Extension>

Next, a specific example of an MPD extension method will be described.

Example 1

Figure 17:
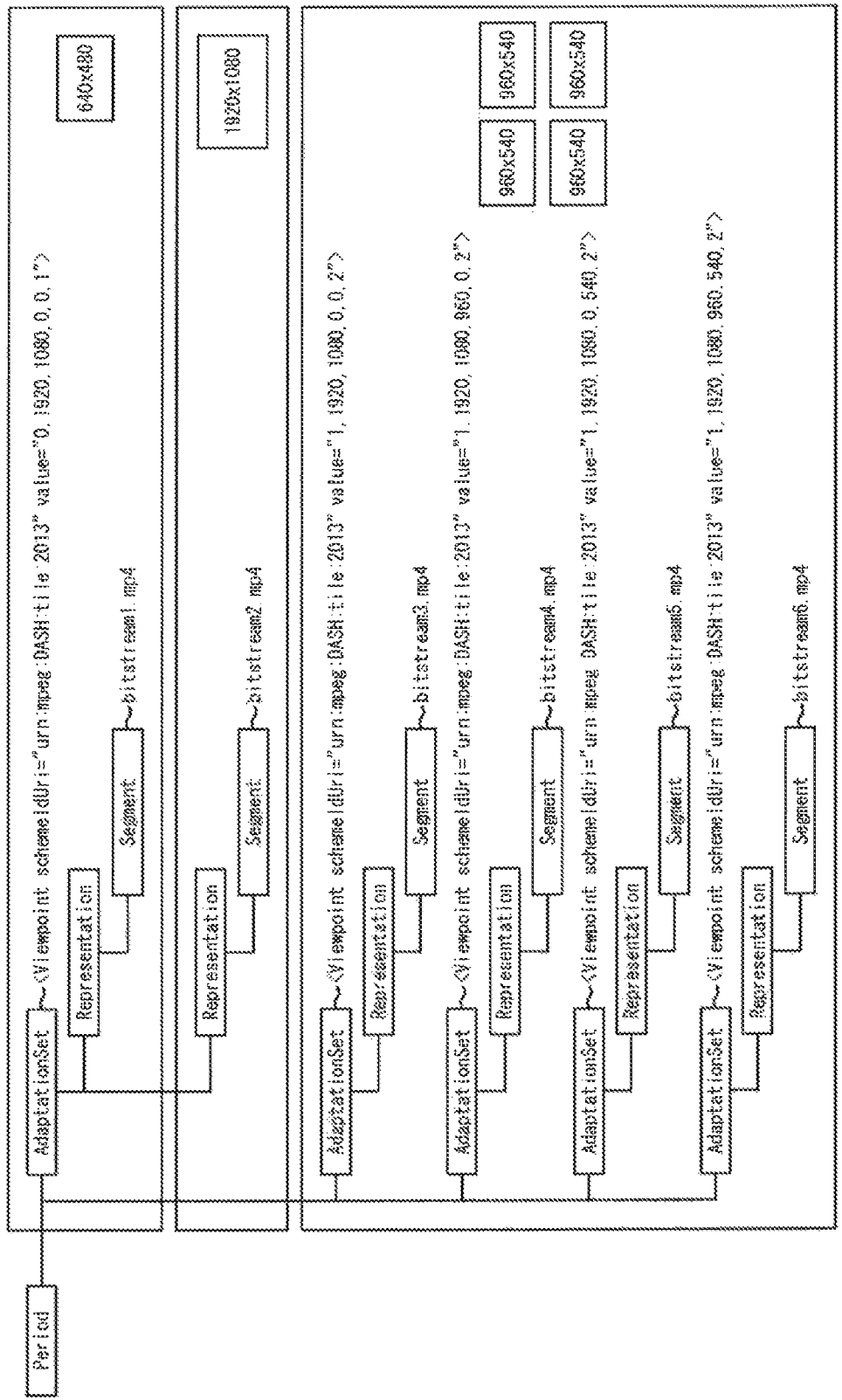
FIG. 17 is a diagram illustrating an example of an MPD extension method.

A main configuration example of the extended MPD is illustrated in FIG. 17. In the case of the example of FIG. 17, the encoded data of each tile of the image data to be delivered is configured in one bit stream (MP4 file) (bitstream3.mp4 to bitstream6.mp4). In the MPD, the adaptation set (AdaptationSet) is extended and the bit stream (MP4 file) of each tile image is defined in mutually different adaptation sets. A viewpoint (Viewpoint) which is a description for a tile is defined in the adaptation set and the URL of the bit stream (MP4 file) of the tile corresponding to the viewpoint is set in the segment (Segment) under the representation (Representation) under the adaptation set.

That is, the partial image information regarding the plurality of partial images belonging to the same group is stored in the mutually different adaptation sets, and the bit streams of the plurality of partial images are assigned to the mutually different adaptation sets.

In the case of this example, as illustrated in FIG. 17, the adaptation sets of the tile images arranged with the adaptation set of the entire images (bitstream1.mp4 and bitstream2.mp4) can be provided, and thus the delivery of the entire images and the adaptive delivery of the partial images can be managed in a unified manner.

In DASH of the related art, for example, images with different displayed content such as R and L images of a stereo image are defined in mutually different adaptation sets in many cases. In this example, the tile images are defined in the mutually different adaptation sets in imitation of such a way. Therefore, even in the delivery control of the partial images, it is possible to realize a natural way close to the related art. Therefore, development can be facilitated.

In the example of FIG. 17, the entire images with different resolutions are defined in the same adaptation set, but these entire images may be defined in mutually different adaptation sets.

A specific description example of the MPD of this example is illustrated in FIG. 18.

Example 2

Figure 19:
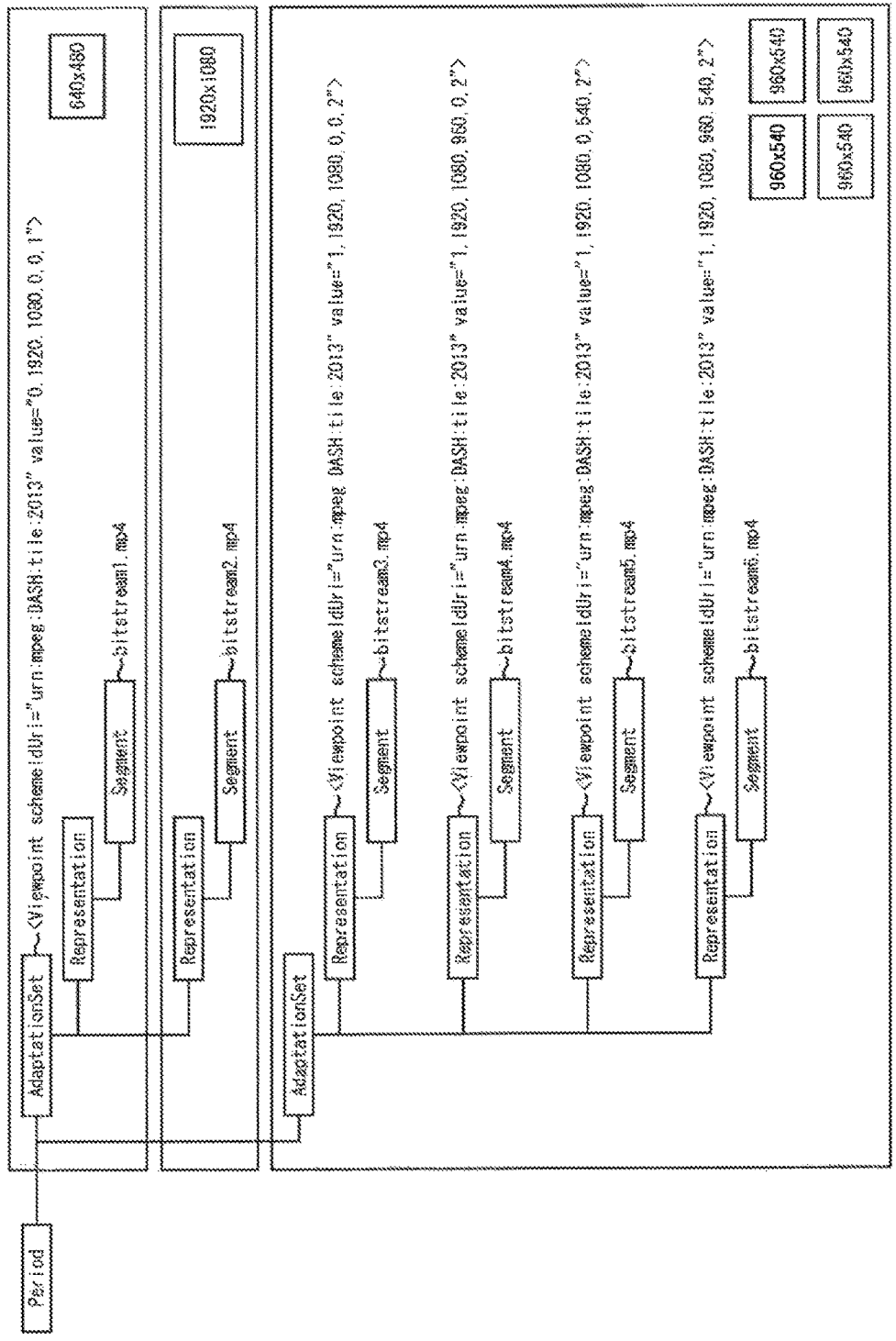
FIG. 19 is a diagram illustrating an example of an MPD extension method.

Another configuration example of the extended MPD is illustrated in FIG. 19. In the case of the example of FIG. 19, all of the encoded data of the tiles of the image data to be delivered is configured in one bit stream (MP4) (bitstream3.mp4 to bitstream6.mp4). In the MPD, the adaptation set (AdaptationSet) is extended and the bit stream (MP4 file) of each tile image is defined in a different adaptation set from the adaptation set in which the entire image is defined. However, unlike the case of <Example 1>, the bit streams (MP4 files) of the tile images are defined in the same adaptation set.

A viewpoint (Viewpoint) which is a description for a tile is defined in a representation (Representation) under the adaptation set and the URL of the bit stream (MP4 file) of the tile corresponding to the viewpoint is set in the segment (Segment) under the representation.

That is, the partial image information regarding the plurality of partial images belonging to the same group is stored in the mutually different representations belonging to one adaptation set of metadata, and the bit streams of the plurality of partial images are assigned to the mutually different representations.

In the case of this example, as illustrated in FIG. 19, the adaptation sets of the tile images arranged with the adaptation set of the entire images can be provided, and thus the delivery of the entire images and the adaptive delivery of the partial images can be managed in a unified manner.

In the example of FIG. 19, the entire images (bitstream1.mp4 and bitstream2.mp4) with different resolutions are defined in the same adaptation set, but these entire images may be defined in mutually different adaptation sets.

Example 3

Figure 20:
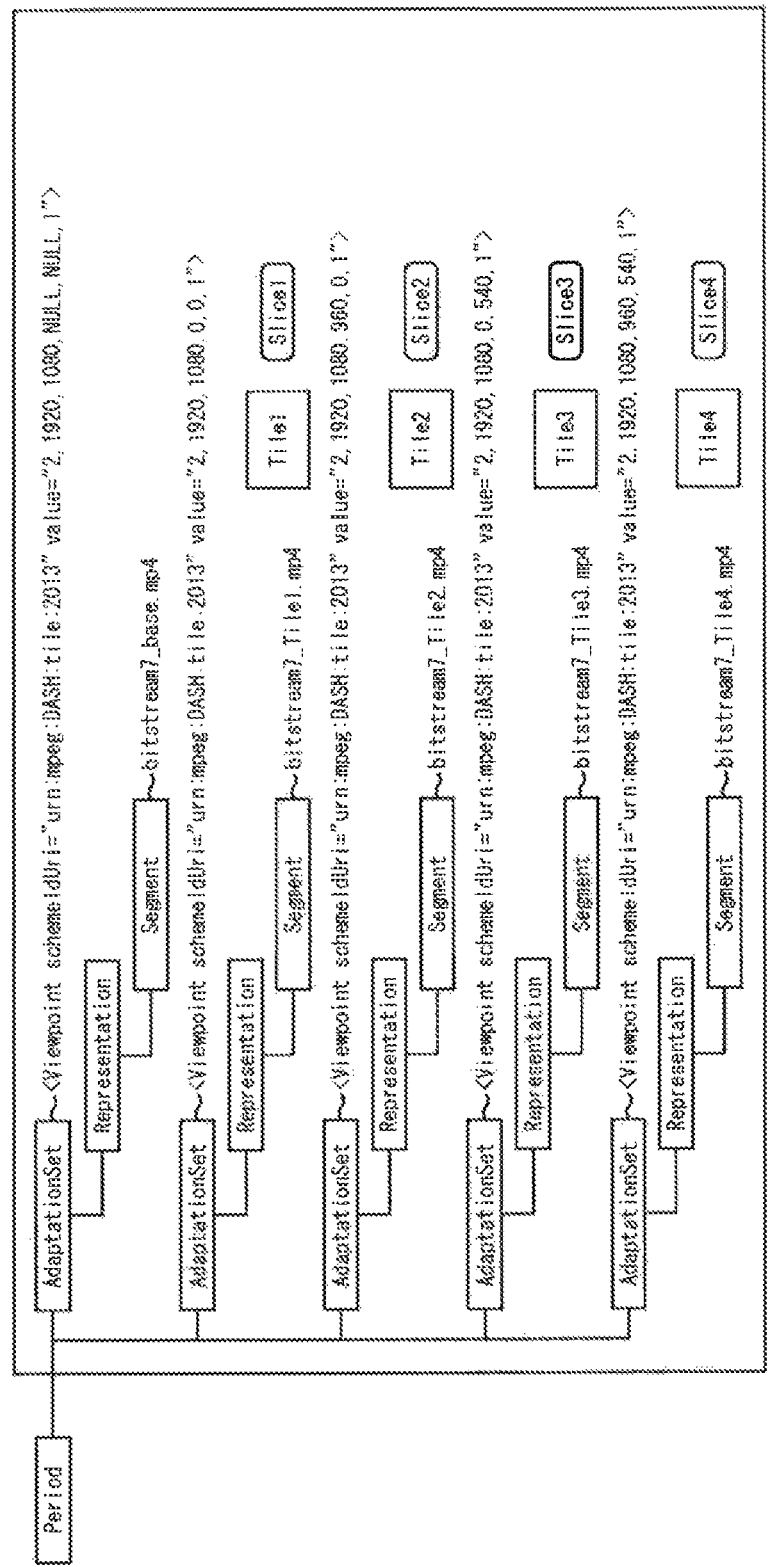
FIG. 20 is a diagram illustrating an example of an MPD extension method.

Another configuration example of the extended MPD is illustrated in FIG. 20. In the case of the example of FIG. 20, the encoded data of the tiles of the image data to be delivered is collected in one bit stream. The bit stream is filed as an MP4 file for each tile (bitstream7_Tile1.mp4 to bitstream7_Tile4.mp4). As described with reference to FIG. 7, a base track in which the header information or the like of the tiles is collected is filed separately from the bit streams of the tiles (bitstream7_base.mp4).

In the MPD, the adaptation set (AdaptationSet) is extended and the bit streams (MP4 files) (bitstream7_Tile1.mp4 to bitstream7_Tile4.mp4) of the tile images are defined in mutually different adaptation sets.

A viewpoint (Viewpoint) which is a description for a tile is defined in the adaptation set and the URL of the bit stream (MP4 file) of the tile corresponding to the viewpoint is set in the segment (Segment) under the representation (Representation) under the adaptation set.

In the x and y coordinates defined in the value of the viewpoint of the bit stream (MP4 file) (bitstream7_base.mp4) of the base track, as described in the first embodiment, apparently different values such as NULL or the like from normal coordinates are set. In the value of the view type defined in the value of each viewpoint, a value ("2" in the case of the example of FIG. 20) indicating a tile (Tile) in which the encoding scheme such as HEVC or the like is supported is set.

That is, the partial image information regarding the plurality of partial images belonging to the same group is stored in the mutually different adaptation sets of the metadata, and the plurality of files for which one bit stream including the plurality of partial images is divided for each partial image are assigned to the mutually different adaptation sets.

Figure 21:
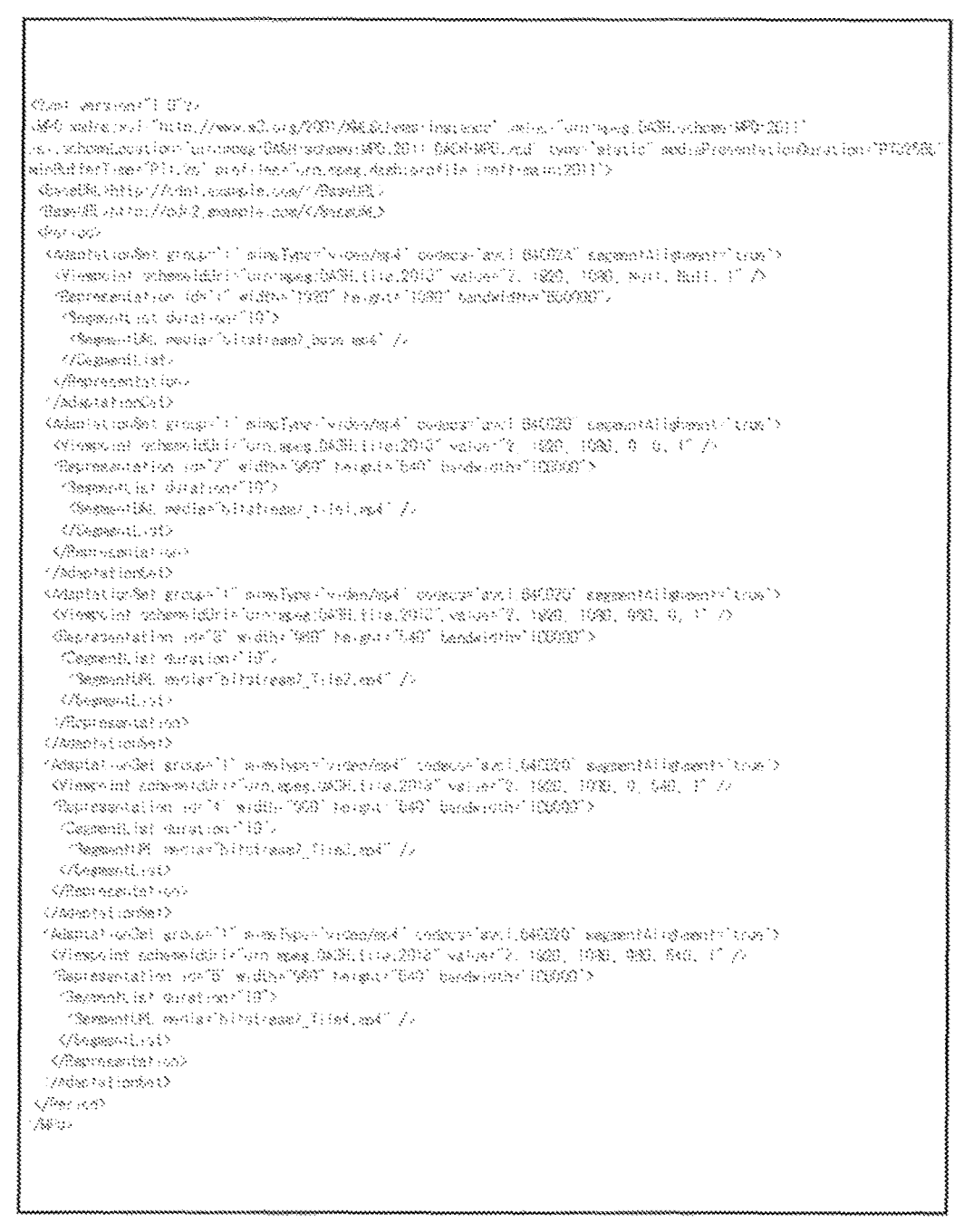

A specific description example of the MPD of this example is illustrated in FIG. 21.

Example 4

Figure 22:
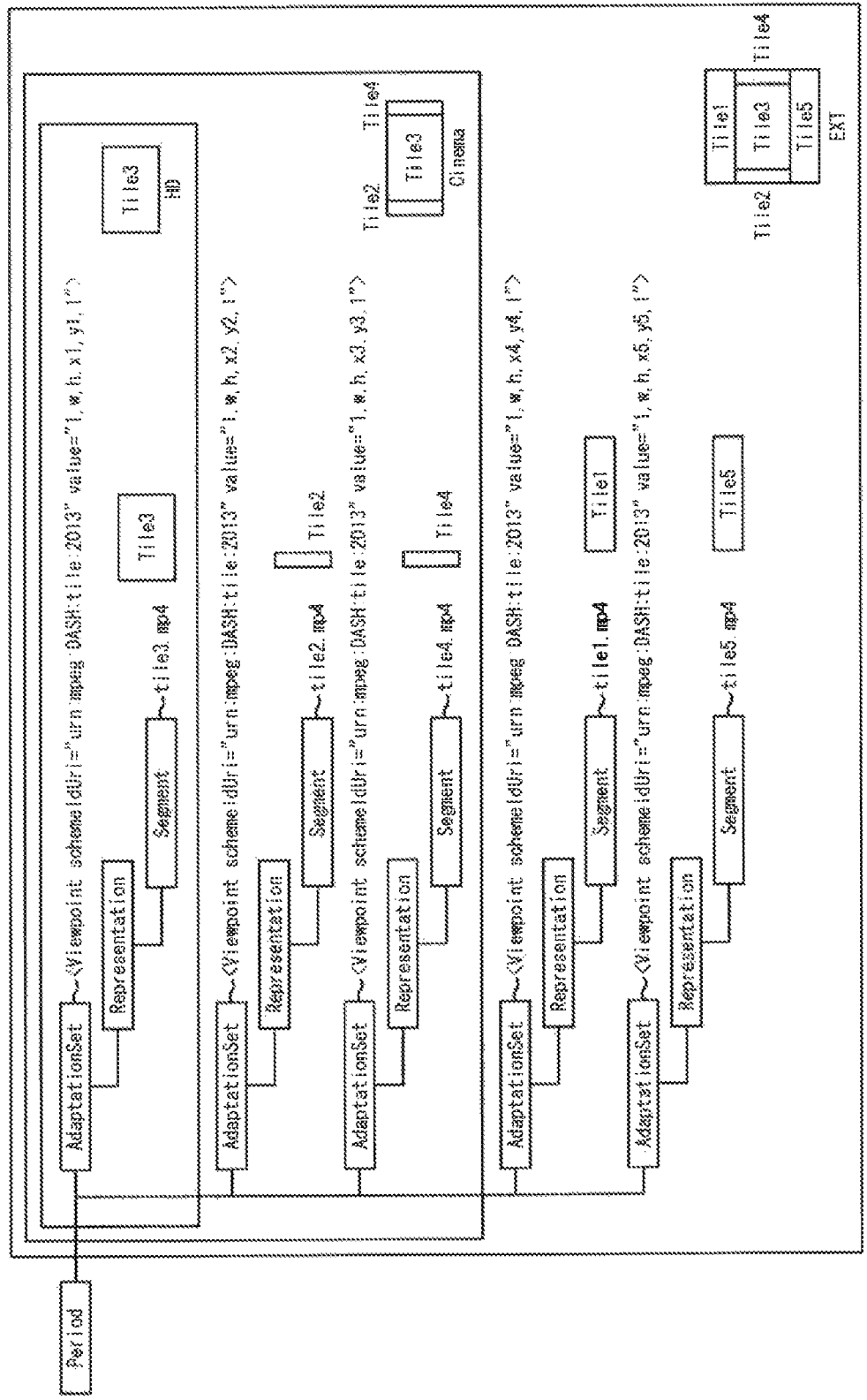
FIG. 22 is a diagram illustrating an example of an MPD extension method.

Another configuration example of the extended MPD is illustrated in FIG. 22. In the case of the example of FIG. 22, the extension method is the same as that of <Example 3>. The tiles are set such that the sizes are unequal, as illustrated in FIG. 22 (corresponding to FIG. 9B). In this case, an image with a desired size can be obtained by adding tiles, as shown with quadrangles.

In the case of this example, each piece of encoded data of each tile of the image data to be delivered is configured in one bit stream (MP4 file) (tile1.mp4 to tile5.mp4). Therefore, no base track is present as in <Example 3>.

That is, partial image information regarding control information included in the bit stream is further generated, the partial image information regarding the control information is stored in a different adaptation set from the partial image information regarding each partial image, and a file of the control information is assigned to the adaptation set.

Example 5

Figure 23:
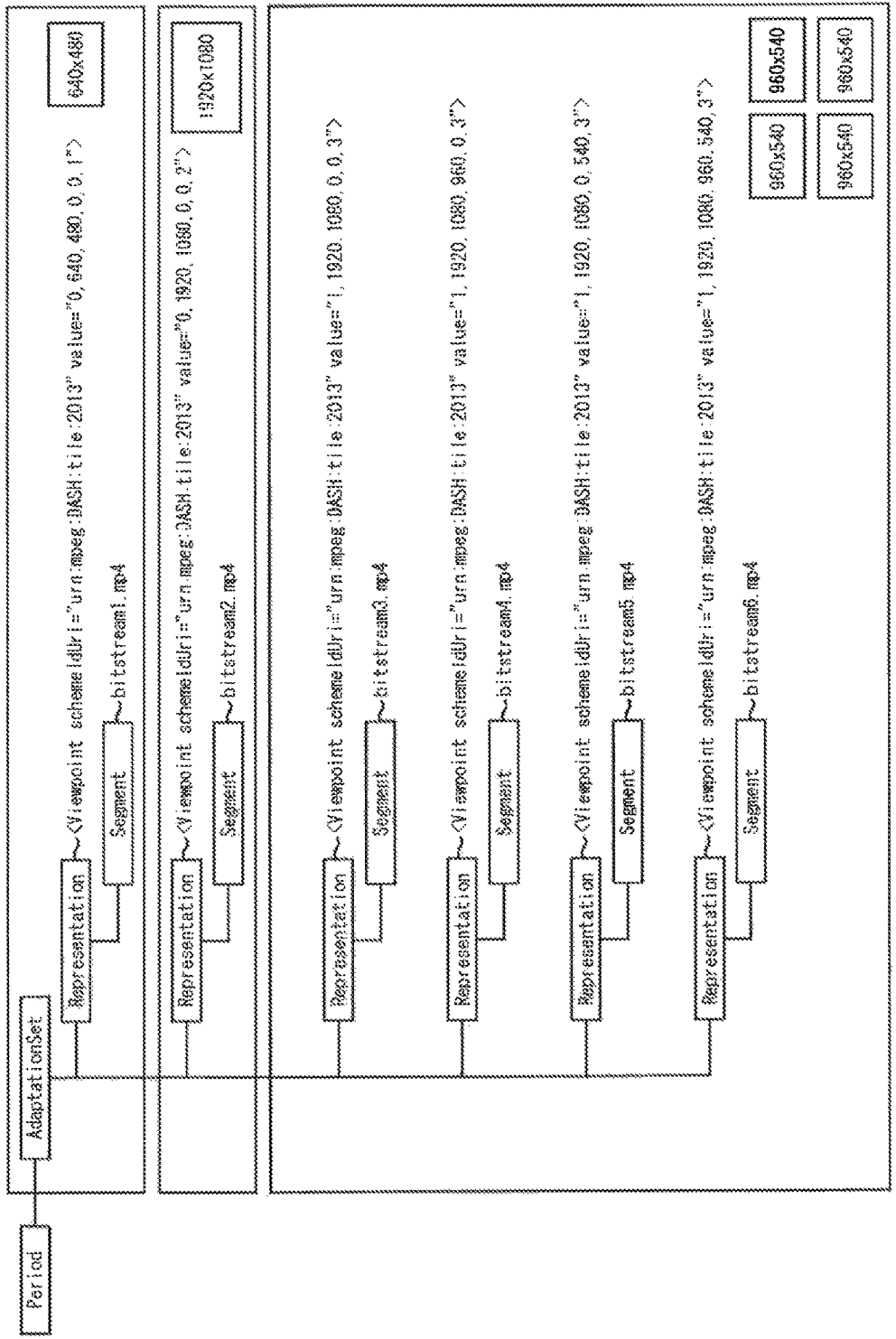
FIG. 23 is a diagram illustrating an example of an MPD extension method.

Another configuration example of the extended MPD is illustrated in FIG. 23. In the case of the example of FIG. 23, each piece of encoded data of each tile of the image data to be delivered is configured in one bit stream (MP4 file) (bitstream3.mp4 to bitstream6.mp4). In the MPD, the representation (Representation) is extended and the bit streams (MP4 files) of the tile images are defined in mutually different representations under the same adaptation set as the bit streams (MP4 files) (bitstream1.mp4 and bitstream2.mp4) of the entire images.

A viewpoint (Viewpoint) which is a description for a tile is defined in the representation and the URL of the bit stream (MP4 file) of the tile corresponding to the viewpoint is set in the segment (Segment) under the representation.

That is, the partial image information regarding the plurality of partial images belonging to the same group is stored in the mutually different representations belonging to the same adaptation set of the entire images of the metadata and the bit streams of the plurality of partial images are assigned to the mutually different representations.

That is, in the case of this example, as illustrated in FIG. 23, the representations of the tile images arranged with the representations of the entire images (bitstream1.mp4 and bitstream2.mp4) can be provided, and thus the delivery of the entire images and the adaptive delivery of the partial images can be managed in a unified manner.

Figure 24:
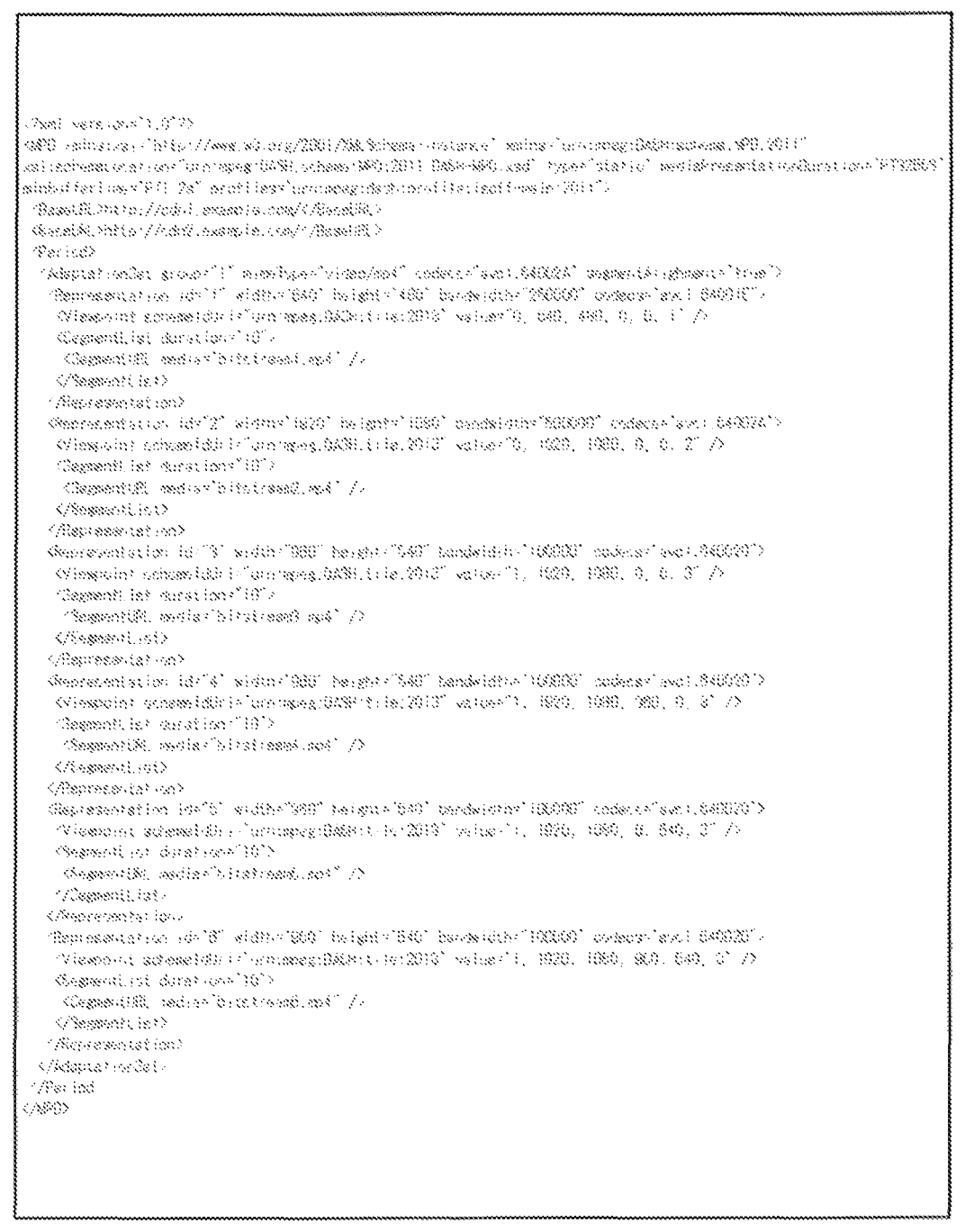

A specific description example of the MPD of this example is illustrated in FIG. 24.

Example 6

Figure 25:
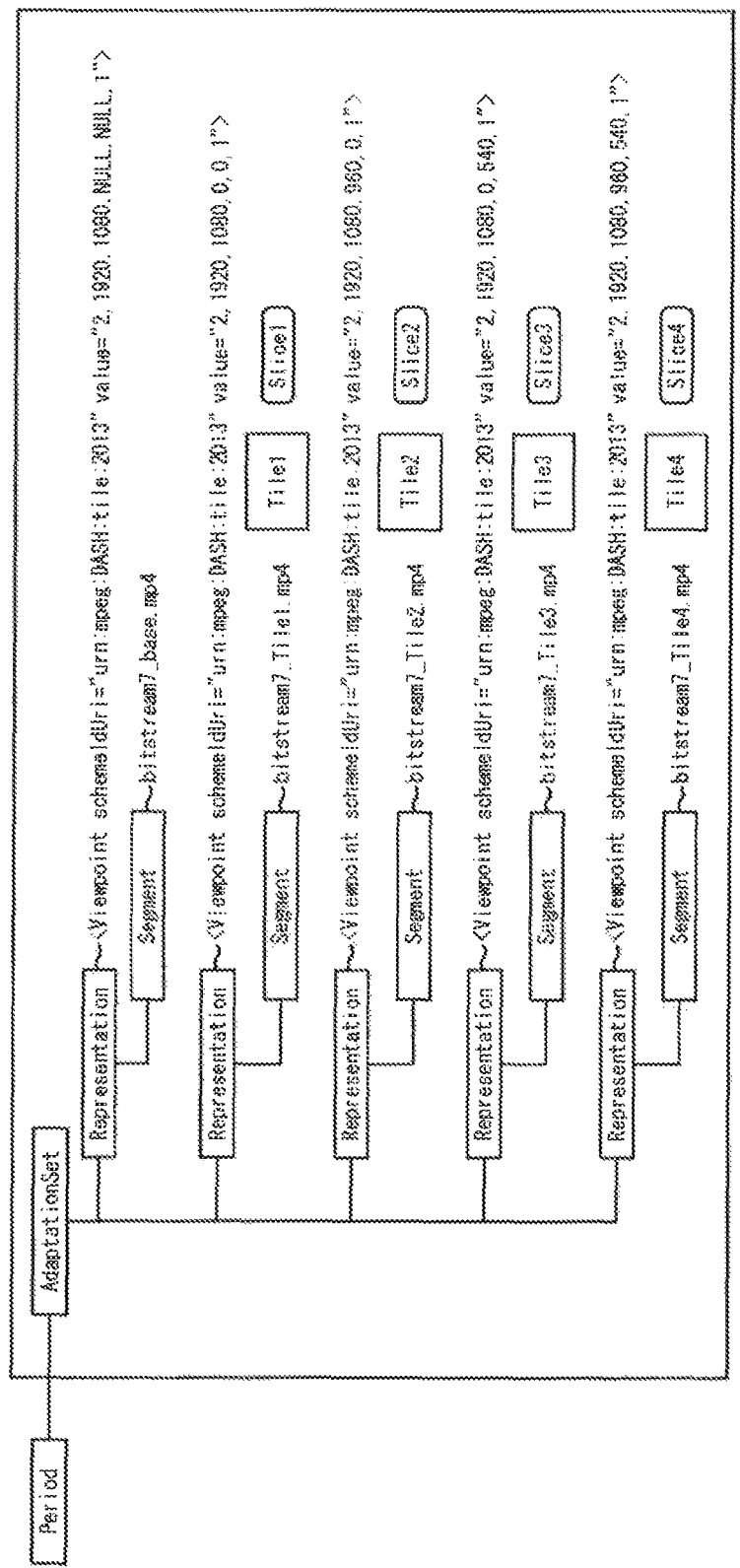
FIG. 25 is a diagram illustrating an example of an MPD extension method.

Another configuration example of the extended MPD is illustrated in FIG. 25. In the case of the example of FIG. 25, the encoded data of the tiles of the image data to be delivered is collected in one bit stream. The bit stream is filed as an MP4 file for each tile (bitstream7_Tile1.mp4 to bitstream7_Tile4.mp4). As described with reference to FIG. 7, a base track in which the header information or the like of the tiles is collected is filed separately from the bit streams of the tiles (bitstream7_base.mp4).

In the MPD, the representation (Representation) is extended, and the bit streams (MP4 files) (bitstream7_Tile1.mp4 to bitstreams7_Tile4.mp4) of the tile images are defined in the mutually different representations under the same adaptation sets.

A viewpoint (Viewpoint) which is a description for a tile is defined in the representation and the URL of the bit stream (MP4 file) of the tile corresponding to the viewpoint is set in the segment (Segment) under the representation.

In the x and y coordinates defined in the value of the viewpoint of the bit stream (MP4 file) (bitstream7_base.mp4) of the base track, as described in the first embodiment, apparently different values such as NULL or the like from normal coordinates are set. In the value of the view type defined in the value of each viewpoint, a value ("2" in the case of the example of FIG. 25) indicating a tile (Tile) in which the encoding scheme such as HEVC or the like is supported is set.

That is, partial image information regarding control information included in one bit stream including the plurality of partial images belonging to the same group is further generated, the partial image information regarding the plurality of partial images is stored in the mutually different representations belonging to one adaptation set of the metadata, the plurality of files for which the bit stream is divided for each partial image are assigned to the mutually different representations, the partial image information regarding the control information is stored in the different representation from the partial image information regarding each partial image, and the file of the control information is assigned to the representation.

Figure 26:
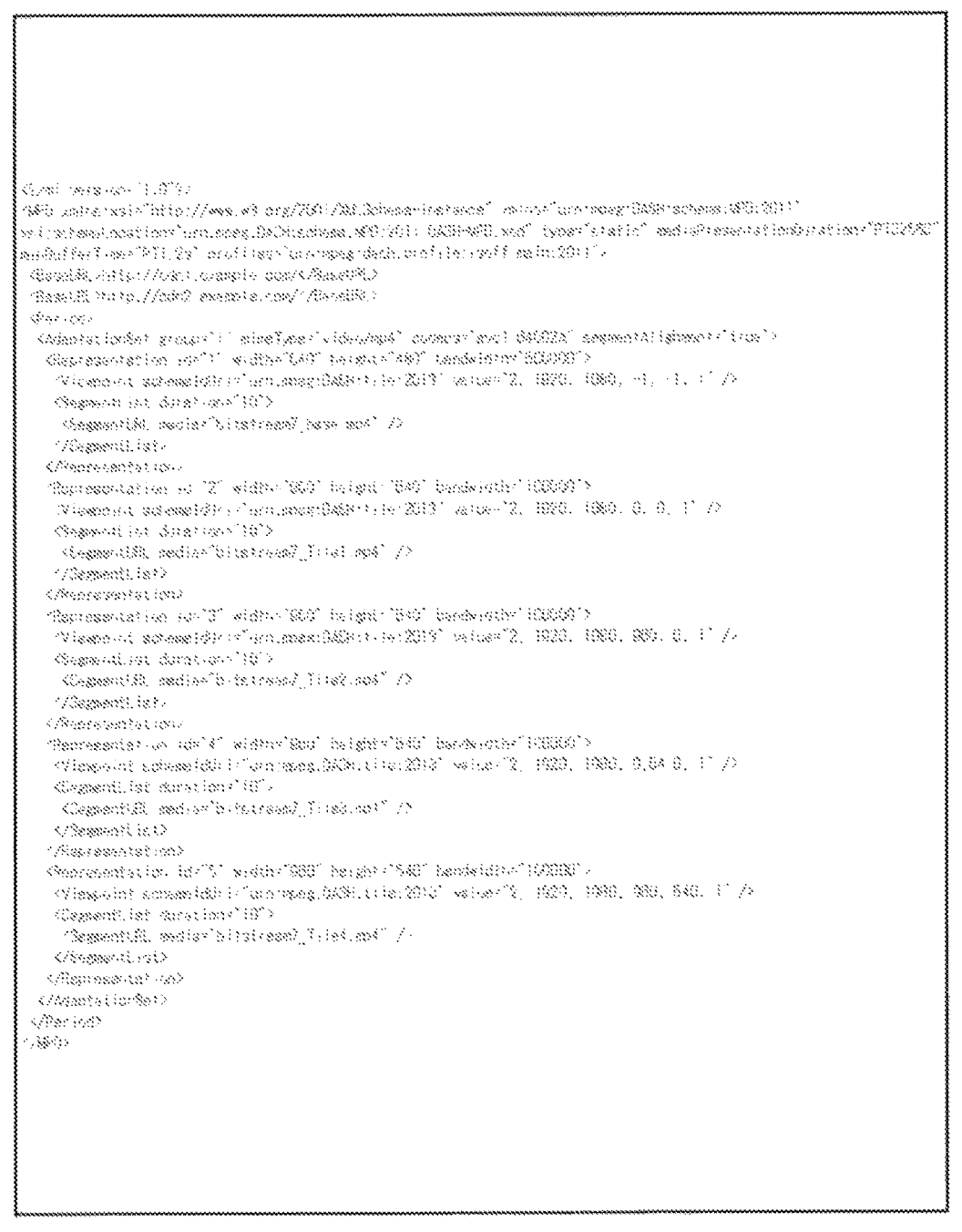

A specific description example of the MPD of this example is illustrated in FIG. 26.

Example 7

Figure 27:
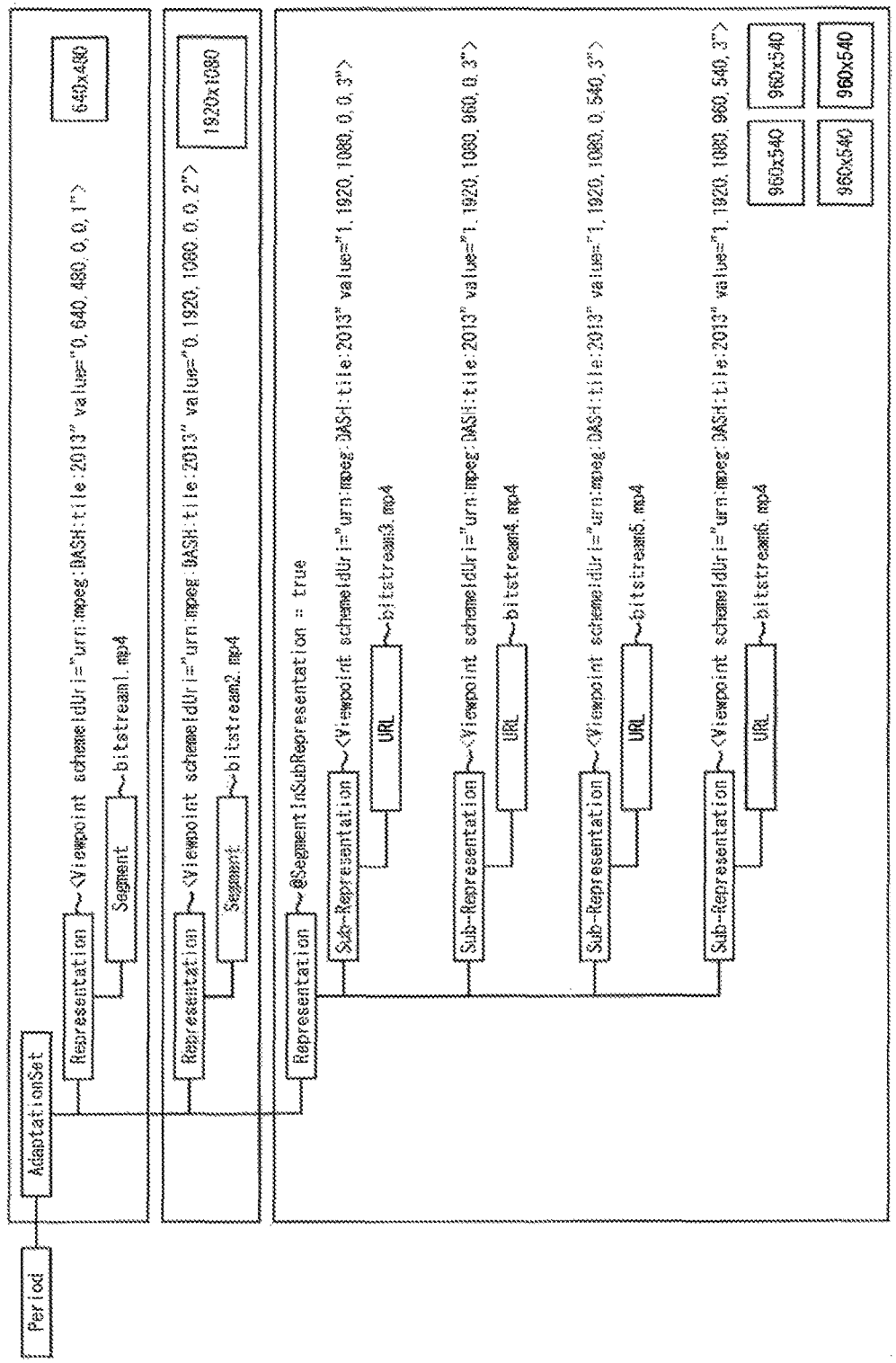
FIG. 27 is a diagram illustrating an example of an MPD extension method.

Another configuration example of the extended MPD is illustrated in FIG. 27. In the case of the example of FIG. 27, each piece of encoded data of each tile of the image data to be delivered is configured in one bit stream (MP4 file) (bitstream3.mp4 to bitstream6.mp4). In the MPD, the sub-representation (Sub-Representation) is extended and the bit streams (MP4 files) of the tile images are defined in mutually different sub-representations under the same adaptation set as the bit streams (MP4 files) (bitstream1.mp4 and bitstream2.mp4) of the entire images and under different representations from the bit streams (MP4 files) of the entire images.

A viewpoint (Viewpoint) which is a description for a tile is defined in the sub-representation and the URL of the bit stream (MP4 file) of the tile corresponding to the viewpoint is set in the segment (Segment) under the sub-representation.

In the representation in which the bit stream (MP4 file) of each tile image is defined, segment information (@SegmentInSubRepresentation=true) indicating that information regarding the bit stream is present under the sub-representation is defined.

That is, the partial image information regarding the plurality of partial images belonging to the same group is stored in mutually different sub-representations belonging to one representation belonging to one adaptation set of the metadata, and the bit streams of the plurality of partial images are assigned to the mutually different sub-representations.

That is, in the case of this example, as illustrated in FIG. 27, the representations of the tile images arranged with the representations of the entire images (bitstream1.mp4 and bitstream2.mp4) can be provided, and thus the delivery of the entire images and the adaptive delivery of the partial images can be managed in a unified manner.

Figure 28:
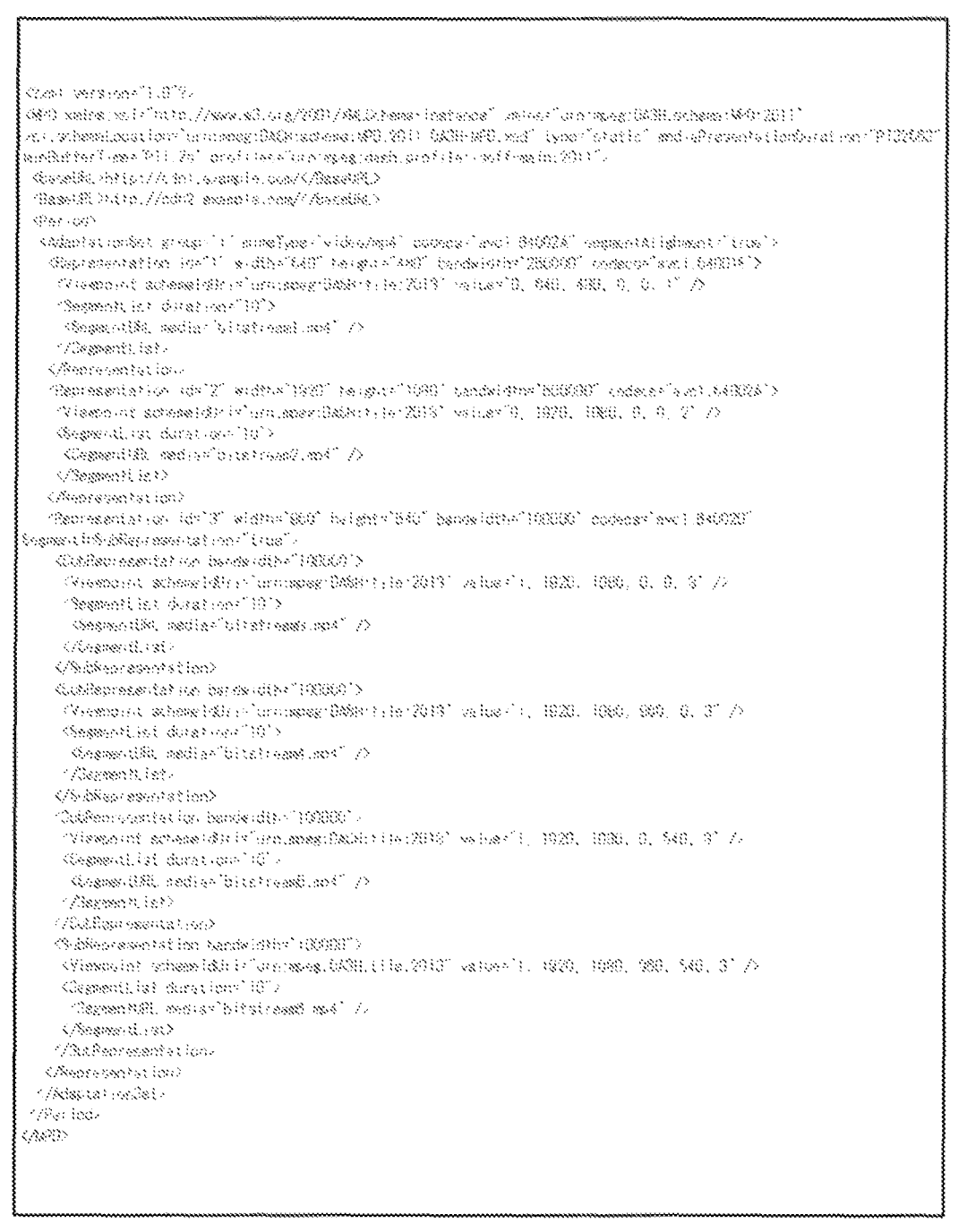

A specific description example of the MPD of this example is illustrated in FIG. 28.

Example 8

Figure 29:
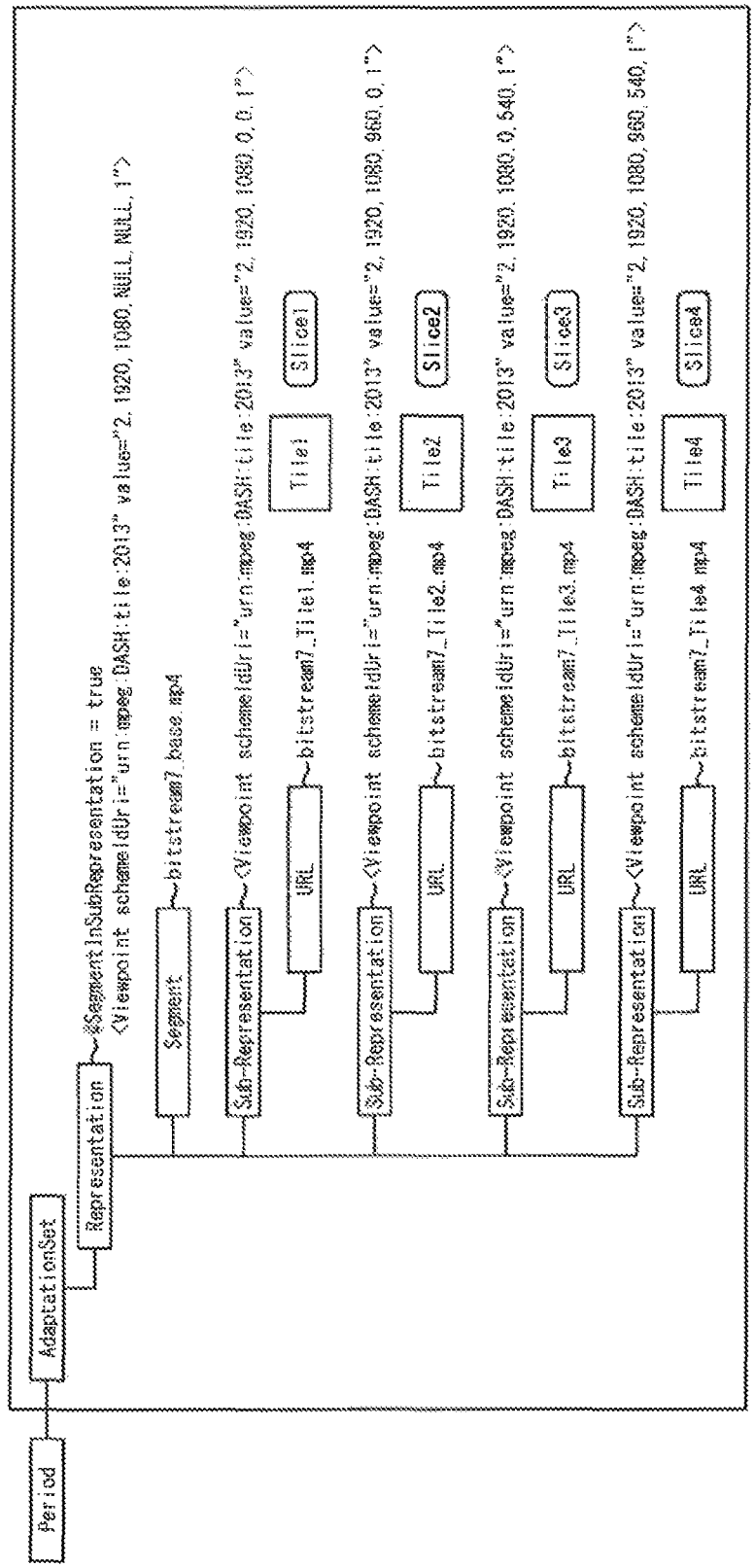
FIG. 29 is a diagram illustrating an example of an MPD extension method.

Another configuration example of the extended MPD is illustrated in FIG. 29. In the case of the example of FIG. 29, the encoded data of the tiles of the image data to be delivered is collected in one bit stream. The bit stream is filed as an MP4 file for each tile (bitstream7_Tile1.mp4 to bitstream7_Tile4.mp4). As described with reference to FIG. 7, a base track in which the header information or the like of the tiles is collected is filed separately from the bit streams of the tiles (bitstream7_base.mp4).

In the MPD, the sub-representation (Sub-Representation) is extended, and the bit streams (MP4 files) (bitstream7_Tile1.mp4 to bitstream7_Tile4.mp4) of the tile images are defined in the mutually different sub-representations under the same representation (Representation) under the same adaptation set (AdaptationSet).

A viewpoint (Viewpoint) which is a description for a tile is defined in the sub-representation and the URL of the bit stream (MP4 file) of the tile corresponding to the viewpoint is set in the segment (Segment) under the sub-representation.

The viewpoint of a base track is defined in the representation above the sub-representation and the URL of the bit stream (MP4 file) (bitstream7_base.mp4) of the base track is set in the segment under the representation. In the representation in which the bit stream (MP4 file) of each tile image is defined, segment information (@SegmentInSubRepresentation=true) indicating that information regarding the bit stream is present under the sub-representation is defined. Further, the segment information (@SegmentInSubRepresentation=true) indicating that the information regarding the bit stream is present under the sub-representation may be defined with another constituent element (for example, AdaptationSet) of the MPD illustrated in FIG. 4.

In the x and y coordinates defined in the value of the viewpoint of the bit stream (MP4 file) (bitstream7_base.mp4) of the base track, as described in the first embodiment, apparently different values such as NULL or the like from normal coordinates are set. In the value of the view type defined in the value of each viewpoint, a value ("2" in the case of the example of FIG. 29) indicating a tile (Tile) in which the encoding scheme such as HEVC or the like is supported is set.

That is, the partial image information regarding the control information included in one bit stream including the plurality of partial images belonging to the same group and the segment information indicating that the information regarding the bit stream is present under the sub-representation (Sub-Representation) are further generated, the segment information and the partial image information of the control information are stored in one representation belonging to one adaptation set of the metadata, a file of the control information is assigned to the representation, the partial image information regarding the plurality of partial images is stored in the mutually different sub-representations belonging to the representation, and the plurality of files in which the bit stream is divided for each partial image are assigned to the mutually different sub-representations.

A specific description example of the MPD of this example is illustrated in FIG. 30.

Example 9

Figure 31:
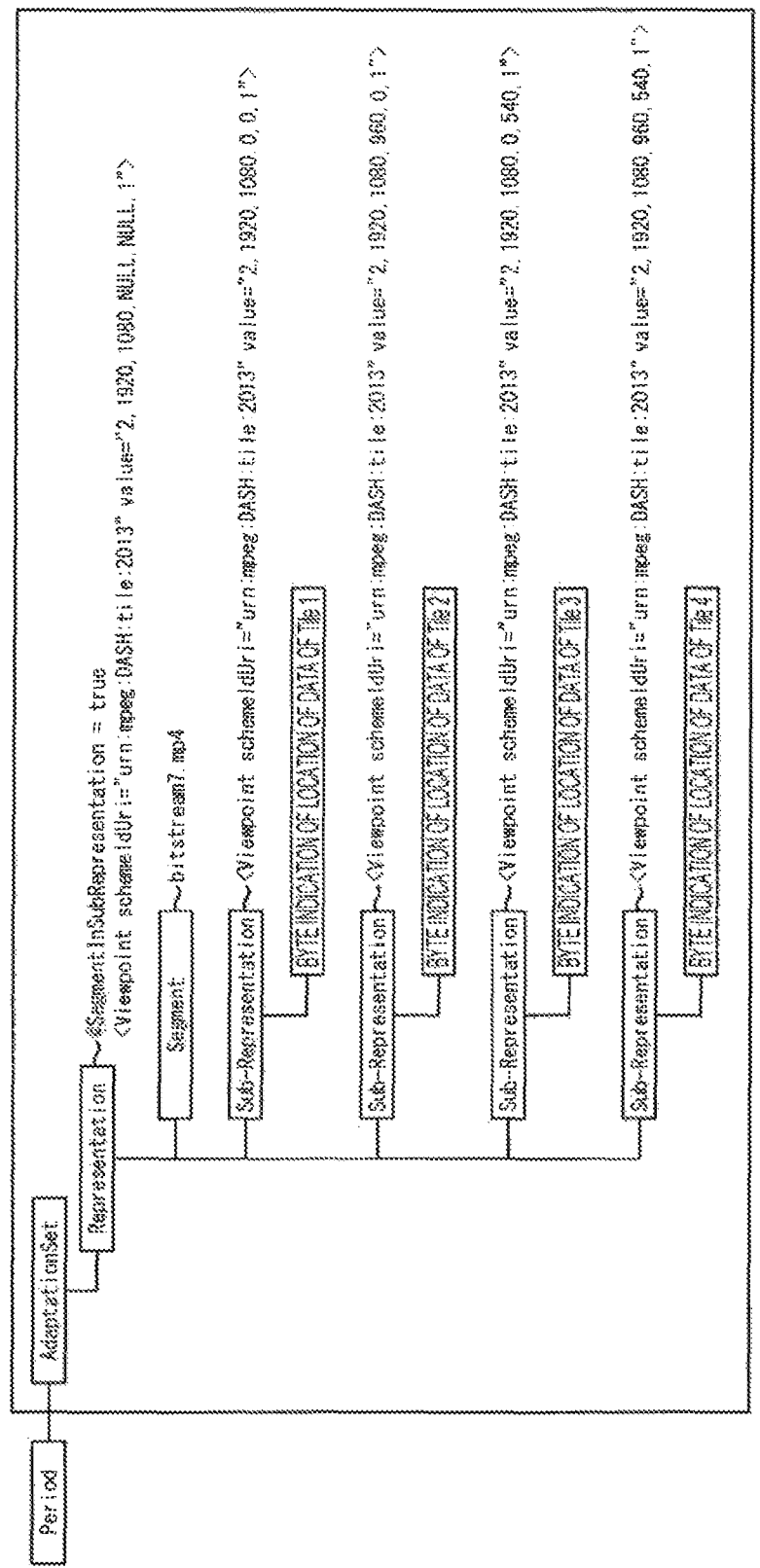
FIG. 31 is a diagram illustrating an example of an MPD extension method.

Another configuration example of the extended MPD is illustrated in FIG. 31. In the case of the example of FIG. 31, the encoded data of the tiles of the image data to be delivered is collected in one bit stream. The bit stream is filed as one MP4 file as in the example of FIG. 8 (bitstream7.mp4).

In the MPD, the sub-representation (Sub-Representation) is extended and the bit stream (MP4 file) (bitstream7.mp4) of the tile image is defined under the representation (Representation) under the adaptation set (AdaptationSet). In the representation above the sub-representation, the viewpoint (Viewpoint) corresponding to the bit stream (MP4 file) (bitstream7.mp4) of the tile image is defined and the segment information (@SegmentInSubRepresentation=true) indicating that information regarding the bit stream is present under the sub-representation is further defined.

In the sub-representation under the representation, the viewpoint of each tile is set and the location of the data of each tile in (bitstream7.mp4) is designated with a byte in the segment under the representation.

That is, the segment information indicating that the information regarding the bit stream is present under the sub-representation and the partial image information of the control information included in one bit stream including the plurality of partial images belonging to the same group are further generated, the partial image information of the control information and the segment information are stored in one representation belonging to one adaptation set of the metadata, the bit stream is assigned to the representation, the partial image information regarding the plurality of partial images is stored in mutually different sub-representations belonging to the representation, and the information indicating the location of the data of the partial images in the bit stream is assigned to the mutually different sub-representations.

Example 10

Figure 32:
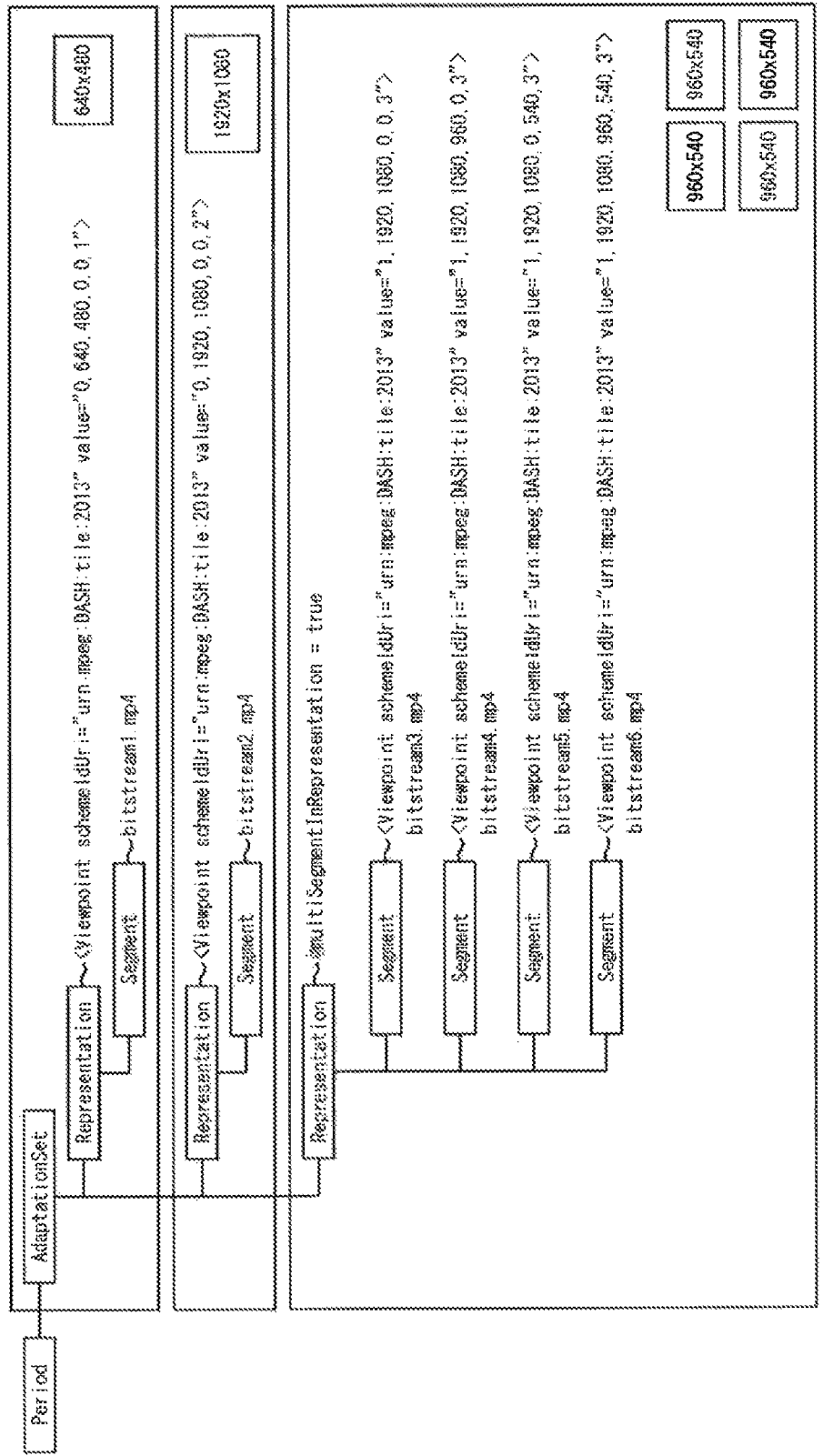
FIG. 32 is a diagram illustrating an example of an MPD extension method.

Another configuration example of the extended MPD is illustrated in FIG. 32. In the case of the example of FIG. 32, the encoded data of the tiles of the image data to be delivered is configured in one bit stream (MP4 file) (bitstream3.mp4 to bitstream6.mp4). In the MPD, the segments (Segment) are extended and the plurality of segments (Segment) are defined under the representations under the adaptation set.

In the representation, the viewpoint of a combined image of all the tile images is defined and the multi-segment information (@multiSegmentInRepresentation=true) indicating that the plurality of segments to which the tile images of the same time are assigned are present is defined under the representation. Further, the segment information (@SegmentInSub Representation=true) indicating that the information regarding the bit stream is present under the sub-representation may be defined with another constituent element (for example, AdaptationSet) of the MPD illustrated in FIG. 4.

The bit streams (MP4 files) of the tile images are defined in mutually different segments under the different representation from the bit streams (MP4 files) of the entire images and under the same adaptation set as the bit streams (MP4 files) (bitstream1.mp4 and bitstream2.mp4) of the entire images.

The viewpoint (Viewpoint) which is a description for a tile is defined in the segment (Segment) and the URL of the bit stream (MP4 file) of the tile corresponding to the viewpoint is set in each segment (Segment).

That is, the multi-segment information indicating that the plurality of pieces of information regarding the bit streams of the same time are present under the representation is further generated, the multi-segment information is stored in one representation belonging to one adaptation set of the metadata, the partial image information regarding the plurality of partial images belonging to the same group is stored in the mutually different segments belonging to the representation, and the bit streams of the plurality of partial images are assigned to the mutually different segments.

That is, as illustrated in FIG. 32, in the case of this example, the representation of the tile image arranged with the representations of the entire images (bitstream1.mp4 and bitstream2.mp4) can be provided, and thus the delivery of the entire images and the adaptive delivery of the partial images can be managed in a unified manner.

Figure 33:
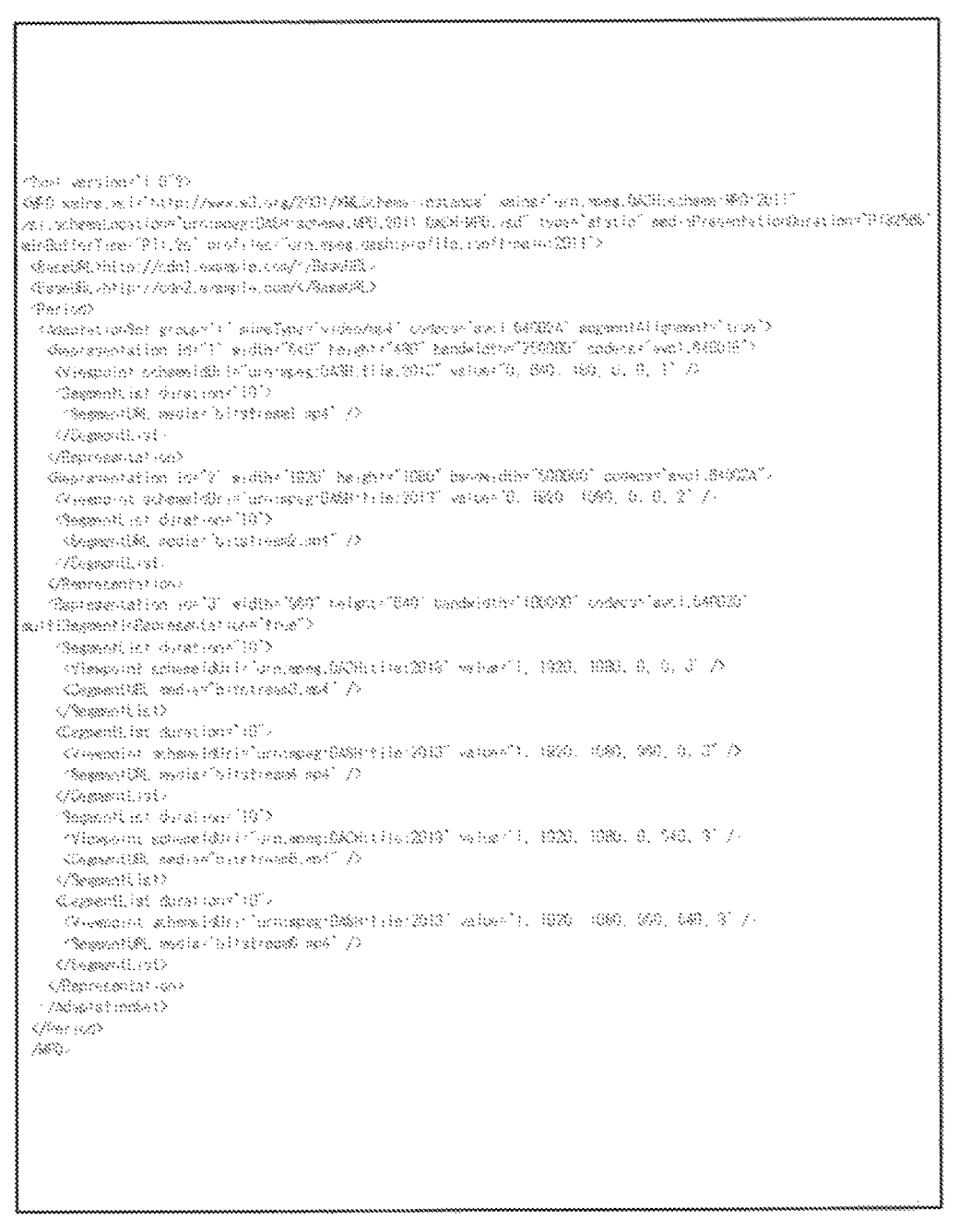

A specific description example of the MPD of this example is illustrated in FIG. 33.

Example 11

Figure 34:
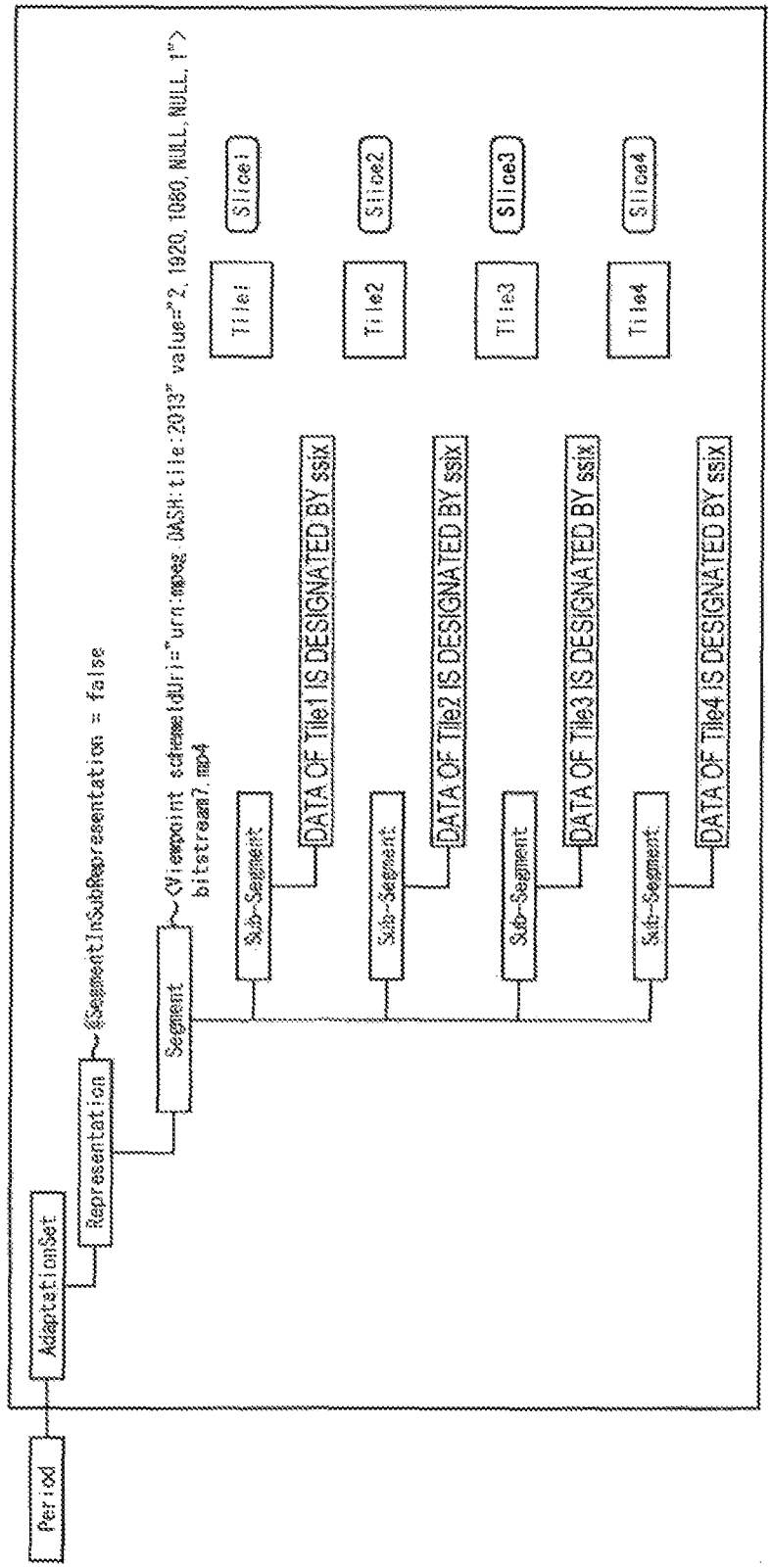
FIG. 34 is a diagram illustrating an example of an MPD extension method.

Another configuration example of the extended MPD is illustrated in FIG. 34. In the case of the example of FIG. 34, the encoded data of the tiles of the image data to be delivered is collectively configured in one bit stream (MP4 file) (bitstream7.mp4). In the MPD, the sub-segments (Sub-Segment) are extended and the plurality of sub-segments (Sub-Segment) are defined under the segment under the representation under the adaptation set.

In the representation, segment information (@Segment-InSub Representation=false) indicating that the information regarding the bit stream is not present under the sub-representation is defined.

In the segment, the viewpoint of the combined image of all the tile images is defined and the data of each tile image is shown in accordance with the ssix in the sub-segment under the segment.

That is, the segment information indicating that the information regarding the bit stream is not present under the sub-representation and the partial image information regarding one bit stream including the plurality of partial images belonging to the same group are further generated, the segment information is stored in one representation belonging to one adaptation set of the metadata, the partial image information is stored in one segment belonging to the representation, the bit stream is assigned to the segment, and the information indicating the location of the data of each partial image in the bit stream is assigned to the mutually different sub-segments belonging to the segment.

Of course, the MPD extension method is arbitrary and methods other than the above-described methods may be used.

<Other Example of Application Using Delivery of Tile Image>

Next, another example of the application using the adaptive delivery (supply) of the tile images described above will be described.

Figure 35:
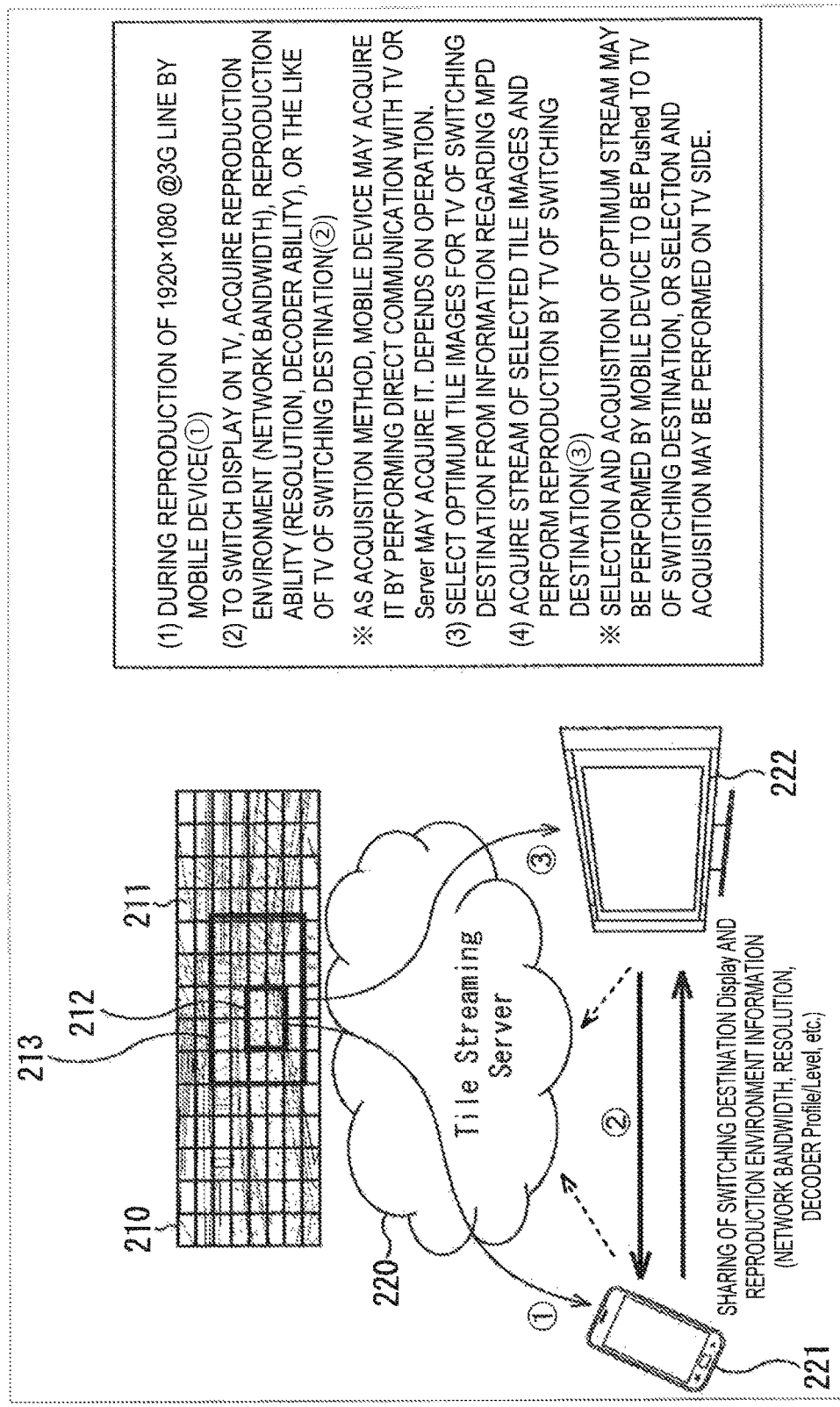
FIG. 35 is a diagram illustrating an example of an application using tile image delivery.

For example, in a system illustrated on the left of FIG. 35, a mobile device 221 is assumed to acquire a partial image 212 with a 1920×1080 size formed by four tile images 211 of an entire image 210 from a server 220 using a 3G line and reproduce the partial image 212.

To switch display on a television signal receiver (TV) 222, information regarding a reproduction environment (network bandwidth), a reproduction ability (resolution and a decoder ability), or the like of the TV 222 of a switching destination is acquired from the TV 222. The method of acquiring the information is arbitrary. For example, the mobile device 221 may acquire the information by performing direct communication with the TV 222. Alternatively, the mobile device 221 may acquire the information via the server 220.

The mobile device 221 selects optimum tile images for the TV 222 of the switching destination from the information regarding the MPD. In the case of the example of FIG. 35, a partial image 213 formed by the 5×5 tile images 211 is selected.

The TV 222 of the switching destination acquires a bit stream of the tile images selected in this way and reproduces the bit stream.

The above-described selection or acquisition of the optimum stream may be performed by the mobile device 221 to be pushed to the TV 222 of the switching destination, or such selection or acquisition may be performed by the TV 222.

<Other Example of Application Using Delivery of Tile Image>

Figure 36:
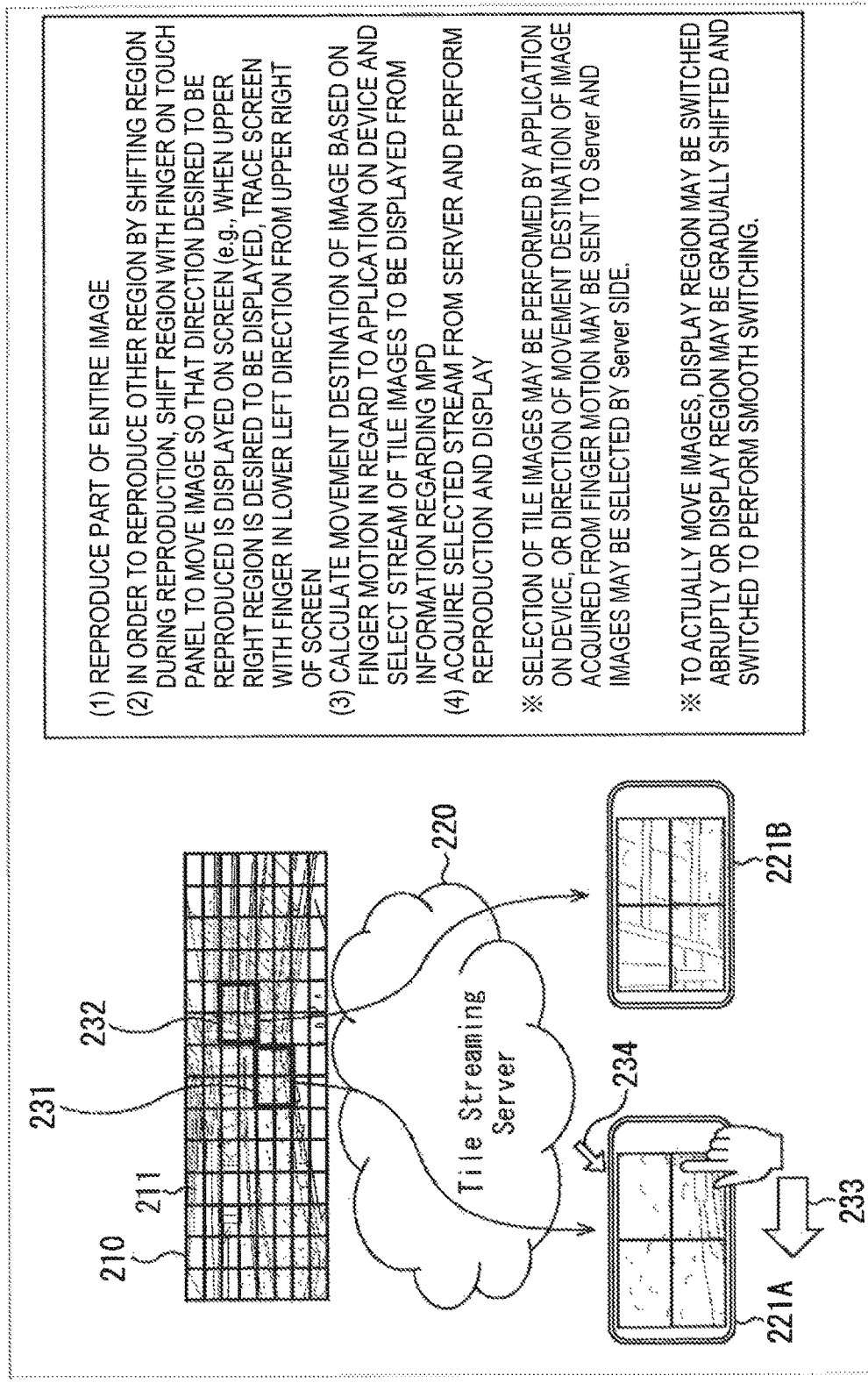
FIG. 36 is a diagram illustrating another example of an application using the tile image delivery.

For example, in a system illustrated on the left of FIG. 36, a mobile device 221 is assumed to reproduce a part of an entire image (state 221A of the mobile device)

To reproduce another region by shifting a region during the reproduction, a user of the mobile device 221 shifts the region with his or her finger on a touch panel to move an image (as indicated by an arrow 233) so that a direction desired to be reproduced is displayed on a screen. For example, when the user desires to display an upper right region (partial image 232) of the currently displayed region (partial image 231) as indicated by an arrow 234, the user traces his or her finger in the lower left direction from the upper right of the screen.

When such a user input is performed, the mobile device 221 calculates a movement destination of the image based on the input finger motion or the like and selects a stream of tile images to be displayed from the information regarding the MPD.

Then, the mobile device 221 acquires the selected bit stream from the server 220 and performs the reproduction and display (state 221B of the mobile device).

The selection of the tile images may be performed by an application executed in the mobile device 221, or the direction of the movement destination of the image acquired from the finger motion may be sent to the server 220 and the images may be selected by the server 220.

To actually move the images, a display region may be switched abruptly or the display region may be gradually shifted and switched to perform smooth switching.

4. Fourth Embodiment

<Other Example of MPD Extension>

Figure 37:
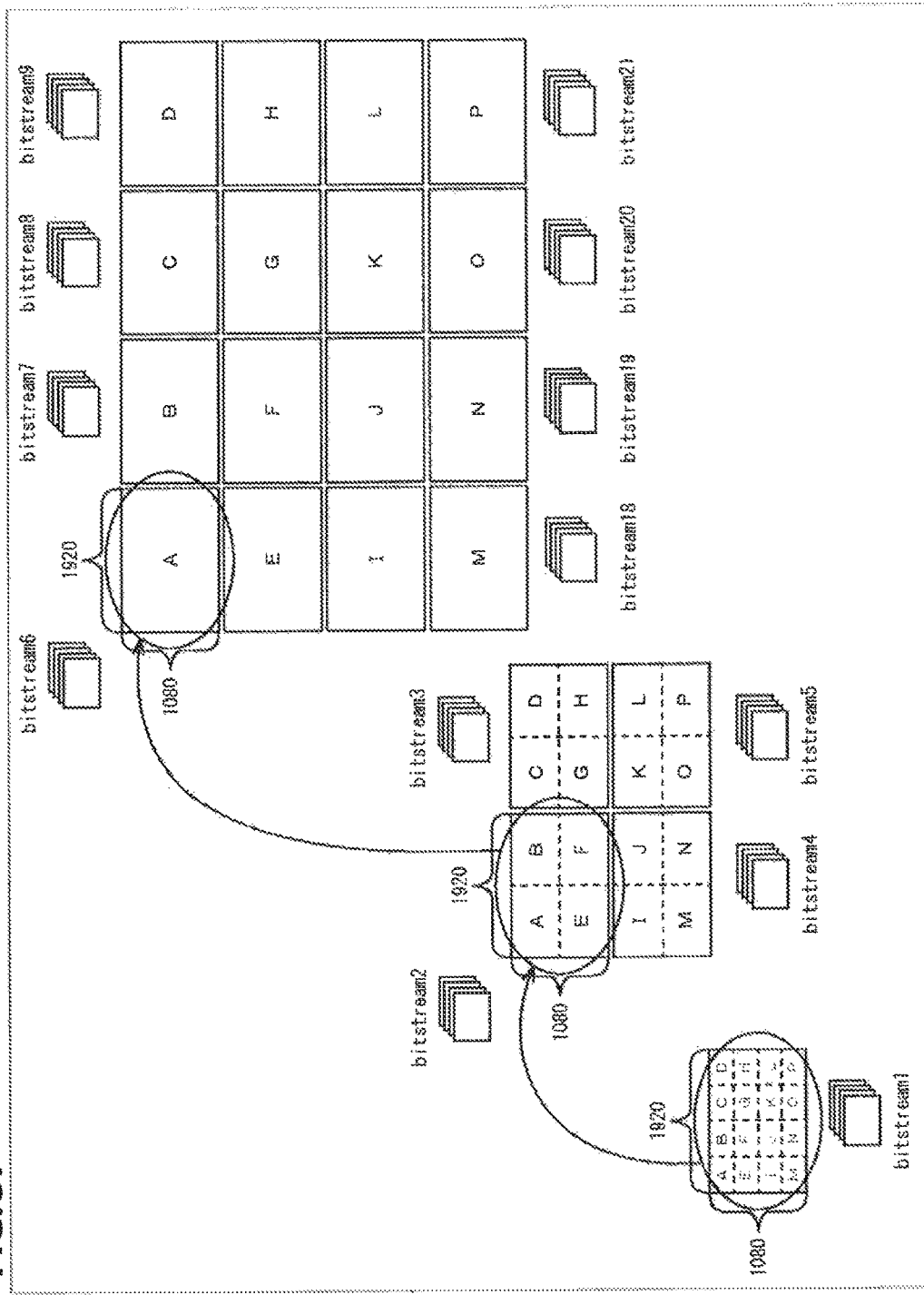
FIG. 37 is a diagram illustrating another example of an application using the tile image delivery.

FIG. 37 is a diagram illustrating another example of an application using the tile image delivery.

In order to enable users to select favorite programs among programs of a plurality of channels of broadcast or the like, for example, a menu is generated by encoding images of the plurality of channels as one image (HD). A combined image combined so that such different images are arranged is defined as a mosaic video.

For example, in the case of devices having large displays as in television signal receivers, users can easily comprehend content of each program from a mosaic video in which programs of all channels are combined, select a desired program, and display the program.

However, in the case of mobile devices, displays of the mobile device are small, and thus can display only images with small image sizes (low resolutions), such as images in HD or lower. That is, only images with 1920×1080 can be delivered to such mobile devices.

However, in such small image sizes, regions in which a program of each channel of a mosaic video is displayed are too small, and thus it is difficult for users to comprehend content of each program from such a mosaic video and select a desired program.

Accordingly, when a technology for adaptively supplying data of a partial image is applied, as described above, and a user selects and zooms in on a location at which a program in which he or she is interested is pictured in a mosaic video, the image is configured to be switched to another HD image in which images of fewer programs are displayed. The user can easily display only a desired program by repeating such zooming (image switching).

In the case of the example of FIG. 37, tiles within a range indicated by an elliptical circle are assumed to be acquired and displayed by a mobile device. In the leftmost mosaic video, an entire mosaic video can be displayed. At this time, images of programs corresponding to 16 channels are displayed. In this state, display regions (A to P) of the programs are too small, and thus it is difficult for a user to select a desired program. Accordingly, when the user performs selection, for example, by tapping an upper left portion, a delivered file (bit stream) is switched and an upper left tile image with an image size of 1920×1080 in the mosaic video is displayed, as illustrated in the middle of FIG. 37. In the tile image, 4 programs (A, B, E, and F) are displayed. That is, the number of displayed programs is reduced and the display region per program is spread.

Further, when the user performs selection, for example, by tapping an upper left portion of the mosaic video, the delivered file (bit stream) is switched and an upper left tile image with an image size of 1920×1080 in the mosaic video is displayed, as illustrated on the right in FIG. 37. In the tile image, 1 program (A) is displayed. That is, the number of displayed programs is further reduced and the display region per program is spread.

The switching of the delivered data described above is realized by extending the DASH standard, as described above. That is, for example, the structure of the mosaic video forming one screen is defined in the MPD so that the mosaic video can be used as a user interface (UI/UX).

For example, a relation between a screen structure and positional information selected by the user is obtained and a stream to be subsequently switched is selected. Coordinates touched on the screen by the user and coordinates on the mosaic video are obtained and a mosaic video of a subsequent Layer (extension) in which the coordinate position is included is obtained to be switched.

New schemeIdUri (urn:mpeg:DASH:mosaic:2013) is defined using an element (Viewpoint element) of the viewpoint. For example, the following information is defined in content (partial image information) of the value of the new schemeIdUri.

the number of mosaic images forming one screen
a flag indicating that the sizes of the mosaic images are equal
the coordinates of the origin of the upper left of each mosaic image and information regarding a width and a height when the sizes are not equal More specifically, a viewpoint is defined as follows. Then, the MPD is extended using such partial image information.
<Viewpoint schemeIdUri="urn:mpeg:DASH:mosaic:2013" value="number of mosaic images, equal image flag, positional information regarding mosaic images">

The element of the viewpoint is an element corresponding to the mosaic video (urn:mpeg:DASH:mosaic:2013). In order to adaptively supply the data of the partial image, as described above, it is necessary to further define the element of the viewpoint for a tile, as illustrated in FIG. 10A. That is, the element of the viewpoint for mosaic video described above is positioned as an extension element of the elements of the viewpoint for a tile.

Figure 38:
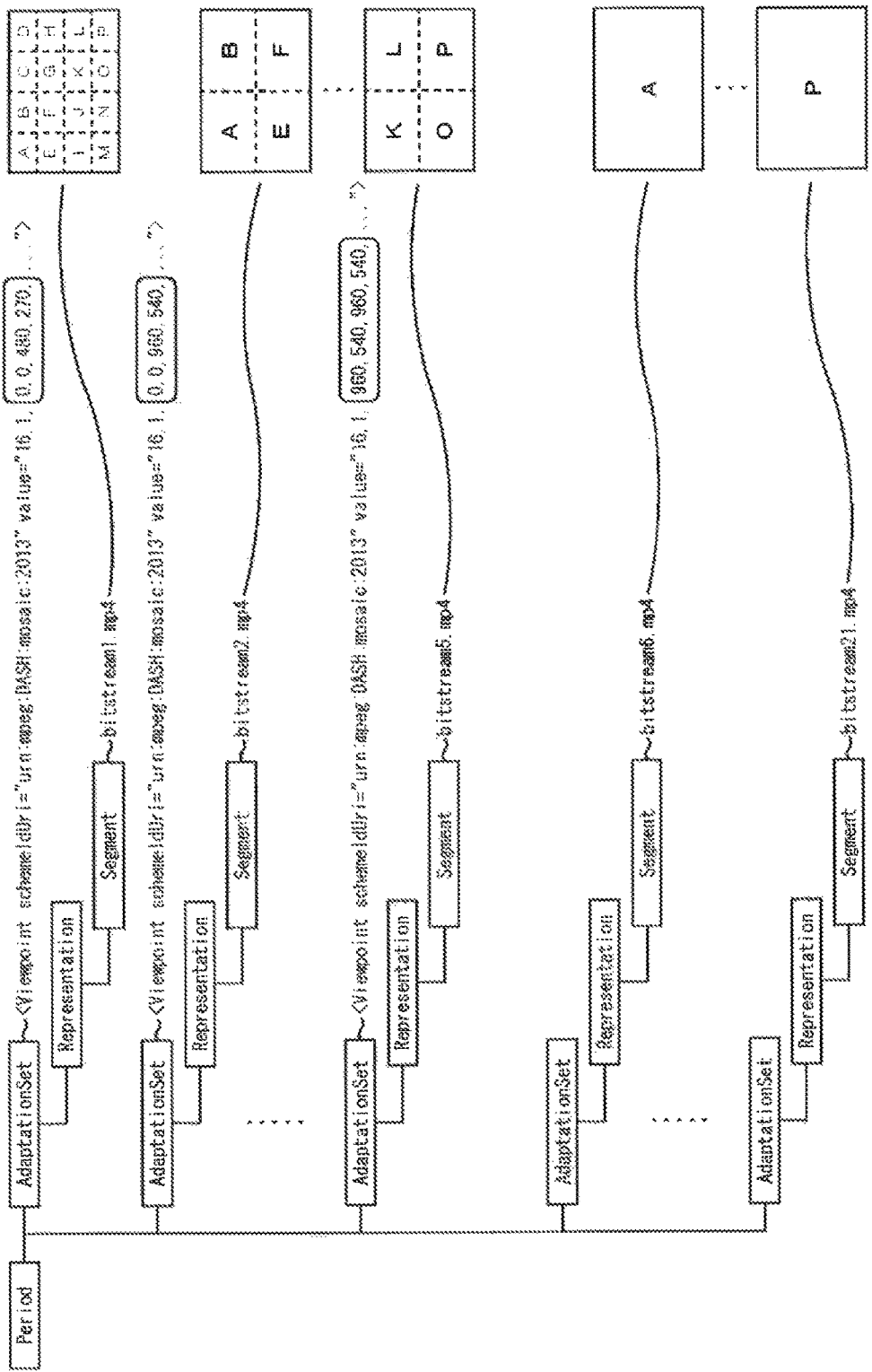
FIG. 38 is a diagram illustrating an example of an MPD extension method.

For example, in the case of a state in which a plurality of programs are displayed, as illustrated on the upper side of FIG. 38, it is necessary to define both of the element of the viewpoint for a tile and the element of the viewpoint for mosaic video in the adaptation set.

On the other hand, in the case of a state in which only one program is displayed, as illustrated on the lower side of FIG. 38, as a narrowing result of the programs by the user, the mosaic video is not formed, and thus it is not necessary to define the element of the viewpoint for mosaic video. However, in order to indicate the entire image (Full video), it is necessary to define the element of the viewpoint for a tile.

When the sizes of the tile images are equal in the value of the element of the viewpoint for mosaic video described above, the positional information regarding the image is handled optionally. Writing may not be performed. When the writing is performed, it is necessary to write all of the images. Further, information other than the above-described information may be defined as a value.

5. Fifth Embodiment

<Examples of Configuration of MP4 File and Extension Examples of MPD Corresponding Thereto>

The examples of the configuration of the MP4 file have been described with reference to FIGS. 7 and 8 in the first embodiment. However, an embodiment of the present disclosure is not limited to the examples of the configuration of the MP4 file. Hereinafter, examples of the configuration of the MP4 file and examples of the configuration (extension examples) of the MPD corresponding thereto will be described.

<Case of 1 Track: MP4 File>

Figure 39:
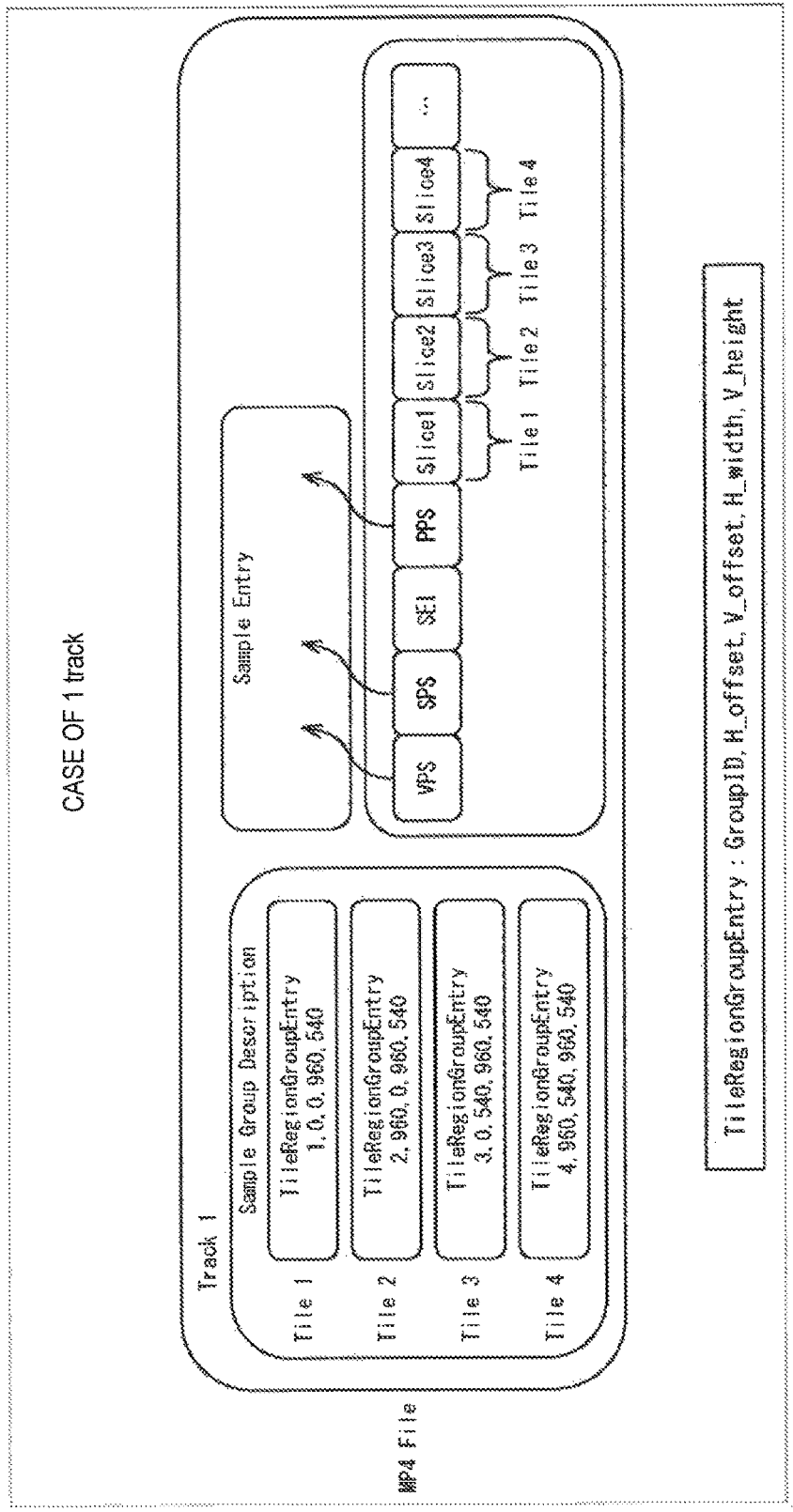
FIG. 39 is a diagram for describing an example of the configuration of an MP4 file of a tile image.

FIG. 39 is a diagram illustrating an example of the configuration of an MP4 file obtained by filing the bit stream (bitstream7) having, for example, the tile (Tile) structure illustrated in FIG. 6B. In the case of the example of FIG. 39, as in the example of FIG. 8A, bit streams of tiles are collected and considered as one file and the data of the tiles is further managed as one track.

Parameter sets such as a video parameter set (VPS), a sequence parameter set (SPS), and a picture parameter set (PPS) are managed for a sample by a sample entry (Sample Entry). Each tile is defined by a tile region group entry (TileRegionGroupEntry) in a sample group description (Sample Group Description). As illustrated in FIG. 39, the values of 5 parameters, GroupID which is identification information identifying the tile, H_offset indicating the position (offset) of the tile in the horizontal direction, V_offset indicating the position (offset) of the tile in the vertical direction, H_width indicating the size (width) of the tile in the horizontal direction, and V_height indicating the size (height) of the tile in the vertical direction, are defined as the tile region group entry (TileRegionGroupEntry).

For example, in the tile region group entry (TileRegionGroupEntry) of tile 1 (Tile 1), GroupID=1, H_offset=0, V_offset=0, H_width=960, and V_height=540 are defined. For example, in the tile region group entry (TileRegionGroupEntry) of tile 2 (Tile 2), GroupID=2, H_offset=960, V_offset=0, H_width=960, and V_height=540 are defined. For example, in the tile region group entry (TileRegionGroupEntry) of tile 3 (Tile 3), GroupID=3, H_offset=0, V_offset=540, H_width=960, and V_height=540 are defined. For example, in the tile region group entry (TileRegionGroupEntry) of tile 4 (Tile 4), GroupID=4, H_offset=960, V_offset=540, H_width=960, and V_height=540 are defined. In this case, an entire image (1920×1080) is formed by 4 tiles (960×540), 2 vertical tiles×2 horizontal tiles.

The file name of this MP4 file is assumed to be bitstream.mp4.

<Case of 1 Track: MPD>

Figure 40:
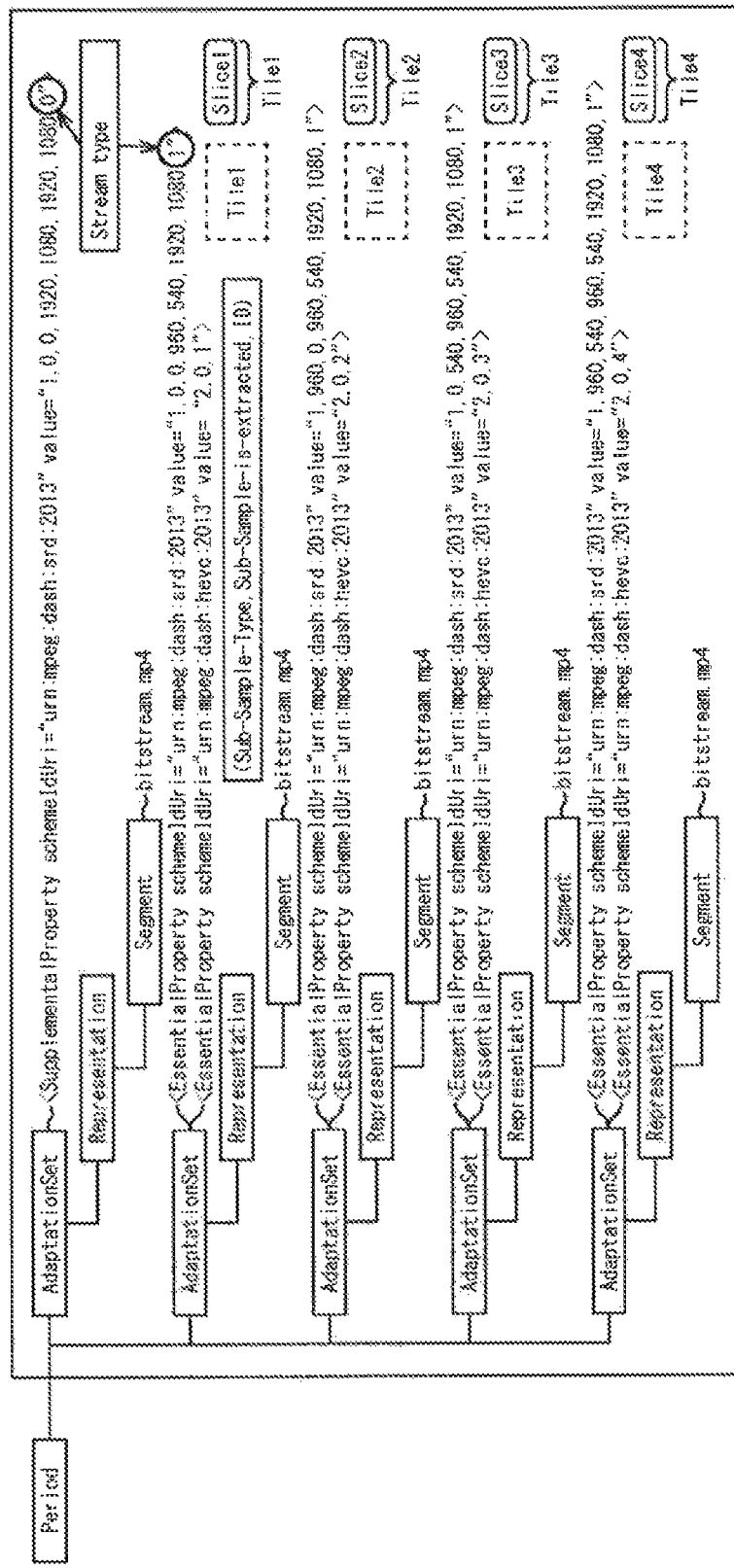
FIG. 40 is a diagram illustrating an example of the configuration of an MPD.

To manage the MP4 file of the bit stream having the tile structure in the example of FIG. 39, for example, an MPD of an MPEG-DASH standard of the related art is extended, as in FIG. 40.

In the case of the example of FIG. 40, an entire image and each tile are defined in mutually different adaptation sets (AdaptationSet). In the topmost adaptation set in the drawing defined in the entire image, as illustrated in FIG. 40, a supplemental property (SupplementalProperty) is defined as a description for a tile instead of the viewpoint (Viewpoint) described in the first embodiment.

The supplemental property (SupplementalProperty) is an element of the related art. By using the element of the related art, it is possible to suppress a reduction in affinity to an MPD of the related art (it is possible to suppress an increase in a description in which a decoder of the related art is not analyzable). The supplemental property is defined in the adaptation set in which the bit stream decodable even in a decoder of the related art is defined. For example, in the case of FIG. 40, the supplemental property is defined in the adaptation set defined in regard to an entire image which can be decoded even in the decoder of the related art.

For example, the supplemental property is extended and defined as follows.

<SupplementalProperty schemeIdUri=" " value="source id, x, y, width, height, width_all, height_all, stream type">

That is, in the element of the supplemental property, schema (schemeIdUri) for storing image information is defined. In the case of the example of FIG. 40, "urn:mpeg:dash:srd:2013" is defined as the schema.

The value of the schema is defined. "source id" is identification information indicating whether a content source of the adaptation set is the same as a content source of another adaptation set. In the case of FIG. 40, since the content source of each adaptation set is common (bitstream.mp4), "1" is defined as "source id."

"x, y" is information indicating the position (x and y coordinates of the upper left) of the tile defined by the adaptation set. In the case of FIG. 40, since the adaptation set defines the entire image, "0, 0" is defined as "x, y."

"width, height" is information indicating the size (the width and the height) of the tile defined by the adaptation set. In the case of FIG. 40, since the adaptation set defines the entire image, "1920, 1080" is defined as "width, height."

"width_all, height_all" is information indicating the size (the width and the height) of the entire image. In the case of FIG. 40, "1920, 1080" is defined as "width_all, height_all."

"stream type" is identification information indicating whether the adaptation set defines an entire bit stream or a part of the bit stream. In the case of FIG. 40, "0" indicating that the adaptation set defines the entire bit stream is defined as "stream type."

That is, in the case of the topmost adaptation set in the drawing in the example of FIG. 40, the supplemental property is defined as follows, for example.

<SupplementalProperty schemeIdUri="urn:mpeg:dash:srd:2013" value="1, 0, 0, 1920, 1080, 1920, 1080, 0">

As illustrated in FIG. 40, in the adaptation set in which tile 1 (Tile 1) is defined and which is the second adaptation set from the top of the drawing, an essential property (EssentialProperty) is defined instead of the viewpoint (Viewpoint) described as the description for a tile in the first embodiment.

The essential property (EssentialProperty) is an element of the related art. By using the element of the related art, it is possible to suppress a reduction in affinity to an MPD of the related art (it is possible to suppress an increase in a description in which a decoder of the related art is not analyzable). The essential property is defined in the adaptation set in which the bit stream undecodable in a decoder of the related art is defined. For example, in the case of FIG. 40, the essential property is defined in the adaptation set defined in regard to each tile image which cannot be decoded in the decoder of the related art.

That is, only a decoder which is capable of interpreting the essential property decodes the bit stream managed by the adaptation set and a decoder which is not capable of interpreting the essential property skips the adaptation set.

For example, the essential property is extended as follows and is defined. That is, the essential property is defined as in the supplemental property (SupplementalProperty).

<EssentialProperty schemeIdUri=" " value="source id, x, y, width, height, width_all, height_all, stream type">

In the case of the second adaptation set from the top of the drawing in the example of FIG. 40, "urn:mpeg:dash:srd:2013" is defined as the schema. Further, "1" is defined as "source id" of the value of the schema, "0, 0" is defined as "x, y," "960, 540" is defined as "width, height," "1920, 1080" is defined as "width_all, height_all," and "1" indicating the adaptation set defines a part of the bit stream is defined as "stream type."

When the value of "stream type" is "1," that is, when a part of the bit stream is defined in the adaptation set, the essential property is further extended as information indicating the part of the bit stream. For example, when the (Tile) of 16 HEVC is included in an MP4 file managed in the adaptation set, the adaptation set corresponding to the tile corresponds to the part of the bit stream. In this case, the essential property in regard to the part of the bit stream is further extended and defined as follows, for example.

<EssentialProperty schemeIdUri=" " value="Sub-Sample-Type, Sub-Sample-is-extracted.ID">

In this case, in the element of the essential property, a schema (schemeIdUri) for storing information indicating a part of the file is defined. In the case of the second adaptation set from the top of the drawing in the example of FIG. 40, "urn:mpeg:dash:hevc:2013" is defined as the schema.

A value of the schema is defined. "Sub-Sample-Type" is information indicating by which information a part of the bit stream to which the adaptation set corresponds is configured. For example, when the value of the information is "0," it is indicated that the part of the bit stream is configured by Nal based. For example, when the value of the information is "1," it is indicated that the part of the bit stream is configured by Decoding-unit-based. Further, for example, when the value of the information is "2," it is indicated that the part of the bit stream is configured by Tile-based. For example, when the value of the information is "3," it is indicated that the part of the bit stream is configured by CTU-row-based. Further, for example, when the value of the information is "4," it is indicated that the part of the bit stream is configured by slice-based. In the case of the second adaptation set from the top of the drawing in the example of FIG. 40, "2" is defined as "Sub-Sample-Type."

"Sub-Sample-is-extracted" is information indicating whether a part of the bit stream to which the adaptation set corresponds is divided (extracted) into tracks. For example, when the value of the information is "0," it is indicated that the part of the bit stream is not divided (false). When the value of the information is "1," it is indicated that the part of the bit stream is divided into the tracks (true). In the case of the second adaptation set from the top of the drawing in the example of FIG. 40, the number of tracks is 1 (not divided), as described with reference to FIG. 39, and "0" is defined as "Sub-Sample-is-extracted."

"ID" is identification information. When "2" is defined as "Sub-Sample-Type," that is, in the case of Tile, GroupID of The tile region group entry (TileRegionGroupEntry) of the MP4 file is defined. In the case of the second adaptation set from the top of the drawing in the example of FIG. 40, the part of the bit stream is data of tile 1 (Tile 1), and thus "1" is defined as "ID."

That is, in the case of the second adaptation set from the top of the drawing in the example of FIG. 40, the essential property is defined as follows, for example.

<EssentialProperty schemeIdUri="urn:mpeg:dash:srd: 2013" value="1, 0, 0, 960, 540, 1920, 1080, 1">
<EssentialProperty schemeIdUri="urn:mpeg:dash:hevc: 2013" value="2, 0, 1">

Similarly, in the case of the third adaptation set from the top of the drawing in the example of FIG. 40, the essential property is defined as follows, for example.

<EssentialProperty schemeIdUri="urn:mpeg:dash:srd: 2013" value="1, 960, 0, 960, 540, 1920, 1080, 1">
<EssentialProperty schemeIdUri="urn:mpeg:dash:hevc: 2013" value="2, 0, 2">

Similarly, in the case of the fourth adaptation set from the top of the drawing in the example of FIG. 40, the essential property is defined as follows, for example.

<EssentialProperty schemeIdUri="urn:mpeg:dash:srd: 2013" value="1, 0, 540, 960, 540, 1920, 1080, 1">
<EssentialProperty schemeIdUri="urn:mpeg:dash:hevc: 2013" value="2, 0, 3">

Similarly, in the case of the bottommost adaptation set of the drawing in the example of FIG. 40, the essential property is defined as follows, for example.

<EssentialProperty schemeIdUri="urn:mpeg:dash:srd: 2013" value="1, 960, 540, 960, 540 1920, 1080, 1">
<EssentialProperty schemeIdUri="urn:mpeg:dash:hevc: 2013" value="2, 26 0, 4">

<Case of 1 Track: Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of 1 File and Plurality of Tracks (Reference by Extractor): MP4 File>

Figure 41:
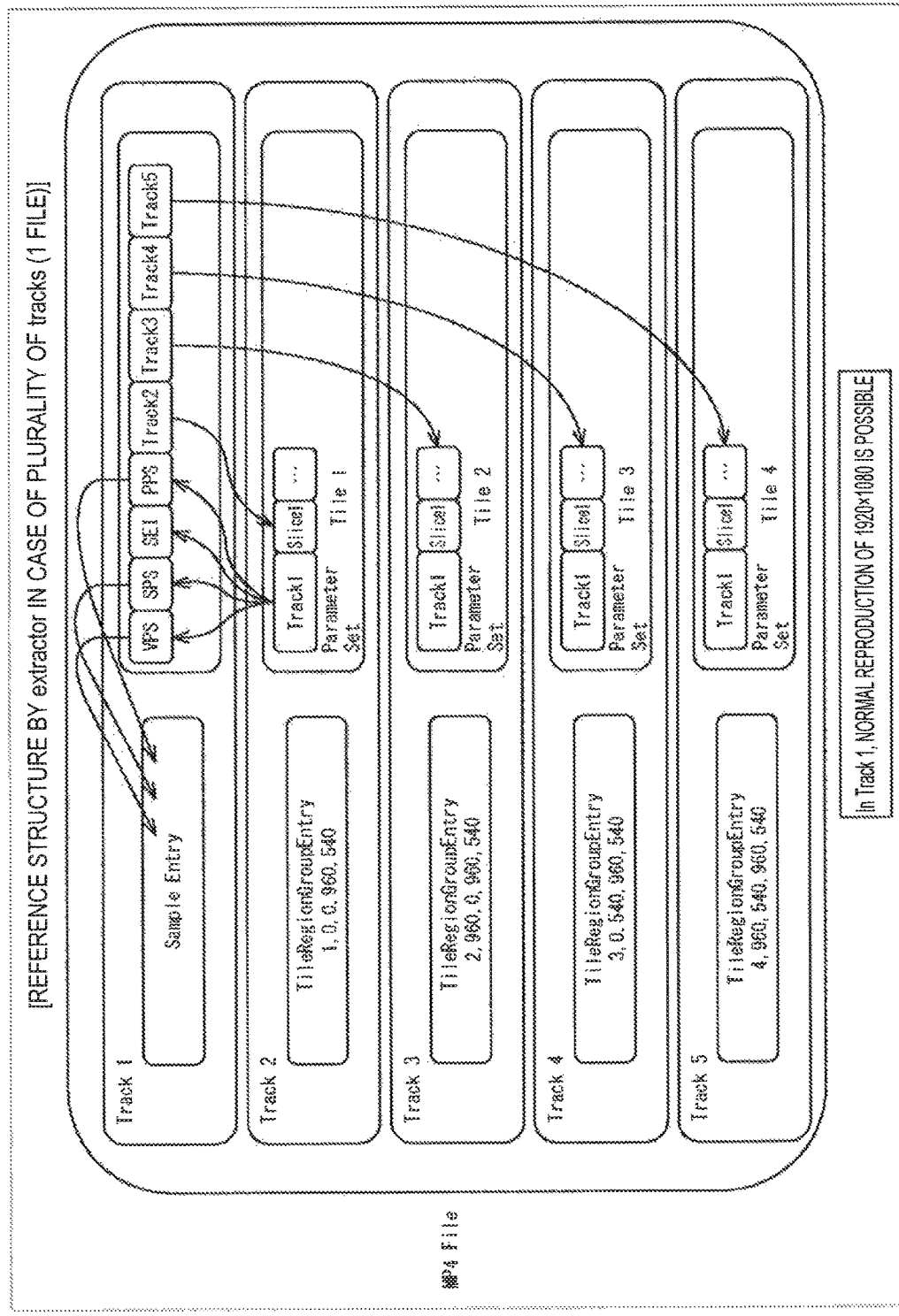
FIG. 41 is a diagram for describing an example of the configuration of an MP4 file of a tile image.

FIG. 41 is a diagram illustrating an example of the configuration of an MP4 file obtained by filing the bit stream (bitstream7) having, for example, the tile (Tile) structure illustrated in FIG. 6B. In the case of the example of FIG. 41, as in the example of FIG. 8B, the bit streams of the tiles are collected and considered as one file and the data of the tiles is further managed as one track.

In the case of the example of FIG. 41, track 1 (Track 1) manages data of an entire image (1920×1080), and thus the entire image can be reproduced by reproducing track 1 (Track 1). Further, track 2 (Track 2) manages data of tile 1 (Tile 1), and thus the image of tile 1 (Tile 1) can be reproduced by reproducing track 2 (Track 2). Similarly, track 3 (Track 3) manages data of tile 2 (Tile 2), and thus the image of tile 2 (Tile 2) can be reproduced by reproducing track 3 (Track 3). Similarly, track 4 (Track 4) manages data of tile 3 (Tile 3), and thus the image of tile 3 (Tile 3) can be reproduced by reproducing track 4 (Track 4). Similarly, track 5 (Track 5) manages data of tile 4 (Tile 4), and thus the image of tile 4 (Tile 4) can be reproduced by reproducing track 5 (Track 5).

In track 1 (Track 1), as illustrated in FIG. 41, the parameter sets such as the video parameter set (VPS), the sequence parameter set (SPS), and the picture parameter set (PPS), an entity (also referred to as actual data) such as supplemental enhancement information (SEI), and reference information (also referred to as extractors) of the bit streams of the tiles are stored.

The extractor (Track 2) is information (reference information) used to refer to the actual data (Slice 1) of tile 1 (Tile 1) stored in track 2 (Track 2). For example, the extractor indicates the storage location of the actual data (Slice 1). Similarly, an extractor (Track 3) is reference information regarding the actual data (Slice 2) of tile 2 (Tile 2) stored in track 3 (Track 3), an extractor (track 4) is reference information regarding the actual data (Slice 3) of tile 3 (Tile 3) stored in track 4 (Track 4), and an extractor (Track 5) is reference information regarding the actual data (Slice 4) of tile 4 (Tile 4) stored in track 5 (Track 5).

The parameter sets, the extractor, and the like are managed for each sample by the sample entry (Sample Entry).

In track 2 (Track 2), the extractor (Track 1) such as the parameter set, the actual data (Slice 1) of tile 1 (Tile 1), and the like are stored. The extractor (Track 1) of the parameter set is reference information of the actual data (the VPS, the SPS, the SEI, the PPS, and the like) such as the parameter sets stored in track 1 (Track 1). For example, the extractor indicates the storage location of the actual data.

Further, in track 3 (Track 3), the extractor (Track 1) such as the parameter sets, the actual data (Slice 2) of tile 2 (Tile 2), and the like are stored. In track 4 (Track 4), the extractor (Track 1) such as the parameter sets, the actual data (Slice 3) of tile 3 (Tile 3), and the like are stored. In track 5 (Track 5), the extractor (Track 1) such as the parameter sets, the actual data (Slice 4) of tile 4 (Tile 4), and the like are stored.

As in the case of FIG. 39, the tile region group entry (TileRegionGroupEntry) is defined in each of track 2 (Track 2) to track 5 (Track 5). That is, one tile is defined in each track.

The extractor indicating a reference relation is defined for each sample. That is, the reference relation can be set for each sample. Accordingly, by using the extractor, it is possible to construct a freer reference relation, for example, a change in the reference relation in the bit stream. More specifically, for example, it is possible to easily realize a change or the like in the size or the shape of the tile in the bit stream.

The file name of this MP4 file is assumed to be bitstream.mp4.

<Case of 1 File and Plurality of Tracks (Reference by Extractor): MPD>

Even in the MPD of this case, as in the case of 1 track described above, the supplemental property (SupplementalProperty) or the essential property (EssentialProperty) of the adaptation set (AdaptationSet) is extended. The example is illustrated in FIG. 42.

Figure 42:
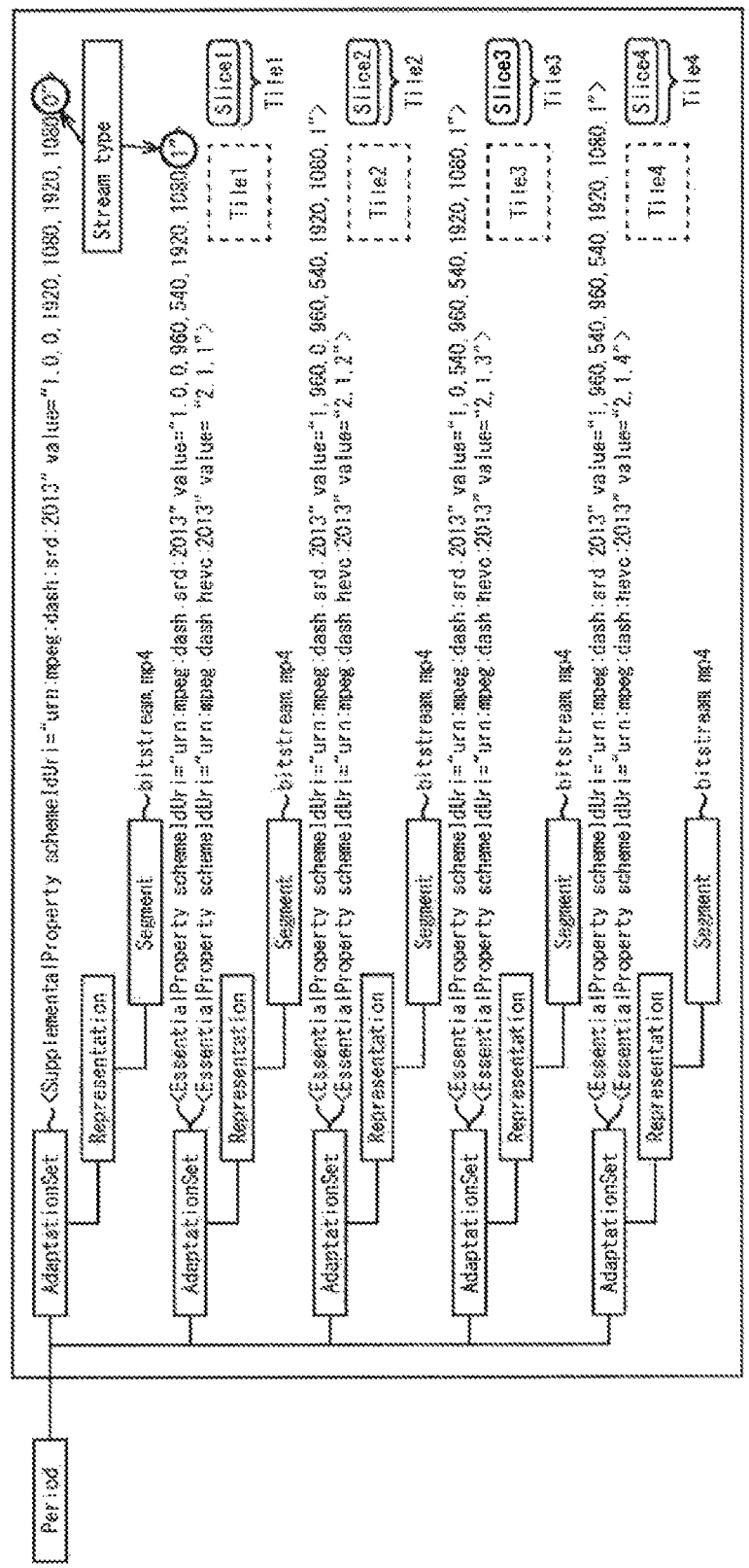
FIG. 42 is a diagram illustrating an example of the configuration of an MPD.

That is, even in the case of the example of FIG. 42, an entire image and each tile are defined in mutually different adaptation sets (AdaptationSet). In the topmost adaptation set in the drawing in which the entire image is defined, the supplemental property (SupplementalProperty) is defined as a description for a tile, instead of the viewpoint (Viewpoint) described in the first embodiment.

Even in this case, as illustrated in FIG. 42, the supplemental property of the topmost adaptation set in the drawing is defined as follows, for example.
 <SupplementalProperty schemeIdUri="urn:mpeg:dash:srd:2013" value="1, 0, 0, 1920, 1080, 1920, 1080, 0">

Even in the case of the example of FIG. 42, in the adaptation set which is the second adaptation set from the top of the drawing and in which tile 1 (Tile 1) is defined, the essential property (EssentialProperty) is defined as a description for a tile, instead of the viewpoint (Viewpoint) described in the first embodiment. The essential property in regard to a part of the bit stream is further extended and defined.

That is, as illustrated in FIG. 42, the essential property of the second adaptation set from the top of the drawing is defined as follows, for example.
 <EssentialProperty schemeIdUri="urn:mpeg:dash:srd:2013" value="1, 0, 0, 960, 540, 1920, 1080, 1">
 <EssentialProperty schemeIdUri="urn:mpeg:dash:hevc:2013" value="2, 1, 1">

In this case, since a part of the bit stream to which the adaptation set corresponds is divided (extracted) into tracks (that is, a plurality of tracks are formed), "1 (true)" is defined as "Sub-Sample-is-extracted."

Similarly, the essential property of the third adaptation set from the top of the drawing in the example of FIG. 42 is defined as follows, for example.
 <EssentialProperty schemeIdUri="urn:mpeg:dash:srd:2013" value="1, 960, 0, 960, 540, 1920, 1080, 1">
 <EssentialProperty schemeIdUri="urn:mpeg:dash:hevc:2013" value="2, 1, 2">

Similarly, the essential property of the fourth adaptation set from the top of the drawing in the example of FIG. 42 is defined as follows, for example.
 <EssentialProperty schemeIdUri="urn:mpeg:dash:srd:2013" value="1, 0, 540, 960, 540, 1920, 1080, 1">
 <EssentialProperty schemeIdUri="urn:mpeg:dash:hevc:2013" value="2, 1, 3">

Similarly, the essential property of the bottommost adaptation set in the drawing in the example of FIG. 42 is defined as follows, for example.
 <EssentialProperty schemeIdUri="urn:mpeg:dash:srd:2013" value="1, 960, 540, 960, 540, 1920, 1080, 1">
 <EssentialProperty schemeIdUri="urn:mpeg:dash:hevc:2013" value="2, 1, 4">

<Case of 1 File and Plurality of Tracks (Reference by Extractor): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of Plurality of Files and Plurality of Tracks (Reference by Extractor): MP4 File>

Figure 43:
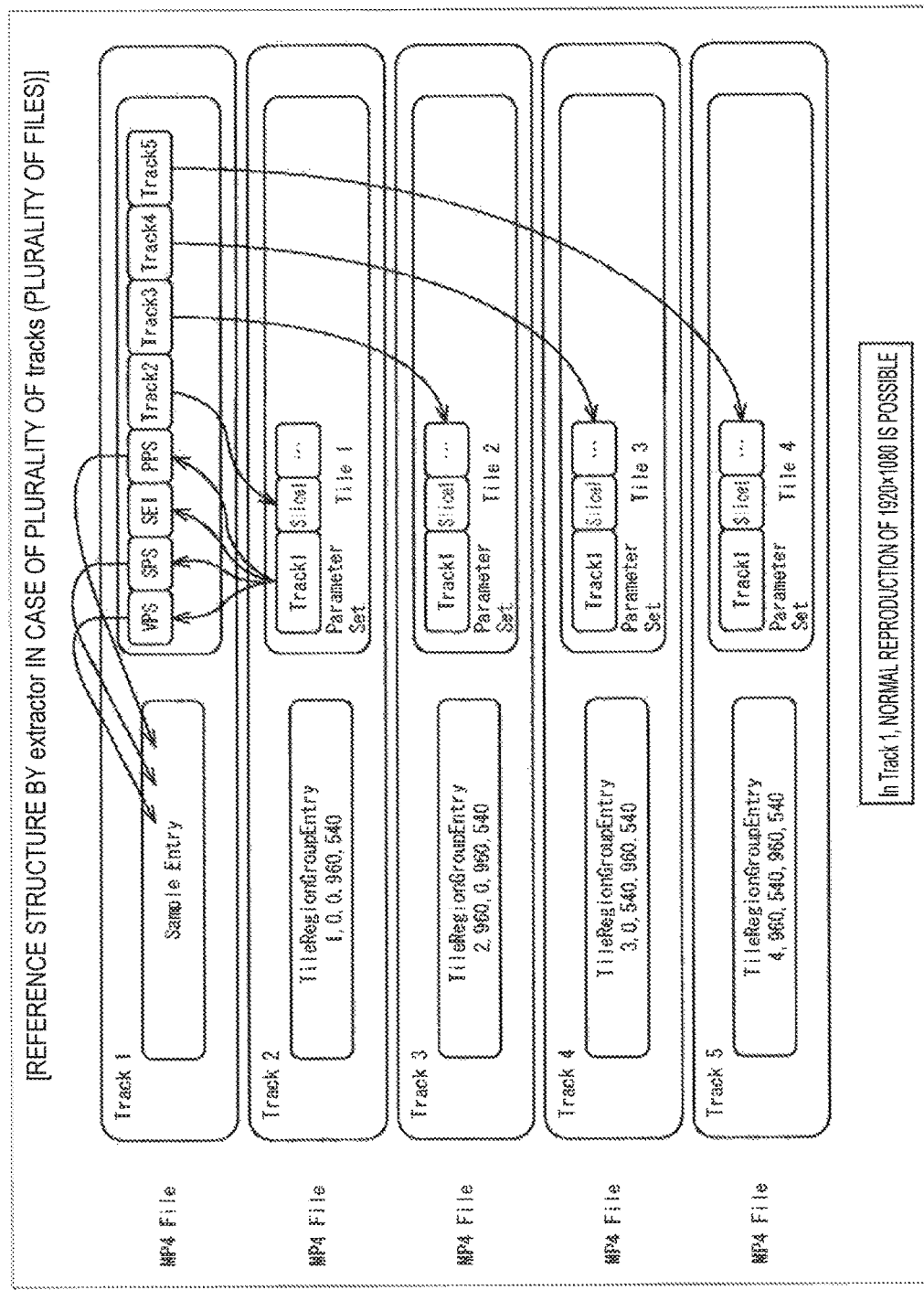
FIG. 43 is a diagram for describing an example of the configuration of an MP4 file of a tile image.

FIG. 43 is a diagram illustrating an example of the configuration of an MP4 file obtained by filing the bit stream (bitstream7) having, for example, the tile (Tile) structure illustrated in FIG. 6B. In the case of the example of FIG. 43, as in the example of FIG. 7, the bit streams of tiles are managed as mutually different files. Since the tracks of the files are mutually different, the bit streams of the tiles can also be said to be managed as mutually different tracks.

The topmost MP4 file (MP4 File) in FIG. 43 (that is, track 1 (Track 1)) stores (manages) data of an entire image (1920×1080). By reproducing the MP4 file (that is, track 1), it is possible to reproduce the entire image.

The second MP4 file (MP4 File) (that is, track 2 (Track 2)) from the top of FIG. 43 stores (manages) data of tile 1 (Tile 1). By reproducing the MP4 file (that is, track 2), it is possible to reproduce an image of tile 1 (Tile 1). Similarly, the third MP4 file (MP4 File) (that is, track 3 (Track 3)) from the top of FIG. 43 stores (manages) data of tile 2 (Tile 2). By reproducing the MP4 file (that is, track 3), it is possible to reproduce an image of tile 2 (Tile 2). Similarly, the fourth MP4 file (MP4 File) (that is, track 4 (Track 4)) from the top of FIG. 43 stores (manages) data of tile 3 (Tile 3). By reproducing the MP4 file (that is, track 4), it is possible to reproduce an image of tile 3 (Tile 3). Similarly, the bottommost MP4 file (MP4 File) (that is, track 5 (Track 5)) in FIG. 43 stores (manages) data of tile 4 (Tile 4). By reproducing the MP4 file (that is, track 5), it is possible to reproduce an image of tile 4 (Tile 4).

In the topmost MP4 file (track 1) in FIG. 43, as illustrated in FIG. 43, the parameter sets such as the video parameter set (VPS), the sequence parameter set (SPS), and the picture parameter set (PPS), the actual data such as the SEI, extractors (Track 2, Track 3, Track 4, and Track 5) of the bit streams of the tiles, and the like are stored. The parameter sets, the extractors, and the like are managed for each sample by the sample entry (Sample Entry).

In the second MP4 file (track 2) from the top of FIG. 43, the extractor (Track 1) such as the parameter sets, the actual data (Slice 1) of tile 1 (Tile 1), and the like are stored.

Further, in the third MP4 file (track 3) from the upper side of FIG. 43, the extractor (Track 1) such as the parameter sets, the actual data (Slice 2) of tile 2 (Tile 2), and the like are stored. In the fourth MP4 file (track 4) from the top of FIG. 43, the extractor (Track 1) such as the parameter sets, the actual data (Slice 3) of tile 3 (Tile 3), and the like are stored. Further, in the bottommost MP4 file (track 5) in FIG. 43, the extractor (Track 1) such as the parameter sets, the actual data (Slice 4) of tile 4 (Tile 4), and the like are stored.

As in the case of FIG. 39, a tile region group entry (TileRegionGroupEntry) is defined in each of the MP4 files (tracks 2 to 5). That is, one tile is defined in each track.

As described above, even in the case of the example, the extractor is used as information indicating the reference relation. Accordingly, for example, it is possible to construct a freer reference relation, such as a change in the reference relation in the bit stream.

The file name of the topmost MP4 file in FIG. 43 is assumed to be bitstream_base.mp4, the file name of the second MP4 file from the top of FIG. 43 is assumed to be bitstream_tile1.mp4, the file name of the third MP4 file from the top of FIG. 43 is assumed to be bitstream_tile2.mp4, the file name of the fourth MP4 file from the top of FIG. 43 is assumed to be bitstream_tile3.mp4, and the file name of the bottommost MP4 file in FIG. 43 is assumed to be bitstream_tile4.mp4, <Case of Plurality of Files and Plurality of Tracks (Reference by Extractor): MPD>

Even in the MPD of this case, as in the case of 1 track described above, the supplemental property (SupplementalProperty) or the essential property (EssentialProperty) of the adaptation set (AdaptationSet) is extended. The example is illustrated in FIG. 44.

Figure 44:
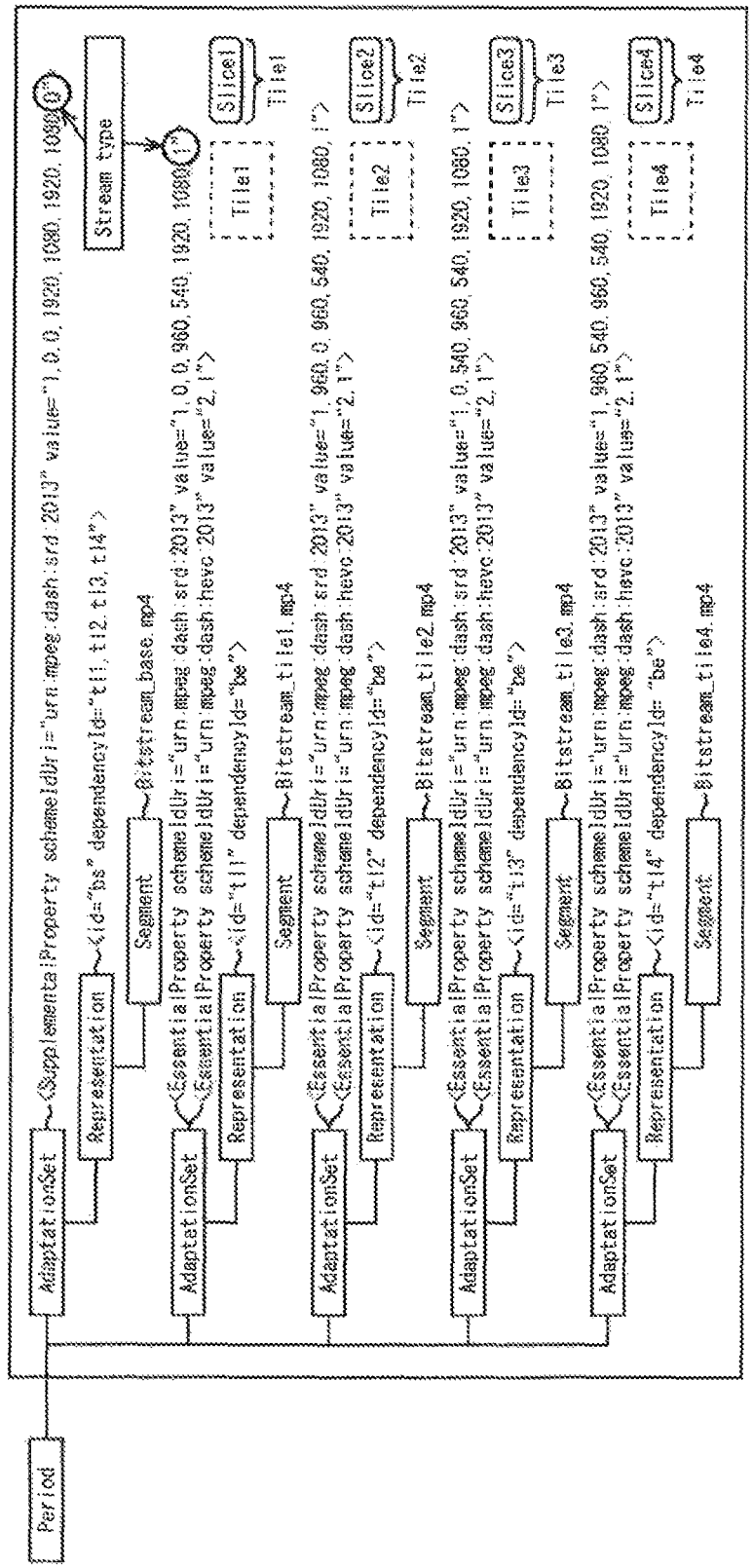
FIG. 44 is a diagram illustrating an example of the configuration of an MPD.

That is, even in the case of the example of FIG. 44, an entire image and each tile are defined in mutually different adaptation sets (AdaptationSet). In the topmost adaptation set in the drawing in which the entire image is defined, the supplemental property (SupplementalProperty) is defined as a description for a tile, instead of the viewpoint (Viewpoint) described in the first embodiment.

Even in this case, as illustrated in FIG. 44, the supplemental property of the topmost adaptation set in the drawing is defined as follows, for example.

<SupplementalProperty schemeIdUri="urn:mpeg:dash:srd:2013" value="1, 0, 0, 1920, 1080, 1920, 1080, 0">

In this case, the representation (Representation) belonging to the adaptation set is extended and information indicating dependency between files (tiles) is additionally defined.

In the representation belonging to the topmost adaptation set from the upper side of the drawing, as illustrated in FIG. 44, for example, the following information is defined.

<id="bs" dependencyId="tl1.tl2.tl3.tl4">

In the segment (Segment) belonging to the representation, bitstream_base.mp4 is defined.

Even in the case of the example of FIG. 44, in the adaptation set which is the second adaptation set from the top of the drawing and in which tile 1 (Tile 1) is defined, the essential property (EssentialProperty) is defined as a description for a tile, instead of the viewpoint (Viewpoint) described in the first embodiment. The essential property in regard to a part of the bit stream is further extended and defined.

That is, as illustrated in FIG. 44, the essential property of the second adaptation set from the top of the drawing is defined as follows, for example.

<EssentialProperty schemeIdUri="urn:mpeg:dash:srd:2013" value="1, 0, 0, 960, 540, 1920, 1080, 1">

<EssentialProperty schemeIdUri="urn:mpeg:dash:hevc:2013" value="2, 1, 1">

In this case, since the bit stream to which the adaptation set corresponds is an HEVC Tile divided (extracted) into tracks (that is, a plurality of tracks (plurality of files) are formed), "1 (true)" is defined as "Sub-Sample-is-extracted."

In this case, since the file is divided and only 1 track is included in 1 file, "ID" is omitted. Accordingly, the increase in the amount of information is suppressed to that extent.

In the representation belonging to the adaptation set, as illustrated in FIG. 44, for example, the following information is defined.

<id="tl1" dependencyId="be">

In the segment (Segment) belonging to the representation, bitstream_tile1.mp4 is defined.

Similarly, the essential property of the third adaptation set from the top of the drawing in the example of FIG. 44 is defined as follows, for example.

<EssentialProperty schemeIdUri="urn:mpeg:dash:srd:2013" value="1, 960, 0, 960, 540, 1920, 1080, 1">

<EssentialProperty schemeIdUri="urn:mpeg:dash:hevc:2013" value="2, 1">

In the representation belonging to the adaptation set, for example, the following information is defined.

<id="tl2" dependencyId="be">

In the segment (Segment) belonging to the representation, bitstream_tile2.mp4 is defined.

Similarly, the essential property of the fourth adaptation set from the top of the drawing in the example of FIG. 44 is defined as follows, for example.

<EssentialProperty schemeIdUri="urn:mpeg:dash:srd:2013" value="1, 0, 540, 960, 540, 1920, 1080, 1">

<EssentialProperty schemeIdUri="urn:mpeg:dash:hevc:2013" value="2, 1">

In the representation belonging to the adaptation set, for example, the following information is defined.

<id="tl3" dependencyId="be">

In the segment (Segment) belonging to the representation, bitstream_tile3.mp4 is defined.

Similarly, the essential property of the bottommost adaptation of the drawing in the example of FIG. 44 is defined as follows, for example.

<EssentialProperty schemeIdUri="urn:mpeg:dash:srd:2013" value="1, 960, 540, 960, 540, 1920, 1080, 1">

<EssentialProperty schemeIdUri="urn:mpeg:dash:hevc:2013" value="2, 1">

In the representation belonging to the adaptation set, for example, the following information is defined.

<id="tl4" dependencyId="be">

In the segment (Segment) belonging to the representation, bitstream_tile4.mp4 is defined.

<Case of Plurality of Files and Plurality of Tracks (Reference by Extractor): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of 1 File and Plurality of Tracks (Reference by Track Reference): MP4 File>

Figure 45:
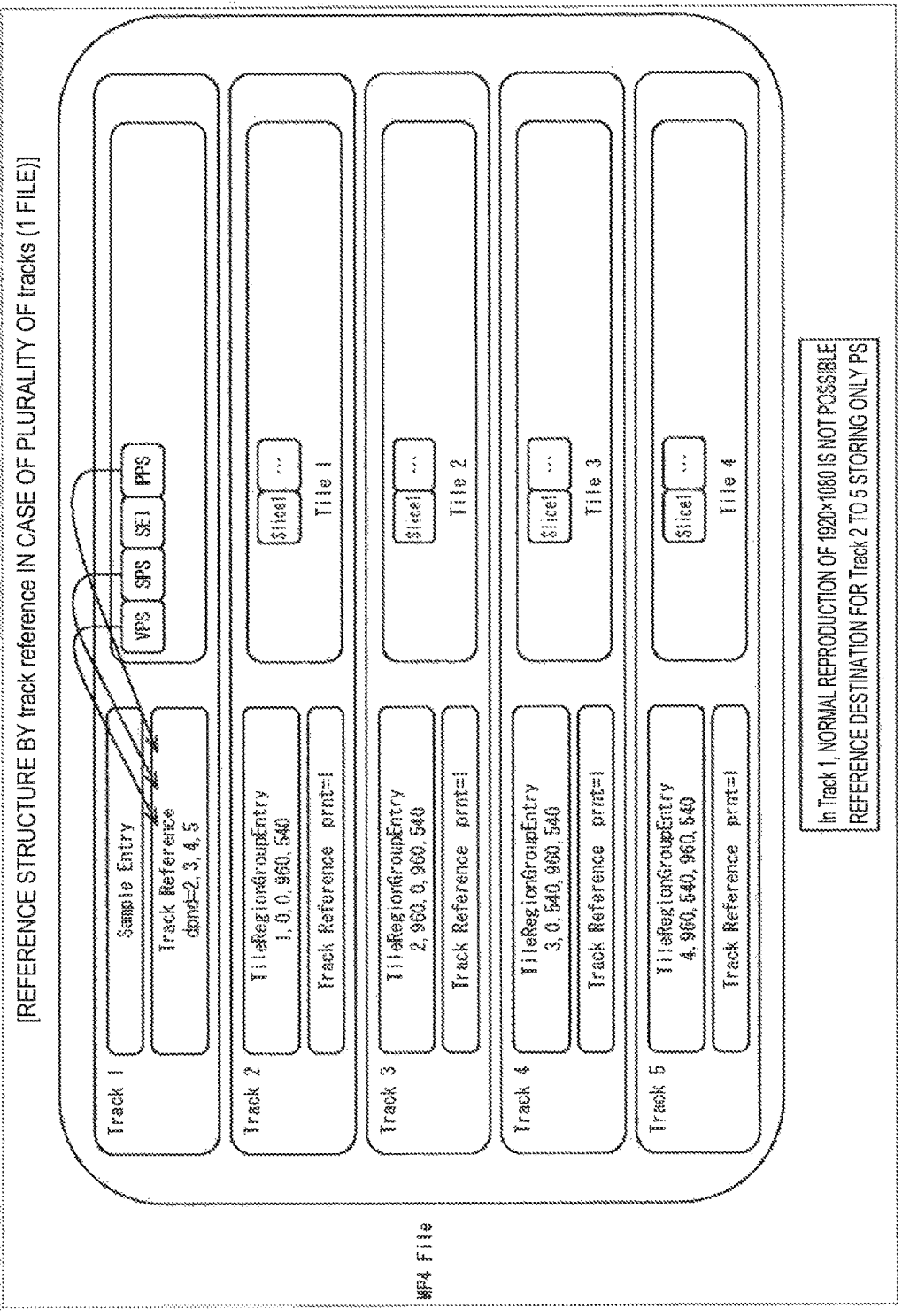
FIG. 45 is a diagram for describing an example of the configuration of an MP4 file of a tile image.

FIG. 45 is a diagram illustrating an example of the configuration of an MP4 file obtained by filing the bit stream (bitstream7) having, for example, the tile (Tile) structure illustrated in FIG. 6B. In the case of the example of FIG. 45, as in the example of FIG. 41, the bit streams of the tiles are collected and considered as one file and the data of the tiles is further managed as one track.

In the case of the example of FIG. 41, the reference relation of the data between the tracks is defined using the extractor. In the case of the example of FIG. 45, however, the reference relation is defined using track reference (Track Reference).

The track reference (Track Reference) is information indicating a reference relation (which track refers to which track (or from which track reference is made)) between tracks. That is, the track reference is information in units of tracks and is defined once for 1 track. "dpnd" is information that defines a track (that is, a reference source) referring to the track and "prnt" is information that defines a track (that is, a reference destination) referred to by the track.

For example, in the case of the example of FIG. 45, "dpnd=2, 3, 4, 5" is defined as the track reference (Track Reference) in track 1 (Track 1). This indicates that track 1 is referred to by tracks 2 to 5. Similarly, in track 2 (Track 2) to track 5 (Track 5), "prnt=1" is defined as the track reference (Track Reference). This indicates that these tracks refer to track 1. That is, this indicates that the information (the parameter sets and the like) regarding track 1 is referred to in accordance with the track reference when any (any tile) of tracks 2 to 5 is reproduced.

As described above, the degree of freedom for setting the reference relation is improved since the extractor is defined for each sample. However, when the reference relation is fixed, redundancy of the extractor increases, and thus there is a possibility of the amount of information being unnecessarily increasing. For example, when the sizes or shapes of the tiles are uniform in the bit stream, one time suffices for the reference relation.

On the other hand, the track reference (Track Reference) is defined only once for 1 track, as described above. Accordingly, by using the track reference, it is possible to reduce the definition redundancy of the reference relation and suppress an increase in the amount of unnecessary information.

In the case of this example, track 1 (Track 1) is present for storing the parameter sets and the reproduction of track 1 (reproduction of an entire image (1920×1080)) may not be performed. However, by reproducing the actual data of tracks 2 to 5 in the order of the track reference, it is possible to reproduce the entire image.

As in the case of FIG. 39, the tile region group entry (TileRegionGroupEntry) is defined in each of track 2 (Track 2) to track 5 (Track 5). That is, one tile is defined in each track.

The file name of this MP4 file is assumed to be bitstream.mp4.

<Case of 1 File and Plurality of Tracks (Reference by Track Reference): MPD>

In the MPD of this case, the supplemental property (SupplementalProperty) or the essential property (EssentialProperty) of the adaptation set (AdaptationSet) is also extended, as in the above-described case of the reference by the extractor. An example of this is illustrated in FIG. 46.

Figure 46:
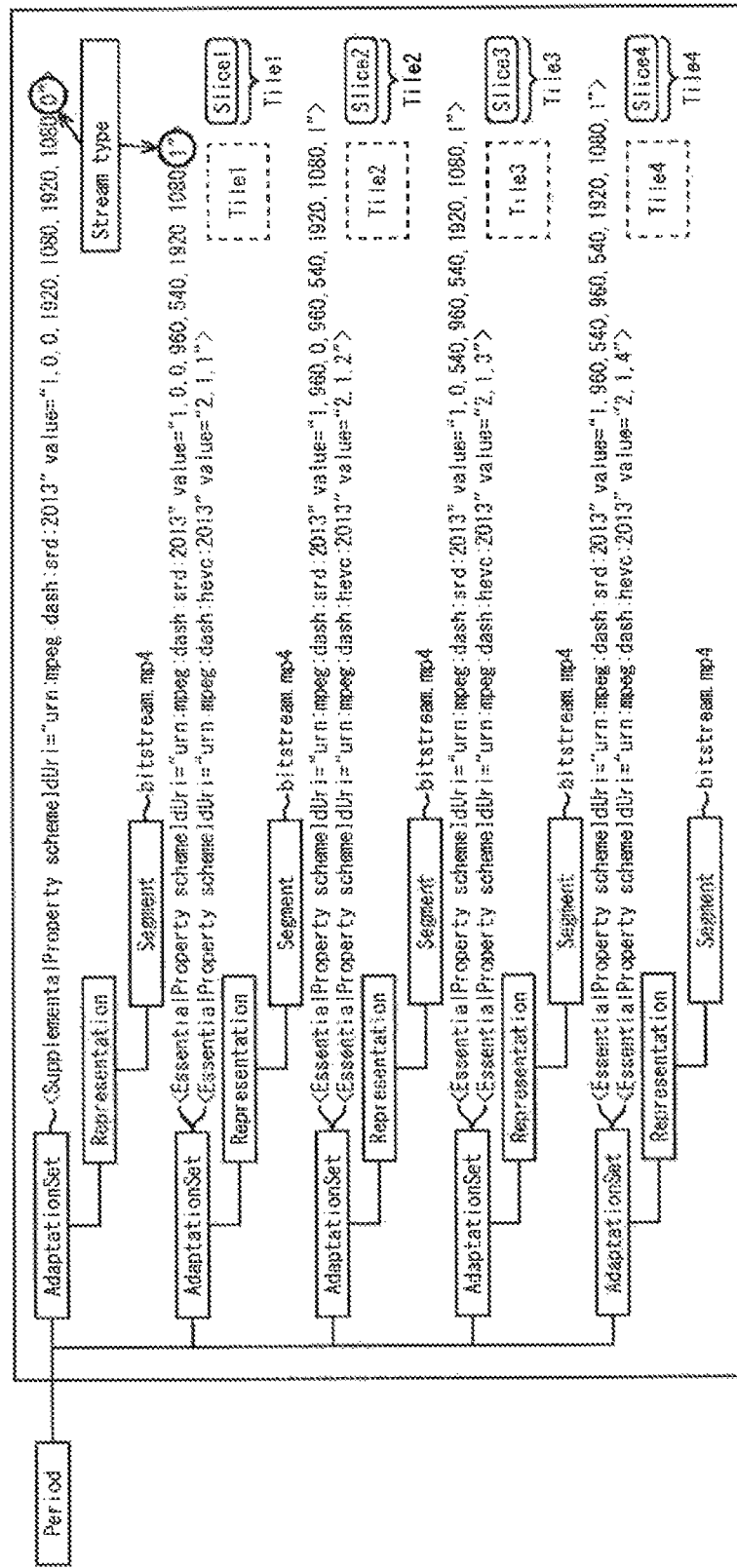
FIG. 46 is a diagram illustrating an example of the configuration of an MPD.

That is, as illustrated in FIG. 46, in this case, the MP4 file can be managed by the MPD as in the example of FIG. 42.

<Case of 1 File and Plurality of Tracks (Reference by Track Reference): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of Plurality of Files and Plurality of Tracks (Reference by Track Reference): MP4 File>

Figure 47:
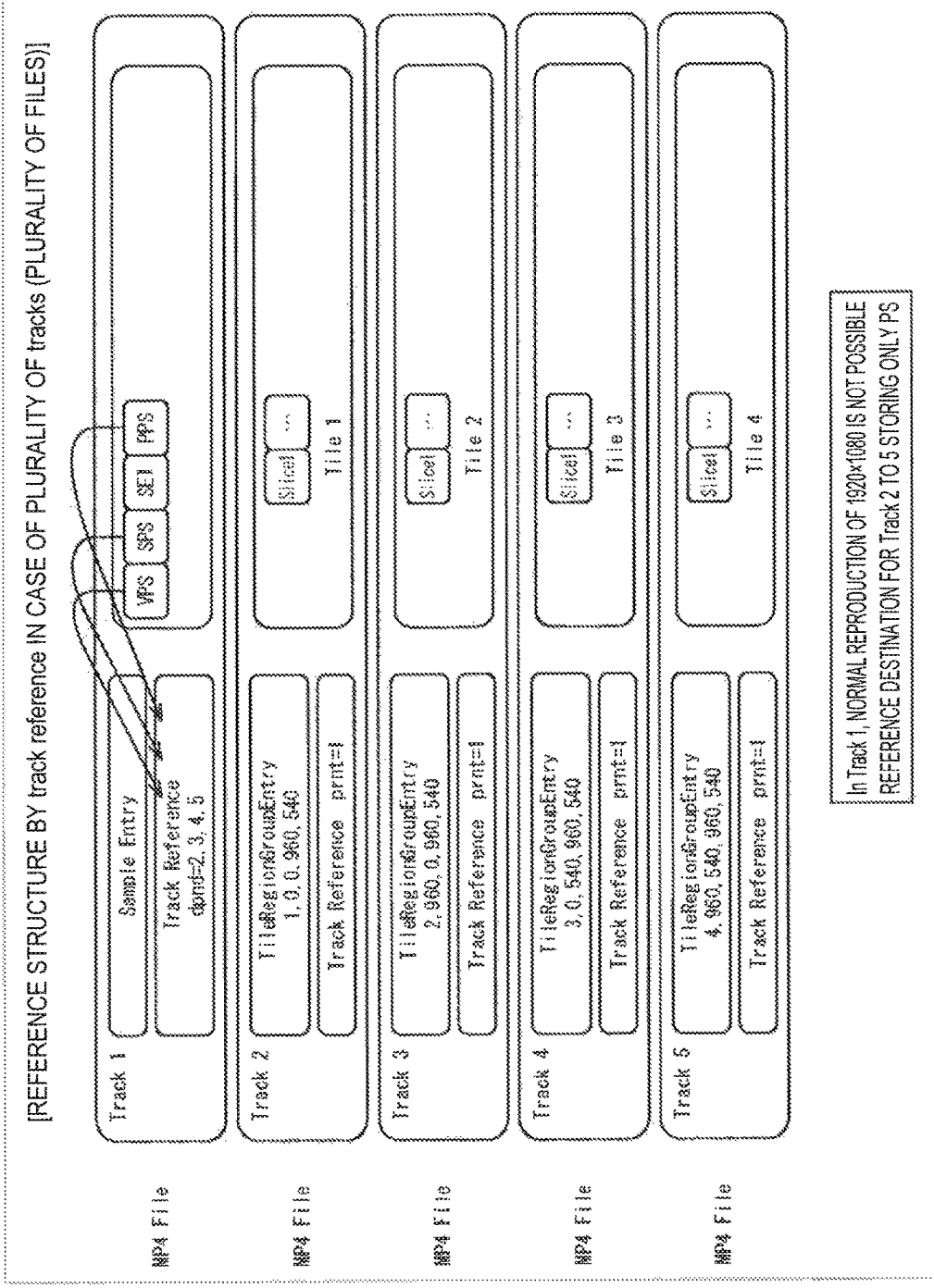
FIG. 47 is a diagram for describing an example of the configuration of an MP4 file of a tile image.

FIG. 47 is a diagram illustrating an example of the configuration of an MP4 file obtained by filing the bit stream (bitstream7) having, for example, the tile (Tile) structure illustrated in FIG. 6B. In the case of the example of FIG. 47, as in the example of FIG. 43, the bit streams of tiles are managed as mutually different files. Since the tracks of the files are mutually different, the bit streams of the tiles can also be said to be managed as mutually different tracks.

The topmost MP4 file (MP4 File) (that is, track 1 (Track 1)) in FIG. 47 stores (manages) the parameter sets and the like (the VPS, the SPS, the PPS, the SEI, and the like).

The second to fifth MP4 files (MP4 File) (that is, track 2 (Track 2) to track 5 (Track)) from the top of FIG. 47 store (manage) the data of tile 1 (Tile 1) to tile 4 (Tile 4). By reproducing any MP4 file (that is, any track) among the files, it is possible to reproduce the image of any tile.

In the case of the example of FIG. 43, the reference relation of the data between the tracks is defined using the extractor. In the case of the example of FIG. 47, however, the reference relation is defined using track reference (Track Reference) in a way similar to the case of FIG. 45.

For example, in the case of the example of FIG. 47, "dpnd=2, 3, 4, 5" is defined as the track reference (Track Reference) in track 1 (Track 1). This indicates that track 1 is referred to by tracks 2 to 5. Similarly, in track 2 (Track 2) to track 5 (Track 5), "prnt=1" is defined as the track reference (Track Reference). This indicates that these tracks refer to track 1. That is, this indicates that the information (the parameter sets and the like) regarding track 1 is referred to in accordance with the track reference when any (any tile) of tracks 2 to 5 is reproduced.

As in the case of FIG. 39, the tile region group entry (TileRegionGroupEntry) is defined in each of track 2 (Track 2) to track 5 (Track 5). That is, one tile is defined in each track.

Even in the case of this example, as described above, the track reference is used as the information indicating the reference relation. Accordingly, it is possible to reduce the definition redundancy of the reference relation and suppress the increase in the amount of unnecessary information.

The file names of the MP4 files in FIG. 47 are assumed to be bitstream_base.mp4, bitstream_tile1.mp4, bitstream_tile2.mp4, bitstream_tile3.mp4, and bitstream_tile4.mp4 in order from the top.

<Case of Plurality of Files and Plurality of Tracks (Reference by Track Reference): MPD>

In the MPD of this case, the supplemental property (SupplementalProperty) or the essential property (EssentialProperty) of the adaptation set (AdaptationSet) is also extended, as in the above-described case of the reference by the extractor. An example of this is illustrated in FIG. 48.

Figure 48:
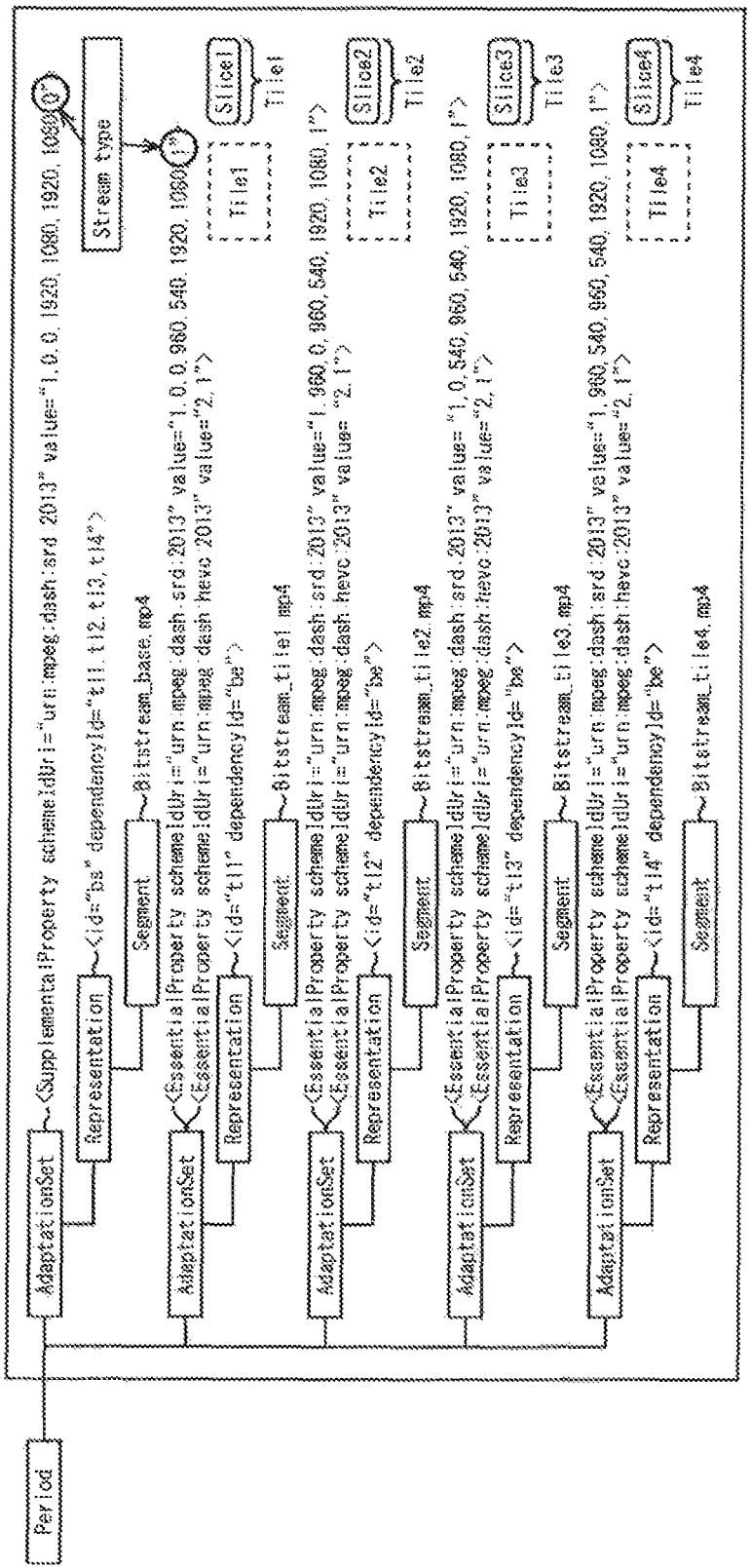
FIG. 48 is a diagram illustrating an example of the configuration of an MPD.

That is, as illustrated in FIG. 48, in this case, the MP4 file can be managed by the MPD as in the example of FIG. 44.

<Case of Plurality of Files and Plurality of Tracks (Reference by Track Reference): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of 1 File and Plurality of Tracks (Reference by Track Reference and Extractor): MP4 File>

Figure 49:
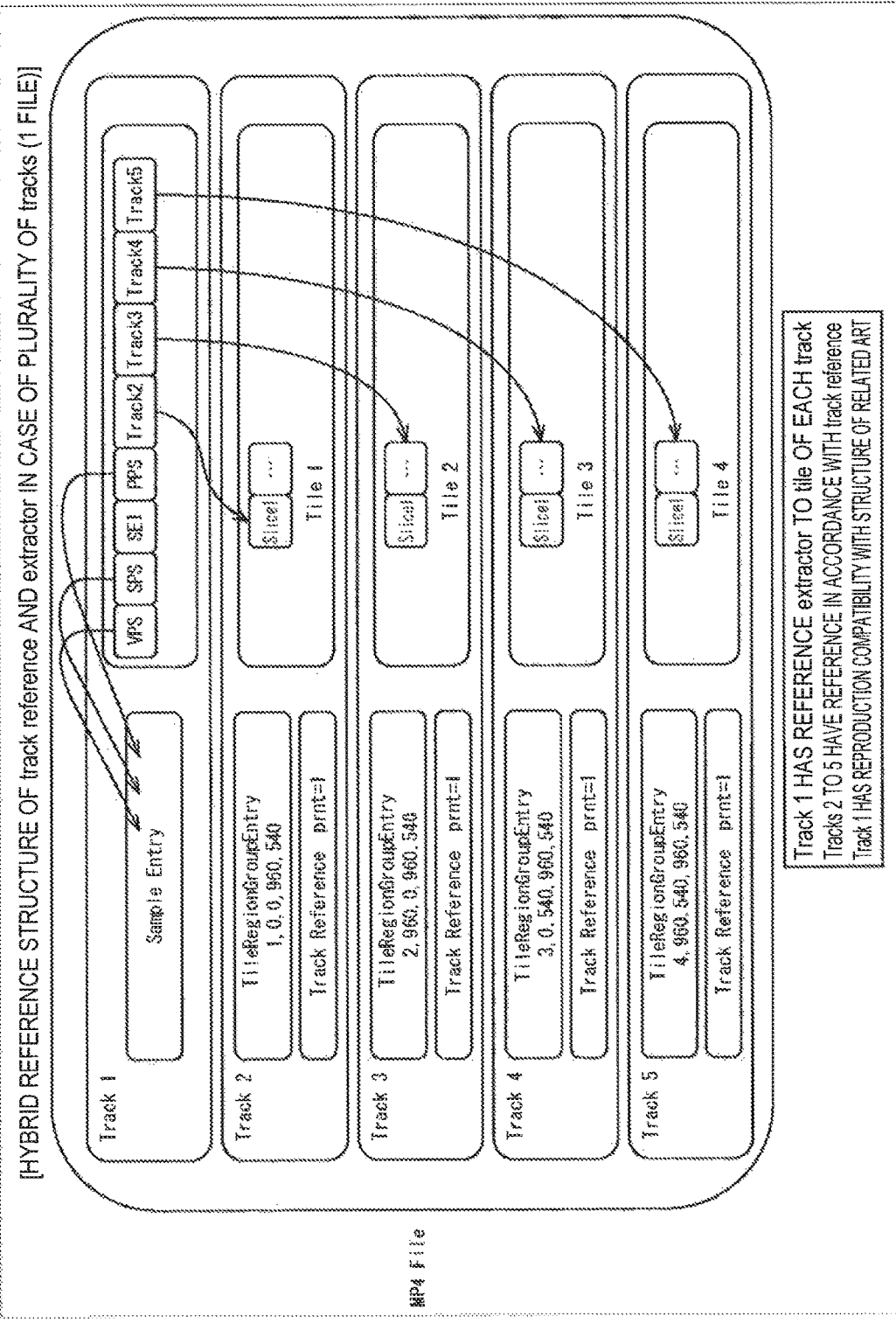
FIG. 49 is a diagram for describing an example of the configuration of an MP4 file of a tile image.

FIG. 49 is a diagram illustrating an example of the configuration of an MP4 file obtained by filing the bit stream (bitstream7) having, for example, the tile (Tile) structure illustrated in FIG. 6B. In the case of the example of FIG. 49, as in the examples of FIG. 41 and FIG. 45, the bit streams of the tiles are collected and considered as one file and the data of the tiles is further managed as one track.

In the case of the example of FIG. 41, however, the reference relation of the data between the tracks is defined using the extractor. In the case of the example of FIG. 45, the reference relation of the data between the tracks is defined using the track reference. In the case of the example of FIG. 49, however, the reference relation is defined using both of the extractor and the track reference.

More specifically, track 1 (Track 1) refers to the information regarding track 2 (Track 2) to track 5 (Track 5) using the extractor as in the case of FIG. 41. Further, track 2 (Track 2) to track 5 (Track 5) refer to the information regarding track 1 (Track 1) using the track reference as in the case of FIG. 45.

That is, in track 1 (Track 1), as illustrated in FIG. 49, the parameter sets such as the video parameter set (VPS), the sequence parameter set (SPS), and the picture parameter set (PPS), the actual data such as the SEI, the extractor for referring to the data of the tiles of tracks 2 to 5, and the like are stored.

In track 2 (Track 2) to track 5 (Track 5), as illustrated in FIG. 49, "prnt=1" is defined as the track reference (Track Reference). This indicates that these tracks refer to track 1. That is, this indicates that the information (the parameter sets and the like) regarding track 1 is referred to in accordance with the track reference when any (any tile) of tracks 2 to 5 is reproduced.

In this way, it is possible to perform the reproduction of track 1 (reproduction of the entire image (1920×1080)) as in the case of FIG. 41, while reducing the redundancy as in the case of FIG. 45.

As in the case of FIG. 39, the tile region group entry (TileRegionGroupEntry) is defined in each of track 2 (Track 2) to track 5 (Track 5). That is, one tile is defined in each track.

The file name of this MP4 file is assumed to be bitstream.mp4.

<Case of 1 File and Plurality of Tracks (Reference by Track Reference and Extractor): MPD>

Even in the MPD of this case, as in the case of the reference by the extractor (FIG. 42) or the case of the reference by the track reference (FIG. 46), as described above, the supplemental property (SupplementalProperty) or the essential property (EssentialProperty) of the adaptation set (AdaptationSet) is extended. The example is illustrated in FIG. 50.

Figure 50:
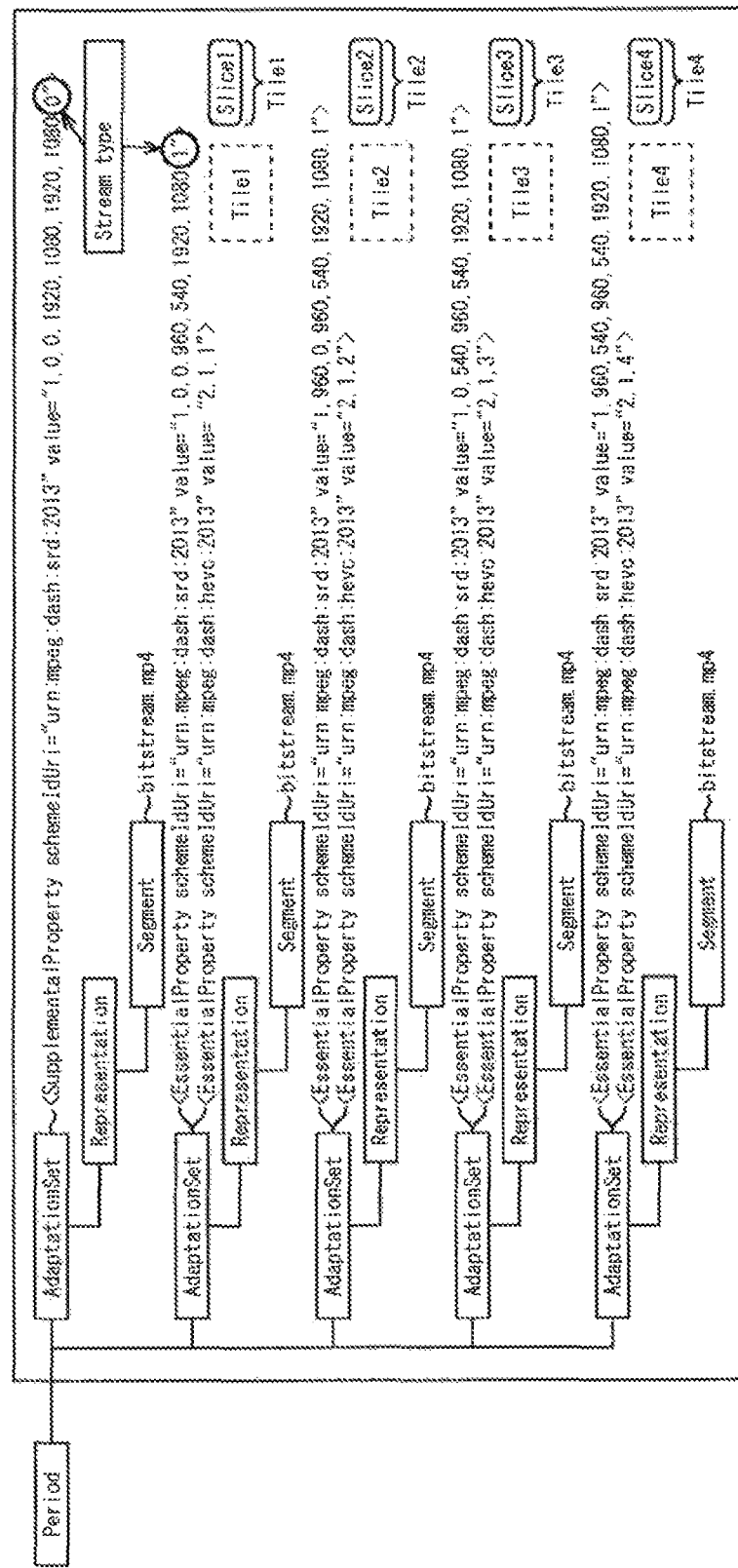
FIG. 50 is a diagram illustrating an example of the configuration of an MPD.

That is, as illustrated in FIG. 50, in this case, the MP4 file can be managed by the MPD as in the examples of FIG. 42 and FIG. 46.

<Case of 1 File and Plurality of Tracks (Reference by Track Reference and Extractor): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of Plurality of Files and Plurality of Tracks (Reference by Track Reference and Extractor): MP4 File>

Figure 51:
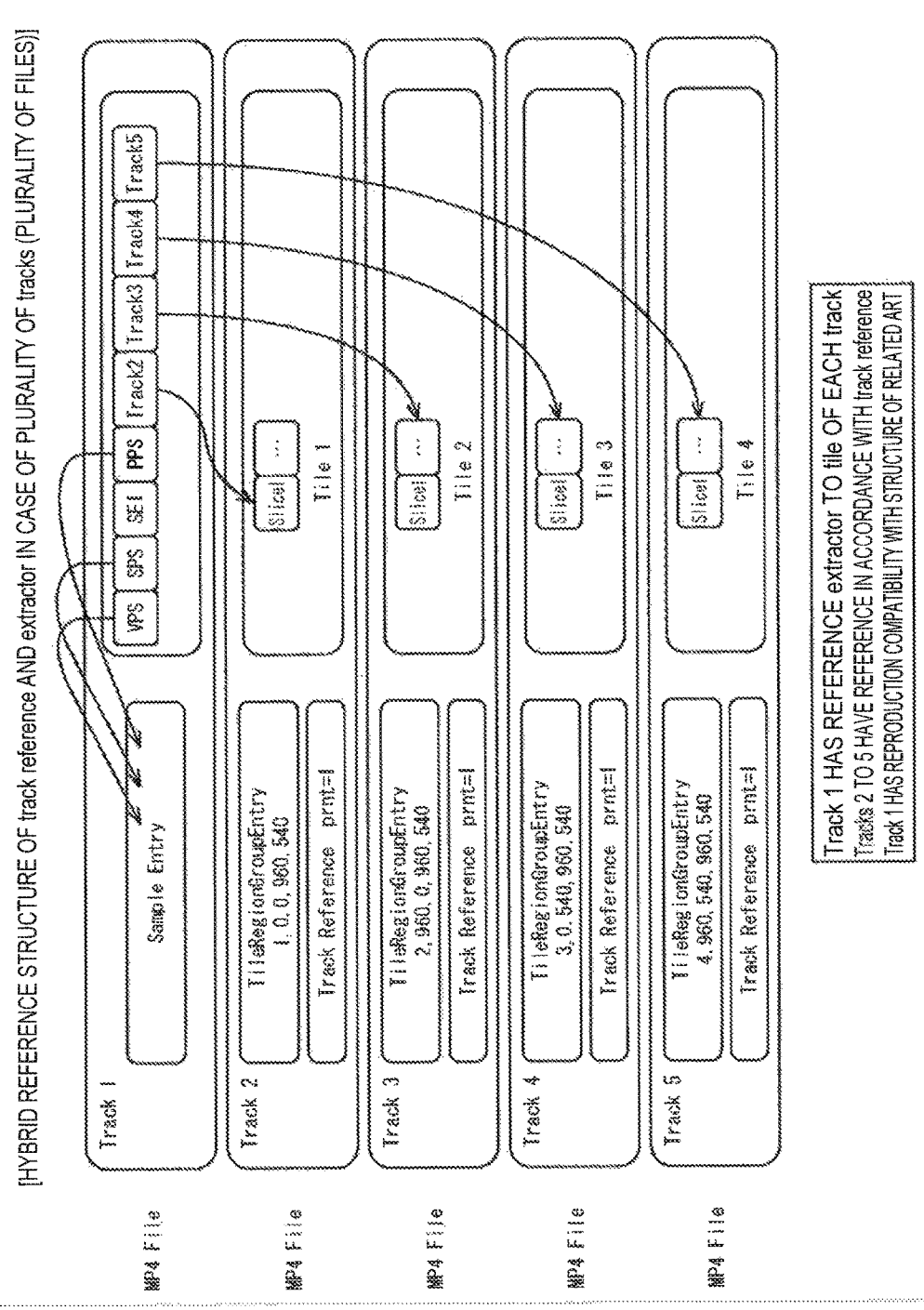
FIG. 51 is a diagram for describing an example of the configuration of an MP4 file of a tile image.

FIG. 51 is a diagram illustrating an example of the configuration of an MP4 file obtained by filing the bit stream (bitstream7) having, for example, the tile (Tile) structure illustrated in FIG. 6B. In the case of the example of FIG. 51, as in the examples of FIG. 43 and FIG. 47, the bit streams of tiles are managed as mutually different files. Since the tracks of the files are mutually different, the bit streams of the tiles can also be said to be managed as mutually different tracks.

In the case of the example of FIG. 43, however, the reference relation of the data between the tracks is defined using the extractor. In the case of the example of FIG. 47, the reference relation of the data between the tracks is defined using the track reference. In the case of the example of FIG. 51, however, the reference relation is defined using both of the extractor and the track reference.

More specifically, the topmost MP4 file (track 1 (Track 1)) in FIG. 51 refers to the information regarding the second to fifth MP4 files (track 2 (Track 2) to track 5 (Track 5)) from the top of FIG. 51 using the extractor as in the case of FIG. 43. Further, the second to fifth MP4 files (track 2 (Track 2) to track 5 (Track 5)) from the top of FIG. 51 refer to the information regarding the topmost MP4 file (track 1 (Track 1)) in FIG. 51 using the track reference as in the case of FIG. 47.

In the topmost MP4 file (track 1), as illustrated in FIG. 51, the parameter sets such as the video parameter set (VPS), the sequence parameter set (SPS), and the picture parameter set (PPS), the actual data such as the SEI, extractors (Track 2, Track 3, Track 4, and Track 5) of the bit streams of the tiles, and the like are stored. The parameter sets, the extractors, and the like are managed for each sample by the sample entry (Sample Entry).

As illustrated in FIG. 51, in the second to fifth MP4 files (track 2 (Track 2) to track 5 (Track 5)) from the top, "prnt=1" is defined as the track reference (Track Reference). This indicates that these tracks refer to track 1. That is, this indicates that the information (the parameter sets and the like) regarding track 1 is referred to in accordance with the track reference when any (any tile) of tracks 2 to 5 is reproduced.

In this way, it is possible to perform the reproduction of the topmost MP4 file (track 1) in FIG. 51 (reproduction of the entire image (1920×1080)) as in the case of FIG. 43 while reducing the redundancy as in the case of FIG. 47.

As in the case of FIG. 39, in each of the second to fifth MP4 files (track 2 (Track 2) to track 5 (Track 5)) from the top, the tile region group entry (TileRegionGroupEntry) is defined. That is, one tile is defined in each track.

The file names of the MP4 files in FIG. 51 are assumed to be bitstream_base.mp4, bitstream_tile1.mp4, bitstream_tile2.mp4, bitstream_tile3.mp4, and bitstream_tile4.mp4 in order from the top.

<Case of Plurality of Files and Plurality of Tracks (Reference by Track Reference and Extractor): MPD>

Even in the MPD of this case, as in the case of the reference by the extractor, as described above, the supplemental property (SupplementalProperty) or the essential property (EssentialProperty) of the adaptation set (AdaptationSet) is extended. The example is illustrated in FIG. 52.

Figure 52:
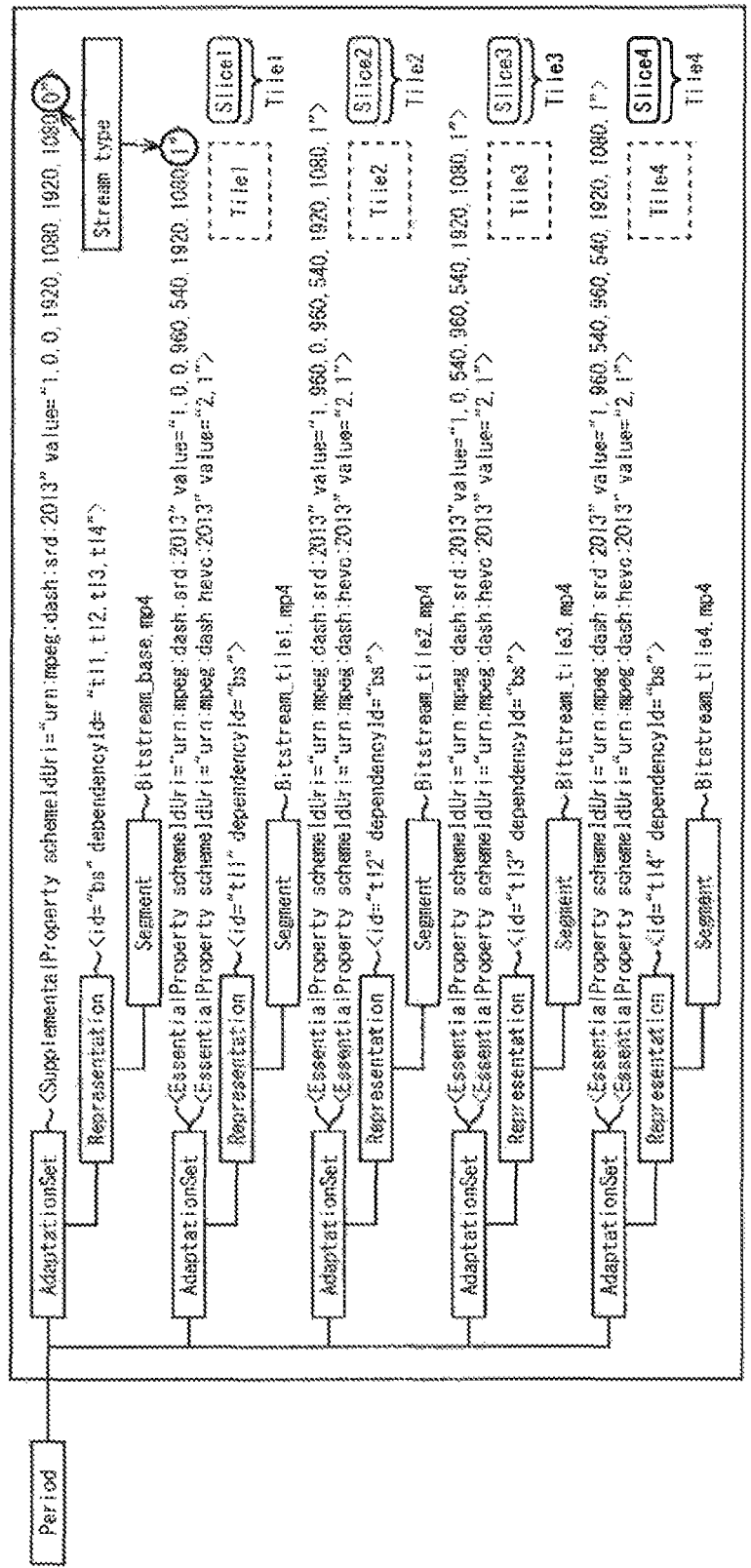
FIG. 52 is a diagram illustrating an example of the configuration of an MPD.

That is, as illustrated in FIG. 52, in this case, the MP4 file can be managed by the MPD as in the examples of FIG. 44 and FIG. 48.

<Case of Plurality of Files and Plurality of Tracks (Reference by Track Reference and Extractor): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of 1 File and Plurality of Tracks (Reference by Track Reference and Extractor): MP4 File>

In the examples in which one MP4 file includes the plurality of tracks, as described above in FIGS. 41, 45, and 49, the slice which is the actual data is stored for each tile in the different track. However, when one MP4 file includes the plurality of tracks, the slices of the tiles can be collected and disposed in one track. The example of this case will be described below with reference to FIG. 53.

Figure 53:
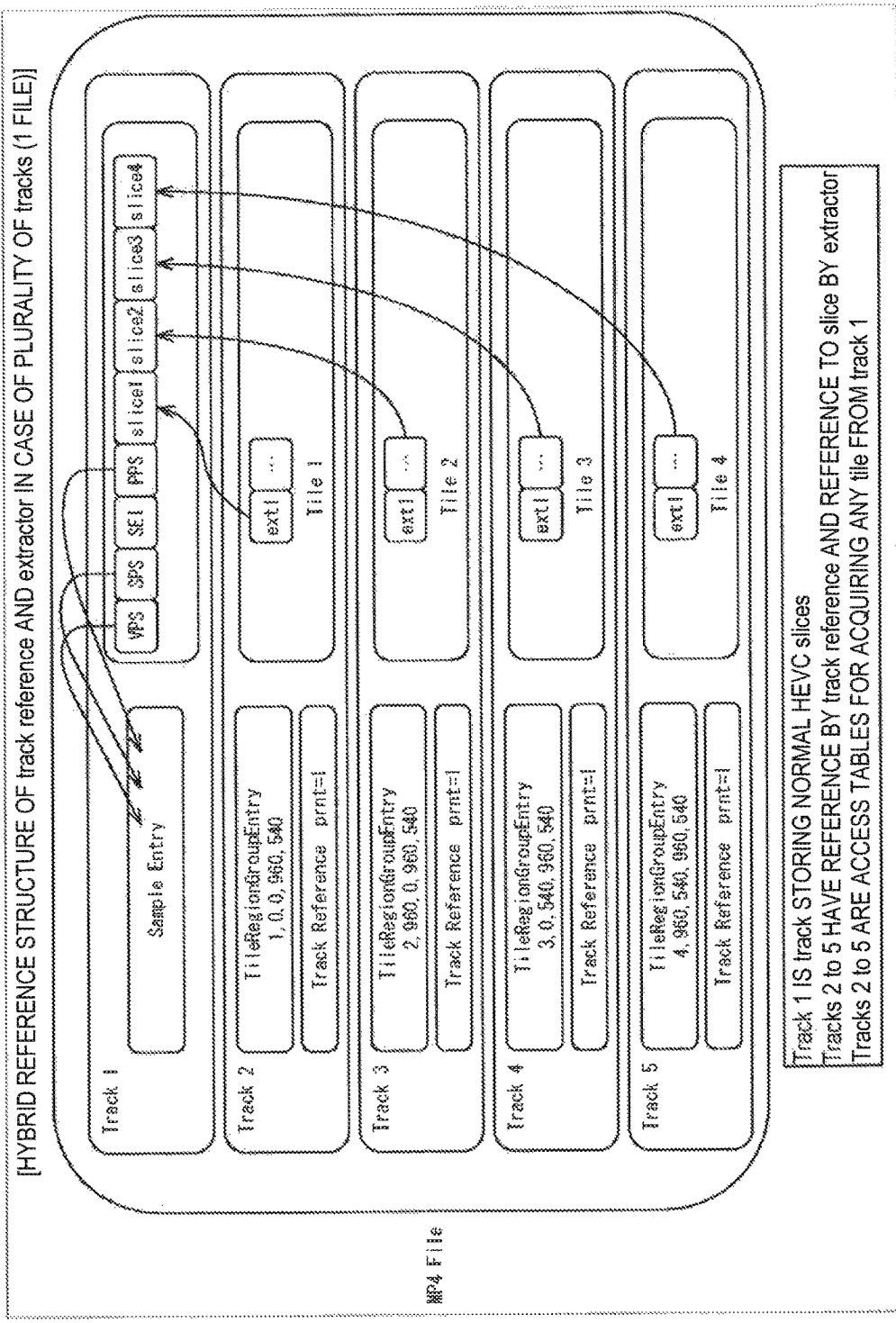
FIG. 53 is a diagram for describing an example of the configuration of an MP4 file of a tile image.

FIG. 53 is a diagram illustrating an example of the configuration of the MP4 file obtained by filing the bit stream (bitstream7) having, for example, the tile (Tile) structure illustrated in FIG. 6B. In the case of the example of FIG. 53, as in the examples of FIGS. 41, 45, and 49, the bit streams of the tiles are collected and considered as one MP4 file. Further, the tiles are managed in mutually different tracks. In the MP4 file of FIG. 53, however, the slices which are the actual data of the tiles are collected and stored in one track.

In the case of the example of FIG. 41, the reference relation of the data between the tracks is defined using the extractor. In the case of the example of FIG. 45, the reference relation of the data between the tracks is defined using the track reference. In the case of the example of FIG. 53, on the other hand, as in the example of FIG. 49, both of the extractor and the track reference are used. However, a method of using the extractor and the track reference differs from the case of FIG. 49.

More specifically, in track 1 (Track 1) which is a base track, as illustrated in FIG. 53, the parameter sets such as the video parameter set (VPS), the sequence parameter set (SPS), and the picture parameter set (PPS) and the actual data such as the SEI are stored. The parameter sets such as the video parameter set (VPS), the sequence parameter set (SPS), and the picture parameter set (PPS) are managed for each sample by a sample entry (Sample Entry). Further, in track 1 (Track 1), slices 1 to 4 which are actual data of the tiles of HEVC and the like are stored.

Here, track 2 (Track 2) to track 5 (Track 5) have both of the extractor and the track reference for referring to the information regarding track 1 (Track 1).

In other words, in track 2 (Track 2) to track 5 (Track 5), as illustrated in FIG. 53, "prnt=1" is defined as the track reference (Track Reference). This indicates that these tracks refer to track 1. That is, this indicates that the information (the parameter sets and the like) regarding track 1 is referred to in accordance with the track reference when any (any tile) of tracks 2 to 5 is reproduced.

In each of track 2 (Track 2) to track 5 (Track 5), "ext1" is defined as an extractor. That is, slice 1 of track 1 is referred to in accordance with the extractor, for example, the tile of track 2 is reproduced. Similarly, slice 2 of track 1 is referred to when the tile of track 3 is reproduced. Further, slice 3 of track 1 is referred to when the tile of track 4 is reproduced, and slice 4 of track 1 is referred to when the tile of track 5 is reproduced.

In this way, only track 1 may be reproduced when an entire image (1920×1080) is reproduced, and it is possible to reduce a load when the entire image is reproduced.

As in the cases of FIGS. 39, 41, 43, 45, 47, 49, and 51, the tile region group entry (TileRegionGroupEntry) is defined in each of track 2 (Track 2) to track 5 (Track 5). That is, one tile is defined for each track. The definition is the same as the case of each track in FIGS. 41, 43, 45, 47, 49, and 51 (the case of each tile in FIG. 39).

The file name of this MP4 file is assumed to be bitstream.mp4.

<Case of 1 File and Plurality of Tracks (Reference by Track Reference and Extractor): MPD>

Figure 54:
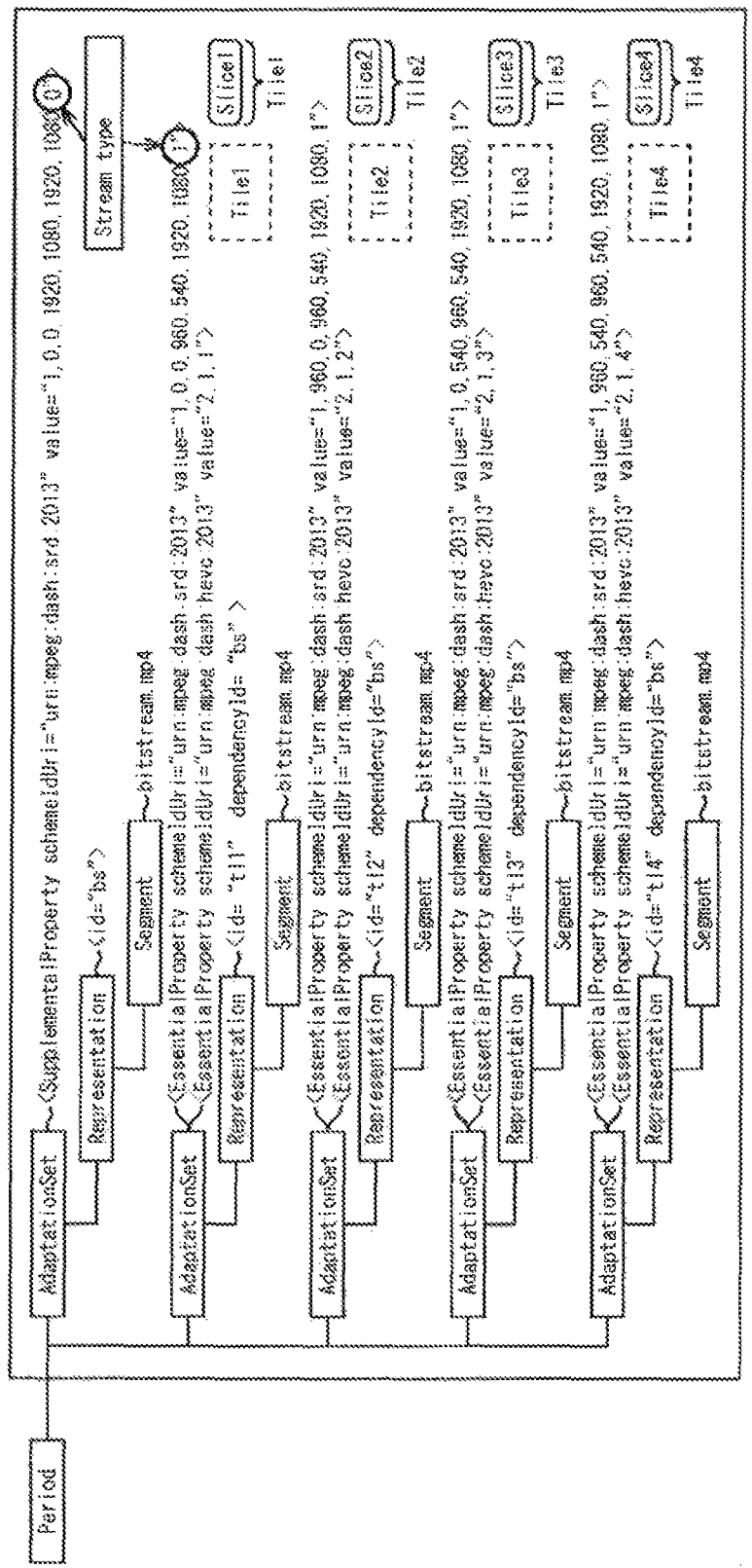
FIG. 54 is a diagram illustrating an example of the configuration of an MPD.

The MPD of the MP4 in FIG. 53 is illustrated in FIG. 54. Even in the MPD, the same extension as the MPDs in FIGS. 42, 46, and 50 corresponding to the MP4 files in FIGS. 41, 45, and 49 is performed. That is, the supplemental property (SupplementalProperty) or the essential property (EssentialProperty) of the adaptation set (AdaptationSet) is extended.

The MPD in FIG. 54 has basically the same configuration as the MPDs in FIGS. 42, 46, and 50. However, the MPD in FIG. 54 differs from the MPDs in that an ID is stored in each representation (Representation). In the representation (Representation) located at the top in FIG. 54, an ID (bs) indicating a base track is stored. In the second representation (Representation) from the top, an ID (tl1) indicating the ID of tile 1 is stored. Similarly, in the third to fifth representations (Representation), IDs (tl2 to tl4) indicating the IDs of tiles 2 to 4 are stored.

Further, in the second representation from the top, an ID (dependencyid=bs) indicating a track dependent on the base track is stored. Similarly, in each of the third to fifth representations (Representation), the ID (dependencyid=bs) indicating the track dependent on the base track is stored.

The MP4 file in FIG. 53 can be managed by the MPD in FIG. 54.

<Case of Plurality of Files and Plurality of Tracks (Reference by Track Reference and Extractor): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

<Case of Plurality of Files and Plurality of Tracks (Reference by Track Reference and Extractor): MP4 File>

Figure 55:
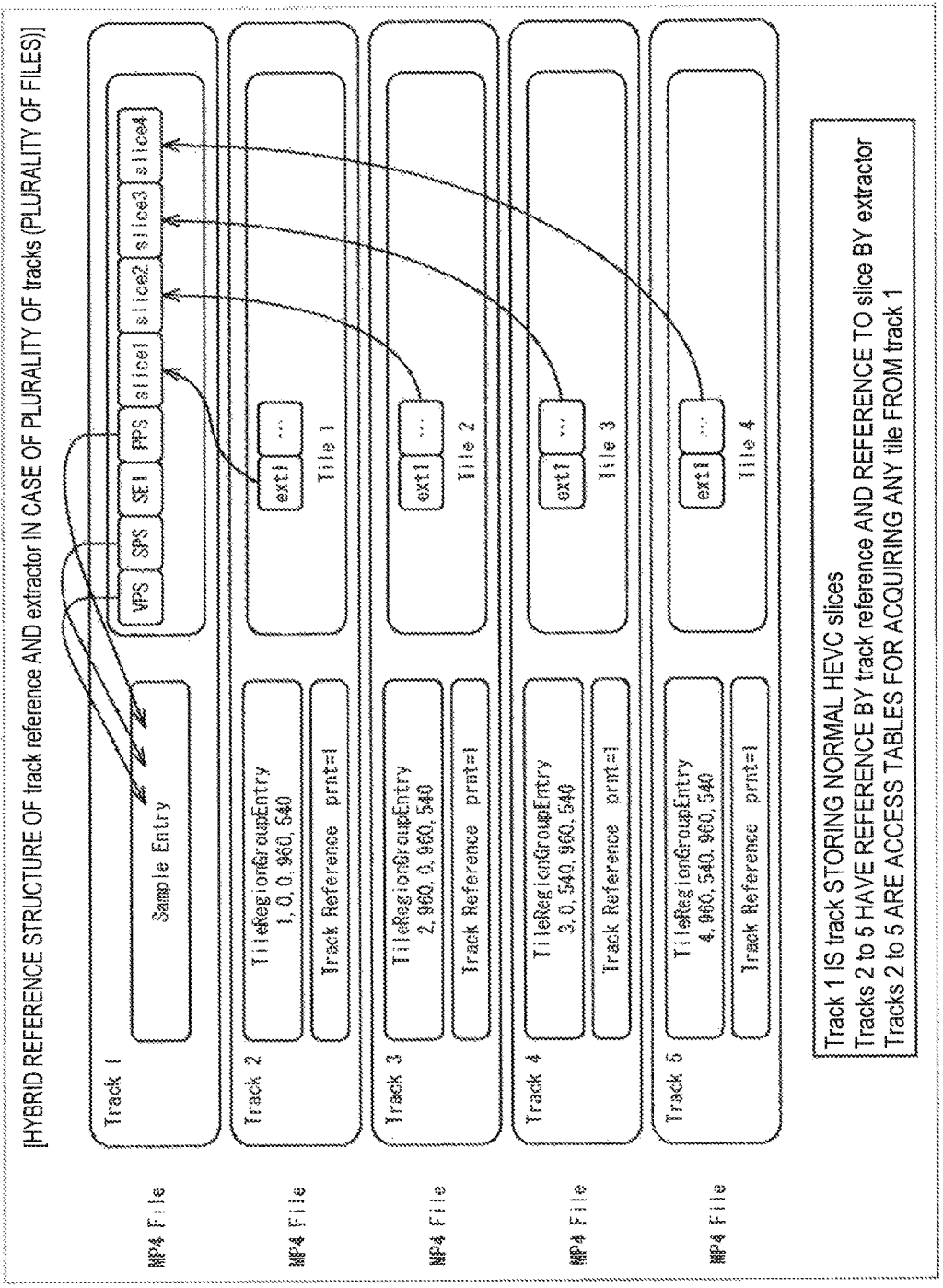
FIG. 55 is a diagram for describing an example of the configuration of an MP4 file of a tile image.

FIG. 55 is a diagram illustrating an example of the configuration of the MP4 file obtained by filing the bit stream (bitstream7) having, for example, the tile (Tile) structure illustrated in FIG. 6B. In the case of the example of FIG. 55, as in the examples of FIGS. 43, 47, and 51, the tracks of the tiles are considered to be different MP4 files. Further, the slices which are the actual data of the tiles are collected and stored in track 1 (Track 1) which is a base track.

In the case of the example of FIG. 41, the reference relation of the data 26 between the tracks is defined using the extractor. In the case of the example of FIG. 45, the reference relation of the data between the tracks is defined using the track reference. In the case of the example of FIG. 55, on the other hand, as in the example of FIG. 49, both of the extractor and the track reference are used. However, a method of using the extractor and the track reference differs from the case of FIG. 49 in a way similar to the case of FIG. 53.

More specifically, in track 1 (Track 1) as illustrated in FIG. 55, the parameter sets such as the video parameter set (VPS), the sequence parameter set (SPS), and the picture parameter set (PPS) and the actual data such as the SEI are stored. Further, in track 1 (Track 1), slices 1 to 4 which are actual data of the tiles of HEVC are stored. Here, track 2 (Track 2) to track 5 (Track 5) have both of the extractor and the track reference for referring to the information regarding track 1 (Track 1).

In other words, in track 2 (Track 2) to track 5 (Track 5), as illustrated in FIG. 55, "prnt=1" is defined as the track reference (Track Reference). This indicates that these tracks refer to track 1. That is, this indicates that the information (the parameter sets and the like) regarding track 1 is referred to in accordance with the track reference when any (any tile) of tracks 2 to 5 is reproduced.

In each of track 2 (Track 2) to track 5 (Track 5), "ext1" is defined as an extractor. That is, slice 1 of track 1 is referred to in accordance with the extractor, for example, the tile of track 2 is reproduced. Similarly, slice 2 of track 1 is referred to when the tile of track 3 is reproduced. Further, slice 3 of track 1 is referred to when the tile of track 4 is reproduced, and slice 4 of track 1 is referred to when the tile of track 5 is reproduced.

In this way, only track 1 may be reproduced when an entire image (1920×1080) is reproduced, and it is possible to reduce a load when the entire image is reproduced.

Also in FIG. 55, as in the cases of FIGS. 39, 41, 43, 45, 47, 49, 51, and 53, the tile region group entry (TileRegionGroupEntry) is defined in each of track 2 (Track 2) to track 5 (Track 5). That is, one tile is defined for each track. Its content is the same as FIG. 39. etc.

In this way, the MP4 file in FIG. 55 has the same basic configuration as the MP4 file in FIG. 53 except that the MP4 files separated in the example of FIG. 53 are collected as one MP4 file.

The file names of the MP4 files in FIG. 55 are assumed to be bitstream_base.mp4, bitstream_tile1.mp4, bitstream_tile2.mp4, bitstream_tile3.mp4, and bitstream_tile4. mp4 in order from the top.

<Case of Plurality of Files and Plurality of Tracks (Reference by Track Reference and Extractor): MPD>

Figure 56:
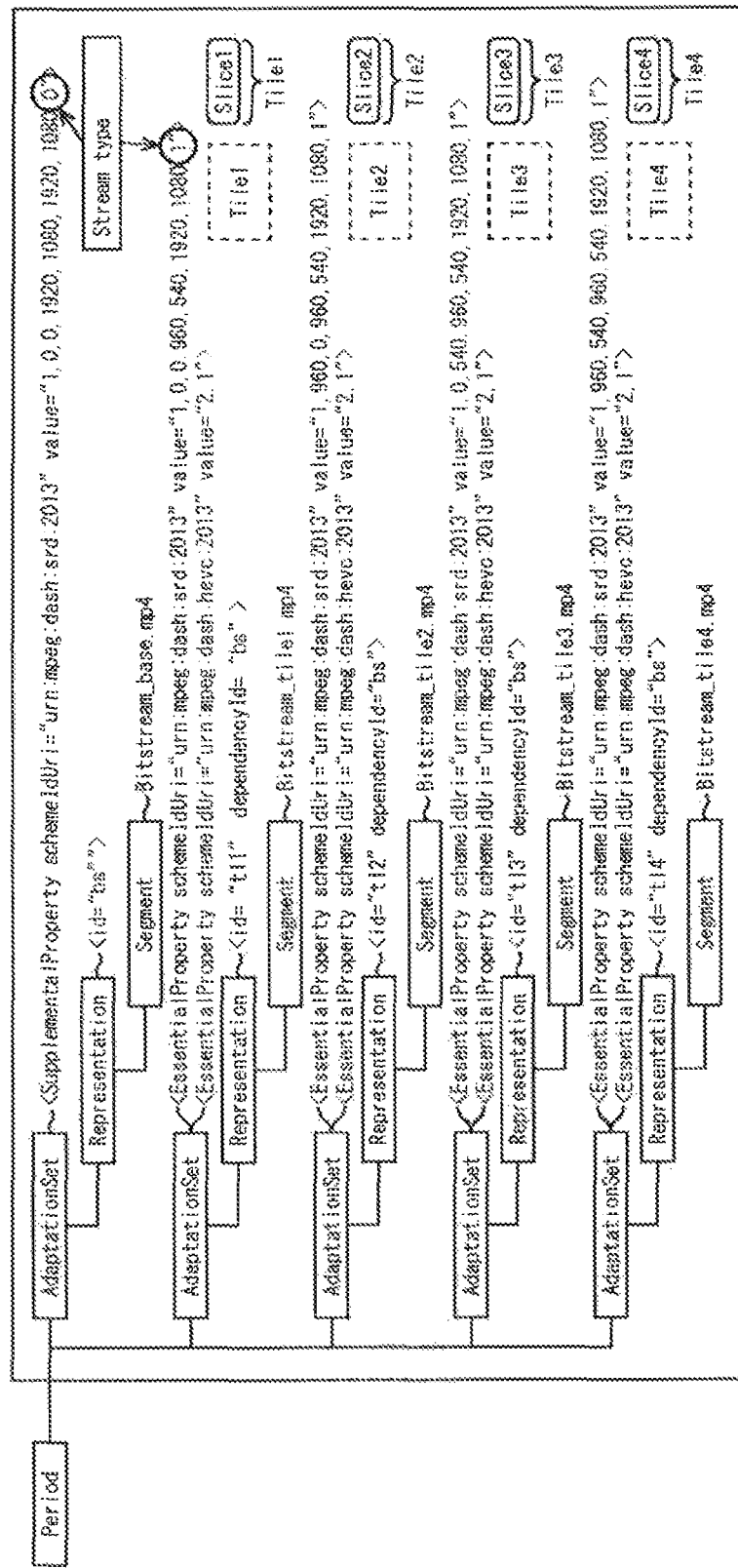
FIG. 56 is a diagram illustrating an example of the configuration of an MPD.

Even in the MPD of the MP4 file in FIG. 55, as in the above-described cases of the reference by the extractor, the supplemental property (SupplementalProperty) or the essential property (EssentialProperty) of the adaptation set (AdaptationSet) is extended. The example is illustrated in FIG. 56. The MPD in FIG. 56 has the same configuration as the MPD in FIG. 54.

The MP4 file in FIG. 55 can be managed by the MPD in FIG. 56.

<Case of Plurality of Files and Plurality of Tracks (Reference by Track Reference and Extractor): Use of MPD>

The generation of the extended MPD can be performed as in the case of the first embodiment. For example, when the delivery data generation device 101 (FIG. 12) performs the delivery data generation process (FIG. 14) and the tile type MPD generation unit 141 (the tile type image information generation unit 124) (FIG. 12) performs the tile type MPD file generation process (FIG. 15), the extended MPD can be generated (the MPD is extended). Accordingly, even in this case, the delivery data generation device 101 can adaptively deliver (supply) the data of the partial image to the delivery server 102 based on the DASH standard. That is, it is possible to realize the adaptive supply of the data of the partial image.

The reproduction of the delivery data using the extended MPD can also be performed as in the case of the first embodiment. For example, the terminal device 103 (FIG. 13) can correctly analyze the extended MPD by performing the delivery data generation process (FIG. 16) and gain the adaptive delivery (supply) of the data of the partial image by the delivery server 102 which is based on the DASH standard. That is, it is possible to correctly acquire the data of the partial image from the delivery server 102 and reproduce the data of the partial image. That is, it is possible to realize the adaptive supply of the data of the partial image.

In this way, in the examples of FIGS. 53 to 56, the partial image information includes the track reference and the extractor, the track reference and the extractor are stored in the tracks corresponding to the plurality of partial images, and the tracks storing the slices of the partial images are referred to.

The application scope of the present technology can be applied to any information processing devices that supply or receive partial images.

6. Sixth Embodiment

<Computer>

The above-described series of processes can also be performed by hardware and can also be performed by software. When the series of processes is performed by software, a program of the software is installed in a computer. Here, the computer includes a computer embedded in dedicated hardware and, for example, a general personal computer capable of various functions through installation of various programs.

Figure 57:
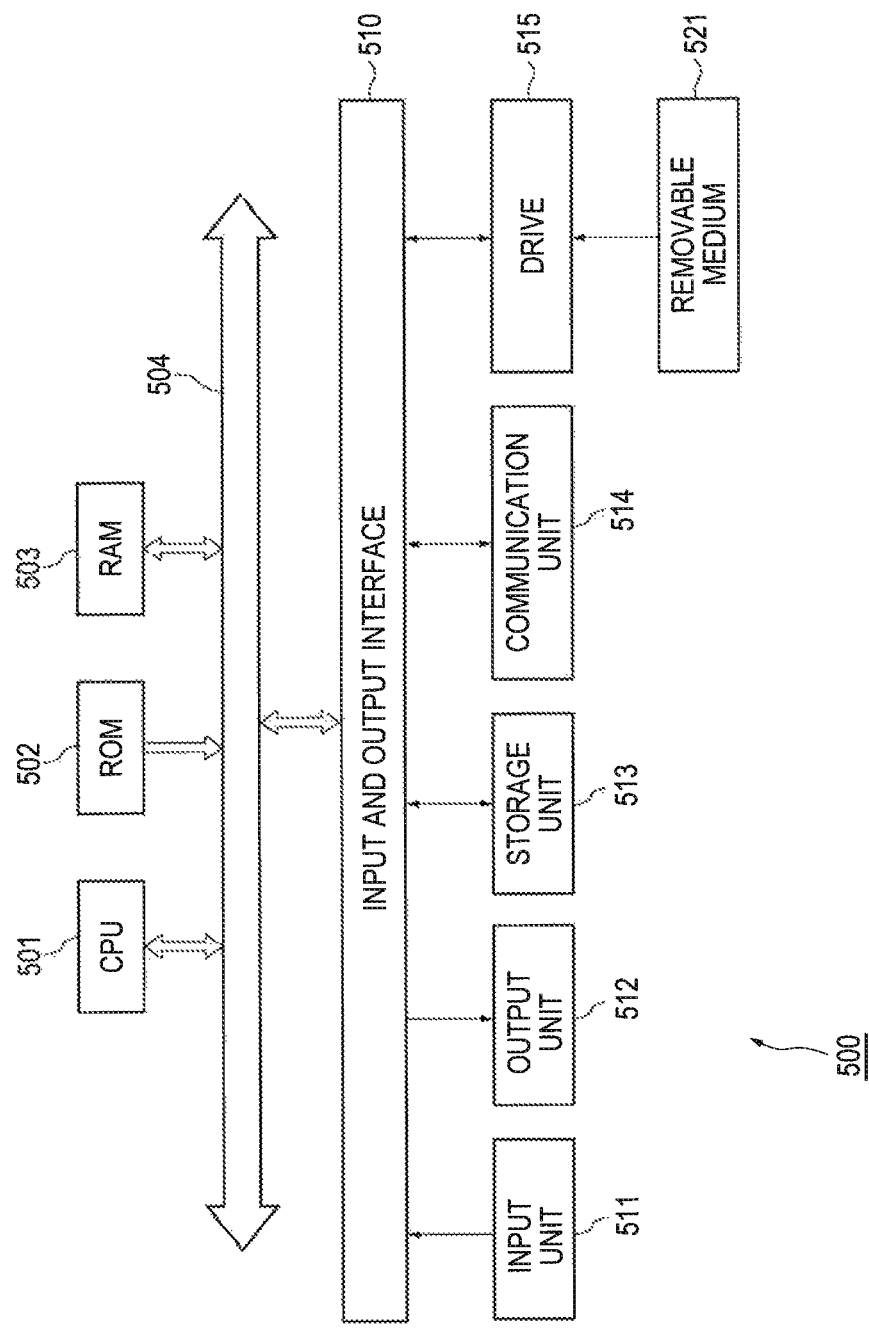
FIG. 57 is a block diagram illustrating an example of a main configuration of a computer.

FIG. 57 is a block diagram illustrating an example of a hardware configuration of the computer performing the above-described series of processes according to a program.

In a computer 500 illustrated in FIG. 57, a central processing unit (CPU) 501, a read-only memory (ROM) 502, and a random access memory (RAM) 503 are connected mutually via a bus 504.

An input and output interface 510 is also connected to the bus 504. An input unit 511, an output unit 512, a storage unit 513, a communication unit 514, and a drive 515 are connected to the input and output interface 510.

The input unit 511 is formed by, for example, a keyboard, a mouse, a microphone, a touch panel, or an input terminal. The output unit 512 is formed by, for example, a display, a speaker, or an output terminal. The storage unit 513 is formed by, for example, a hard disk, a RAM disk, or a non-volatile memory. The communication unit 514 is formed by, for example, a network interface. The drive 515 drives a removable medium 521 such as a magnetic disk, an optical disc, a magneto-optical disc, or a semiconductor memory.

In the computer having the above-described configuration, for example, the CPU 501 performs the above-described processes by loading a program stored in the storage unit 513 to the RAM 503 via the input and output interface 510 and the bus 504 and executing the program. The RAM 503 also appropriately stores data necessary for the CPU 501 to perform various processes.

For example, a program executed by the computer (the CPU 501) can be recorded in the removable medium 521 such as a package medium to be applied. In this case, by mounting the removable medium 521 on the drive 515, the program can be installed in the storage unit 513 via the input and output interface 510.

The program can also be supplied via a wired or wireless transmission medium such as a local area network, the Internet, or digital satellite broadcast. In this case, the program can be received by the communication unit 514 to be installed in the storage unit 513.

Further, the program can also be installed in advance in the ROM 502 or the storage unit 513.

Programs executed by the computer may be programs which are processed chronologically in the order described in the present specification or may be programs which are processed at necessary timings, for example, in parallel or when called.

In the present specification, steps describing a program recorded in a recording medium include not only processes which are performed chronologically in the described order but also processes which are performed in parallel or individually but not chronologically.

7. Seventh Embodiment

<Application of Multi-View Image Encoding and Multi-View Image Decoding>

Figure 58:
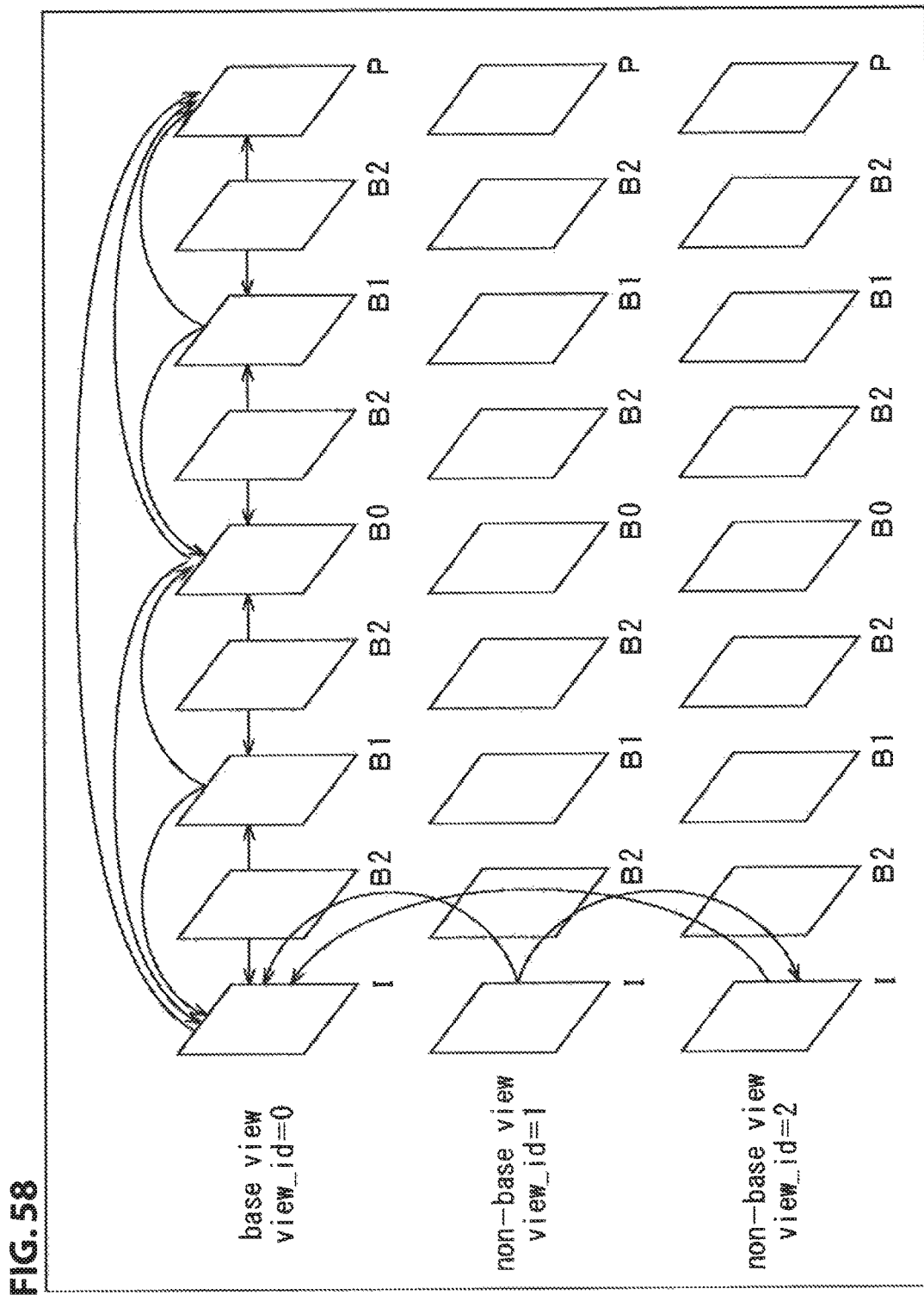
FIG. 58 is a diagram illustrating an example of a multi-view image coding scheme.

Multi-view image encoding and multi-view image decoding can be applied as schemes for image encoding and image decoding related to the above-described series of processes. FIG. 58 illustrates an example of a multi-view image coding scheme.

As illustrated in FIG. 58, a multi-view image includes images having a plurality of views. The plurality of views of the multi-view image include a base view for which encoding/decoding is performed using only the image of its own view without using images of other views and non-base views for which encoding/decoding is performed using images of other views. In a non-base view, the image of the base view may be used, and the image of the other non-base view may be used.

In delivery of the multi-view image as in FIG. 58, the method of each embodiment described above may be applied. In this way, it is also possible to realize the adaptive supply of the data of the partial images in regard to the multi-view image.

Further, information necessary to encode and decode the flags or the parameters (for example, the VPS, the SPS, and the like as coding information) used in the method of each embodiment described above may be shared between encoding and decoding of each view. In this way, it is possible to suppress transmission of redundant information and suppress a reduction in coding efficiency.

<Multi-View Image Encoding Device>

Figure 59:
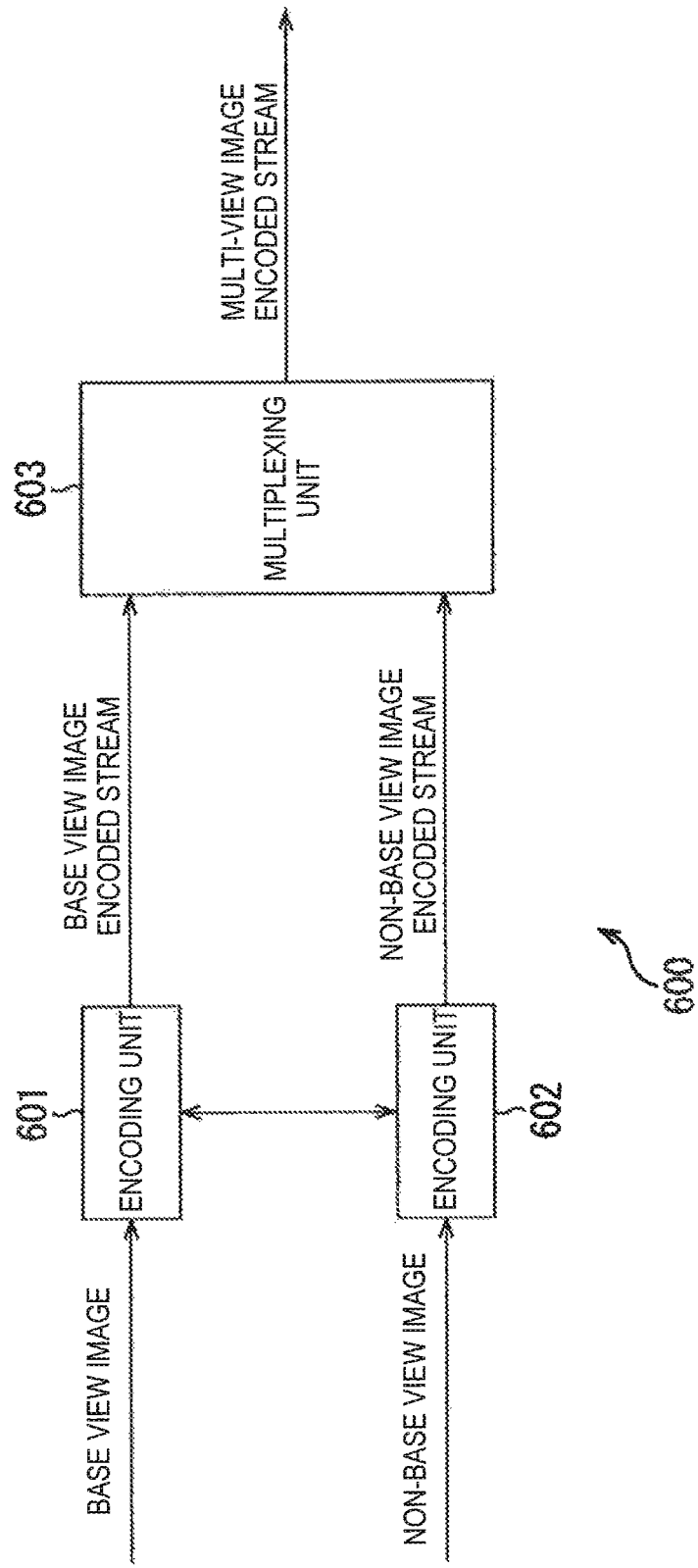
FIG. 59 is a diagram illustrating an example of a configuration of a multi-view image encoding device.

FIG. 59 is a diagram illustrating a multi-view image encoding device which performs the above-described multi-view image encoding. As illustrated in FIG. 59, the multi-view image encoding device 600 has an encoding unit 601, an encoding unit 602, and a multiplexing unit 603.

The encoding unit 601 encodes a base view image to generate a base view image encoded stream. The encoding unit 602 encodes a non-base view image to generate a non-base view image encoded stream. The multiplexing unit 603 multiplexes the base view image encoded stream generated by the encoding unit 601 and the non-base view image encoded stream generated by the encoding unit 602 to generate a multi-view image encoded stream.

For example, the multi-view image encoding device 600 may be applied as the image encoding unit 122 (which is one encoding processing unit of the image encoding unit) (FIG. 12) of the delivery data generation device 101 (FIG. 11). In this way, it is also possible to apply the method of each embodiment described above to delivery of the multi-view image, and thus it is possible to realize adaptive supply of the data of the partial images.

<Multi-View Image Decoding Device>

Figure 60:
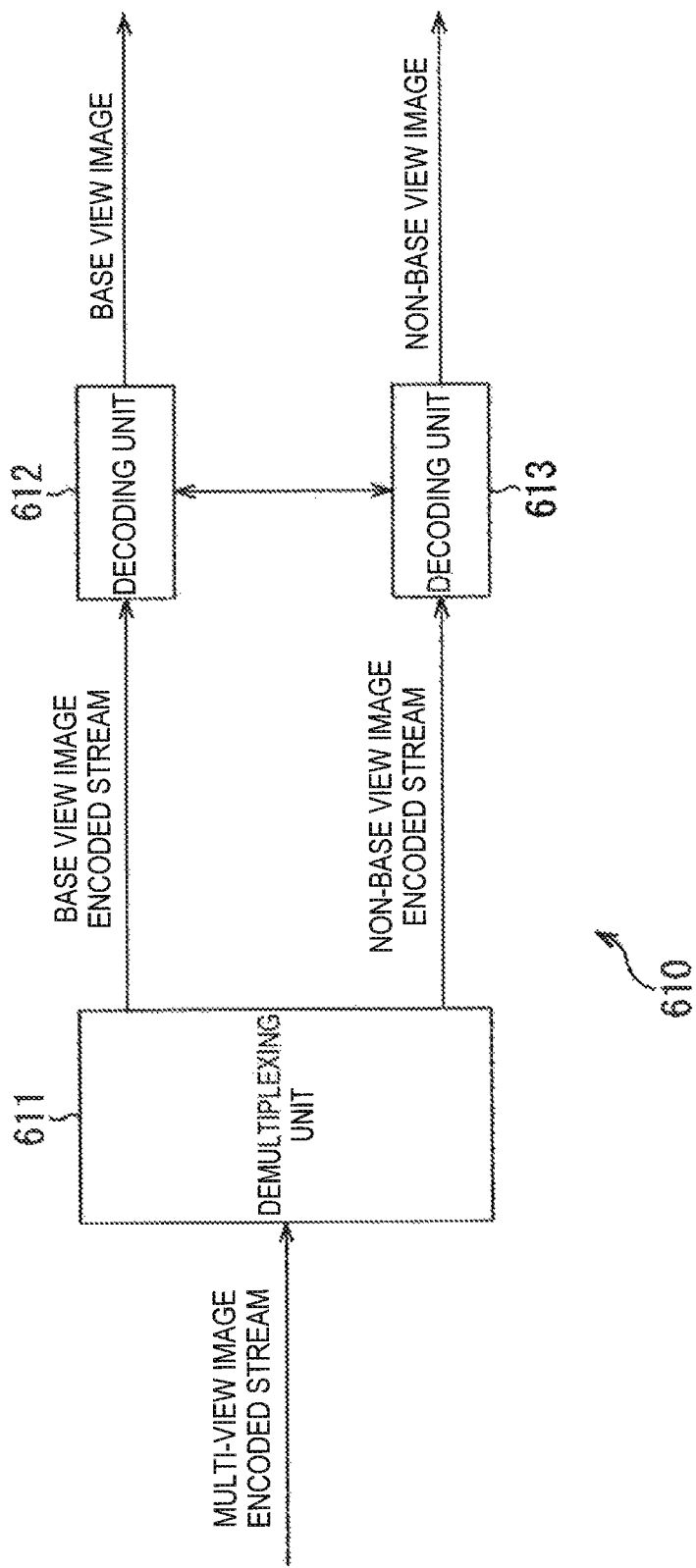
FIG. 60 is a diagram illustrating an example of a configuration of a multi-view image decoding device.

FIG. 60 is a diagram illustrating a multi-view image decoding device which performs the above-described multi-view image decoding. As illustrated in FIG. 60, the multi-view image decoding device 610 has a demultiplexing unit 611, a decoding unit 612, and another decoding unit 613.

The demultiplexing unit 611 demultiplexes the multi-view image encoded stream obtained by multiplexing the base view image encoded stream and the non-base view image encoded stream to extract the base view image encoded stream and the non-base view image encoded stream. The decoding unit 612 decodes the base view image encoded stream extracted by the demultiplexing unit 611 to obtain the base view image. The decoding unit 613 decodes the non-base view image encoded stream extracted by the demultiplexing unit 611 to obtain the non-base view image.

For example, the multi-view image decoding device 610 may be applied as the image decoding unit 155 (one decoding processing unit of the image decoding unit) of the terminal device 103 (FIG. 11). In this way, it is also possible to apply the method of each embodiment described above to delivery of the multi-view image, and thus it is possible to realize adaptive supply of the data of the partial images.

Eighth Embodiment

<Application of Layered Image Encoding/Layered Image Decoding>

Figure 61:
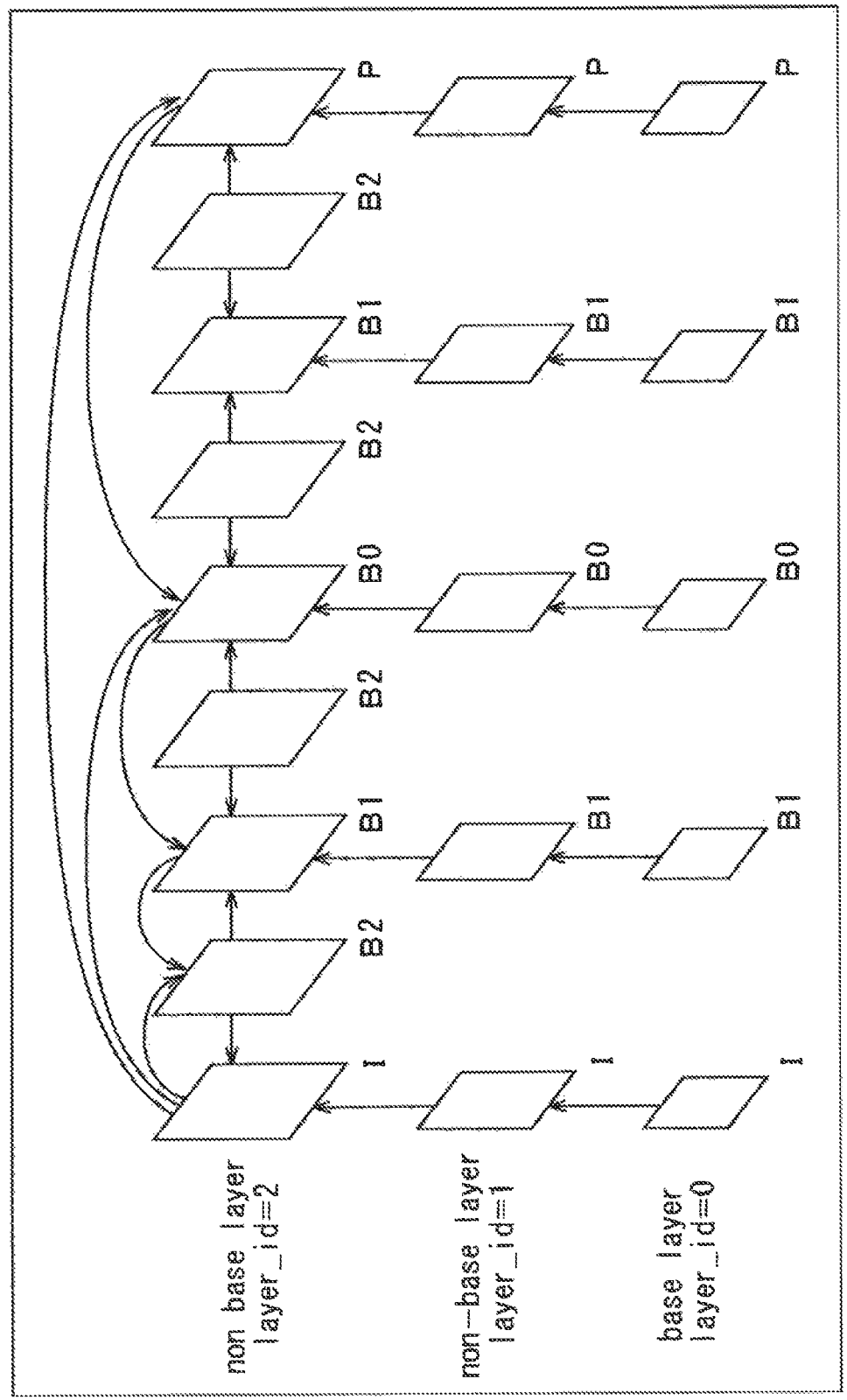
FIG. 61 is a diagram illustrating an example of a layered image encoding scheme.

The series of processes described above can be applied to layered image encoding/layered image decoding (scalable encoding/scalable decoding). FIG. 61 illustrates an example of a layered image coding scheme.

Layered image encoding (scalable encoding) involves dividing an image into a plurality of layers (multi-layered) and performing encoding for each layer so that image data can have scalability with respect to a predetermined parameter. Layered image decoding (scalable decoding) is decoding that corresponds to the layered image encoding.

The layering of the image is a parameter related to the image and is performed by changing predetermined parameters having scalability. That is, as illustrated in FIG. 61, an image subjected to the layering (layered image) is configured to include a plurality of images of which the values of the predetermined parameters with the scalability are mutually different. Each image of the plurality of images is considered to be a layer.

The plurality of layers of the layered image include a base layer in which only information regarding the own layer is used without using information regarding other layers at the time of encoding and decoding and non-base layers (also referred to as enhancement layers) in which the information regarding the other layers can be used at the time of encoding and decoding. In the non-base layers, the information regarding the base layer can also be used and the information regarding the other non-base layers can also be used.

The layered image encoding is a process of encoding such a layered image. For example, the image of the base layer is encoded using only the information regarding the base layer to generate encoded data of the base layer. For example, the images of the non-base layers are encoded using the information regarding the base layer and the information regarding the non-base layers, and encoded data of the non-base layers is generated.

The layered image decoding is a process of decoding the encoded data subjected to the layered image encoding and generating a decoded image of any layer. For example, the encoded data of the base layer is decoded to generate a decoded image of the base layer. For example, the encoded data of the base layer is decoded, and the encoded data of the non-base layers is decoded using the information regarding the base layer to generate decoded images of the non-base layers.

In this way, the encoded data is divided and generated for each layer through the layered encoding. Therefore, at the time of decoding, the encoded data of all the layers may not necessarily be necessary, and only the encoded data of a layer necessary to obtain a desired decoded image may be obtained. Accordingly, it is possible to suppress an increase in a transmission amount of the data from an encoding side to a decoding side.

Any information of another layer used for the encoding and the decoding can be used. However, for example, an image (for example, a decoded image) may be used. For example, prediction between layers may be performed using the image of another layer. In this way, it is possible to reduce redundancy between the layers. In particular, it is possible to suppress an increase in the encoding amount of the non-base layer. The use of the information between the layers (for example, prediction between the layers) may be performed in all of the pictures of a moving image. As illustrated in FIG. 61, the use of the information may be performed in some of the pictures.

As described above, the qualities of the images of the layers of the layered image are mutually different for the predetermined parameters having the scalability. That is, by performing the layered image encoding and the layered image decoding on the layered image, it is possible to easily obtain images with various qualities according to situations. Any setting can be performed on the quality of each layer. However, in general, the quality of the image of the base layer is set to be lower than the quality of the image of the enhancement layer using the information regarding the base layer.

For example, image compression information (encoded data) regarding only the base layer may be transmitted to a terminal such as a mobile telephone with a low processing ability, and image compression information (encoded data) regarding the enhancement layer in addition to the base layer may be transmitted to a terminal such as a television or a personal computer with a high processing ability.

In general, the load of a process of reproducing an image with low quality is less than that of a process of reproducing an image with high quality. Accordingly, by performing the transmission in this way, it is possible to allow each terminal to perform a reproduction process according to the ability, for example, to allow a terminal with a low processing ability to reproduce a moving image with low quality and allow a terminal with a high processing ability to reproduce a moving image with high quality. That is, it is possible to allow terminals with more varied processing abilities to reproduce a moving image normally (without failure). As described above, only the encoded data of a necessary layer may be transmitted to each terminal. Therefore, it is possible to suppress an increase in a data amount (transmission amount) of the encoded data to be transmitted. Further, as described above, by using the information regarding the other layers, it is possible to suppress the increase in the encoding amount. In the case of the layered encoding and the layered decoding, the delivery of the data according to a terminal can be realized without a transcoding process.

In the delivery of the layered image as in FIG. 61, the method of each embodiment described above may be applied. In this way, it is possible to realize the adaptive supply of the data of the partial image even in the layered image.

Further, the information necessary to encode and decode the flags or the parameters (for example, the VPS, the SPS, and the like as coding information) used in the method of each embodiment described above may be shared between encoding and decoding of each layer. In this way, it is possible to suppress transmission of redundant information and suppress a reduction in coding efficiency.

<Scalable Parameters>

Figure 62:
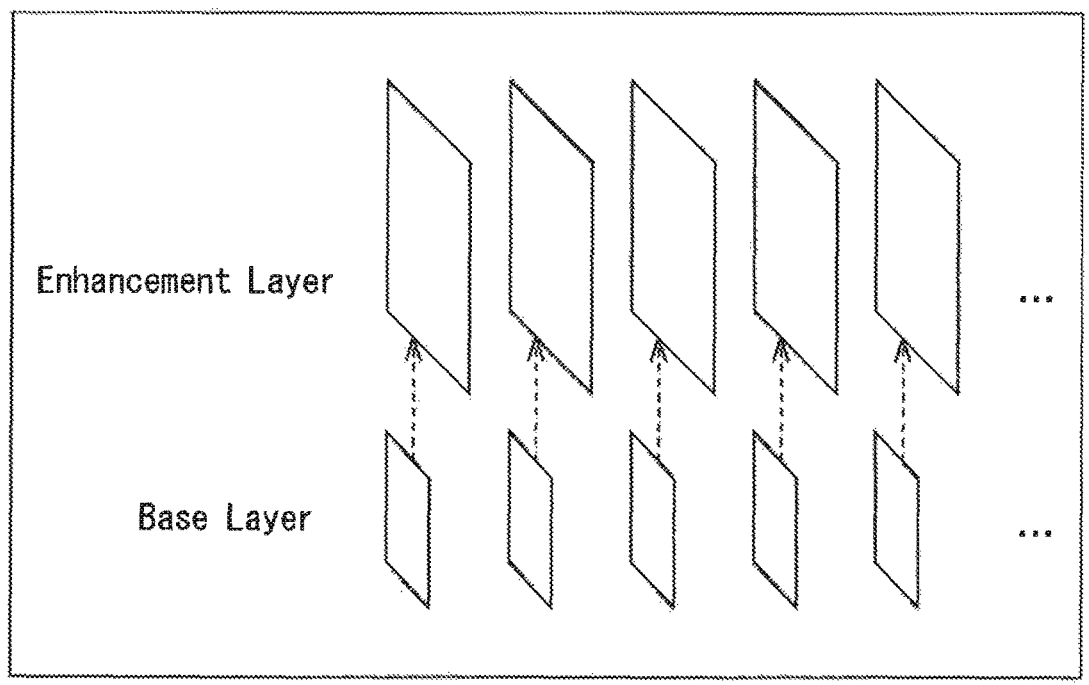
FIG. 62 is a diagram for describing an example of spatial scalable coding.

In the layered image encoding and the layered image decoding (scalable encoding and scalable decoding), any parameter having the scalability can be used. For example, a spatial resolution illustrated in FIG. 62 may be assumed to be the parameter (spatial scalability). In the case of the spatial scalability, a spatial resolution (that is, the number of pixels of a picture) differs for each layer. In the example of FIG. 62, each picture is layered into two layers, a base layer with a low resolution and an enhancement layer with a high resolution. Of course, this number of layers is an example and each picture can be layered into any number of layers.

Figure 63:
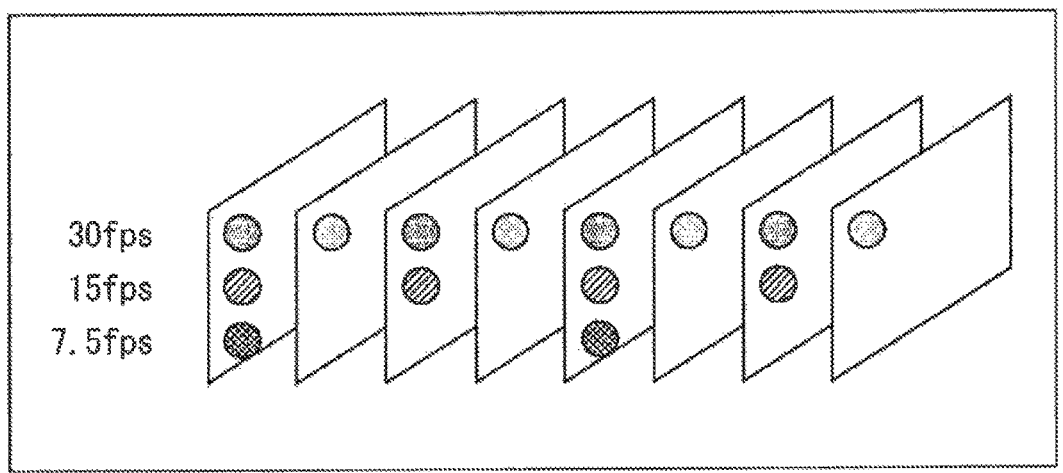
FIG. 63 is a diagram for describing an example of temporal scalable coding.

As the parameter having such a scalable property, for example, a temporal resolution may be applied, as illustrated in FIG. 63 (temporal scalability). In the case of the temporal scalability, a temporal resolution (that is, a frame rate) differs for each layer. In the case of the example of FIG. 63, a picture is layered into three layers, a layer with a low frame rate (7.5 fps), a layer with an intermediate frame rate (15 fps), and a layer with a high frame rate (30 fps). Of course, this number of layers is an example and each picture can be layered into any number of layers.

Figure 64:
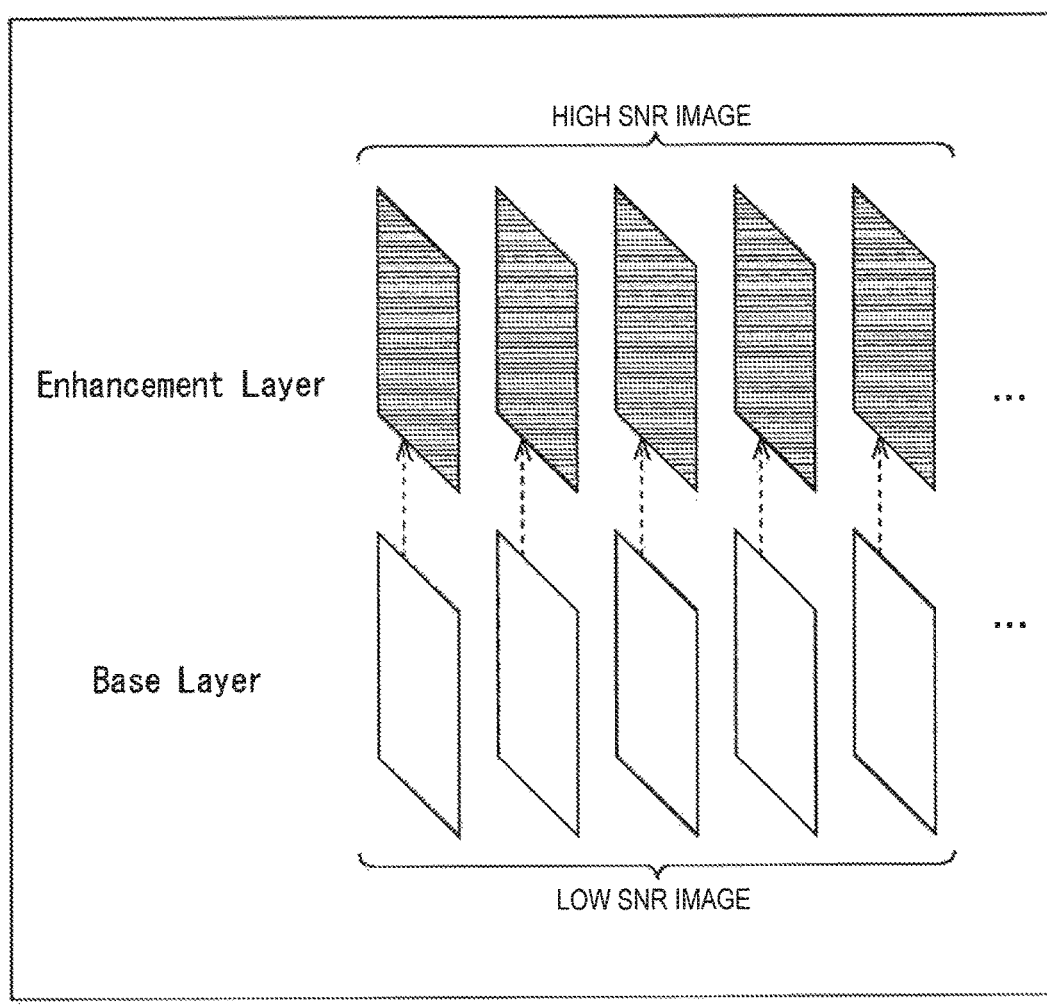
FIG. 64 is a diagram for describing an example of scalable coding of a signal-to-noise ratio.

As the parameter having such a scalable property, for example, a signal-to-noise ratio (SNR) may be applied, as illustrated in FIG. 64 (SNR scalability). In the case of the SNR scalability, the SN ratio differs for each layer. In the case of the example of FIG. 64, each picture is layered into two layers, a base layer with a low SNR and an enhancement layer with a high SNR. Of course, this number of layers is an example and each picture can be layered into any number of layers.

The parameter having such a scalable property may, of course, be a parameter other than the above-described examples. For example, a bit depth can also be used as the parameter having such a scalable property (bit-depth scalability). In the case of the bit-depth scalability, a bit depth differs for each layer. For example, the base layer may be formed by an 8-bit image and the enhancement layer may be formed by a 10-bit image. Of course, this number of layers is an example and each picture can be layered into any number of layers. Any bit depth of each layer can also be used and is not limited to the above-described example.

For example, the base layer may be assumed to be a standard dynamic range (SDR) image with a standard dynamic range and the enhancement layer may be assumed to be a high dynamic range (HDR) image with a broader dynamic range. The SDR image may be assumed to be, for example, image data with integer precision of 8 bits or 16 bits and the HDR image may be assumed to be, for example, image data with floating-point precision of 32 bits.

As the parameter having the scalable property, for example, a chroma format can also be used (chroma scalability). In the case of the chroma scalability, the chroma format differs for each layer. For example, the base layer may be formed by a component image with a 4:2:0 format and the enhancement layer may be formed by a component image with a 4:2:2 format. Of course, this number of layers is an example and each picture can be layered into any number of layers. Any chroma format of each layer can also be used and is not limited to the above-described example.

As the parameter having the scalable property, for example, a color gamut may be used. For example, the color gamut of the enhancement layer may be configured to include the color gamut of the base layer (that is, broader than the color gamut of the base layer).

<Layered Image Encoding Device>

Figure 65:
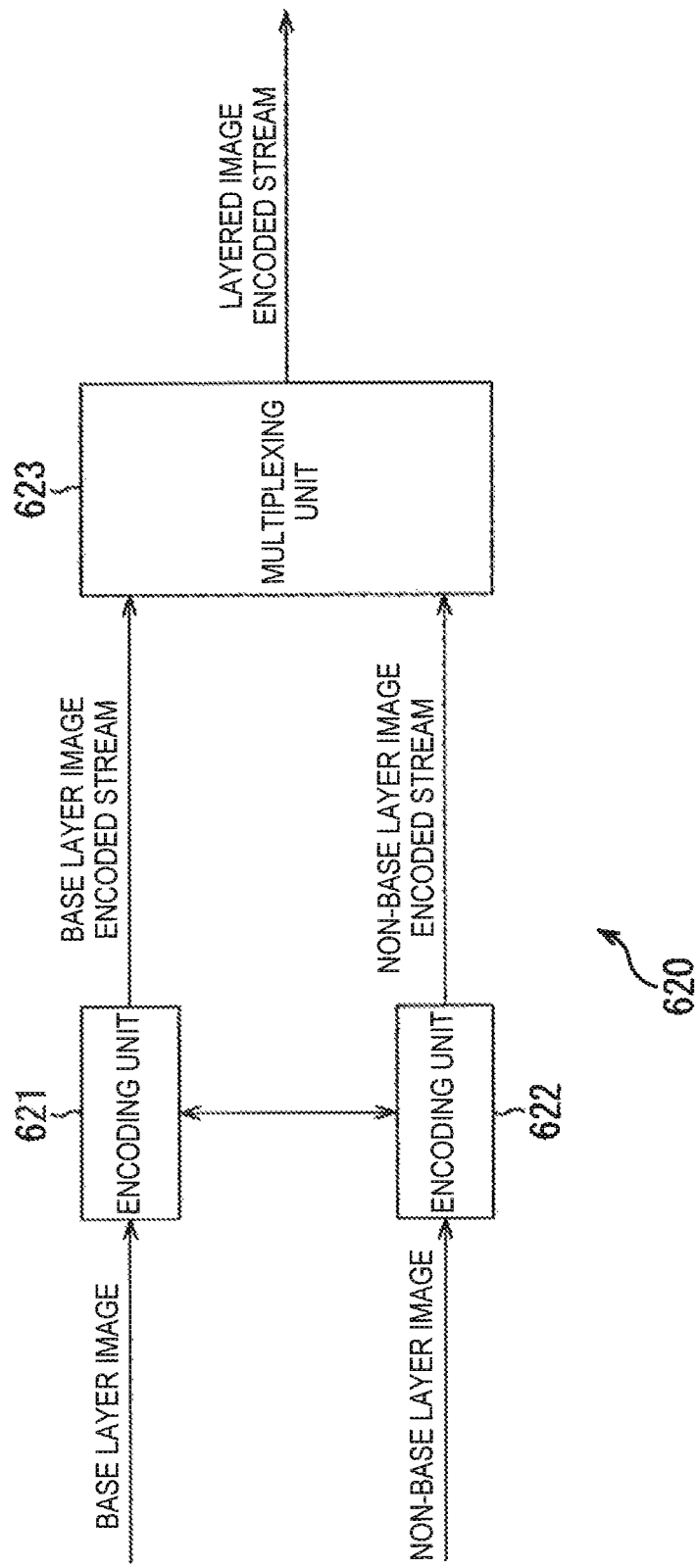
FIG. 65 is a diagram illustrating an example of a configuration of a layered image encoding device.

FIG. 65 is a diagram illustrating a layered image encoding device which performs the above-described layered image encoding. The layered image encoding device 620 has an encoding unit 621, another encoding unit 622, and a multiplexing unit 623 as illustrated in FIG. 65.

The encoding unit 621 encodes a base layer image to generate a base layer image encoded stream. The encoding unit 622 encodes a non-base layer image to generate a non-base layer image encoded stream. The multiplexing unit 623 multiplexes the base layer image encoded stream generated by the encoding unit 621 and the non-base layer image encoded stream generated by the encoding unit 622 to generate a layered image encoded stream.

For example, the layered image encoding device 620 may be applied as the image encoding unit 122 (which is one encoding processing unit of the image encoding unit) (FIG. 12) of the delivery data generation device 101 (FIG. 11). In this way, it is also possible to apply the method of each embodiment described above to delivery of the layered image, and thus it is possible to realize adaptive supply of the data of the partial images.

<Layered Image Decoding Device>

Figure 66:
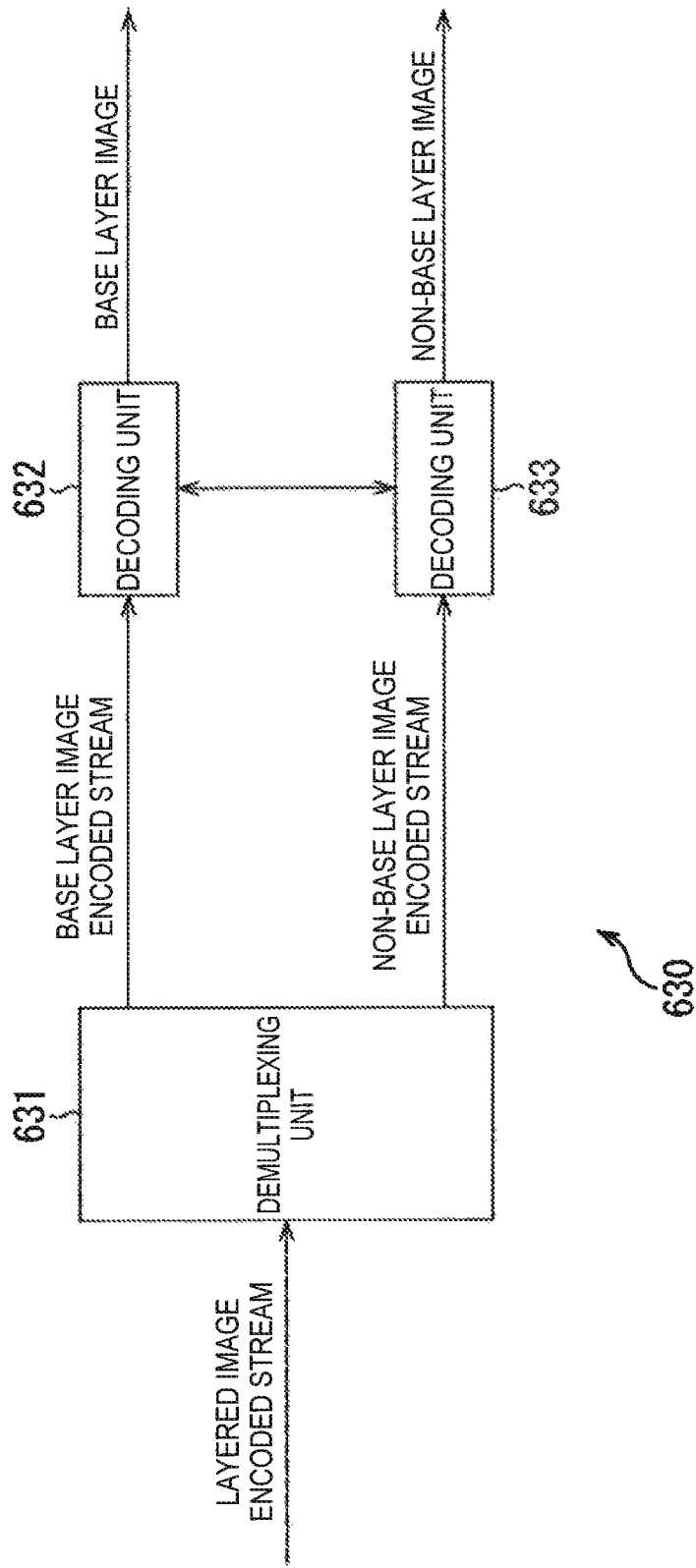
FIG. 66 is a diagram illustrating an example of a configuration of a layered image decoding device.

FIG. 66 is a diagram illustrating a layered image decoding device which performs the above-described layered image decoding. The layered image decoding device 630 has a demultiplexing unit 631, a decoding unit 632, and another decoding unit 633 as illustrated in FIG. 66.

The demultiplexing unit 631 demultiplexes the layered image encoded stream obtained by multiplexing the base layer image encoded stream and the non-base layer image encoded stream to extract the base layer image encoded stream and the non-base layer image encoded stream. The decoding unit 632 decodes the base layer image encoded stream extracted by the demultiplexing unit 631 to obtain the base layer image. The decoding unit 633 decodes the non-base layer image encoded stream extracted by the demultiplexing unit 631 to obtain the non-base layer image.

For example, the layered image decoding device 630 may be applied as the image decoding unit 155 (one decoding processing unit of the image decoding unit) of the terminal device 103 (FIG. 11). In this way, it is also possible to apply the method of each embodiment described above to delivery of the layered image, and thus it is possible to realize adaptive supply of the data of the partial images.

The image encoding device and the image decoding device according to the above-described embodiments can be applied to various electronic devices such as a transmitter or a receiver in delivery of satellite broadcast, a wired broadcast such as a cable TV, or the Internet and delivery to a terminal by cellular communication, a recording device recording an image in a medium such as an optical disc, a magnetic disk, or a flash memory, or a reproduction device reproducing an image from the storage medium. Hereinafter, two application examples will be described.

9. Application Examples

First Application Example: Television Receiver

Figure 67:
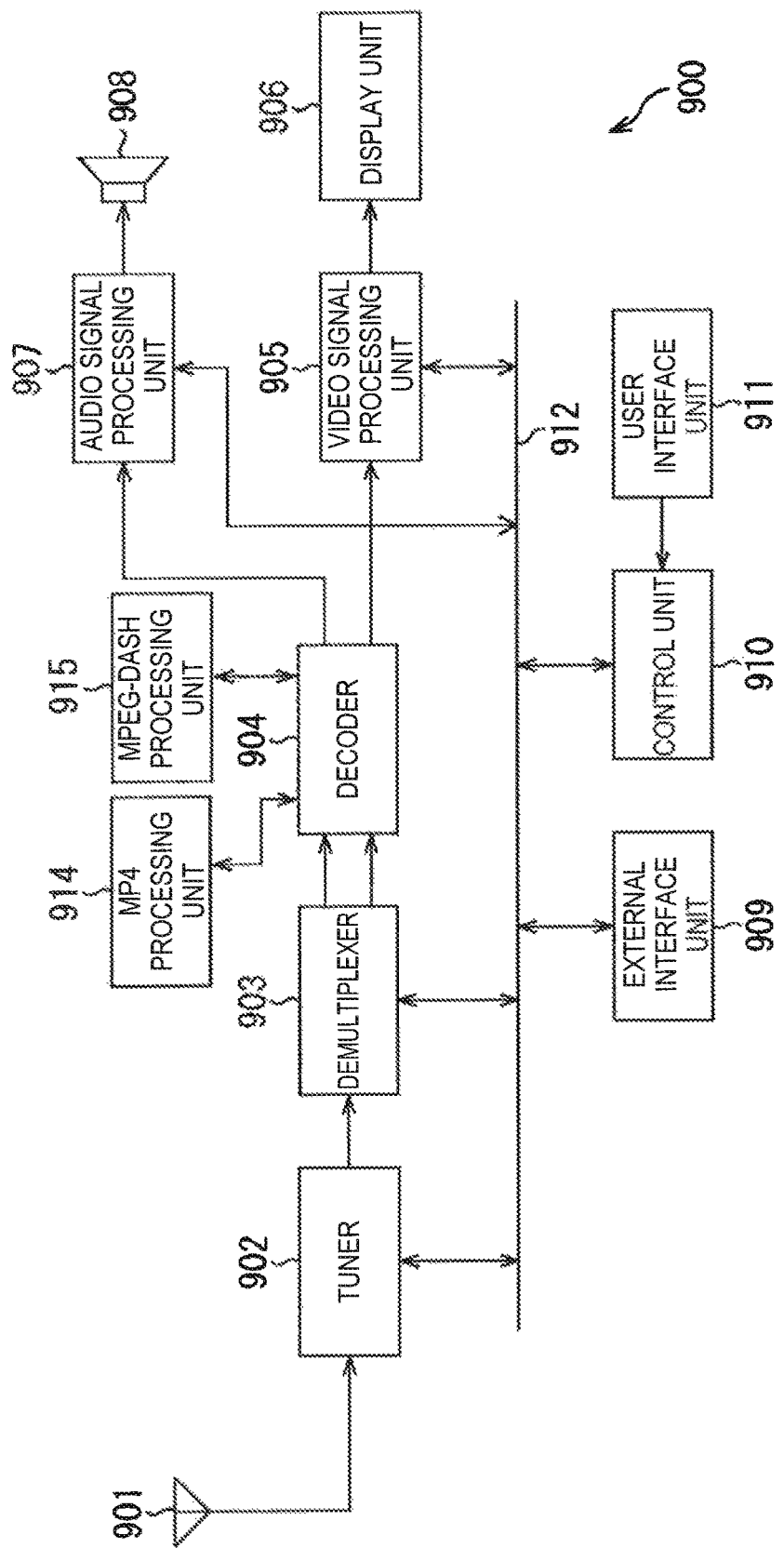
FIG. 67 is a block diagram illustrating an example of a schematic configuration of a television device.

FIG. 67 is a block diagram illustrating an example of a schematic configuration of a television device to which the above-described embodiments are applied. A television device 900 includes an antenna 901, a tuner 902, a demultiplexer 903, a decoder 904, a video signal processing unit 905, a display unit 906, an audio signal processing unit 907, and a speaker 908. The television device 900 further includes an external interface (I/F) unit 909, a control unit 910, a user interface (I/F) unit 911, and a bus 912. The television device 900 further includes an MP4 processing unit 914 and an MPEG-DASH processing unit 915.

The tuner 902 extracts a signal of a desired channel (tuned channel) from a broadcast wave signal received via the antenna 901 and demodulates the extracted signal. The tuner 902 outputs an encoded bit stream obtained through the demodulation to the demultiplexer 903.

The demultiplexer 903 demultiplexes a video stream and an audio stream of a viewing target program from the encoded bit stream and outputs the demultiplexed streams to the decoder 904. The demultiplexer 903 extracts auxiliary data such as an electronic program guide (EPG) from the encoded bit stream and supplies the extracted data to the control unit 910. When the encoded bit stream is subjected to scrambling, the demultiplexer 903 may perform descrambling on the encoded bit stream.

The decoder 904 decodes the video stream and the audio stream input from the demultiplexer 903. The decoder 904 performs the decoding using the MP4 processing unit 914 or the MPEG-DASH processing unit 915, as necessary. The decoder 904 outputs video data generated through the decoding process to the video signal processing unit 905. The decoder 904 outputs audio data generated through the decoding process to the audio signal processing unit 907.

The video signal processing unit 905 reproduces the video data input from the decoder 904 and causes the display unit 906 to display an image. For example, the video signal processing unit 905 can also reproduce video data supplied from the outside via a reception unit 913 and cause the display unit 906 to display the image. For example, the video signal processing unit 905 can also generate an image by executing an application supplied from the outside via the reception unit 913 and cause the display unit 906 to display the image.

In the reproduction of the video data or the generation of the image, the video signal processing unit 905 can also perform, for example, an additional process such as noise removal on the image displayed by the display unit 906. For example, the video signal processing unit 905 can also generate an image of a graphical user interface (GUI) such as a menu, a button, or a cursor and superimpose the image on an image displayed by the display unit 906.

The audio signal processing unit 907 performs a reproduction process such as D-to-A conversion and amplification on the audio data input from the decoder 904 and outputs audio from the speaker 908. For example, the audio signal processing unit 907 can also reproduce audio data supplied from the outside via the reception unit 913 and output the audio from the speaker 908. For example, the audio signal processing unit 907 can also generate audio by executing an application supplied from the outside via the reception unit 913 and output the audio from the speaker 908.

In the reproduction of the audio data and the generation of the audio, the audio signal processing unit 907 can also perform, for example, an additional process such as noise removal on the audio to be output from the speaker 908.

The external interface unit 909 is an interface for connecting the television device 900 to an external device or a network. The external device may be any electronic device, such as a computer, an externally attached hard disk drive (HDD) connected via a communication cable of a predetermined standard such as Universal Serial Bus (USB) or IEEE1394, an externally attached optical disc drive, or a network attached storage (NAS), as long as the device can transmit and receive information to and from the television device 900.

A network is a communication network serving as a communication medium. The network may be any communication network, a wired communication network, a wireless communication network, or both. For example, the network may be a wired local area network (LAN), a wireless LAN, a public telephone line network, a wide area communication network for a wireless moving object such as a so-called 3G network or 4G network, or the Internet for wireless moving objects, or a combination thereof. The network may be a single communication network or a plurality of communication networks. For example, the network may be configured by a plurality of communication networks mutually connected via servers, relay devices, or the like. For example, a part or all of the network may be configured by a communication cable of a predetermined standard, such as a Universal Serial Bus (USB) cable or a High-Definition Multimedia Interface (HDMI: registered trademark) cable. For example, a part or all of the network may be configured by a method which is based on a predetermined standard such as an ad hoc mode of Institute of Electrical and Electronic Engineers (IEEE) 802.11 wireless LAN, optical communication of infrared rays such as InfraRed Data Association (IrDA) or the like, or Bluetooth (registered trademark), or may be configured by wireless communication of a unique communication scheme.

In addition to the television device 900, another device (external device) or the like can be connected to the network. The television device 900 can perform communication (transmit and receive information) with the external device via the network.

The external interface unit 909 can receive an encoded bit stream supplied from an external device via a communication cable or a network. When the external interface unit 909 receives the encoded bit stream, the external interface unit 909 supplies the encoded bit stream to the demultiplexer 903 via the bus 912.

The demultiplexer 903 processes the encoded bit stream as in the encoded bit stream supplied from the tuner 902 to demultiplex a video stream and an audio stream, extract auxiliary data such as EP, or perform descrambling. In this way, the television device 900 can receive a broadcast wave signal including the encoded bit stream and can also receive the encoded bit stream transmitted via a network, decode the encoded bit stream, and output the video or the audio.

That is, the antenna 901 or the external interface unit 909 functions as a reception unit in the television device 900.

The television device 900 can also transmit information to an external device via the external interface unit 909. This information is arbitrary. For example, the information may be a request for content such as a video or audio, information regarding a communication function of the television device 900 necessary to establish communication, or information regarding a decoding function, an image display function, an audio output function of the television device 900. The television device 900 may also transmit an encoded bit stream received via the antenna 901 to an external device via the external interface unit 909. That is, the external interface unit 909 may function as a transmission unit in the television device 900.

The control unit 910 is connected with the user interface unit 911. The user interface unit 911 is configured as a manipulating switch or a remotely controlled signal reception unit, and supplies an operation signal to the control unit 910 according to a user operation.

The control unit 910 is configured using a CPU, a memory, and the like. The memory stores programs executed by the CPU, various kinds of data necessary for the CPU to perform processes, EPG data, data acquired through the external interface unit 909. The programs stored in the memory are read and executed by the CPU at predetermined timings such as when the television device 900 is turned on. By executing the programs, the CPU controls the respective units so that the television device 900 is operated according to user operations.

Note that, in the television device 900, a bus 912 is provided to connect the tuner 902, the demultiplexer 903, the video signal processing unit 905, the audio signal processing unit 907, the external interface unit 909, and the like with the control unit 910.

When a video stream received via the antenna 901 or the external interface unit 909 is an MP4 file, the decoder 904 supplies the MP4 file to the MP4 processing unit 914. The MP4 processing unit 914 analyzes the supplied MP4 file and decodes encoded data included in the MP4 file. The MP4 processing unit 914 supplies the image data obtained through the decoding to the decoder 904. The decoder 904 supplies the image data to the video signal processing unit 905.

As a process of the MP4 processing unit 914, the method of each embodiment described above may be applied. That is, the MP4 processing unit 914 may include the file acquisition unit 154, the image decoding unit 155, and the tile image combination unit 156 (FIG. 13) of the terminal device 103 (FIG. 11). In this case, the MP4 processing unit 914 acquires an MP4 file including the data of the tiles included in a desired range via the decoder 904 or the like, extracts and decodes the encoded data of the tiles, appropriately combines the acquired image data (tile images) of the tiles to generate image data in the desired range, and supplies the image data to the decoder 904. In this way, the MP4 processing unit 914 can process the various MP4 files described above in the embodiments to obtain desired image data. That is, the television device 900 can realize the adaptive supply of the data of the partial images.

When the video stream received via the antenna 901 or the external interface unit 909 is the MPD file, the decoder 904 supplies the MPD file to the MPEG-DASH processing unit 915. The MPEG-DASH processing unit 915 analyzes the supplied MPD and acquires desired image data based on the MPD. For example, when the MP4 file including the encoded data obtained by encoding the image data is managed by the MPD, the MPEG-DASH processing unit 915 acquires the MP4 file corresponding to a desired image based on the MPD, decodes the encoded data included in the MP4 file, and supplies the image data obtained through the decoding to the decoder 904. The decoder 904 supplies the image data to the video signal processing unit 905.

As a process of the MPEG-DASH processing unit 915, the method of each embodiment described above may be applied. That is, the MPEG-DASH processing unit 915 may include the MPD acquisition unit 151 to the tile image combination unit 156 (each processing unit other than the display unit 157 in FIG. 13) of the terminal device 103 (FIG. 11). The MPEG-DASH processing unit 915 analyzes the MPD, acquires the MP4 file including the data of the tiles included in a desired range via the decoder 904 or the like, extracts and decodes the encoded data of the tiles, appropriately combines the obtained image data (tile images) of the tiles to generate image data in the desired range, and supplies the image data to the decoder 904. In this way, the MPEG-DASH processing unit 915 can process the various MP4 files described in the embodiments to obtain desired image data. That is, the television device 900 can realize the adaptive supply of the data of the partial images.

Second Embodiment: Mobile Telephone

Figure 68:
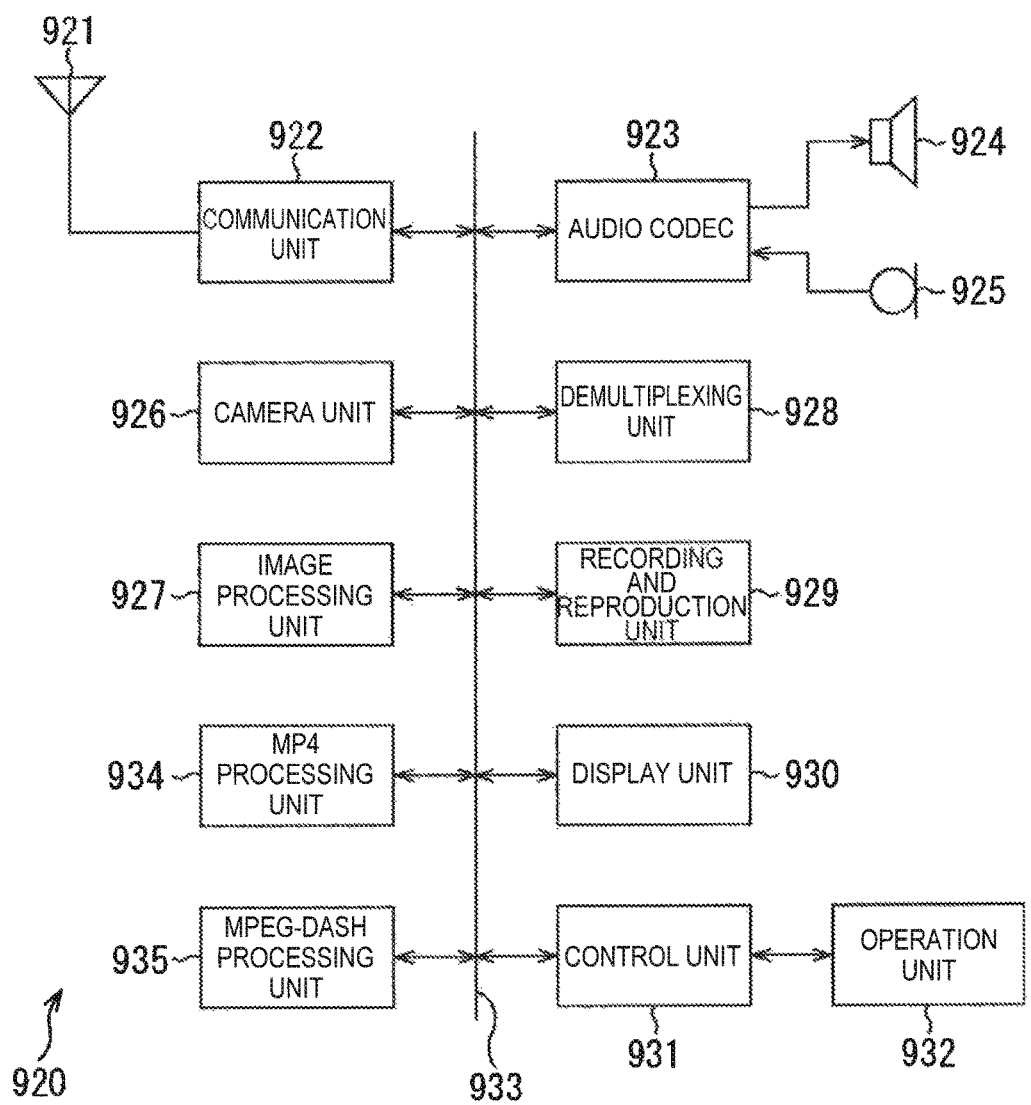
FIG. 68 is a block diagram illustrating an example of a schematic configuration of a mobile telephone.

FIG. 68 illustrates a schematic configuration of a mobile telephone to which the present disclosure is applied. The mobile telephone 920 has a communication unit 922, an audio codec 923, a camera unit 926, an image processing unit 927, a demultiplexing unit 928, a recording and reproduction unit 929, a display unit 930, and a control unit 931. The constituent elements are connected to one another by a bus 933.

In addition, an antenna 921 is connected to the communication unit 922, and a speaker 924 and a microphone 925 are connected to the audio codec 923. Further, an operation unit 932 is connected to the control unit 931.

The mobile telephone 920 includes an MP4 processing unit 934 and an MPEG-DASH processing unit 935. The MP4 processing unit 934 and the MPEG-DASH processing unit 935 are connected to the bus 933.

The communication unit 922 performs processes related to transmission and reception of radio signals via the antenna 921. The audio codec 923 performs processes related to encoding of audio data and decoding of audio encoded data obtained by encoding the audio data. The camera unit 926 images a subject and performs processes related to the imaging, such as generation of image data.

The image processing unit 927 performs a process on the image data. For example, the image processing unit 927 can perform any image processing on the image data. The image processing unit 927 can also encode the image data or decode the encoded data obtained by encoding the image data.

The demultiplexing unit 928 performs, for example, processes related to multiplexing of a plurality of pieces of data such as image data or audio data or demultiplexing of the multiplexed data.

The recording and reproduction unit 929 includes any storage medium capable of performing reading and writing and performs processes related to writing (recording) of data to the storage medium or reading (reproducing) of data stored in the storage medium. The storage medium may be an internal type storage medium such as a RAM or a flash memory or may be an externally mounted type storage medium such as a hard disk, a magnetic disk, a magneto-optical disc, an optical disc, a USB memory, or a memory card.

The display unit 930 includes a display device (for example, a liquid crystal display, a plasma display, or an organic electroluminescence display (OELD) (organic EL display)) and performs processes related to image display.

The control unit 931 includes a processor such as a CPU and memories such as a RAM and a ROM. The memories store programs executed by the CPU, program data, EPG data, data acquired via a network, and the like. The programs stored in the memories are read and executed by the CPU, for example, when the mobile telephone 920 is activated. The CPU controls an operation of each processing unit of the mobile telephone 920, for example, according to an operation signal input from the operation unit 932 by executing a program.

The MP4 processing unit 934 performs processes related to the MP4 file. The MPEG-DASH processing unit 935 performs a process related to generation of delivery data delivered in a method which is based on the MPEG-DASH standard or the control information, such as generation of the MPD or the MP4 file. The MPEG-DASH processing unit 935 also performs a process related to reproduction of the delivery data delivered in a method which is based on the MPEG-DASH standard, such as the analysis of the MPD or processing of the MP4 file.

The mobile telephone 920 performs various operations such as transmission and reception of audio signals, transmission and reception of electronic mail or image data, capturing of images, and recording of data in various operation modes such as an audio calling mode, a data communication mode, a photographing mode, and a video phone mode.

For example, in the case of the audio calling mode, an analog audio signal generated by the microphone 925 is supplied to the audio codec 923. The audio codec 923 performs A-to-D conversion to convert the analog audio signal into digital audio data and encodes (compresses) the digital audio data. The audio codec 923 outputs the audio data (audio encoded data) after the compression to the communication unit 922. The communication unit 922 further encodes or modulates the audio encoded data to generate a transmission signal. Then, the communication unit 922 transmits the generated transmission signal to a base station (not illustrated) via the antenna 921.

The communication unit 922 performs amplification or frequency conversion on a radio signal received via the antenna 921 to acquire a received signal, demodulates or decodes the received signal to generate audio encoded data, and outputs the audio encoded data to the audio codec 923. The audio codec 923 decodes (decompresses) the supplied audio encoded data or performs D-to-A conversion to generate the analog audio signal. The audio codec 923 supplies the analog audio signal to the speaker 924 to output the audio.

For example, when mail transmission is performed in the data communication mode, the control unit 931 receives a text input via the operation unit 932 by a user and causes the display unit 930 to display the input text. The control unit 931 receives a mail transmission instruction from the user via the operation unit 932, generates electronic mail data according to the instruction, and supplies the electronic mail data to the communication unit 922. The communication unit 922 encodes or modulates the supplied electronic mail data to generate a transmission signal, performs frequency conversion or amplification on the transmission signal, and transmits the signal to a base station (not illustrated) via the antenna 921.

For example, when mail reception is performed in the data communication mode, the communication unit 922 performs amplification or frequency conversion on a radio signal received via the antenna 921 to acquire a received signal, demodulates or decodes the received signal to restore the electronic mail data, and supplies the restored electronic mail data to the control unit 931. The control unit 931 causes the display unit 930 to display content of the electronic mail and stores the electronic mail data in a storage medium of the recording and reproduction unit 929.

For example, in the case of the photographing mode, the camera unit 926 images a subject to generate image data. The camera unit 926 supplies the generated image data to the image processing unit 927 via the bus 933. The image processing unit 927 performs image processing on the image data. The camera unit 926 supplies the image data subjected to the image processing to the display unit 930 via the bus 933 to display the image. The image processing unit 927 encodes the image data subjected to the image processing to generate encoded data, supplies the encoded data (image encoded data) to the recording and reproduction unit 929 via the bus 933, and stores the encoded data in the storage medium based on control (a user instruction or the like input via the operation unit 932) of the control unit 931.

When sound collection is also performed along with photographing in the photographing mode, the camera unit 926 images a subject and generates image data, the microphone 925 collects sound, and an analog audio signal is generated. The image processing unit 927 performs image processing on the image data generated by the camera unit 926 and causes the display unit 930 to display an image of the image data subjected to the image processing. The audio codec 923 outputs the audio of the analog audio signal generated by the microphone 925 from the speaker 924.

The image processing unit 927 encodes the image data to generate image encoded data and supplies the encoded data to the demultiplexing unit 928 via the bus 933 based on control (a user instruction or the like input via the operation unit 932) of the control unit 931. The audio codec 923 performs A-to-D conversion on the analog audio signal to generate audio data, further encodes the audio data to generate audio encoded data, and supplies the audio encoded data to the demultiplexing unit 928 via the bus 933 based on control (a user instruction or the like input via the operation unit 932) of the control unit 931. The demultiplexing unit 928 multiplexes the supplied image encoded data and audio encoded data to generate multiplexed data. The demultiplexing unit 928 supplies the multiplexed data to the recording and reproduction unit 929 via the bus 933 and stores the multiplexed data in the storage medium.

For example, when image data is transmitted in the data communication mode, the communication unit 922 acquires the image encoded data from the image processing unit 927 or the recording and reproduction unit 929 via the bus 933, encodes or modulates the image encoded data to generate the transmission signal, performs frequency conversion or amplification on the transmission signal, and transmits the signal to a base station (not illustrated) via the antenna 921 based on control (a user instruction or the like input via the operation unit 932) of the control unit 931.

For example, when an image and audio are transmitted as in a video call, the communication unit 922 acquires the multiplexed data in which the data of the image and the audio (for example, the image encoded data and the audio encoded data) are multiplexed from the demultiplexing unit 928 via the bus 933, encodes or modulates the multiplexed data to generate the transmission signal, performs frequency conversion or amplification on the transmission signal, and transmits the signal to a base station (not illustrated) via the antenna 921 based on control (a user instruction or the like input via the operation unit 932) of the control unit 931.

For example, when image data is encoded to generate an MP4 file and the MP4 file is transmitted, the MP4 processing unit 934 acquires image data from the camera unit 926, the image processing unit 927, the recording and reproduction unit 929, or the like via the bus 933 (may acquire the multiplexed data from the demultiplexing unit 928), encodes the image data to generate encoded data, further generates an MP4 file in which the encoded data is stored, and supplies the MP4 file to the communication unit 922 via the bus 933 based on control (a user instruction or the like input via the operation unit 932) of the control unit 931. The communication unit 922 encodes or modulates the supplied MP4 file to generate the transmission signal, performs frequency conversion or amplification on the transmission signal, and transmits the signal to a base station (not illustrated) via the antenna 921 based on control of the control unit 931.

As a process of the MP4 processing unit 934, the method of each embodiment described above may be applied. That is, the MP4 processing unit 934 may include the screen division processing unit 121, the image encoding unit 122, the file generation unit 123, and the server upload processing unit 126 (FIG. 12) of the delivery data generation device 101 (FIG. 11). In this case, the MP4 processing unit 934 divides and encodes an image for each tile, generates an MP4 file in which data of each tile is stored, and uploads the MP4 file to the delivery server 102. In this way, the MP4 processing unit 934 can generate the various MP4 files described above in the embodiments. That is, the mobile telephone 920 can realize the adaptive supply of the data of the partial images.

For example, when the MPD managing the information regarding the image data is generated and the MPD is transmitted, the MPEG-DASH processing unit 935 acquires the image data from the camera unit 926, the image processing unit 927, the recording and reproduction unit 929, or the like via the bus 933 (may acquire the multiplexed data from the demultiplexing unit 928), generates the MPD managing the image data, and supplies the MPD file to the communication unit 922 via the bus 933 based on control (a user instruction or the like input via the operation unit 932) of the control unit 931. The communication unit 922 encodes or modulates the supplied MPD file to generate the transmission signal, performs frequency conversion or amplification on the transmission signal, and supplies the signal to a base station (not illustrated) via the antenna 921 based on control of the control unit 931. At this time, the MPEG-DASH processing unit 935 may transmit the image data along with the MPD file via the communication unit 922.

The MPEG-DASH processing unit 935 may encode the image data to generate the MPD managing the encoded data and transmit the MPD file via the communication unit 922. Further, the MPEG-DASH processing unit 935 may transmit the encoded data along with the MPD file via the communication unit 922.

The MPEG-DASH processing unit 935 may encode the image data to generate the MP4 file in which the encoded data is stored, generate the MPD managing the MP4 file, and transmit the MPD file via the communication unit 922. Further, the MPEG-DASH processing unit 935 may transmit the MP4 file along with the MPD file via the communication unit 922.

As a process of the MPEG-DASH processing unit 935, the method of each embodiment described above may be applied. That is, the MPEG-DASH processing unit 935 may include the screen division processing unit 121 to the server upload processing unit 126 (including the tile type MPD generation unit 141 in FIG. 12) of the delivery data generation device 101 (FIG. 11). In this case, the MPEG-DASH processing unit 935 divides and encodes an image for each tile, generates the MP4 files in which the data of each tile is stored, generates the MPDs managing the MP4 files, and uploads them to the delivery server 102. In this way, the MPEG-DASH processing unit 935 can generate the various MPDs (or the MP4 files) described above in the embodiments. That is, the mobile telephone 920 can realize the adaptive supply of the data of the partial images.

For example when the image data is received in the data communication mode, the communication unit 922 receives a radio signal via the antenna 921, performs amplification or frequency conversion on the received signal to generate the received signal, demodulates or decodes the signal to generate the image encoded data, and supplies the image encoded data to the image processing unit 927 or the recording and reproduction unit 929 via the bus 933 based on control (a user instruction or the like input via the operation unit 932) of the control unit 931. For example, the image processing unit 927 decodes the supplied image encoded data and supplies the obtained image data to the display unit 930 to display the image. For example, the recording and reproduction unit 929 stores the supplied image encoded data in the storage medium.

For example, when an image and audio are received as in a video call, the communication unit 922 receives a radio signal via the antenna 921, performs amplification or frequency conversion on the radio signal to generate a received signal, and demodulates or decodes the signal to generate multiplexed data in which data of the image and the audio (for example, the image encoded data and the audio encoded data) are multiplexed based on control (a user instruction or the like input via the operation unit 932) of the control unit 931. The communication unit 922 supplies the multiplexed data to the demultiplexing unit 928 via the bus 933. For example, the demultiplexing unit 928 demultiplexes the image encoded data and the audio encoded data included in the supplied multiplexed data, supplies the image encoded data to the image processing unit 927 or the recording and reproduction unit 929 via the bus 933, and supplies the audio encoded data to the audio codec 923 via the bus 933. For example, the image processing unit 927 decodes the supplied image encoded data and supplies the obtained image data to the display unit 930 to display the image. For example, the recording and reproduction unit 929 stores the supplied image encoded data in the storage medium. For example, the audio codec 923 decodes the supplied audio encoded data and performs D-to-A conversion on the obtained audio data to generate an analog audio signal and outputs the audio of the analog audio signal from the speaker 924.

For example, when the communication unit 922 receives the MP4 file in which the encoded data of the image data is stored, the MP4 processing unit 934 acquires the MP4 file from the communication unit 922 via the bus 933, analyzes the MP4 file to extract the encoded data, further decodes the encoded data, and supplies the obtained image data to the image processing unit 927, the recording and reproduction unit 929, the display unit 930, and the like via the bus 933 based on control (a user instruction or the like input via the operation unit 932) of the control unit 931. When the multiplexed data is extracted from the MP4 file or the encoded data is decoded to obtain the multiplexed data, the MP4 processing unit 934 supplies the obtained multiplexed data to the demultiplexing unit 928.

As a process of the MP4 processing unit 934, the method of each embodiment described above may be applied. That is, the MP4 processing unit 934 may include the file acquisition unit 154, the image decoding unit 155, and the tile image combination unit 156 (FIG. 13) of the terminal device 103 (FIG. 11). In this case, the MP4 processing unit 934 acquires the MP4 file including the data of the tiles included in a desired range via the communication unit 922 and the like, extracts and decodes the encoded data of the tiles, appropriately combines the obtained image data (tile images) of the tiles to generate image data in the desired range, and supplies the image data to the image processing unit 927, the recording and reproduction unit 929, the display unit 930, and the like via the bus 933. In this way, the MP4 processing unit 934 can generate the various MP4 files described above in the embodiments. That is, the mobile telephone 920 can realize the adaptive supply of the data of the partial images.

For example, when the communication unit 922 receives the MPD file managing the information regarding the image data, the MPEG-DASH processing unit 935 acquires the MPD file from the communication unit 922 via the bus 933 and analyzes the MPD file based on control (a user instruction or the like input via the operation unit 932) of the control unit 931 to acquire desired image data based on the MPD. For example, when the MP4 file including the encoded data obtained by encoding the image data is managed by the MPD, the MPEG-DASH processing unit 935 acquires the MP4 file corresponding to a desired image via the communication unit 922 based on the MPD, decodes the encoded data included in the MP4 file, and supplies the image data obtained through the decoding to the image processing unit 927, the recording and reproduction unit 929, the display unit 930, or the like via the bus 933. When the multiplexed data is extracted from the MP4 file or the encoded data is decoded to obtain the multiplexed data, the MPEG-DASH processing unit 935 supplies the obtained multiplexed data to the demultiplexing unit 928.

As a process of the MPEG-DASH processing unit 935, the method of each embodiment described above may be applied. That is, the MPEG-DASH processing unit 935 may include the MPD acquisition unit 151 to the tile image combination unit 156 (each processing unit other than the display unit 157 in FIG. 13) of the terminal device 103 (FIG. 11). The MPEG-DASH processing unit 935 analyzes the MPD, acquires the MP4 file including the data of the tiles included in a desired range via the communication unit 922 or the like, extracts and decodes the encoded data of the tiles, appropriately combines the obtained image data (tile images) of the tiles to generate image data in the desired range, and supplies the image data to the image processing unit 927, the recording and reproduction unit 929, the display unit 930, and the like. In this way, the MPEG-DASH processing unit 935 can process the various MP4 files described in the embodiments to obtain desired image data. That is, the mobile telephone 920 can realize the adaptive supply of the data of the partial images.

Tenth Embodiment

Other Examples

Although the examples of devices, systems, and the like to which the present technology is applied have been described above, the present technology is not limited thereto, and can be implemented as any configuration mounted in the devices or devices constituting the systems, for example, processors in the form of system large scale integration (LSI), modules that use a plurality of processors, units that use a plurality of modules, sets obtained by further adding other functions to the units (i.e., a partial configuration of the devices), and the like.

<Video Set>

Figure 69:
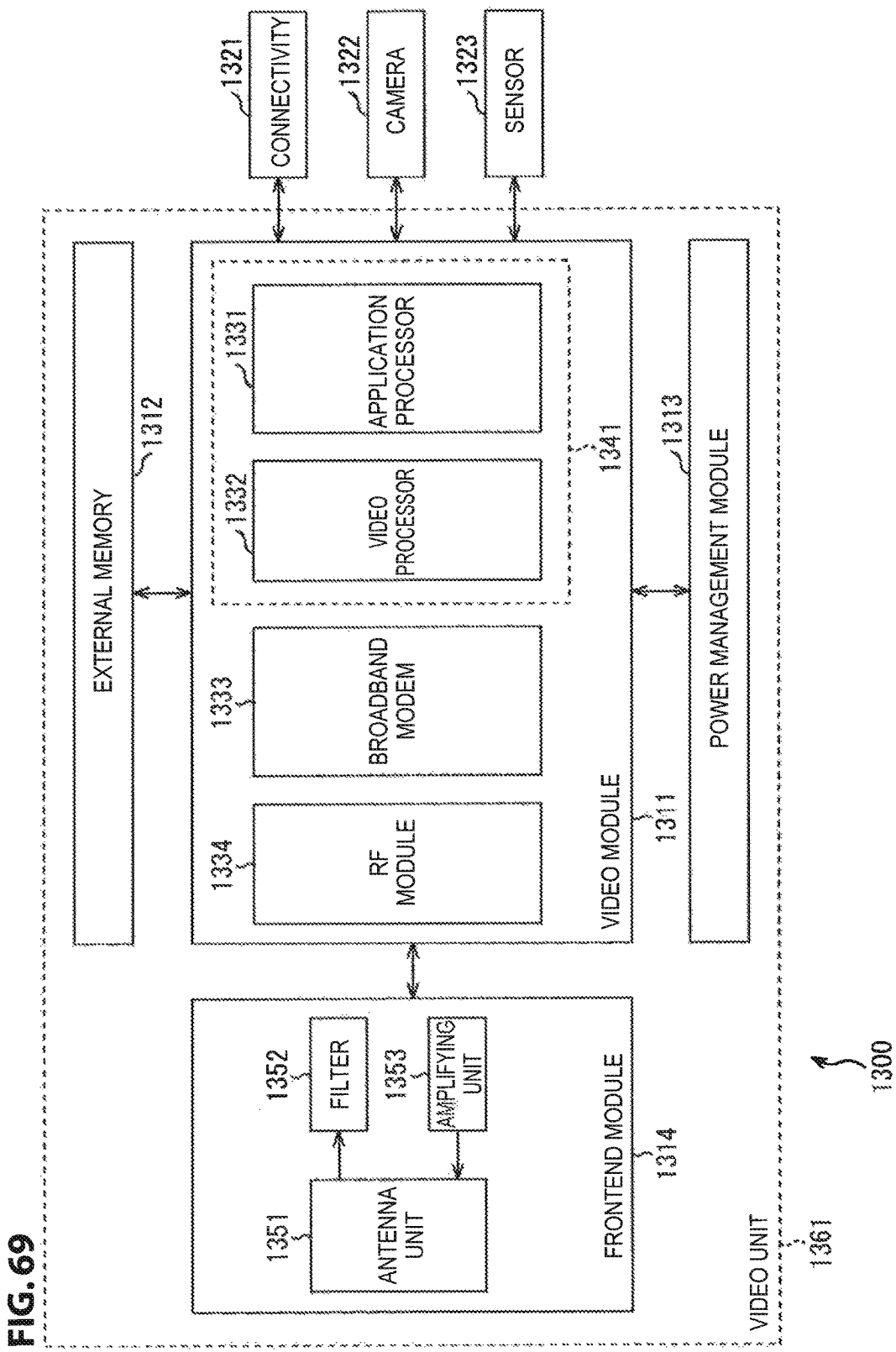
FIG. 69 is a block diagram illustrating an example of a schematic configuration of a video set.

An example in which the present technology is implemented as a set will be described with reference to FIG. 69. FIG. 69 illustrates an example of a schematic configuration of a video set to which the present disclosure is applied.

As electronic apparatuses have gradually become multifunctional in recent years, when some configurations of each apparatus are prepared for sale, provision, and the like in the stage of development and manufacturing, there are not only cases in which such an apparatus is configured to have one function, but also many cases in which a plurality of configurations having relevant functions are combined and implemented as one set with the plurality of functions.

The video set 1300 illustrated in FIG. 69 is configured to be multifunctional as described above by combining devices having functions of encoding and decoding (which may have either or both of the functions) of images with devices having other functions relating to the foregoing functions.

As illustrated in FIG. 69, the video set 1300 has a module group including a video module 1311, an external memory 1312, a power management module 1313, a frontend module 1314 and the like, and devices having relevant functions such as connectivity 1321, a camera 1322, a sensor 1323, and the like.

A module is a form of a component in which several related componential functions are gathered to provide a cohesive function. A specific physical configuration is arbitrary; however, it is considered to be an integration in which, for example, a plurality of processors each having functions, electronic circuit elements such as a resistor and a capacitor, and other devices are disposed on a circuit board. In addition, making a new module by combining a module with another module, a processor, or the like is also considered.

In the example of FIG. 69, the video module 1311 is a combination of configurations with functions relating to image processing, and has an application processor, a video processor, a broadband modem 1333, and an RF module 1334.

A processor is a semiconductor chip integrated with a configuration having predetermined functions using System-On-Chip (SoC), and is also referred to as, for example, system large scale integration (LSI), or the like. The configuration having a predetermined function may be a logic circuit (hardware configuration), may be, along with CPU, a ROM, and a RAM, a program that is executed by using the elements (software configuration), or may be a combination of both configurations. For example, a processor may have a logic circuit, a CPU, a ROM, a RAM, and the like and may realize some functions with the logic circuit (hardware configuration), or may realize the other functions with a program executed by the CPU (software configuration).

The application processor 1331 of FIG. 69 is a processor that executes an application relating to image processing. The application executed by the application processor 1331 can not only perform an arithmetic process but can also control a configuration internal and external to the video module 1311, for example, the video processor 1332 when necessary in order to realize predetermined functions.

The video processor 1332 is a processor having a function relating to (one or both of) encoding and decoding of images.

The broadband modem 1333 is a processor (or a module) which performs a process relating to wired or wireless (or both) broadband communication performed through a broadband line such as the Internet or a public telephone line network. For example, the broadband modem 1333 converts data (a digital signal) to be transmitted into an analog signal by performing digital modulation or the like, or converts a received analog signal into data (a digital signal) by performing demodulation. For example, the broadband modem 1333 can digitally modulate/demodulate arbitrary information such as image data to be processed by the video processor 1332, a stream obtained by encoding image data, an application program, or setting data.

The RF module 1334 is a module which performs frequency conversion, modulation and demodulation, amplification, a filtering process, and the like on a radio frequency (RF) signal transmitted and received via an antenna. For example, the RF module 1334 generates an RF signal by performing frequency conversion and the like on a baseband signal generated by the broadband modem 1333. In addition, the RF module 1334, for example, generates a baseband signal by performing frequency conversion and the like on an RF signal received via the frontend module 1314.

Note that, as indicated by the dashed line 1341 in FIG. 69, the application processor 1331 and the video processor 1332 may be integrated to constitute one processor.

The external memory 1312 is a module that is provided outside the video module 1311, having a storage device used by the video module 1311. The storage device of the external memory 1312 may be realized with any physical configuration, but is generally used when large amounts of data such as image data in units of frames are stored, and thus it is desirable to realize the storage device with a relatively inexpensive and high-capacity semiconductor memory, for example, a dynamic random access memory (DRAM).

The power management module 1313 manages and controls power supply to the video module 1311 (each constituent element inside the video module 1311).

The frontend module 1314 is a module which provides the RF module 1334 with a frontend function (serving as a circuit of a transmitting and receiving end on an antenna side). The frontend module 1314 has, for example, an antenna unit 1351, a filter 1352, and an amplifying unit 1353 as illustrated in FIG. 38.

The antenna unit 1351 is configured with an antenna which transmits and receives wireless signals and peripherals thereof. The antenna unit 1351 transmits a signal supplied from the amplifying unit 1353 as a radio signal and supplies a received radio signal to the filter 1352 as an electric signal (RF signal). The filter 1352 performs a filtering process or the like on the RF signal received via the antenna unit 1351 and supplies the processed RF signal to the RF module 1334. The amplifying unit 1353 amplifies an RF signal supplied from the RF module 1334, and supplies the signal to the antenna unit 1351.

The connectivity 1321 is a module having a function relating to connection to the outside. A physical configuration of the connectivity 1321 is arbitrary. The connectivity 1321 has, for example, a configuration with a communication function other than that of a communication standard to which the broadband modem 1333 corresponds, an external input and output terminal, or the like.

For example, the connectivity 1321 may have a communicating function that is based on a wireless communication standard such as Bluetooth (a registered trademark), IEEE 802.11 (for example, Wireless Fidelity (Wi-Fi; a registered trademark), near field communication (NFC), or Infrared Data Association (IrDA), an antenna which transmits and receives signals based on the standard, or the like. In addition, the connectivity 1321 may have, for example, a module having a communicating function based on a wired communication standard such as Universal Serial Bus (USB), or High-Definition Multimedia Interface (HDMI; a registered trademark), or a terminal based on the standard. Furthermore, the connectivity 1321 may have, for example, another data (signal) transmitting function of an analog input and output terminal or the like.

Note that the connectivity 1321 may be set to include a device serving as a data (signal) transmission destination. For example, the connectivity 1321 may be set to have a drive (including a drive not only of a removable medium but also of a hard disk, a solid-state drive (SSD), a network-attached storage (NAS), or the like) which reads and writes data with respect to a recording medium such as a magnetic disk, an optical disc, a magneto-optical disc, or a semiconductor memory. In addition, the connectivity 1321 may be set to have an image or audio output device (a monitor, a speaker, or the like).

The camera 1322 is a module having a function of capturing a subject and obtaining image data of the subject. Image data obtained from capturing by the camera 1322 is, for example, supplied to and encoded by the video processor 1332.

The sensor 1323 is a module having arbitrary sensing functions of, for example, a sound sensor, an ultrasound sensor, a light sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, a temperature sensor, and the like. Data detected by the sensor 1323 is, for example, supplied to the application processor 1331 and used by an application or the like.

The configurations described as modules above may be realized as processors, or conversely the configurations described as processors may be realized as modules.

In the video set 1300 with the configuration described above, the present technology can be applied to the video processor 1332 as will be described below. Thus, the video set 1300 can be implemented as a set to which the present technology is applied.

For example, the video processor 1332 may perform a process related to the MP4 file or a process related to generation or reproduction of the delivery data or the control information delivered in the method which is based on the MPEG-DASH standard. The details of the video processor 1332 will be described below.

The application processor 1331 may execute an application to perform a process related to the MP4 file or the process related to generation or reproduction of the delivery data or the control information delivered in the method which is based on the MPEG-DASH standard. As a process of the application processor 1331, the method of each embodiment described above may be applied.

That is, for example, the application processor 1331 may execute an application to have the functions of the screen division processing unit 121 to the server upload processing unit 126 (including the tile type MPD generation unit 141 in FIG. 12) of the delivery data generation device 101 (FIG. 11). In this case, the application processor 1331 divides and encodes an image for each tile, generates the MP4 files in which the data of each tile is stored, and uploads the MP4 files to the delivery server 102. The application processor 1331 can also generate the MPD managing the generated MP4 file and upload them to the delivery server 102. In this way, the application processor 1331 can generate the various MPDs or MP4 files described above in the embodiments. That is, the video set 1300 can realize the adaptive supply of the data of the partial images.

For example, the application processor 1331 may execute an application to have the functions of the MPD acquisition unit 151 to the tile image combination unit 156 (each processing unit other than the display unit 157 in FIG. 13) of the terminal device 103 (FIG. 11). In this case, based on a user instruction or the like, the application processor 1331 can acquire the MP4 file including the data of the tiles included in a desired range, extract and decode the encoded data of the tiles, and appropriately combine the obtained image data (tile images) of the tiles to generate image data in the desired range. The application processor 1331 can also acquire the MPD, analyze the acquired MPD, acquire the MP4 file including the data of the tiles included in a desired range based on the analysis result, extract and decode the encoded data of the tiles, and appropriately combine the obtained image data (tile images) of the tiles to generate image data in the desired range. In this way, the application processor 1331 can process the various MPDs or the MP4 files described above in the embodiments to obtain the desired image data. That is, the video set 1300 can realize the adaptive supply of the data of the partial images.

<Example of a Configuration of a Video Processor>

Figure 70:
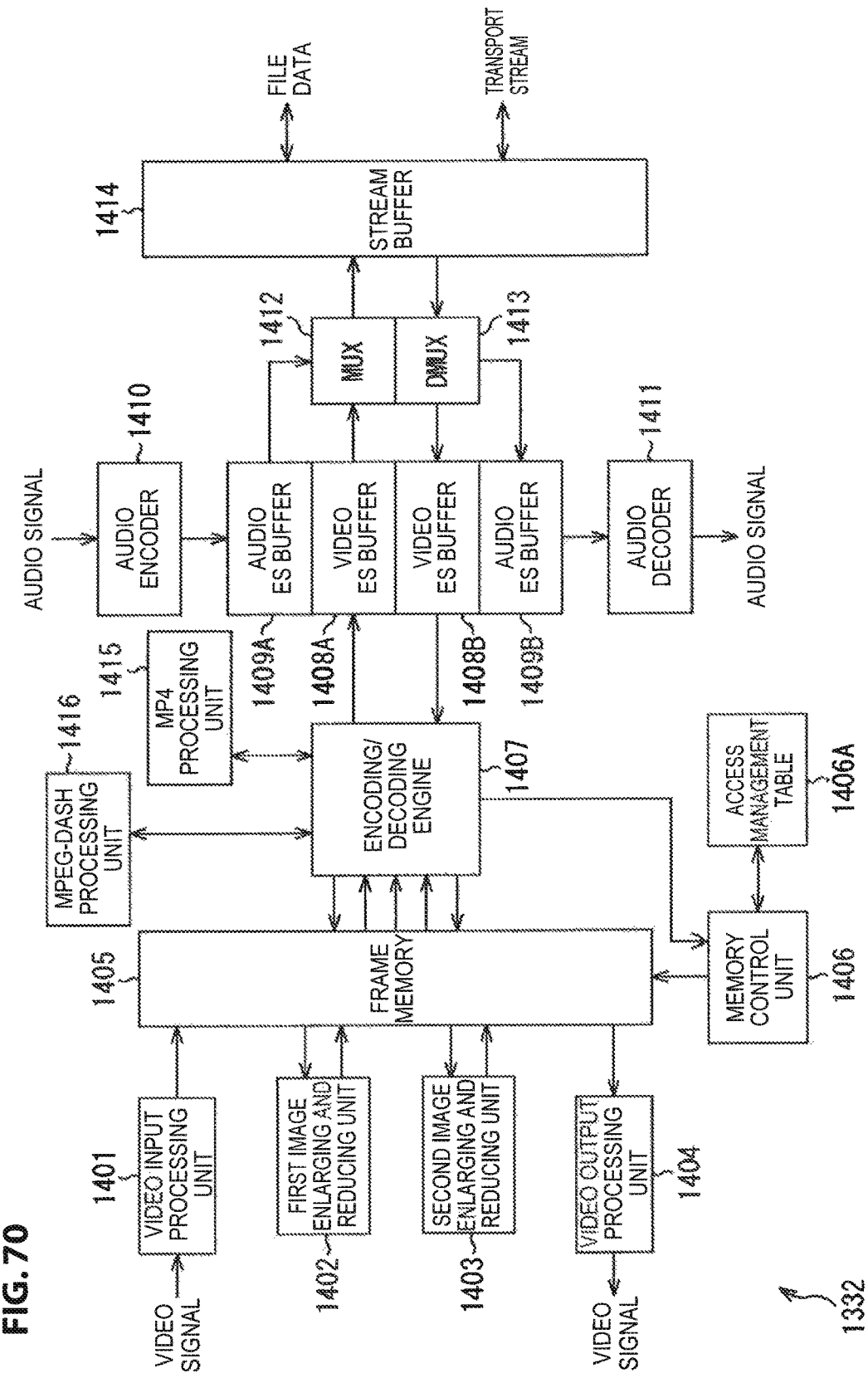
FIG. 70 is a block diagram illustrating an example of a schematic configuration of a video processor.

FIG. 70 illustrates an example of a schematic configuration of the video processor 1332 (of FIG. 69) to which the present disclosure is applied.

As illustrated in FIG. 70, the video processor 1332 has a video input processing unit 1401, a first image enlarging and reducing unit 1402, a second image enlarging and reducing unit 1403, a video output processing unit 1404, a frame memory 1405, and a memory control unit 1406. In addition, the video processor 1332 has an encoding/decoding engine 1407, video elementary stream (ES) buffers 1408A and 1408B, and audio ES buffers 1409A and 1409B. Furthermore, the video processor 1332 has an audio encoder 1410, an audio decoder 1411, a multiplexer (MUX) 1412, a demultiplexer (DMUX) 1413, and a stream buffer 1414. Further, the video processor 1332 includes an MP4 processing unit 1415 and an MPEG-DASH processing unit 1416.

The video input processing unit 1401 acquires a video signal input from, for example, the connectivity 1321, and converts the signal into digital image data. The first image enlarging and reducing unit 1402 performs format conversion, an image enlarging or reducing process or the like on image data. The second image enlarging and reducing unit 1403 performs an image enlarging or reducing process on the image data according to the format of a destination to which the data is output via the video output processing unit 1404, or performs format conversion, an image enlarging or reducing process or the like in the same manner as the first image enlarging and reducing unit 1402. The video output processing unit 1404 performs format conversion, conversion into an analog signal, or the like on image data, and outputs the data to, for example, the connectivity 1321 as a reproduced video signal.

The frame memory 1405 is a memory for image data shared by the video input processing unit 1401, the first image enlarging and reducing unit 1402, the second image enlarging and reducing unit 1403, the video output processing unit 1404, and the encoding/decoding engine 1407. The frame memory 1405 is realized as a semiconductor memory, for example, a DRAM, or the like.

The memory control unit 1406 receives a synchronization signal from the encoding/decoding engine 1407 and controls access to the frame memory 1405 for writing and reading according to an access schedule to the frame memory 1405 which is written in an access management table 1406A. The access management table 1406A is updated by the memory control unit 1406 according to processes executed in the encoding/decoding engine 1407, the first image enlarging and reducing unit 1402, the second image enlarging and reducing unit 1403, and the like.

The encoding/decoding engine 1407 performs an encoding process of image data and a decoding process of a video stream that is data obtained by encoding image data. For example, the encoding/decoding engine 1407 encodes image data read from the frame memory 1405, and sequentially writes the data in the video ES buffer 1408A as video streams. In addition, for example, the encoding/decoding engine 1407 sequentially reads video streams from the video ES buffer 1408B, and sequentially writes the data in the frame memory 1405 as image data. The encoding/decoding engine 1407 uses the frame memory 1405 as a work area for such encoding and decoding. In addition, the encoding/decoding engine 1407 outputs a synchronization signal to the memory control unit 1406 at a timing at which, for example, a process on each micro block is started. Further, the encoding/decoding engine 1407 performs encoding of the image data or decoding of the encoded data obtained by encoding the image data using the MP4 processing unit 1415 or the MPEG-DASH processing unit 1416, as necessary.

The video ES buffer 1408A buffers a video stream generated by the encoding/decoding engine 1407 and supplies the stream to the multiplexer (MUX) 1412. The video ES buffer 1408B buffers a video stream supplied from the demultiplexer (DMUX) 1413 and supplies the stream to the encoding/decoding engine 1407.

The audio ES buffer 1409A buffers an audio stream generated by an audio encoder 1410 and supplies the stream to the multiplexer (MUX) 1412. The audio ES buffer 1409B buffers an audio stream supplied from the demultiplexer (DMUX) 1413 and supplies the stream to an audio decoder 1411.

The audio encoder 1410, for example, digitally converts an audio signal input from, for example, the connectivity 1321 or the like, and encodes the signal in a predetermined scheme, for example, an MPEG audio scheme, an Audio-Code number 3 (AC3) scheme, or the like. The audio encoder 1410 sequentially writes audio streams that are data obtained by encoding audio signals in the audio ES buffer 1409A. The audio decoder 1411 decodes an audio stream supplied from the audio ES buffer 1409B, performs conversion into an analog signal, for example, and supplies the signal to, for example, the connectivity 1321 or the like as a reproduced audio signal.

The multiplexer (MUX) 1412 multiplexes a video stream and an audio stream. A method for this multiplexing (i.e., a format of a bit stream generated from multiplexing) is arbitrary. In addition, during multiplexing, the multiplexer (MUX) 1412 can also add predetermined header information or the like to a bit stream. That is to say, the multiplexer (MUX) 1412 can convert the format of a stream through multiplexing. By multiplexing a video stream and an audio stream, for example, the multiplexer (MUX) 1412 converts the streams into a transport stream that is a bit stream of a format for transport. In addition, by multiplexing a video stream and an audio stream, for example, the multiplexer (MUX) 1412 converts the streams into data of a file format for recording (file data).

The demultiplexer (DMUX) 1413 demultiplexes a bit stream obtained by multiplexing a video stream and an audio stream using a method which corresponds to the multiplexing performed by the multiplexer (MUX) 1412. That is to say, the demultiplexer (DMUX) 1413 extracts a video stream and an audio stream from a bit stream read from the stream buffer 1414 (separates the bit stream into the video stream and the audio stream). The demultiplexer (DMUX) 1413 can convert the format of a stream through demultiplexing (inverse conversion to conversion by the multiplexer (MUX) 1412). For example, the demultiplexer (DMUX) 1413 can acquire a transport stream supplied from, for example, the connectivity 1321, the broadband modem 1333, or the like via the stream buffer 1414, and convert the stream into a video stream and an audio stream through demultiplexing. In addition, for example, the demultiplexer (DMUX) 1413 can acquire file data read from various recording media by, for example, the connectivity 1321 via the stream buffer 1414, and convert the data into a video stream and an audio stream through demultiplexing.

The stream buffer 1414 buffers bit streams. For example, the stream buffer 1414 buffers a transport stream supplied from the multiplexer (MUX) 1412, and supplies the stream to, for example, the connectivity 1321, the broadband modem 1333, or the like at a predetermined timing or based on a request from outside or the like.

In addition, for example, the stream buffer 1414 buffers file data supplied from the multiplexer (MUX) 1412, and supplies the data to, for example, the connectivity 1321 or the like at a predetermined timing or based on a request from outside or the like to cause the data to be recorded on any of various kinds of recording media.

Furthermore, the stream buffer 1414 buffers a transport stream acquired via, for example, the connectivity 1321, the broadband modem 1333, or the like, and supplies the stream to the demultiplexer (DMUX) 1413 at a predetermined timing or based on a request from outside or the like.

In addition, the stream buffer 1414 buffers file data read from any of various kinds of recording media via, for example, the connectivity 1321 or the like, and supplies the data to the demultiplexer (DMUX) 1413 at a predetermined timing or based on a request from outside or the like.

The MP4 processing unit 1415 performs a process related to the MP4 file, such as generation or reproduction of the MP4 file. The MPEG-DASH processing unit 1416 performs a process related to generation or reproduction of the delivery data delivered in a method which is based on the MPEG-DASH standard or the control information, such as generation or reproduction of the MPD or the MP4 file.

Next, an example of an operation of the video processor 1332 having this configuration will be described. For example, a video signal input to the video processor 1332 from the connectivity 1321 or the like is converted into digital image data in a predetermined format such as a YCbCr format of 4:2:2 of in the video input processing unit 1401, and sequentially written in the frame memory 1405. This digital image data is read by the first image enlarging and reducing unit 1402 or the second image enlarging and reducing unit 1403, undergoes format conversion and an enlarging or reducing process in a predetermined format such as a YCbCr format of 4:2:0, and then is written in the frame memory 1405 again. This image data is encoded by the encoding/decoding engine 1407, and written in the video ES buffer 1408A as a video stream.

In addition, an audio signal input to the video processor 1332 from the connectivity 1321 is encoded by the audio encoder 1410, and then written in the audio ES buffer 1409A as an audio stream.

The video stream of the video ES buffer 1408A and the audio stream of the audio ES buffer 1409A are read and multiplexed by the multiplexer (MUX) 1412 to be converted into a transport stream, file data, or the like. The transport stream generated by the multiplexer (MUX) 1412 is buffered in the stream buffer 1414, and then output to an external network via, for example, the connectivity 1321, the broadband modem 1333, or the like. In addition, the file data generated by the multiplexer (MUX) 1412 is buffered in the stream buffer 1414, and output to, for example, the connectivity 1321 (of FIG. 29) to be recorded in any of various kinds of recording media.

In addition, a transport stream input to the video processor 1332 from an external network via, for example, the connectivity 1321, the broadband modem 1333, or the like is buffered in the stream buffer 1414, and then demultiplexed by the demultiplexer (DMUX) 1413. In addition, for example, file data read from any of various kinds of recording media via the connectivity 1321 and input to the video processor 1332 is buffered in the stream buffer 1414, and then demultiplexed by the demultiplexer (DMUX) 1413. That is to say, the transport stream or the file data input to the video processor 1332 is separated into a video stream and an audio stream by the demultiplexer (DMUX) 1413.

The audio stream is supplied to the audio decoder 1411 via the audio ES buffer 1409B to be decoded, and an audio signal is reproduced. In addition, the video stream is written in the video ES buffer 1408B, then sequentially read by the encoding/decoding engine 1407 to be decoded, and written in the frame memory 1405. The decoded image data undergoes an enlarging and reducing process by the second image enlarging and reducing unit 1403, and is written in the frame memory 1405. Then, the decoded image data is read by the video output processing unit 1404, undergoes format conversion in a predetermined format such as the YCbCr format of 4:2:2, and is further converted into an analog signal, and a video signal is reproduced to be output.

The MP4 processing unit 1415 acquires the image data stored in, for example, the frame memory 1405 via the encoding/decoding engine 1407, encodes the image data to generate the encoded data, and further generates the MP4 file in which the encoded data is stored. The MP4 processing unit 1415 supplies the generated MP4 file to the encoding/ decoding engine 1407. The encoding/decoding engine 1407 outputs the supplied MP4 file to the outside of the video processor 1332 via, for example, the video ES buffer 1408A, the multiplexing unit (MUX) 1412, the stream buffer 1414, and the like and outputs the MP4 file to an external network via the connectivity 1321, the broadband modem 1333, or the like.

For example, the MP4 processing unit 1415 acquires, via the encoding/decoding engine 1407, the MP4 file acquired from an external network via the connectivity 1321, the broadband modem 1333, or the like and stored in the video ES buffer 1408B, analyzes the MP4 file to extract the encoded data, and further decodes the encoded data. The MP4 processing unit 1415 supplies the obtained image data to the encoding/decoding engine 1407. The encoding/decoding engine 1407 supplies the supplied image data to the video output processing unit 1404 via the frame memory 1405 and outputs the image data as a video signal to the outside of the video processor 1332.

As a process of the MP4 processing unit 1415, the method of each embodiment described above may be applied. That is, the MP4 processing unit 1415 may include the screen division processing unit 121, the image encoding unit 122, the file generation unit 123, and the server upload processing unit 126 (FIG. 12) of the delivery data generation device 101 (FIG. 11). In this case, the MP4 processing unit 1415 divides and encodes an image for each tile, generates the MP4 files in which the data of each tile is stored, and uploads the MP4 files to the delivery server 102 via the connectivity 1321 or the like. In this way, the MP4 processing unit 1415 can generate the various MP4 files described above in the embodiments.

The MP4 processing unit 1415 may include the file acquisition unit 154, the image decoding unit 155, the tile image combination unit 156 (FIG. 13) of the terminal device 103 (FIG. 11). In this case, the MP4 processing unit 1415 downloads the MP4 file including the data of the tiles included in a desired range from the delivery server 102 via the connectivity 1321 or the like, extracts and decodes the encoded data of the tiles from the MP4 file, appropriately combines the obtained image data (tile images) of the tiles to generate image data in the desired range, and outputs the image data as a video signal to the outside of the video processor 1332. In this way, the MP4 processing unit 1415 can process the various MP4 files described above in the embodiments to obtain desired image data.

That is, the video processor 1332 (that is, the video set 1300) can realize the adaptive supply of the data of the partial images.

For example, the MPEG-DASH processing unit 1416 acquires the image data stored in the frame memory 1405 via the encoding/decoding engine 1407, generates the MPD managing the image data, and supplies the MPD file to the encoding/decoding engine 1407. For example, the encoding/decoding engine 1407 outputs the supplied MPD file to the outside of the video processor 1332 via the video ES buffer 1408A, the multiplexing unit (MUX) 1412, the stream buffer 1414, and the like and outputs the MPD file to an external network via the connectivity 1321, the broadband modem 1333, or the like.

The MPEG-DASH processing unit 1416 may encode the image data to generate the MP4 file in which the encoded data is stored and to generate the MPD managing the MP4 file and output the MPD file to an external network. The MPEG-DASH processing unit 1416 may output the MP4 file along with the MPD file to an external network.

For example, the MPEG-DASH processing unit 1416 acquires, via the encoding/decoding engine 1407, the MPD file acquired from an external network via the connectivity 1321, the broadband modem 1333, or the like and stored in the video ES buffer 1408B, analyzes the MPD file, and acquires desired image data based on the MPD. For example, when the MP4 file including the encoded data obtained by encoding the image data is managed by the MPD, the MPEG-DASH processing unit 1416 acquires the MP4 file corresponding to a desired image based on the MPD from an external network, decodes the encoded data included in the MP4 file, and supplies the image data obtained through the decoding to the encoding/decoding engine 1407. The encoding/decoding engine 1407 supplies the supplied image data to the video output processing unit 1404 via the frame memory 1405 and outputs the image data as a video signal to the outside of the video processor 1332.

As a process of the MPEG-DASH processing unit 1416, the method of each embodiment described above may be applied. That is, the MPEG-DASH processing unit 1416 may include the screen division processing unit 121 to the server upload processing unit 126 (including the tile type MPD generation unit 141 in FIG. 12) of the delivery data generation device 101 (FIG. 11). In this case, the MPEG-DASH processing unit 1416 divides and encodes an image for each tile, generates the MP4 files in which the data of each tile is stored, generates the MPDs managing the MP4 file, and uploads them to the delivery server 102 via the connectivity 1321 or the like. In this way, the MPEG-DASH processing unit 1416 can generate the various MPDs described in the embodiments.

The MPEG-DASH processing unit 1416 may include the MPD acquisition unit 151 to the tile image combination unit 156 (each processing unit other than the display unit 157 in FIG. 13) of the terminal device 103 (FIG. 11). In this case, the MPEG-DASH processing unit 1416 analyzes the MPD, downloads the MP4 file including the data of the tiles included in a desired range from the delivery server 102 via the connectivity 1321 or the like, extracts and decodes the encoded data of the tiles from the MP4 file, appropriately combines the obtained image data (tile images) of the tiles to generate image data in the desired range, and outputs the image data as a video signal to the outside of the video processor 1332. In this way, the MPEG-DASH processing unit 1416 can process the various MPDs described above in the embodiments to obtain desired image data.

That is, the video processor 1332 (that is, the video set 1300) can realize the adaptive supply of the data of the partial images.

In the MP4 processing unit 1415 and the MPEG-DASH processing unit 1416, the present technology (the function of the delivery data generation device 101 or the terminal device 103 described above) may be realized by hardware such as a logic circuit, may be realized by software such as an embedded program, or may be realized by both.

<Other Example of a Configuration of a Video Processor>

Figure 71:
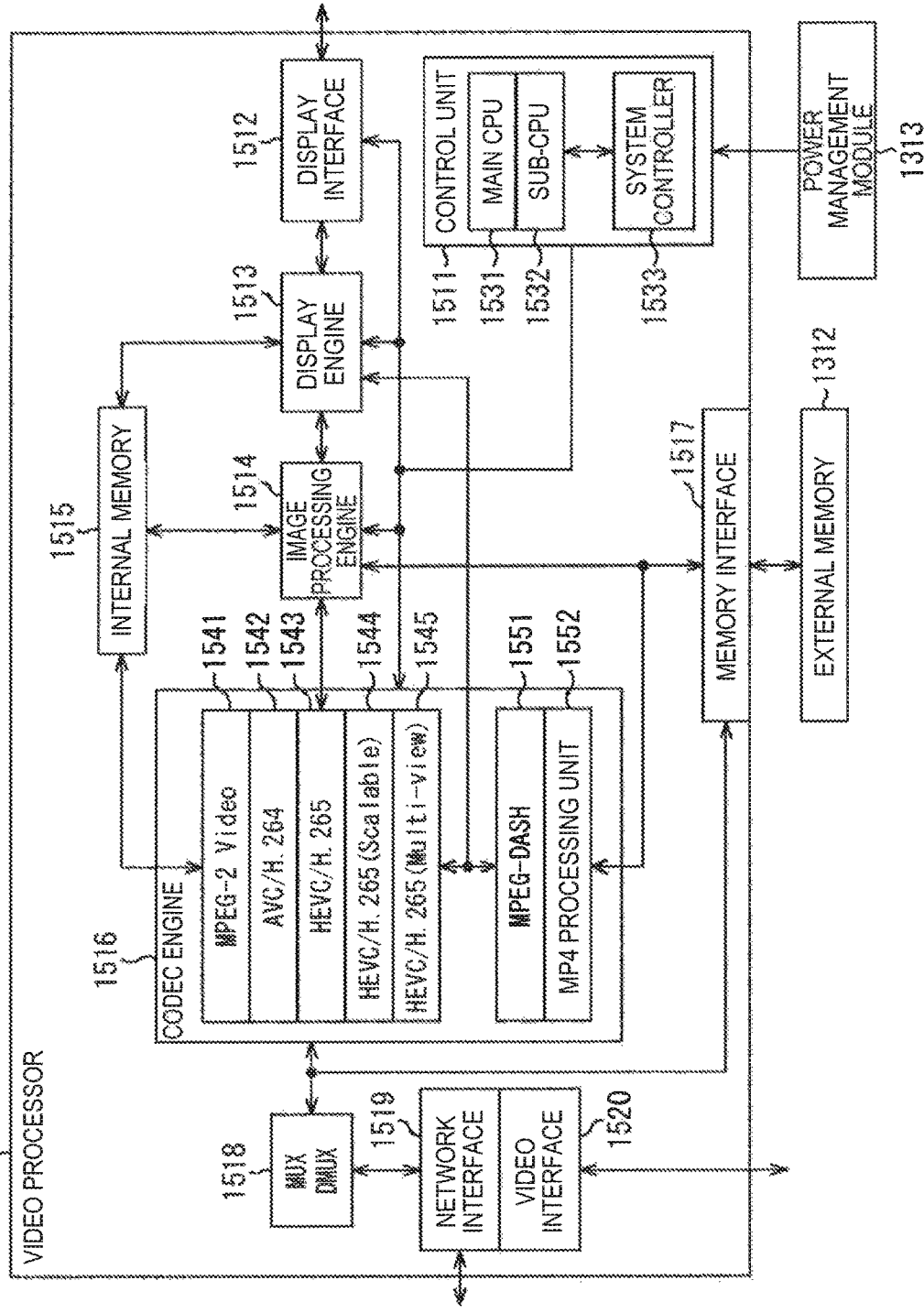
FIG. 71 is a block diagram illustrating another example of the schematic configuration of the video processor.

FIG. 71 illustrates another example of a schematic configuration of the video processor 1332 to which the present disclosure is applied. In the case of the example of FIG. 71, the video processor 1332 has functions of encoding and decoding video data in a predetermined scheme.

More specifically, as illustrated in FIG. 71, the video processor 1332 includes a control unit 1511, a display interface 1512, a display engine 1513, an image processing engine 1514, and an internal memory 1515. The video processor 1332 includes a codec engine 1516, a memory interface 1517, a multiplexing and demultiplexing unit (MUX DMUX) 1518, a network interface 1519, and a video interface 1520.

The control unit 1511 controls an operation of each processing unit in the video processor 1332, such as the display interface 1512, the display engine 1513, the image processing engine 1514, and the codec engine 1516.

As illustrated in FIG. 71, for example, the control unit 1511 includes a main CPU 1531, a sub-CPU 1532, and a system controller 1533. The main CPU 1531 executes a program or the like to control an operation of each processing unit in the video processor 1332. The main CPU 1531 generates a control signal according to the program or the like and supplies the control signal to each processing unit (that is, controls the operation of each processing unit). The sub-CPU 1532 serves as an auxiliary role of the main CPU 1531. For example, the sub-CPU 1532 executes an offspring process or a sub-routine of a program or the like executed by the main CPU 1531. The system controller 1533 controls operations of the main CPU 1531 and the sub-CPU 1532, for example, designates programs executed by the main CPU 1531 and the sub-CPU 1532.

The display interface 1512 outputs the image data to, for example, the connectivity 1321 under the control of the control unit 1511. For example, the display interface 1512 converts the image data of digital data into an analog signal and outputs the image data as the reproduced video signal or the image data of the digital data to a monitor device or the like of the connectivity 1321.

The display engine 1513 performs various conversion processes such as format conversion, size conversion, and color gamut conversion on the image data to match a hardware specification of the monitor device or the like displaying the image under the control of the control unit 1511.

The image processing engine 1514 performs predetermined image processing such as filter processing on the image data, for example, to improve image quality under the control of the control unit 1511.

The internal memory 1515 is a memory shared by the display engine 1513, the image processing engine 1514, and the codec engine 1516 and provided inside the video processor 1332. For example, the internal memory 1515 is used to transmit and receive data among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516, as necessary (for example, according to a request). The internal memory 1515 may be realized by any storage device, but the internal memory 1515 is generally used to store data with a small capacity such as parameters or image data in units of blocks in many cases. Therefore, the internal memory 1515 is preferably realized by, for example, a semiconductor memory with a relatively small capacity (compared to, for example, the external memory 1312) and a fast response speed, such as a static random access memory (SRAM).

The codec engine 1516 performs a process related to encoding or decoding of the image data. Any encoding and decoding schemes to which the codec engine 1516 corresponds can be used, and the number of schemes may be singular or plural. For example, the codec engine 1516 may include codec functions of a plurality of encoding and decoding schemes, and may encode the image data using the codec function selected therefrom and decode the encoded data.

In the example illustrated in FIG. 71, as functional blocks of processes related to the codec, the codec engine 1516 includes, for example, an MPEG-2 video 1541, an AVC/H.264 1542, an HEVC/H.265 1543, an HEVC/H.265 (scalable) 1544, and an HEVC/H.265 (multi-view) 1545 and includes an MPEG-DASH 1551 and an MP4 processing unit 1552.

The MPEG-2 video 1541 is a functional block that encodes or decodes the image data in an MPEG-2 scheme. The AVC/H.264 1542 is a functional block that encodes or decodes the image data in an AVC scheme. The HEVC/H.265 1543 is a functional block that encodes or decodes the image data in an HEVC scheme. The HEVC/H.265 (scalable) 1544 is a functional block that performs scalable encoding or scalable decoding on the image data in an HEVC scheme. The HEVC/H.265 (multi-view) 1545 is a functional block that performs multi-view encoding or multi-view decoding on the image data in an HEVC scheme.

The MPEG-DASH 1551 performs processes related to generation or reproduction of the delivery data or the control information delivered in a method which is based on the MPEG-DASH standard, such as generation or reproduction of the MPD or the MP4 file. The MP4 processing unit 1552 performs a process related to the MP4 file, such as generation or reproduction of the MP4 file. When the MPEG-DASH 1551 and the MP4 processing unit 1552 perform encoding and decoding of the image data, the MPEG-DASH 1551 and the MP4 processing unit 1552 use the MPEG-2 video 1541 to the HEVC/H.265 (multi-view) 1545 described above.

The memory interface 1517 is an interface for the external memory 1312. The data supplied from the image processing engine 1514 or the codec engine 1516 is supplied to the external memory 1312 via the memory interface 1517. The data read from the external memory 1312 is supplied to the video processor 1332 (the image processing engine 1514 or the codec engine 1516) via the memory interface 1517.

The multiplexing and demultiplexing unit (MUX DMUX) 1518 multiplexes or demultiplexes various kinds of data related to images such as image data, video signals, bit streams of encoded data. Any multiplexing and demultiplexing methods can be used. For example, at the time of multiplexing, the multiplexing and demultiplexing unit (MUX DMUX) 1518 can collect a plurality of pieces of data into one piece of data and can also add predetermined header information or the like to the data. At the time of demultiplexing, the multiplexing and demultiplexing unit (MUX DMUX) 1518 divides one piece of data into a plurality of pieces of data and can also add predetermined header information or the like to each of the pieces of divided data. That is, the multiplexing and demultiplexing unit (MUX DMUX) 1518 can convert the format of the data through the multiplexing and the demultiplexing. For example, the multiplexing and demultiplexing unit (MUX DMUX) 1518 can convert data into a transport stream which is a bit stream with a transmission format or data (file data) with a file format for recording by multiplexing the bit stream. Of course, the reverse conversion can also be performed through the demultiplexing.

The network interface 1519 is, for example, an interface for the broadband modem 1333, the connectivity 1321, or the like. The video interface 1520 is, for example, an interface for the connectivity 1321, the camera 1322, or the like.

Next, an example of an operation of the video processor 1332 will be described. For example, when the transport stream is received from an external network via the connectivity 1321, the broadband modem 1333, or the like, the transport stream is supplied to the multiplexing and demultiplexing unit (MUX DMUX) 1518 via the network interface 1519 to be demultiplexed, and then is decoded by the codec engine 1516. For example, the image data obtained through the decoding of the codec engine 1516 is subjected to predetermined image processing by the image processing engine 1514, is subjected to predetermined conversion by the display engine 1513, and is supplied to, for example, the connectivity 1321 via the display interface 1512, and then the image is displayed on a monitor. For example, the image data obtained through the decoding of the codec engine 1516 is re-encoded by the codec engine 1516, is multiplexed by the multiplexing and demultiplexing unit (MUX DMUX) 1518 to be converted into file data, is output to, for example, the connectivity 1321 via the video interface 1520, and is recorded in various recording media.

Further, for example, the file data of the encoded data read from a recording medium (not illustrated) by the connectivity 1321 or the like and obtained by encoding the image data is supplied to the multiplexing and demultiplexing unit (MUX DMUX) 1518 via the video interface 1520 to be demultiplexed, and then is decoded by the codec engine 1516. The image data obtained through the decoding of the codec engine 1516 is subjected to predetermined image processing by the image processing engine 1514, is subjected to predetermined conversion by the display engine 1513, and is supplied to, for example, the connectivity 1321 via the display interface 1512, and then the image is displayed on a monitor. For example, the image data obtained through the decoding of the codec engine 1516 is re-encoded by the codec engine 1516, is multiplexed by the multiplexing and demultiplexing unit (MUX DMUX) 1518 to be converted into a transport stream, is supplied to, for example, the connectivity 1321 or the broadband modem 1333 via the network interface 1519, and is transmitted to another device (not illustrated).

Transmission and reception of the image data or other data between the processing units in the video processor 1332 are performed using, for example, the internal memory 1515 or the external memory 1312. The power management module 1313 controls power supply to, for example, the control unit 1511.

The MP4 processing unit 1552 of the codec engine 1516 acquires the image data read from, for example, the external memory 1312, encodes the image data using any of the MPEG-2 video 1541 to the HEVC/H.265 (multi-view) 1545 to generate the encoded data, and further generates the MP4 file in which the encoded data is stored. The MP4 processing unit 1552 supplies the generated MP4 file to the external memory 1312 via, for example, the memory interface 1517 to store the MP4 file. For example, the MP4 file is read by the memory interface 1517, is output to the outside of the video processor 1332 via the multiplexing and demultiplexing unit (MUX DMUX) 1518 or the network interface 1519, and is output to an external network via the connectivity 1321, the broadband modem 1333, or the like.

For example, the MP4 processing unit 1552 acquires, via the memory interface 1517, the MP4 file acquired from an external network via the connectivity 1321, the broadband modem 1333, or the like, supplied to the external memory 1312 via the network interface 1519, the multiplexing and demultiplexing unit (MUX DMUX) 1518, the memory interface 1517, and the like, and stored. The MP4 processing unit 1552 analyzes the acquired MP4 file, extracts the encoded data, and further decodes the encoded data using any of the MPEG-2 video 1541 to the HEVC/H.265 (multi-view) 1545. The MP4 processing unit 1552 supplies the obtained image data to the external memory 1312 via, for example, the memory interface 1517 to store the image data. For example, the image data is read by the memory interface 1517 and is supplied to, for example, the connectivity 1321 via the image processing engine 1514, the display engine 1513, the display interface 1512, and the like, so that the image is displayed on a monitor.

As a process of the MP4 processing unit 1552, the method of each embodiment described above may be applied. That is, the MP4 processing unit 1552 may include the screen division processing unit 121, the image encoding unit 122, the file generation unit 123, and the server upload processing unit 126 (FIG. 12) of the delivery data generation device 101 (FIG. 11). In this case, the MP4 processing unit 1552 divides and encodes an image for each tile, generates the MP4 files in which the data of each tile is stored, and uploads the MP4 files to the delivery server 102 via the connectivity 1321 or the like. In this way, the MP4 processing unit 1552 can generate the various MP4 files described above in the embodiments.

The MP4 processing unit 1552 may include the file acquisition unit 154, the image decoding unit 155, the tile image combination unit 156 (FIG. 13) of the terminal device 103 (FIG. 11). In this case, the MP4 processing unit 1552 downloads the MP4 file including the data of the tiles included in a desired range from the delivery server 102 via the connectivity 1321 or the like, extracts and decodes the encoded data of the tiles from the MP4 file, appropriately combines the obtained image data (tile images) of the tiles to generate image data in the desired range, and outputs the image data as a video signal to the outside of the video processor 1332. In this way, the MP4 processing unit 1552 can process the various MP4 files described above in the embodiments to obtain desired image data.

That is, the video processor 1332 (that is, the video set 1300) can realize the adaptive supply of the data of the partial images.

The MPEG-DASH 1551 acquires the image data read from, for example, the external memory 1312 and generates the MPD managing the image data. The MPEG-DASH 1551 supplies the generated MPD file to the external memory 1312 via, for example, the memory interface 1517 to store the MPD file. For example, the MP4 file is read by the memory interface 1517, is output to the outside of the video processor 1332 via the multiplexing and demultiplexing unit (MUX DMUX) 1518 or the network interface 1519, and is output to an external network via the connectivity 1321, the broadband modem 1333, or the like.

The MPEG-DASH 1551 may encode the image data to generate the MP4 file in which the encoded data is stored and to generate the MPD managing the MP4 file and output the MPD file to an external network. The MPEG-DASH 1551 may output the MP4 file along with the MPD file to an external network.

For example, the MPEG-DASH 1551 acquires, via the memory interface 1517, the MPD file acquired from an external network via the connectivity 1321, the broadband modem 1333, or the like, supplied to the external memory 1312 via the network interface 1519, the multiplexing and demultiplexing unit (MUX DMUX) 1518, the memory interface 1517, and the like, and stored. The MPEG-DASH 1551 analyzes the acquired MPD and acquires desired image data based on the MPD. For example, when the MP4 file including the encoded data obtained by encoding the image data is managed by the MPD, the MPEG-DASH 1551 acquires the MP4 file corresponding to a desired image from an external network based on the MPD, extracts the encoded data included in the MP4 file, further decodes the encoded data using any of the MPEG-2 video 1541 to the HEVC/H.265 (multi-view) 1545. The MPEG-DASH 1551 supplies the obtained image data to the external memory via, for example, the memory interface 1517 to store the image data. For example, the image data is read by the memory interface 1517 and is supplied to, for example, the connectivity 1321 via the image processing engine 1514, the display engine 1513, the display interface 1512, and the like, so that the image is displayed on a monitor.

As a process of the MPEG-DASH 1551, the method of each embodiment described above may be applied. That is, the MPEG-DASH 1551 may include the screen division processing unit 121 to the server upload processing unit 126 (including the tile type MPD generation unit 141 in FIG. 12) of the delivery data generation device 101 (FIG. 11). In this case, the MPEG-DASH 1551 divides and encodes an image for each tile, generates the MP4 files in which the data of each tile is stored, generates the MPDs managing the MP4 file, and uploads them to the delivery server 102 via the connectivity 1321 or the like. In this way, the MPEG-DASH 1551 can generate the various MPDs described in the embodiments.

The MPEG-DASH 1551 may include the MPD acquisition unit 151 to the tile image combination unit 156 (each processing unit other than the display unit 157 in FIG. 13) of the terminal device 103 (FIG. 11). In this case, the MPEG-DASH 1551 analyzes the MPD, downloads the MP4 file including the data of the tiles included in a desired range from the delivery server 102 via the connectivity 1321 or the like, extracts and decodes the encoded data of the tiles from the MP4 file, appropriately combines the obtained image data (tile images) of the tiles to generate image data in the desired range, and outputs the image data as a video signal to the outside of the video processor 1332. In this way, the MPEG-DASH 1551 can process the various MPDs described above in the embodiments to obtain desired image data.

That is, the video processor 1332 (that is, the video set 1300) can realize the adaptive supply of the data of the partial images.

In the MP4 1551 and the MP4 processing unit 1552, the present technology (the function of the delivery data generation device 101 or the terminal device 103 described above) may be realized by hardware such as a logic circuit, may be realized by software such as an embedded program, or may be realized by both.

The two configurations of the video processor 1332 have been exemplified, but the configuration of the video processor 1332 is arbitrary and may be a configuration other than the two configurations described above. The video processor 1332 may be configured as a single semiconductor chip or may be configured as a plurality of semiconductor chips. For example, a 3-dimensional laminated LSI in which a plurality of semiconductors are laminated may be used. The video processor 1332 may be realized by a plurality of LSIs.

<Application Examples to Devices>

The video set 1300 can be embedded in various devices that process image data. For example, the video set 1300 can be embedded in the television device 900 (FIG. 67) or the mobile telephone 920 (FIG. 68). By embedding the video set 1300, the device can obtain the same advantages as the advantages described with reference to FIGS. 1 to 66.

A part of each configuration of the above-described video set 1300 can also be implemented as a configuration to which the present technology is applied, as long as the part of the configuration includes the video processor 1332. For example, only the video processor 1332 can be implemented as a video processor to which the present technology is applied. For example, the video module 1331 or the processor indicated by the dashed line 1341, as described above, can be implemented as a processor, a module, or the like to which the present technology is applied. Further, for example, the video module 1311, the external 1312, the power management module 1313, and the frontend module 1314 can be combined to be implemented as a video unit 1361 to which the present technology is applied. It is possible to obtain the same advantages as the advantages described with reference to FIGS. 1 to 66 regardless of the configuration.

That is, any configuration can be embedded in various devices processing image data, as in the case of the video set 1300, as long as the configuration includes the video processor 1332. For example, the video processor 1332 or the processor indicated by the dashed line 1341, the video module 1311, or the video unit 1361 can be embedded in the television device 900 (FIG. 67), the mobile telephone 920 (FIG. 68), and the like. By embedding any configuration to which the present technology is applied, the device can obtain the same advantages as the advantages described with reference to FIGS. 1 to 66, as in the video set 1300.

The advantages described in the present specification are merely exemplary and are not limited and other advantages may be obtained.

In the present specification, a system means a set of a plurality of constituent elements (devices, modules (components), and the like) and all of the constituent elements may be included or may not be included in the same casing. Accordingly, a plurality of devices accommodated in separate casings and connected via networks and a single device in which a plurality of modules are accommodated in a single casing are all systems.

A configuration described above as a single device (or processing unit) may be divided and configured as a plurality of devices (or processing units). In contrast, a configuration described above as a plurality of devices (or processing units) may be collected and configured as a single device (or processing unit). Configurations other than the above-described configurations may, of course, be added to the configurations of the devices (or the processing units). Further, as long as configurations or operations are substantially the same in the entire system, parts of the configurations of certain devices (or processing units) may be included in the configurations of the other devices (or other processing units).

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, in the present technology, it is possible to realize a cloud computing configuration in which a single function is shared and processed jointly by a plurality of devices via networks.

Each step described in the above-described flowcharts can be performed by a single device and can also be shared and performed by a plurality of devices.

When a plurality of processes are included in a single step, the plurality of processes included in the single step can be performed by a single device and can also be shared and performed by a plurality of devices.

The information processing device according to the above-described embodiments can be applied to various electronic devices such as a transmitter or a receiver in delivery of satellite broadcast, a wired broadcast such as a cable TV, or the Internet and delivery to a terminal by cellular communication, a recording device recording an image in a medium such as an optical disc, a magnetic disk, or a flash memory, or a reproduction device reproducing an image from the storage medium.

In the present specification, the examples in which the various kinds of metadata are multiplexed in the bit stream and are transmitted from the encoding side to the decoding side have been described. However, the methods of transmitting the information are not limited to the examples. For example, the information may be transmitted or recorded as separate pieces of data associated with the bit stream without being multiplexed in the bit stream. Here, the term "associated" means that an image (which may be a part of an image, such as a slice or a block) included in a bit stream and information corresponding to the image can be linked at the time of decoding. That is, the information may be transmitted along a different transmission path from the bit stream of the image. The information may be recorded in a different recording medium (or a different recording area of the same recording medium) from the bit stream of the image. Further, the bit stream of the information and the image may be mutually associated, for example, in any unit such as a plurality of frames, a single frame, or a part of a frame.

Additionally, the present technology may also be configured as below.

(1) An information processing device including:

a partial image information generation unit configured to generate partial image information which is information regarding each partial image which is a part of an entire image; and a metadata generation unit configured to generate metadata to be used for supply of a bit stream of the entire image and supply of a bit stream of the partial image using the partial image information generated by the partial image information generation unit.

(2) In the information processing device described in (1), the partial image information includes a view type indicating whether an image corresponding to the partial image information is the partial image;

information regarding a size of the entire image;

information indicating a position of the partial image in the entire image; and group identification information identifying a group which is a group to which the partial images belong and which is a group of the partial images displayable as one image.

(3) In the information processing device described in (1) or (2), the metadata generation unit stores the partial image information regarding the plurality of partial images belonging to the same group in mutually different adaptation sets (AdaptationSet) of the metadata and assigns the bit streams of the plurality of partial images to the mutually different adaptation sets.

(4) In the information processing device described in any of (1) to (3), the metadata generation unit stores the partial image information regarding the plurality of partial images belonging to the same group in mutually different representations (Representation) belonging to one adaptation set (AdaptationSet) of the metadata and assigns the bit streams of the plurality of partial images to the mutually different representations.

(5) In the information processing device described in any of (1) to (4), the metadata generation unit stores the partial image information regarding the plurality of partial images belonging to the same group in mutually different adaptation sets (AdaptationSet) of the metadata and assigns a plurality of files for which one bit stream including the plurality of partial images is divided for each partial image to the mutually different adaptation sets.

(6) In the information processing device described in any of (1) to (5), the partial image information generation unit may further generate the partial image information regarding control information included in the bit stream, and the metadata generation unit may store the partial image information of the control information in a different adaptation set from the partial image information of each partial image and assign a file of the control information to the adaptation set.

(7) In the information processing device described in any of (1) to (6), the metadata generation unit stores the partial image information regarding the plurality of partial images belonging to the same group in mutually different representations (Representation) belonging to the same adaptation set (AdaptationSet) of the entire images of the metadata and assigns the bit streams of the plurality of partial images to the mutually different representations.

(8) In the information processing device described in any of (1) to (7), the partial image information generation unit may further generate the partial image information regarding the control information included in one bit stream including the plurality of partial images belonging to the same group. The metadata generation unit may store the partial image information regarding the plurality of partial images in the mutually different representation (Representation) belonging to one adaptation set (AdaptationSet) of the metadata and assign a plurality of files in which the bit stream is divided for each partial image to the mutually different representations, and may store the partial image information of the control information in a different representation from the partial image information regarding each partial image and assign a file of the control information to the representation.

(9) In the information processing device described in any of (1) to (8), the metadata generation unit stores the partial image information regarding the plurality of partial images belonging to the same group in mutually different sub-representations (Sub-Representation) belonging to one representation (Representation) belonging to one adaptation set (AdaptationSet) of the metadata and assigns the bit streams of the plurality of partial images to the mutually different sub-representations.

(10) In the information processing device described in any of (1) to (9), the partial image information generation unit may further generate segment information indicating that information regarding the bit stream is present under a sub-representation (Sub-Representation) and the partial image information regarding the control information included in one bit stream including the plurality of partial images belonging to the same group. The metadata generation unit may store the partial image information of the control information and the segment information in one representation (Representation) belonging to one adaptation set (AdaptationSet) of the metadata and assign a file of the control information to the representation, and may store the partial image information regarding the plurality of partial images in the mutually different sub-representations belonging to the representation and assign a plurality of files for which the bit stream is divided for each partial image to the mutually different sub-representations.

(11) In the information processing device described in any of (1) to (10), the partial image information generation unit may further generate segment information indicating that information regarding the bit stream is present under a sub-representation (Sub-Representation) and the partial image information regarding the control information included in one bit stream including the plurality of partial images belonging to the same group. The metadata generation unit may store the partial image information of the control information and the segment information in one representation (Representation) belonging to one adaptation set (AdaptationSet) of the metadata and assign the bit stream to the representation, and may store the partial image information regarding the plurality of partial images in the mutually different sub-representations belonging to the representation and assign information indicating locations of data of the partial images in the bit stream to the mutually different sub-representations.

(12) In the information processing device described in any of (1) to (11), the partial image information generation unit may further generate multi-segment information indicating that a plurality of pieces of information regarding the bit streams of the same time are present under the representation (Representation). The metadata generation unit may store the multi-segment information in one representation (Representation) belonging to one adaptation set (AdaptationSet) of the metadata, and may store the partial image information regarding the plurality of partial images belonging to the same group in the mutually different segments belonging to the representation and assign the bit streams of the plurality of partial images to the mutually different segments.

(13) In the information processing device described in any of (1) to (12), the partial image information generation unit may further generate segment information indicating that information regarding the bit stream is not present under the sub-representation (Sub-Representation) and the partial image information regarding one bit stream including the plurality of partial images belonging to the same group. The metadata generation unit may store the segment information in one representation (Representation) belonging to one adaptation set (AdaptationSet) of the metadata, may store the partial image information in one segment (Segment) belonging to the representation and assign the bit stream to the segment, and may assign information indicating locations of data of the partial images in the bit stream to the mutually different sub-segments (Sub-Segments) belonging to the segment.

(14) The information processing device described in any of (1) to (13), further includes:
an encoding unit configured to encode image data of the entire image and the partial images and generate a bit stream.

(15) The information processing device described in any of (1) to (14), further includes:
a screen division processing unit configured to generate image data of each partial image from image data of the entire image.

(16) An information processing method includes:
generating partial image information which is information regarding each partial image which is a part of an entire image; and
generating metadata to be used for supply of a bit stream of the entire image and supply of a bit stream of the partial image using the generated partial image information.

(17) An information processing device includes:
an analysis unit configured to analyze metadata including partial image information which is information regarding each partial image which is a part of an entire image and used for supply of a bit stream of the entire image and supply of a bit stream of the partial image and to obtain the partial image information;
a selection unit configured to select a bit stream of a desired partial image using the partial image information obtained by the analysis unit; and
a bit stream acquisition unit configured to acquire the bit stream selected by the selection unit.

(18) The information processing device described in (17) may further include a metadata acquisition unit configured to acquire the metadata.

(19) The information processing device described in (17) or (18), may further include:
a decoding unit configured to decode the bit stream acquired by the bit stream acquisition unit.

(20) An information processing method includes:
analyzing metadata including partial image information which is information regarding each partial image which is a part of an entire image and used for supply of a bit stream of the entire image and supply of a bit stream of the partial image and obtaining the partial image information;
selecting a bit stream of a desired partial image using the obtained partial image information; and
acquiring the selected bit stream.

(21) An information processing device includes:
a partial image information generation unit configured to generate partial image information which is information regarding each partial image which is a part of an entire image; and
a metadata generation unit configured to generate metadata to be used for supply of a bit stream of the entire image and supply of a bit stream of the partial image using the partial image information generated by the partial image information generation unit,
wherein the partial image information includes identification information indicating whether a content source of the adaptation set (AdaptationSet) in which the partial image information is stored is the same as a content source of another adaptation set.

(22) In the information processing device described in (21), the partial image information may further include information indicating a location of the partial image in the entire image, information regarding a size of the partial image, and information regarding a size of the entire image.

(23) In the information processing device described in (21) or (22), the partial image information may further include identification information indicating whether the adaptation set in which the partial image information is stored defines the entire bit stream or a part of the bit stream.

(24) In the information processing device described in any of (21) to (23), the partial image information may further include information indicating which information configures a part of the bit stream to which the adaptation set storing the partial image information corresponds.

(25) In the information processing device described in any of (21) to (24), the partial image information may further include information indicating whether the part of the bit stream to which the adaptation set storing the partial image information corresponds is divided into tracks.

(26) In the information processing device described in any of (21) to (25), the partial image information may further include identification information of the partial image to which the adaptation set storing the partial image information corresponds.

(27) In the information processing device described in any of (21) to (26), the partial image information may further include a track reference and an extractor. The track reference and the extractor may be stored in the tracks corresponding to the plurality of partial images and refer to a base track storing slices of the partial images.

(28) An information processing method includes:
generating partial image information which is information regarding each partial image which is a part of an entire image, the partial image information including identification information indicating whether a content source of the adaptation set (AdaptationSet) in which the partial image information is stored is the same as a content source of another adaptation set; and
generating metadata to be used for supply of a bit stream of the entire image and supply of a bit stream of the partial image using the generated partial image information.

(29) An information processing device includes:
an analysis unit configured to analyze metadata including partial image information which is information regarding each partial image which is a part of an entire image and used for supply of a bit stream of the entire image and supply of a bit stream of the partial image and to obtain the partial image information;
a selection unit configured to select a bit stream of a desired partial image using the partial image information obtained by the analysis unit; and
a bit stream acquisition unit configured to acquire the bit stream selected by the selection unit,
wherein the partial image information includes identification information indicating whether a content source of the adaptation set (AdaptationSet) in which the partial image information is stored is the same as a content source of another adaptation set.

(30) An information processing method includes:
analyzing metadata including partial image information which is information regarding each partial image which is a part of an entire image and used for supply of a bit stream of the entire image and supply of a bit stream of the partial image and obtaining the partial image information, the partial image information including identification information indicating whether a content source of the adaptation set (AdaptationSet) in which the partial image information is stored is the same as a content source of another adaptation set;
selecting a bit stream of a desired partial image using the obtained partial image information; and
acquiring the selected bit stream.

(41) An information processing device includes:
a partial image information generation unit configured to generate partial image information which is information regarding each partial image which is a part of an entire image; and
a metadata generation unit configured to generate metadata to be used for supply of a bit stream of the entire image and supply of a bit stream of the partial image using the partial image information generated by the partial image information generation unit.

(42) In the information processing device described in (41),
the partial image information includes positional information indicating a position of the partial image in the entire image.

(43) In the information processing device described in (42),
the positional information indicates a position of an upper left of the partial image.

(44) In the information processing device described in any of (41) to (43),
the metadata generation unit stores the partial image information regarding the plurality of partial images in mutually different adaptation sets (AdaptationSet) of the metadata and assigns the bit streams of the plurality of partial images to the mutually different adaptation sets.

(45) The information processing device described in any of (41) to (44),
the metadata generation unit stores the partial image information regarding the plurality of partial images in mutually different adaptation sets (AdaptationSet) of the metadata and assigns a plurality of files for which one bit stream including the plurality of partial images is divided for each partial image to the mutually different adaptation sets.

(46) In the information processing device described in any of (41) to (45),
the metadata generation unit stores the partial image information regarding the plurality of partial images in mutually different sub-representations (Sub-Representation) belonging to one representation (Representation) belonging to one adaptation set (AdaptationSet) of the metadata and assigns the bit streams of the plurality of partial images to the mutually different sub-representations.

(47) In the information processing device described in (46),
the partial image information generation unit further generates information indicating that information regarding the bit stream is present under the sub-representation (Sub-Representation).

(48) In the information processing device described in (46) or (47),
each of the bit streams of the plurality of partial images is stored in a TRACK of one MP4 file.

(49) In the information processing device described in (48),
the metadata generation unit further generates information indicating a location of data of the one MP4 file.

(50) In the information processing device described in any of (41) to (49),
the partial image information further includes information regarding a size of the entire image.

(51) In the information processing device described in any of (41) to (50),
the partial image information further includes group identification information identifying a group which is a group to which the partial images belong and which is a group of the partial images displayable as one image.

(52) The information processing device described in any of (41) to (51), may further includes:
an encoding unit configured to encode image data of the entire image and the partial images and generate a bit stream.

(53) In the information processing device described in any of (41) to (52), may further includes:
a screen division processing unit configured to generate image data of each partial image from image data of the entire image.

(54) In the information processing device described in any of (41) to (53), the partial image information includes information indicating the number of partial images forming the entire image, identification information indicating that sizes of the partial images are equal, and information indicating a position and a size of each partial image when the sizes of the partial images are not equal.

(55) An information processing method includes:

generating partial image information which is information regarding each partial image which is a part of an entire image; and generating metadata to be used for supply of a bit stream of the entire image and supply of a bit stream of the partial image using the generated partial image information.

(56) An information processing device includes:

an analysis unit configured to analyze metadata including partial image information which is information regarding each partial image which is a part of an entire image and used for supply of a bit stream of the entire image and supply of a bit stream of the partial image and to obtain the partial image information;

a selection unit configured to select a bit stream of a desired partial image using the partial image information obtained by the analysis unit; and a bit stream acquisition unit configured to acquire the bit stream selected by the selection unit.

(57) In the information processing device described in (56), the partial image information includes positional information indicating a position of the partial image in the entire image.

(58) In the information processing device described in (57), the positional information indicates a position of an upper left of the partial image.

(59) In the information processing device described in any of (56) to (58), the analysis unit analyzes the metadata in which the partial image information regarding the plurality of partial images is stored in mutually different adaptation sets (AdaptationSet) and the bit streams of the plurality of partial images are assigned to the mutually different adaptation sets.

(60) In the information processing device described in any of (56) to (59), the analysis unit analyzes the metadata in which the partial image information regarding the plurality of partial images is stored in mutually different adaptation sets (AdaptationSet) and a plurality of files for which one bit stream including the plurality of partial images is divided for each partial image are assigned to the mutually adaptation sets.

(61) In the information processing device described in any of (56) to (60), the analysis unit analyzes the metadata in which the partial image information regarding the plurality of partial images is stored in mutually different sub-representations (Sub-Representation) belonging to one representation (Representation) belonging to one adaptation set (AdaptationSet) and the bit streams of the plurality of partial images are assigned to the mutually different sub-representations.

(62) In the information processing device described in (61), the partial image information includes information indicating that information regarding the bit stream is present under the sub-representation (Sub-Representation).

(63) In the information processing device described in (61) or (62), each of the bit streams of the plurality of partial images is stored in a TRACK of one MP4 file.

(64) In the information processing device described in (63), the metadata includes information indicating a location of data of the one MP4 file.

(65) In the information processing device described in any of (56) to (64), the partial image information further includes information regarding a size of the entire image.

(66) In the information processing device described in any of (56) to (65), the partial image information further includes group identification information identifying a group which is a group to which the partial images belong and which is a group of the partial images displayable as one image.

(67) In the information processing device described in any of (56) to (66), may further includes:

a decoding unit configured to decode the bit stream acquired by the bit stream acquisition unit.

(68) In the information processing device described in (67), may further includes:

a screen combination processing unit configured to generate image data of the entire image from image data of the partial image obtained by the decoding unit decoding the bit stream.

(69) The information processing device described in any of (56) to (68), the partial image information includes information indicating the number of partial images forming the entire image, identification information indicating that sizes of the partial images are equal, and information indicating a position and a size of each partial image when the sizes of the partial images are not equal.

(70) An information processing method includes:

analyzing metadata including partial image information which is information regarding each partial image which is a part of an entire image and used for supply of a bit stream of the entire image and supply of a bit stream of the partial image and obtaining the partial image information;

selecting a bit stream of a desired partial image using the obtained partial image information; and acquiring the selected bit stream.

REFERENCE SIGNS LIST 100 delivery system
101 delivery data generation device
102 delivery server
103 terminal device
104 network
121 screen division processing unit
122 image encoding unit
123 file generation unit
124 tile type image information generation unit
125 MPD generation unit
126 server upload processing unit
131 to 133 encoding processing units
141 tile type MPD generation unit
151 MPD acquisition unit
152 parsing processing unit
153 tile image selection unit
154 file acquisition unit
155 image decoding unit
156 tile image combination unit 157 display unit
161 to 163 decoding processing units
171 tile type image information processing unit

The invention claimed is:

1. An information processing device comprising:
    circuitry configured to
        generate metadata used for provision of a bit stream of a whole image and provision of a bit stream of a partial image that is part of the whole image, and
        initiate storage into the metadata of partial image information on the partial image,
    wherein the partial image is composed of at least one tile image,
    wherein the partial image information includes a view type (viewtype) indicating whether or not the partial image information is a partial image,
    wherein the partial image information includes group identification information for identifying a group of partial images that can be displayed as one image, and
    wherein the partial image information includes position information indicating a position of the partial image within the whole image.

2. The information processing device according to claim 1,
    wherein the position information indicates an upper left position of the partial image.

3. The information processing device according to claim 1,
    wherein the circuitry is further configured to initiate storage of the partial image information in an adaptation set of the metadata.

4. The information processing device according to claim 1,
    wherein the partial image information is stored in a view point which is a descriptor type element of the adaptation set of the metadata.

5. The information processing device according to claim 1,
    wherein the circuitry is further configured to initiate storage of the partial image information of each of a plurality of partial images in mutually different adaptation sets of the metadata and assign a respective bit stream of each of the plurality of partial images to a respective adaptation set of the mutually different adaptation sets.

6. The information processing device according to claim 1,
    wherein the circuitry is further configured to initiate storage of the partial image information of each of the plurality of partial images in mutually different sub-representations belonging to one representation belonging to one adaptation set of the metadata and assign a respective bit stream of each of the plurality of partial images to a respective sub-representation of the mutually different sub-representations.

7. The information processing device according to claim 6,
    wherein the partial image information includes information indicating that the respective bit stream exists under the respective sub-representation.

8. The information processing device according to claim 6,
    wherein the respective bit stream of each of the plurality of partial images is stored in a TRACK of one MP4 file.

9. The information processing device according to claim 8,
    wherein the circuitry is further configured to generate information indicating a location of data of the one MP4 file.

10. The information processing device according to claim 1,
    wherein the partial image information includes information on a size of the whole image.

11. The information processing device according to claim 1,
    wherein the at least one tile image comprises an HEVC tile image.

12. The information processing device according to claim 1,
    wherein the partial image information includes
        information indicating a number of partial images constituting the whole image,
        identification information indicating whether or not sizes of the partial images are equal, and
        information indicating a position and a size of each partial image when the sizes of the partial images are not equal.

13. An information processing method comprising:
    generating metadata used for provision of a bit stream of a whole image and provision of a bit stream of a partial image that is part of the whole image; and
    storing partial image information on the partial image in an adaptation set of the metadata,
    wherein the partial image is composed of at least one tile image,
    wherein the partial image information includes a view type (viewtype) indicating whether or not the partial image information is a partial image,
    wherein the partial image information includes group identification information for identifying a group of partial images that can be displayed as one image, and
    wherein the partial image information includes position information indicating a position of the partial image within the whole image.

14. A non-transitory computer-readable medium having embodied thereon a program, which when executed by a computer, causes the computer to execute a method, the method comprising:
    generating metadata used for provision of a bit stream of a whole image and provision of a bit stream of a partial image that is part of the whole image; and
    storing partial image information on the partial image in an adaptation set of the metadata,
    wherein the partial image is composed of at least one tile image,
    wherein the partial image information includes a view type (viewtype) indicating whether or not the partial image information is a partial image,
    wherein the partial image information includes group identification information for identifying a group of partial images that can be displayed as one image, and
    wherein the partial image information includes position information indicating a position of the partial image within the whole image.

* * * * *